United States Patent [19]

Hawkins

[11] 4,403,965
[45] Sep. 13, 1983

[54] ELECTRONIC TEACHING APPARATUS

[75] Inventor: William R. Hawkins, Lubbock, Tex.

[73] Assignee: Texas Instruments Incorporated, Dallas, Tex.

[21] Appl. No.: 192,978

[22] Filed: Oct. 1, 1980

[51] Int. Cl.³ .............................................. G09B 7/06
[52] U.S. Cl. .................................... 434/327; 434/339
[58] Field of Search .............. 434/339, 335, 327, 308; 364/718; 340/286 M, 365 UL

[56] References Cited

U.S. PATENT DOCUMENTS 3,579,857  5/1971  Lamberson .
3,696,525 10/1972  Cleary ................................. 434/339
3,760,360  9/1973  Reynolds et al. ............. 340/286 M
3,795,989  3/1974  Greenberg et al. .
3,939,579  2/1976  Andrews et al. .................. 434/335
3,952,426  4/1976  Hesener ............................. 434/327
4,030,094  6/1977  Anderson ..................... 340/365 UL
4,173,832 11/1979  Chen et al. ........................ 434/335
4,189,779  2/1980  Brautingham ...................... 364/718
4,215,240  7/1980  Ostrowski .

FOREIGN PATENT DOCUMENTS 1286822  8/1972  United Kingdom ............... 434/308

Primary Examiner—Vance Y. Hum
Assistant Examiner—Leo P. Picard
Attorney, Agent, or Firm—William E. Hiller; Melvin Sharp; Leo Heiting

[57] ABSTRACT

An electronic teaching apparatus which utilizes interchangeable flexible overlays with printed pictorial representations in conjunction with a programmable keyboard. An integrated circuit speech synthesizer is utilized to verbally ask an operator to select a particular pictorial representation or to verbally identify a pictorial representation selected by the operator. Upon the failure of the operator to correctly select a particular pictorial representation, the verbal request can be repeated in conjunction with a verbal description of some attribute of the desired pictorial presentation. Each of the interchangeable overlays is coded to allow control circuitry to select a proper sequence of words for a given overlay.

12 Claims, 58 Drawing Figures

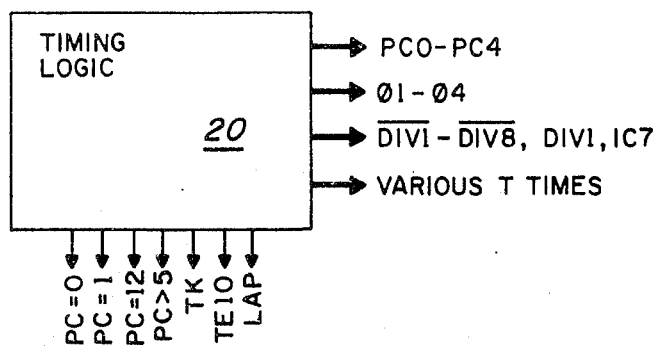
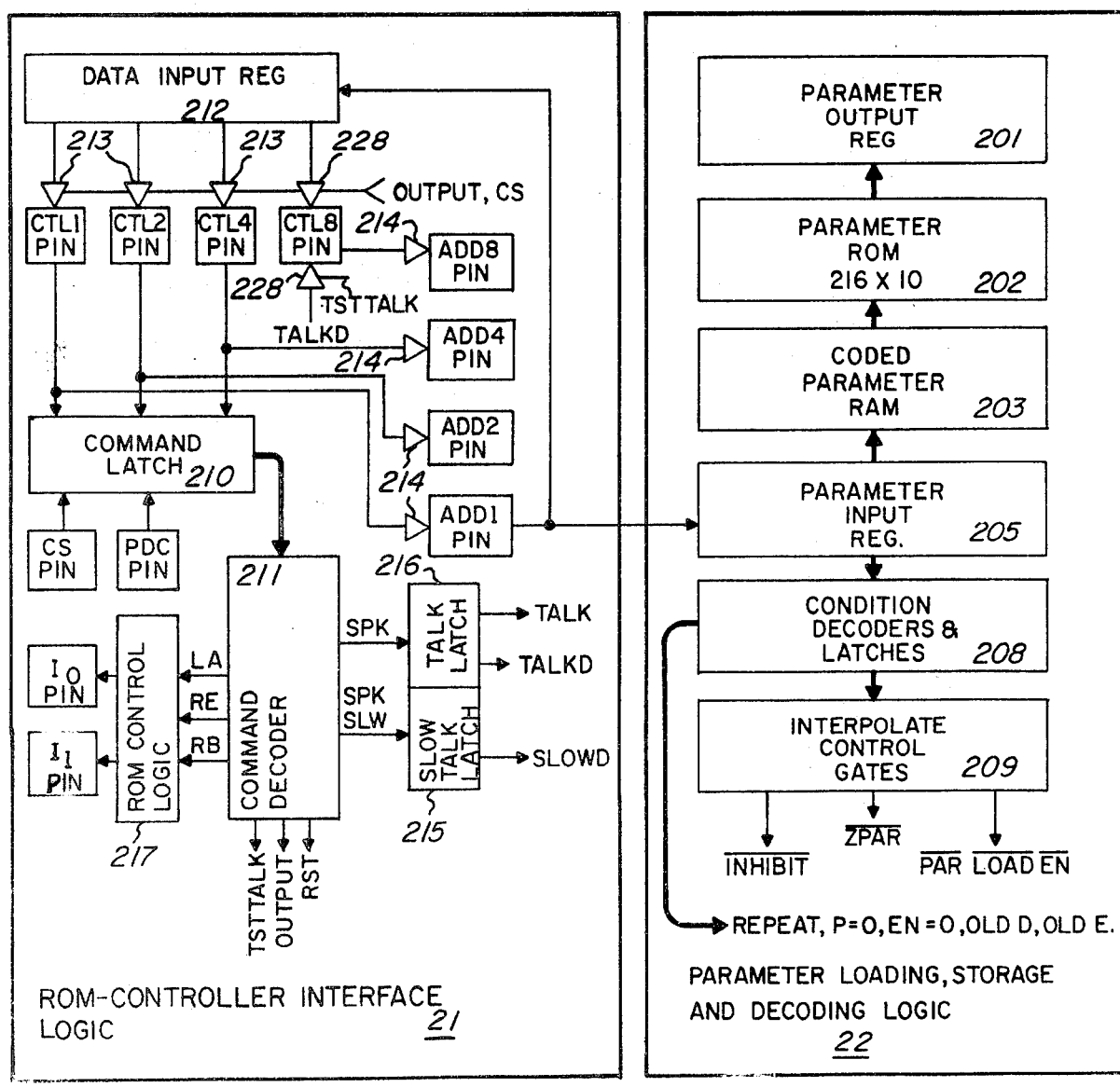
Fig. 4a

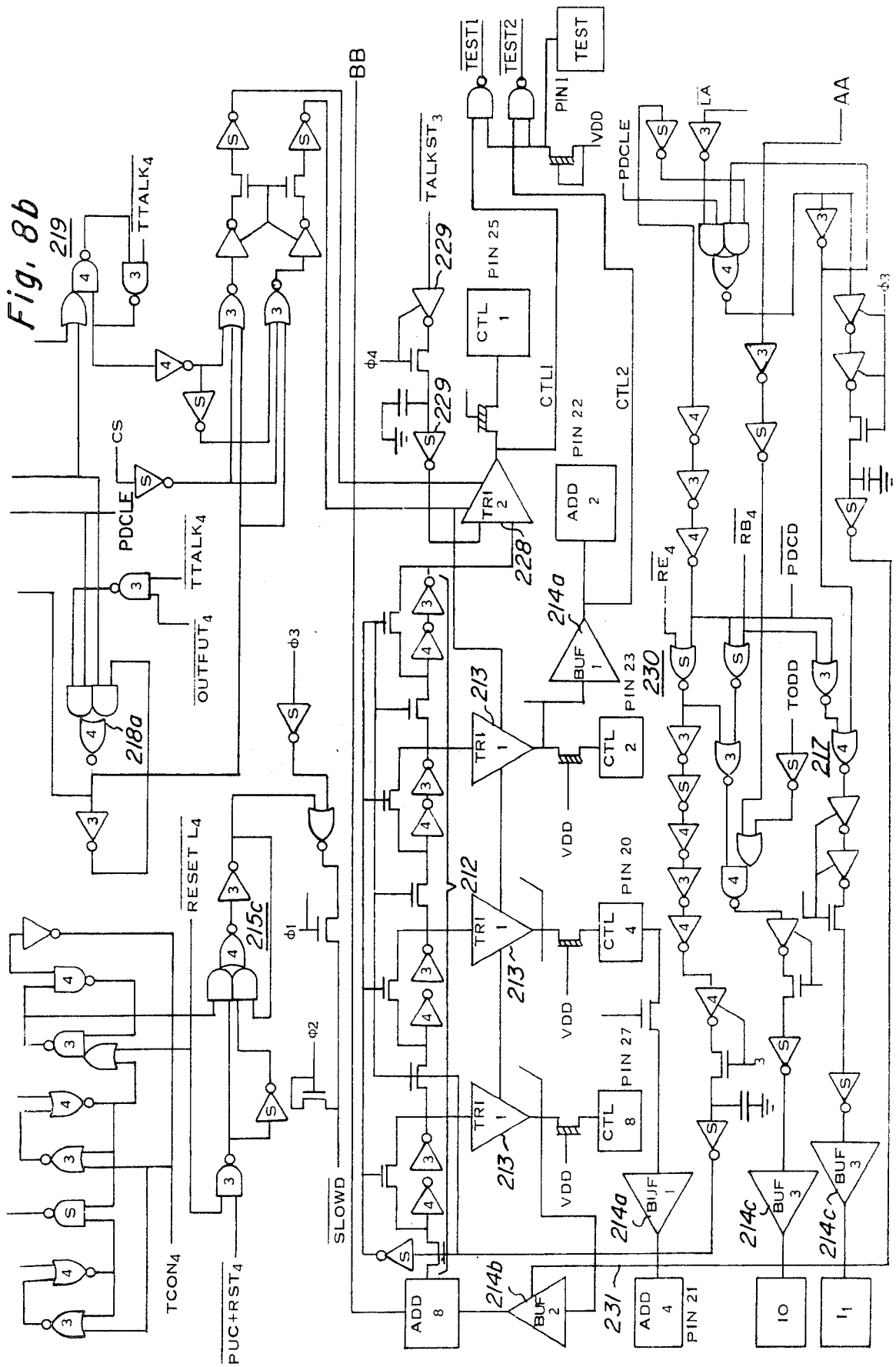

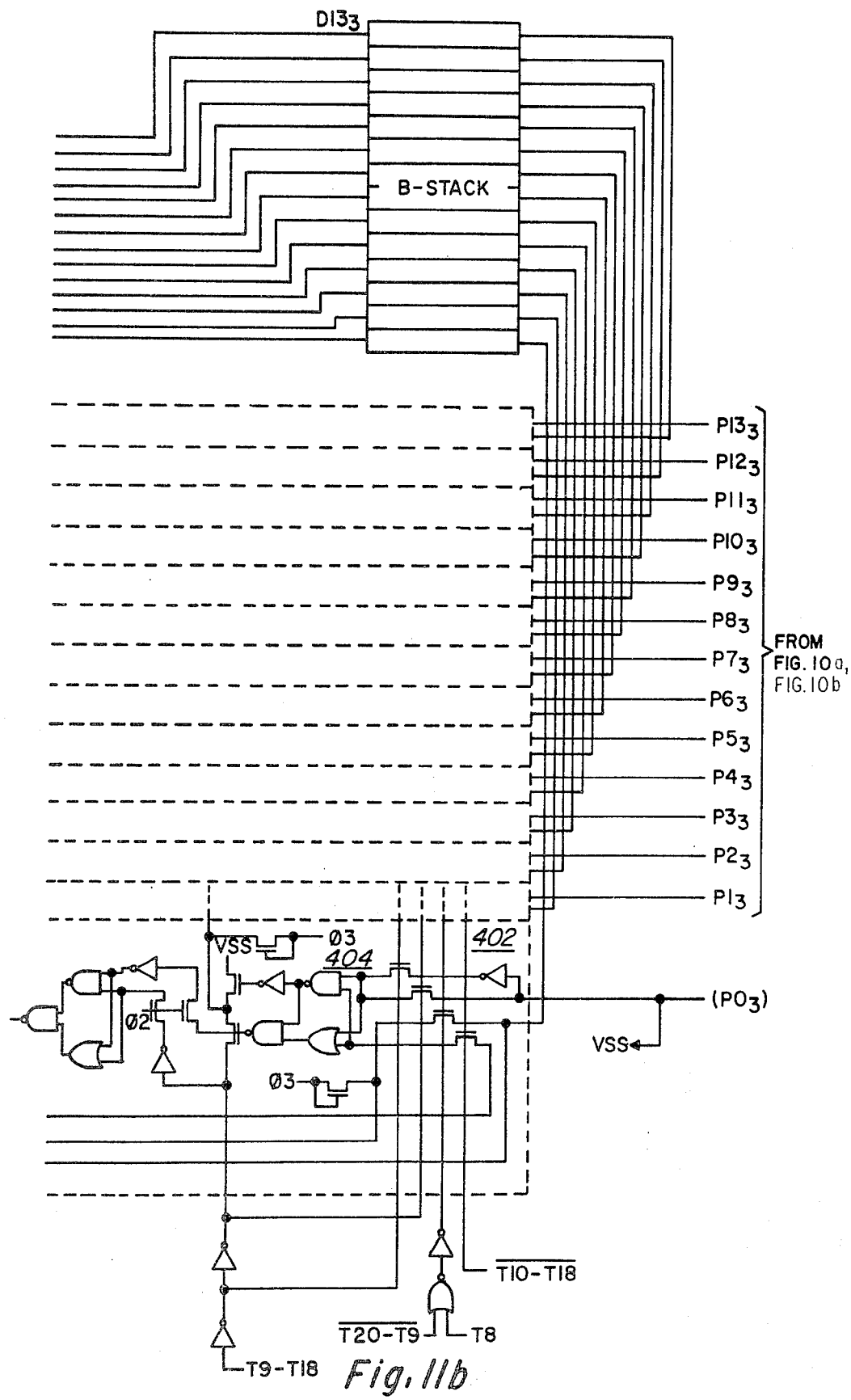

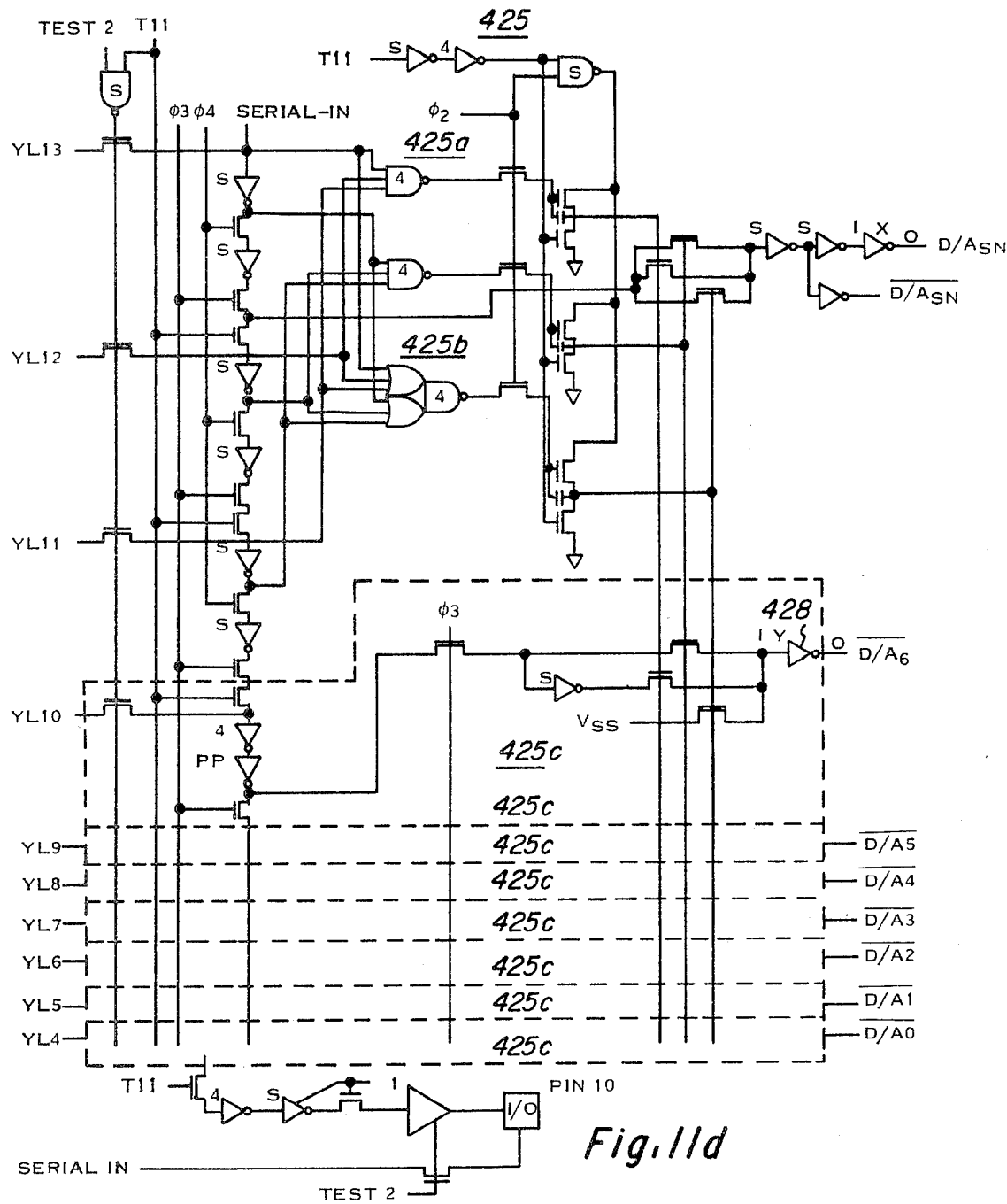
Fig. 11d
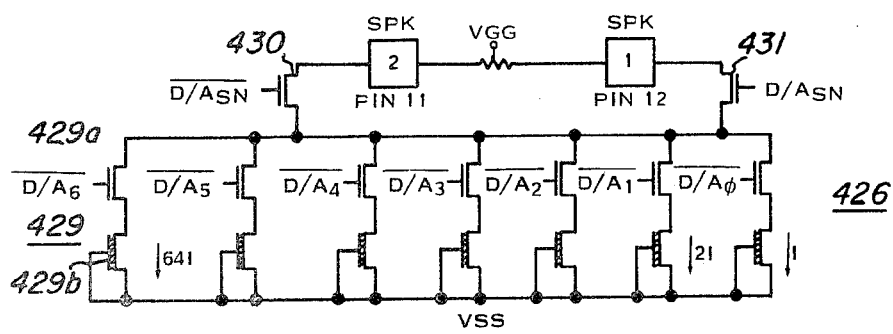

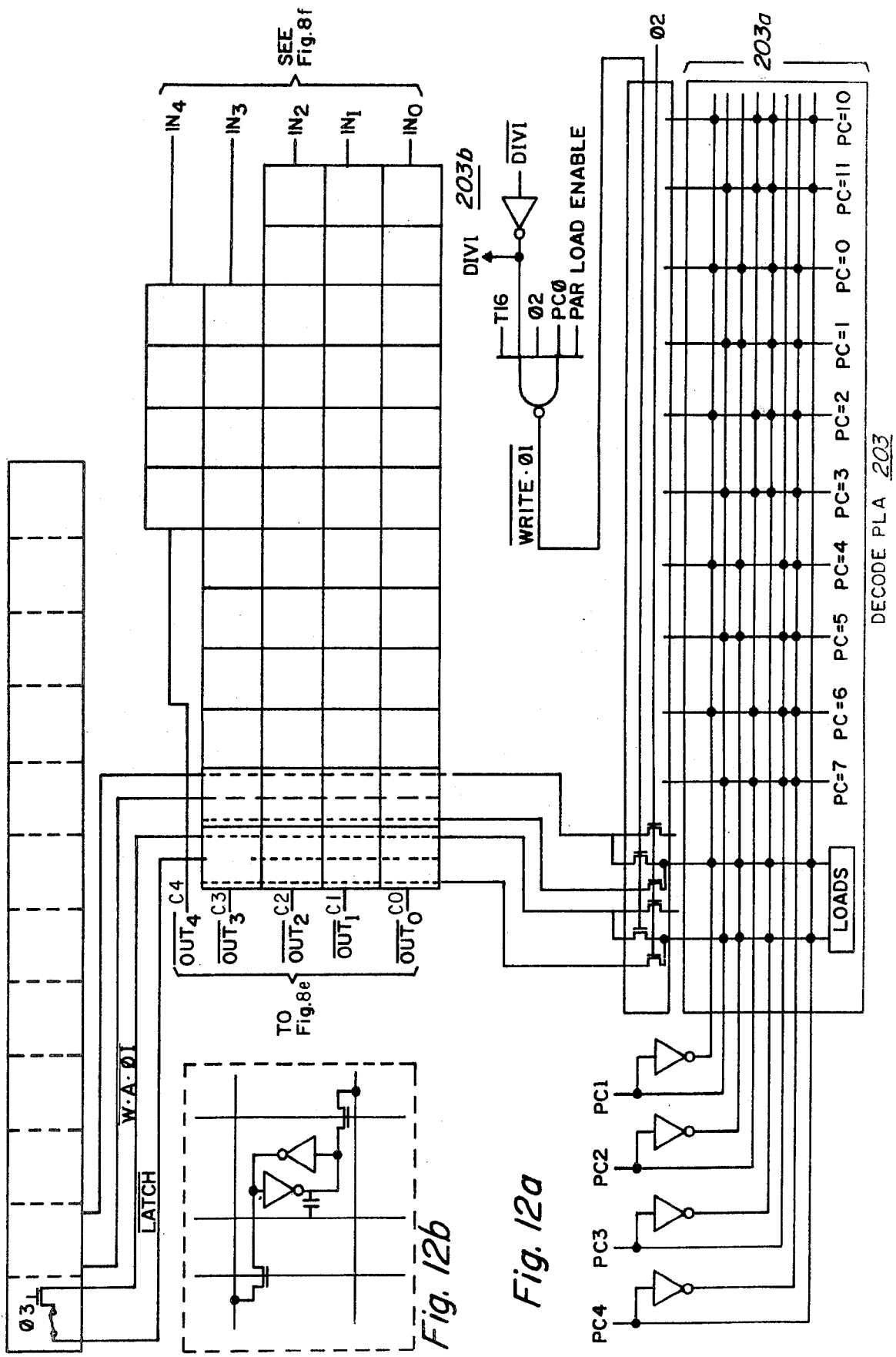

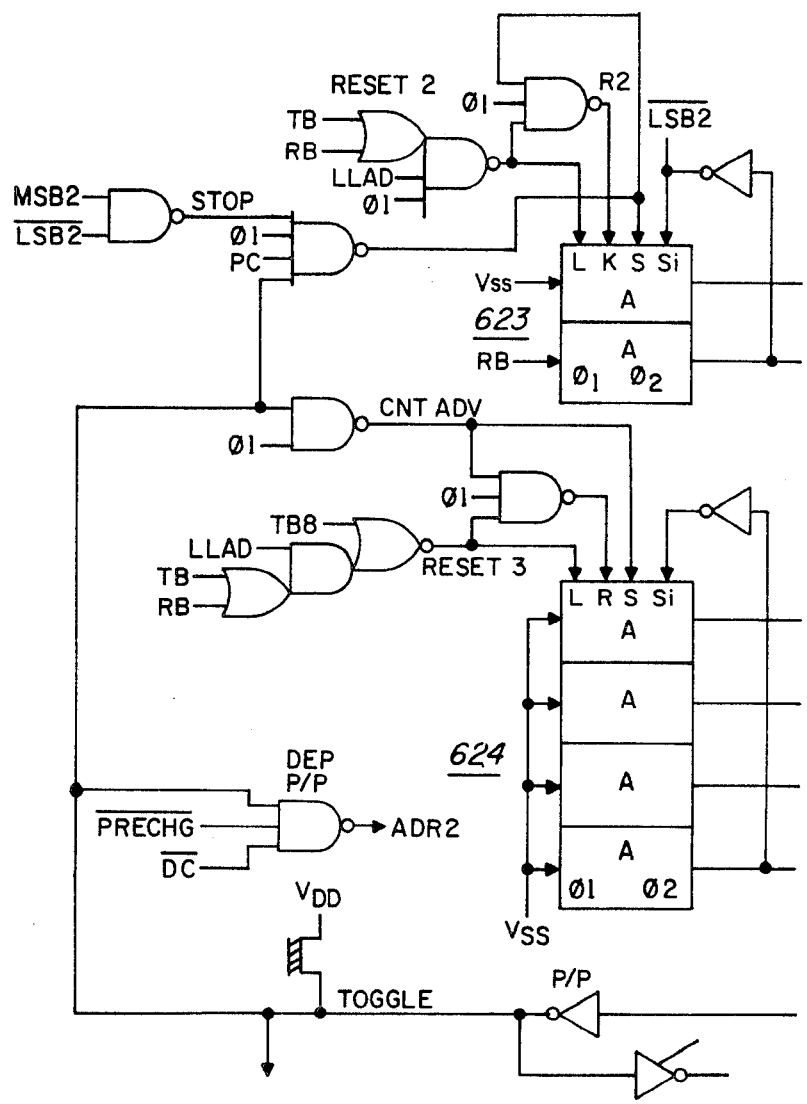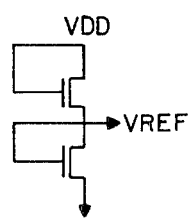
Fig. 20e

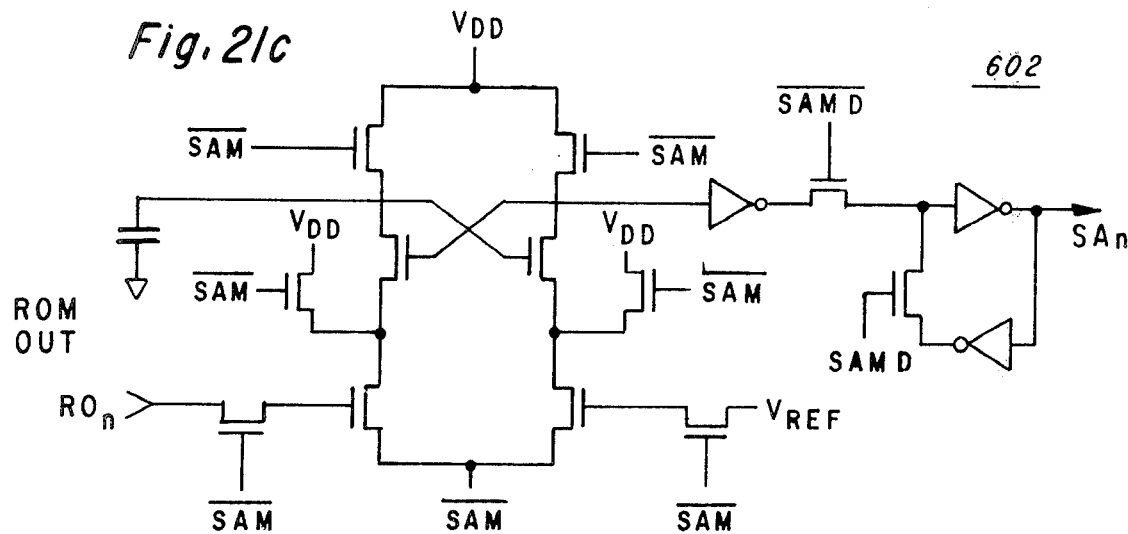
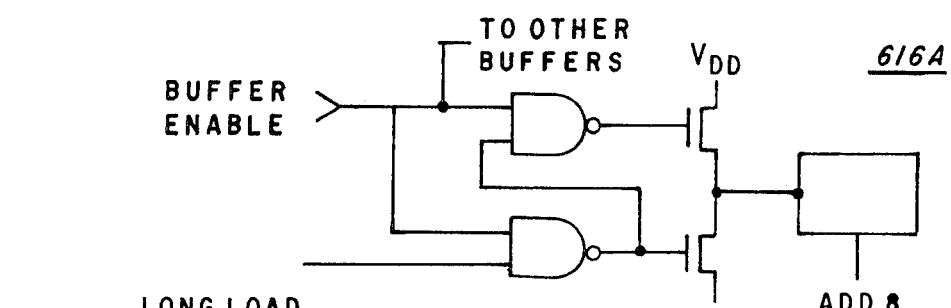
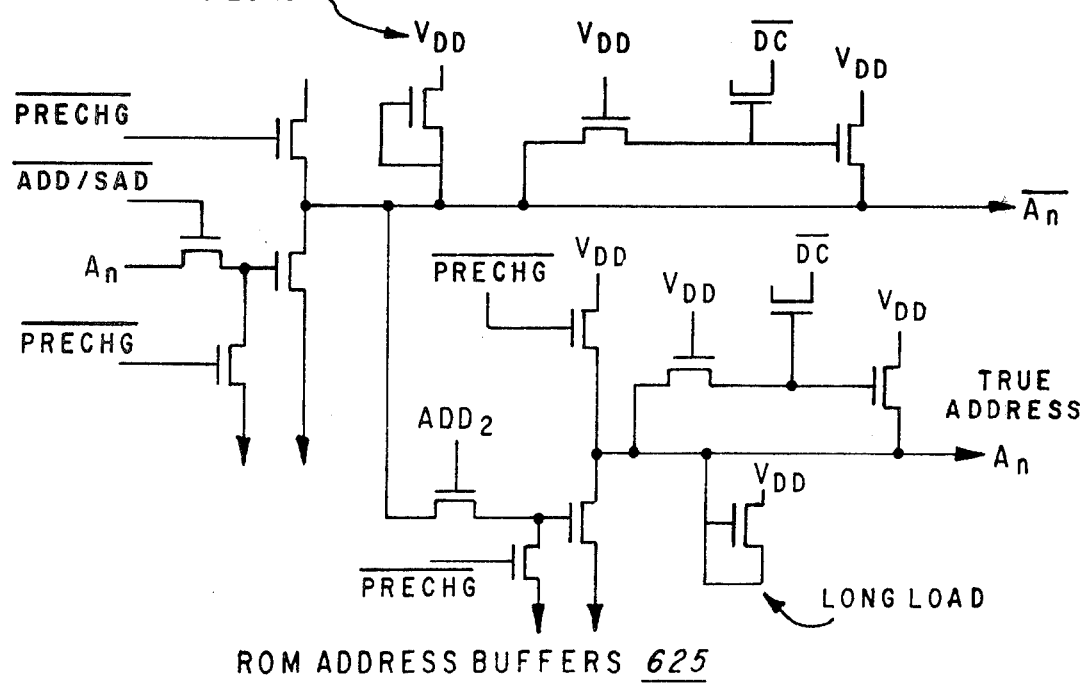
Fig. 21c

ELECTRONIC TEACHING APPARATUS

BACKGROUND OF THE INVENTION

This invention relates to electronic learning aids, teaching machines and electronic training aids. More specifically, this invention relates to an electronic teaching apparatus which utilizes an overlay having a plurality of printed pictorial representations thereon in conjunction with a programmable keyboard disposed therebeneath, wherein means for producing synthesized speech is provided as a component of the electronic teaching apparatus for verbally requesting an operator, such as a child or a person with limited intellectual skills, to identify one of the pictorial representations by appropriately touching a particular pictorial representation on the overlay at a location overlying that portion of the keyboard associated with the specific pictorial representation chosen by the operator as his answer.

The prior art suggests various techniques for implementing electronic learning aids to be utilized by young children or those having only rudimentary reading skills. One example of such a learning aid may be seen in U.S. Pat. No. 3,795,989, wherein a keyboard controller with numerous pictorial displays is utilized to control a tone generator so that a proper sequence of pictorial inputs may be utilized to generate a simple tune. A major disadvantage of systems of this type is that they may not be easily utilized with small children having little or no reading ability, since the sequence of pictorial displays required to generate a proper tune is presented in written form. Another example of electronic learning aids designed for use by operators with only rudimentary reading skills may be seen in U.S. Pat. No. 3,579,857. The electronic learning aid of U.S. Pat. No. 3,579,857 utilizes a flexible overlay placed on a top of a network of conducting elements. The flexible overlay has printed upon it a plurality of pictorial representations and has a number of conducting areas on the opposite side. A teacher or instructor must then request that the student select a particular pictorial representation. Upon depression of the flexible overlay in the area of the correct pictorial representation, contact of the aforementioned conducting area with the conducting elements beneath causes a lamp to be energized and a buzzer to buzz. This system requires that the teacher or instructor know before hand which pictorial representation has a conducting area on the opposite side and only those pictorial representations with conducting areas can be considered correct responses.

Electronic learning aids of general character have been equipped with audio means, wherein the audio means is a prerecorded series of spoken messages relating to the subject matter on which the operator of the learning aid is to be tested. In such instances, the audio means often takes the form of a tape recorder.

The prior are suggests various techniques for synthesizing human speech from digital data. For instance, some of the techniques used are briefly described in "Voice Signals: Bit by Bit" at pp. 28-34 of the October 1973 issue of IEEE Spectrum. An important technique for synthesizing human speech, and the technique used by the speech synthesizer chip of the electronic teaching apparatus described herein, is called linear predictive coding. For a detailed discussion of this technique, see "Speech Analysis and Synthesis by Linear Prediction of the Speech Wave" by B. S. Atal and Suzanne L. Hanauer which appears at pp. 637–50 of Vol. 50 No. 2 (Part II) of the Journal of the Acoustical Society of America (Apr. 1971).

In U.S. patent application Ser. No. 905,328, filed May 12, 1978, now U.S. Pat. No. 4,209,844 issued June 24, 1980, a lattice filter for generating digital signals useful in producing synthesized human speech and capable of being implemented on a single semiconductor chip is described. The learning aid described herein makes use of the lattice filter described in the aforementioned U.S. Pat. No. 4,209,844.

It is an object of this invention to provide an improved electronic teaching apparatus having particular applicability to young children or persons with limited intellectual skills, wherein a speech synthesizer is a component thereof and interacts with an overlay having a plurality of pictorial representations thereon as disposed on a programmable keyboard in audibly requesting an operator to identify one of the pictorial representations by selective touching of the overlay.

It is another object of this invention to provide an improved electronic teaching apparatus for teaching object identification via selective touching of pictorial representations, wherein a speech synthesizer is a component thereof for audibly requesting the identification of a particular object from a plurality of objects appearing as pictorial representations in which the electronic circuits included in the speech synthesizer are implemented as integrated circuits on miniature semiconductor chips so that the entire electronic teaching apparatus can be constructed as a hand-held portable device.

It is another object of this invention to provide an improved electronic teaching apparatus having particular applicability to young children or persons with limited intellectual skills and equipped with a speech synthesis device for audibly requesting an operator to identify a particular object via an operator input in the form of selective touching of a specific pictorial representation on an overlay having a plurality of pictorial representations appearing thereon and disposed on a programmable keyboard, wherein the speech synthesis device further audibly comments upon the accuracy of the operator input through selective accessing of digital data stored in a memory and from which synthesized speech may be derived.

SUMMARY OF THE INVENTION

The foregoing objects are achieved as is now described. The descriptive words utilized and instructions for controlling the operation of the electronic teaching apparatus of the present invention are stored as digital codes in a memory device. This memory is preferably of the non-volatile type so that the data is not erased when power is disconnected from the apparatus. A speech synthesizer circuit is connected to the output of the memory for selectively converting some of the data stored therein to speech signals from which audible speech. Several types of speech synthesis circuits are known and could be employed in the electronic teaching apparatus is generated. In a disclosed embodiment of the electronic teaching apparatus, the speech synthesizer thereof is implemented as an integrated circuit on a single semiconductor chip and employs a linear predictive coding technique in synthesizing speech. A speaker is provided to convert output from the speech synthesizer to audible sounds.

A programmable keyboard unit, such as is described in U.S. patent application Ser. No. 193214, now U.S.

Pat. No. 4,360,716, by Charles Mark Fiorella, filed Oct. 1, 1980, is utilized in conjunction with a plurality of coded flexible overlays. Each overlay has depicted upon it a series of pictorial representations. The coding of each overlay is utilized to determine the approximate boundaries of the keyboard sections beneath each pictorial representation and the appropriate set of descriptive words for each particular overlay. Thus, a single memory device may contain digital codes in the form of digital speech data representative descriptive words for a plurality of overlays and each overlay may contain a varying number of pictorial representations. A control device is utilized to selectively access the digital speech data and keyboard control data in response to the coding of each individual overlay. In the embodiment disclosed, the controller function is provided by an appropriately programmed microprocessor device. The controller circuit controls the memory to read out the digital signals corresponding to the descriptive words which are appropriate for a particular pictorial representation selected by an operator, or to verbally ask an operator to select a particular pictorial representation via synthesized speech as generated by the speaker from speech signals provided by the speech synthesizer. The electronic teaching apparatus contained in an easily portable case and may be battery powered.

BRIEF DESCRIPTION OF THE DRAWINGS

The novel features believed characteristic of the invention are set forth in the appended claims. The invention itself, however, as well as preferred modes of use, further objects and advantages thereof, will be best understood by reference to the following detailed description of an ilustrative embodiment when read in conjunction with the accompanying drawings, wherein:

FIGS. 4a and 4b form a composite block diagram (when placed side by side) of the speech synthesis chip employed in the electronic teaching apparatus in accordance with the present invention;

FIGS. 8a–8f form a composite logic diagram of the synthesizer's ROM/Controller interface logics;

FIGS. 11a–11d form a composite logic diagram of the speech synthesizer's lattice filter and excitation generator;

FIGS. 12a and 12b are schematic diagrams of the parameter RAM;

FIGS. 20a–20f form a composite logic diagram of the control logic for the ROM of FIG. 19;

FIGS. 21a–21d form a composite logic diagram of the X and Y address decoders and the array of memory cells;

DETAILED DESCRIPTION

Figure 1:
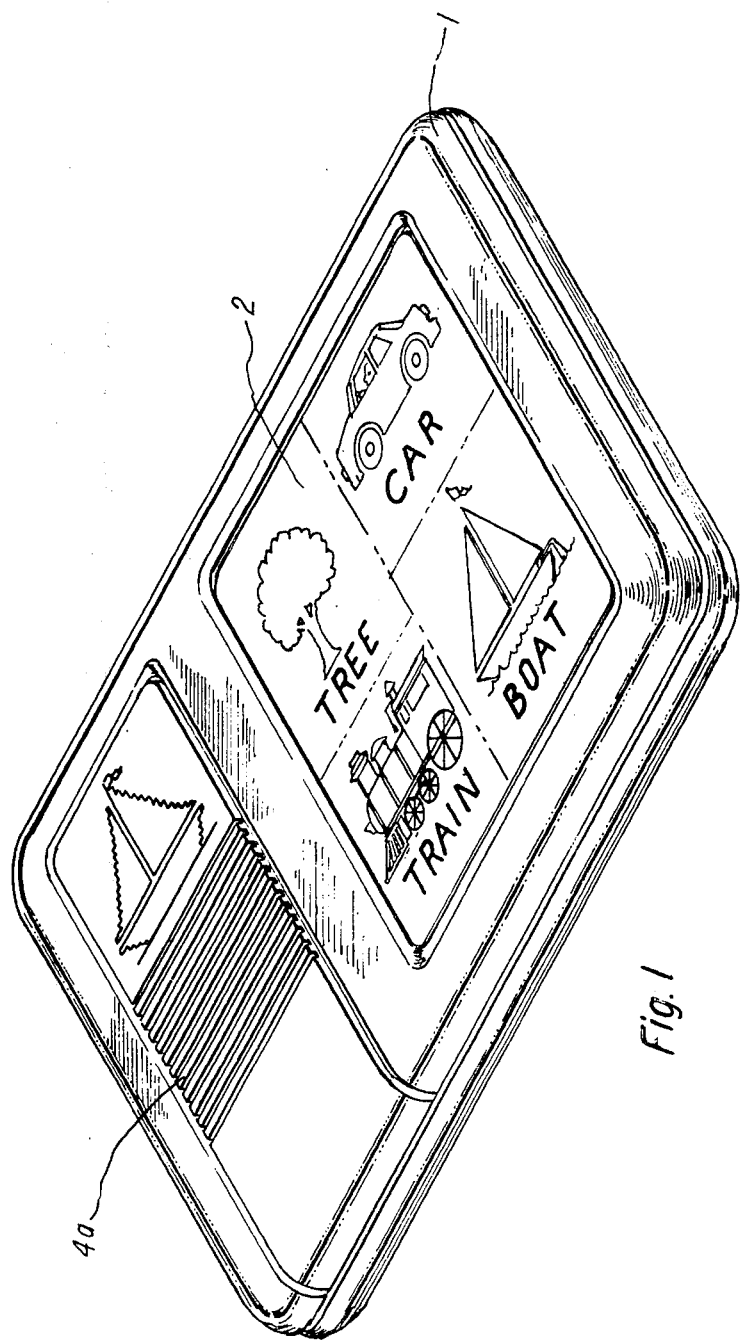
FIG. 1 is a front perspective view of an electronic teaching apparatus in accordance with the present invention.

FIG. 1 is a front perspective view of an electronic teaching apparatus or learning aid of the type which embodies the present invention. The learning aid includes a case 1 which encloses electronic circuits preferably implemented on integrated circuits (not shown in this figure). These circuits are coupled to a keyboard 3 (FIG. 3) and a speaker 4 or other voice coil means (also not shown in this figure). However, the openings 4a are shown behind which speaker 4 is preferably mounted. A flexible overlay 2 upon which are depicted several pictorial representations is also shown. While in the embodiment disclosed, an electrical contact keyboard system is utilized in conjunction with flexible overlay upon which are depicted printed pictorial representations, it will be appreciated by those skilled in the art that other display/input means such as a liquid crystal display and a touch-capacitive keyboard system may be utilized. The keyboard 3 of the learning aid of this embodiment is programmable and the section of keyboard 3 beneath a particular pictorial representation may be increased or decreased in size as is appropriate.

The learning aid depicted in FIG. 1 may be battery powered or powered from a external source of electrical power, as desired. The case is preferably made from an injection molded plastic.

Of course, other parts of case materials or input devices alternatively may be used.

Having described the outward appearance of the learning aid, the coding method for the flexible overlays and the modes in which the learning aid may operate will first be described followed by a description of the block diagrams and detailed logic diagrams of the various electronic circuits used to implement the learning aid of FIG. 1.

CODING METHOD

Figure 2B:
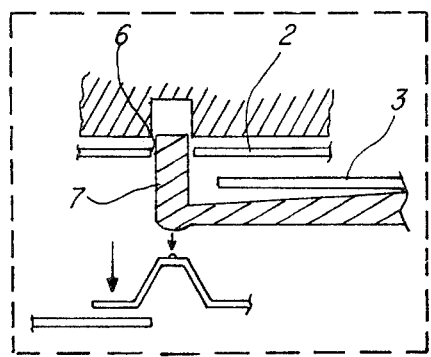
FIG. 2b is a sectional view illustrating the relationship between a coding aperture of an overlay and a coding switch of the coding reader.
Figure 2A:
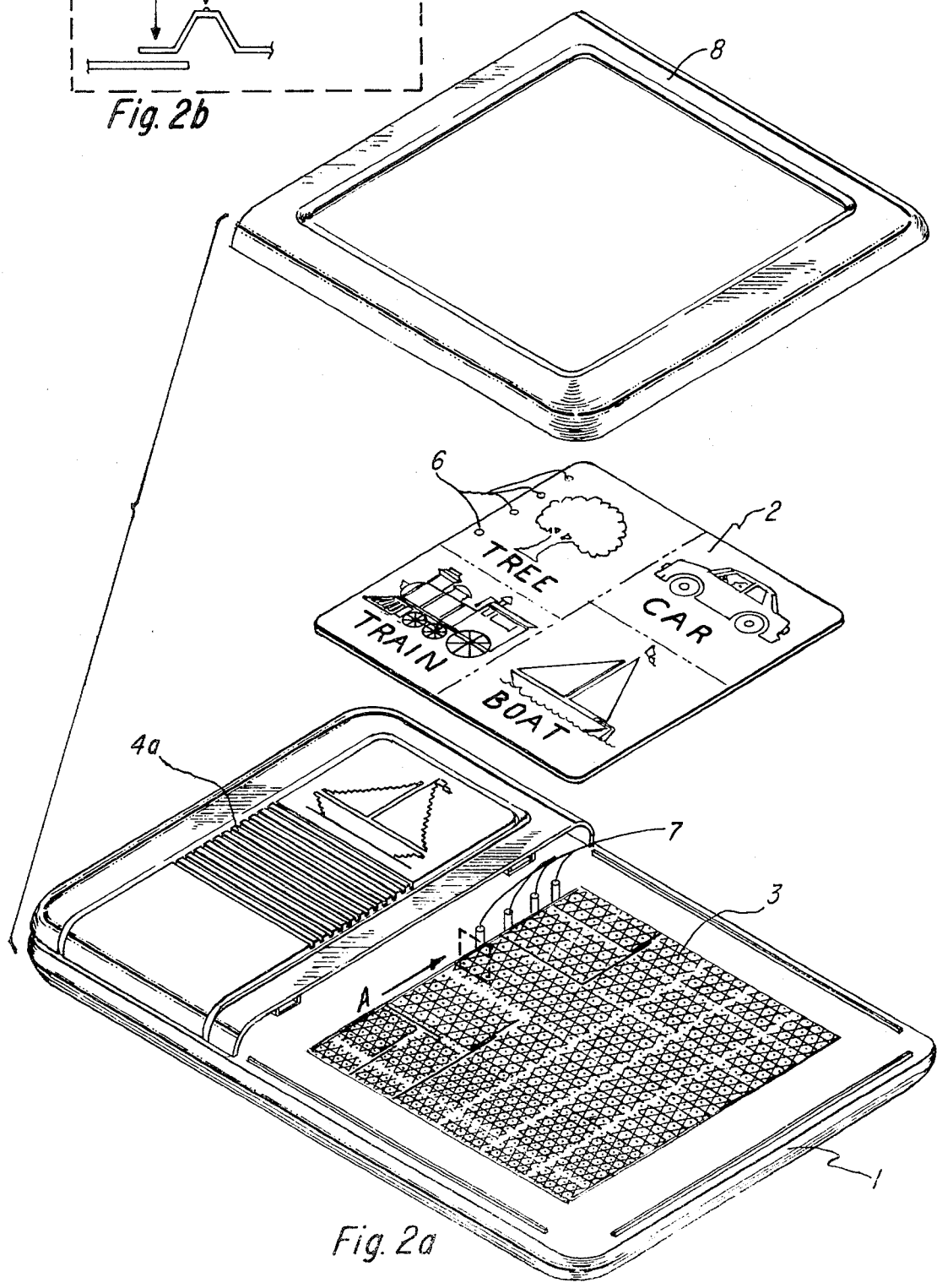
FIG. 2a is an exploded perspective view depicting the interconnection of the flexible overlay with the coding apertures and coding reader of the electronic teaching apparatus.

Referring now to FIG. 2a, the learning aid of the present invention is depicted with the keyboard 3 exposed and the coding apertures 6 of flexible overlay 2 exposed. In the coding method utilized in the embodiment disclosed, a series of electrical switches 7 are disposed at the edge of keyboard 3 and positioned to be aligned with coding apertures 6. As shown in FIG. 2b, the presence or absence of an aperture in flexible overlay 2 will cause coding switches 7 to remain open or to close. In this manner, numerous flexible overlays may be utilized with a single digital storage device. It will, of course, be appreciated by those skilled in the art that edge contacts, optical codes, magnetic sensors or other such similar coding methods may be utilized to allow differentiation of numerous flexible overlays.

MODES OF OPERATION

The first mode, the "Basic" mode, is entered by energizing the learning aid. The "Basic" mode provides a learning experience for young children or those with only rudimentary reading skills. The "Basic" mode operates with an appropriately coded flexible overlay in place in the learning aid. The programmable keyboard 3, located beneath flexible overlay 2 is divided into sections approximately equivalent to the size of the pictorial representations on the flexible overlay above. An input by an operator of the learning aid, consisting of a depression of the flexible overlay on or in the vicinity of a pictorial representation, is received by keyboard 3 and causes the control circuitry to access an appropriate descriptive phrase from within the digital storage device. The speech synthesizer of the disclosed learning aid is then utilized in conjunction with speaker or a voice coil 4 to generate an audible description of the pictorial representation selected. Suitable sount effects, simple spelling, or musical tones may also be incorporated with the descriptive words. In this mode of operation, an operator with little or no reading skills may be taught to recognize the verbal names of common objects depicted as pictorial representations on flexible overlay 2.

The second mode of operation, the "Learn" mode, is entered upon the expiration of a chosen time period after energizing the learning aid. If no operator input is detected within a chosen period of time, the fixed set of instructions stored as digital data within the memory device will cause a random selection of a verbal description of one of the pictorial representations depicted on flexible overlay 2. An appropriate lead-in phrase such as "Can you find" or "Where is the" may be utilized in conjunction with the verbal description. Thus, an operator may be asked "Can you find the car?" In this mode of operation, operators of the learning aid with no reading skills may also be taught to associate simple verbal descriptions with common objects depicted as pictorial representations on flexible overlay 2. Additionally, the input signals generated by the depression of the flexible overlay 2 on or in the vicinity of a pictorial representation may be utilized to determine whether or not the operator has selected the correct pictorial representation. The speech synthesizer of the learning aid disclosed may also be utilized to generate appropriate correction or praise phrases based upon the result of a comparison between the operator input and the desired input.

In the final mode of operation, the "Attribute" mode, the operator of the disclosed learning aid is given further verbal guidance upon his failure to select the appropriate pictorial representation described in the "Learn" mode. A further request coupled with a verbal description of a particular attribute of the object depicted in the pictorial representation is utilized to elicit a response from the operator. An example of a lead-in phrase utilized in the "Attribute" mode of operation might be "Can you find the blue car?" As in previous modes of operation, the "Attribute" mode of operation is well suited to the teaching of preschool children or those individuals without reading skills.

Of course, those ordinarily skilled in the art will appreciate that the described modes of operation may be further enhanced, expanded, or contracted as a matter of design choice.

BLOCK DIAGRAM OF THE LEARNING AID

Figure 3:
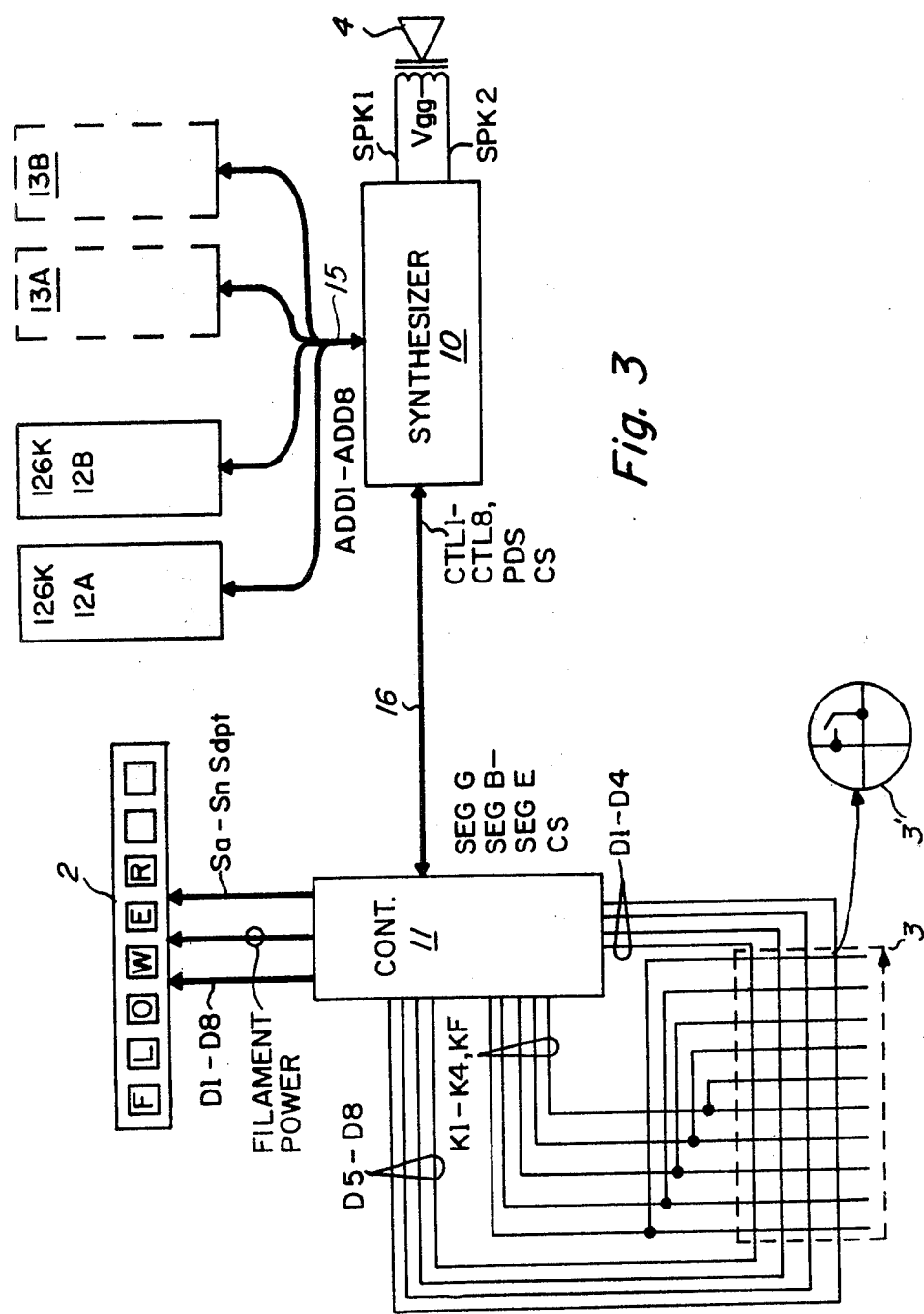
FIG. 3 is a block diagram of the major components preferably making up the electronic teaching apparatus.

FIG. 3 is a block diagram of the major components making up the disclosed embodiment of an electronic learning aid. The electronics of the disclosed learning aid may be divided into three major functional groups, one being a controller 11, another being a speech synthesizer 10, and another being a read-only-memory (ROM) 12. In the enbodiment disclosed, these major electronic functional groups are each integrated on separate integrated circuit chips except for the ROM functional group which is integrated onto two integrated circuit chips. Thus, the speech synthesizer 10 is preferably implemented on a single integrated circuit denoted by the box labeled 10 in FIG. 3 while the controller is integrated on a separate integrated circuit denoted by a box 11 in FIG. 3. The word list for the learning aid is stored in the ROM functional group 12, which stores frames of digitally coded data which are converted by speech synthesizer 10 to an electrical signal which drives speaker or other voice coil means 4. In the embodiment disclosed, ROM functional group 12 is preferably provided with 262,144 bits of storage. As a matter of design choice, the 262,144 bits of data are divided between two separate read-only-memory chips, represented in FIG. 3 at numerals 12A and 12B. The memory capability of ROM functional group 12 is a design choice; however, using the data compression features which are subsequently discussed with reference to FIG. 6, the 262,144 bits of read-only-memory may be used to store on the order of 250 words of spoken speech and their correct spellings.

Of course, the number of chips from which the learning aid is implemented is a design choice and as large scale integration techniques are improved (using electron beam etching and other techniques), the number of integrated circuit chips may be reduced from four to as few as a single chip.

Synthesizer chip 10 is interconnected with the read-only memories via data path 15 and is interconnected with controller 11 via data path 16. The controller 11 may be provided by an appropriately programmed microprocessor type device. Controller 11 also scans keyboard 3 for detecting key depressions thereat. Keyboard 3 has many switch positions which are shown in representative form in FIG. 3, the switch locations occurring where the conductors cross within the dashed line at number 3 in FIG. 3. A switch closure causes the conductors shown as crossing in FIG. 3 to be coupled together. At numeral 3' the switch occurring at a crossing of conductors at numeral 3 is shown in detail. In addition to sensing key depression at keyboard 3, controller 11 also performs such functions as providing addresses for addressing ROMs 12A and 12B (via synthesizer 10), and other such functions which will become apparent. Addresses from controller 11 are transmitted to ROMs 12A and 12B by synthesizer 10 because, as will be seen, synthesizer 10 preferably is equipped with buffers capable of addressing a plurality of read-only-memories. Preferably, only one of the pairs of ROMs will output information in response to this addressing because of a chip select signal which is transmitted from synthesizer 10 to all the Read-Only-Memories. Controller 11, in this embodiment, transmits addresses to the ROMs via synthesizer 10 so that only synthesizer 10 output buffers need be sized to transmit addresses to a plurality of ROMs simultaneously. Of course, controller 11 output buffers could also be sized to transmit information to a plurality of read-only-memories simultaneously and thus in certain embodiments it may be desirable to also couple controller 11 directly to the ROMs.

As will be seen, synthesizer chip 10 synthesizes human speech or other sounds according to frames of data stored in ROMs 12A–12B or 13A–13B. The synthesizer 10 employs a digital lattice filter of the type described in u.S. Pat. No. 4,209,844. U.S. Pat. No. 4,209,844 is hereby incorporated herein by reference. As will also be seen, synthesizer 10 also includes a digital to analog (D to A) converter for converting the digital output from the lattice filter to analog signals for driving speaker 4 or other voice coil means with those analog signals. Synthesizer 10 also includes timing, control and data storage and data compression systems which will be subsequently described in detail.

SYNTHESIZER BLOCK DIAGRAM

Figure 4B:
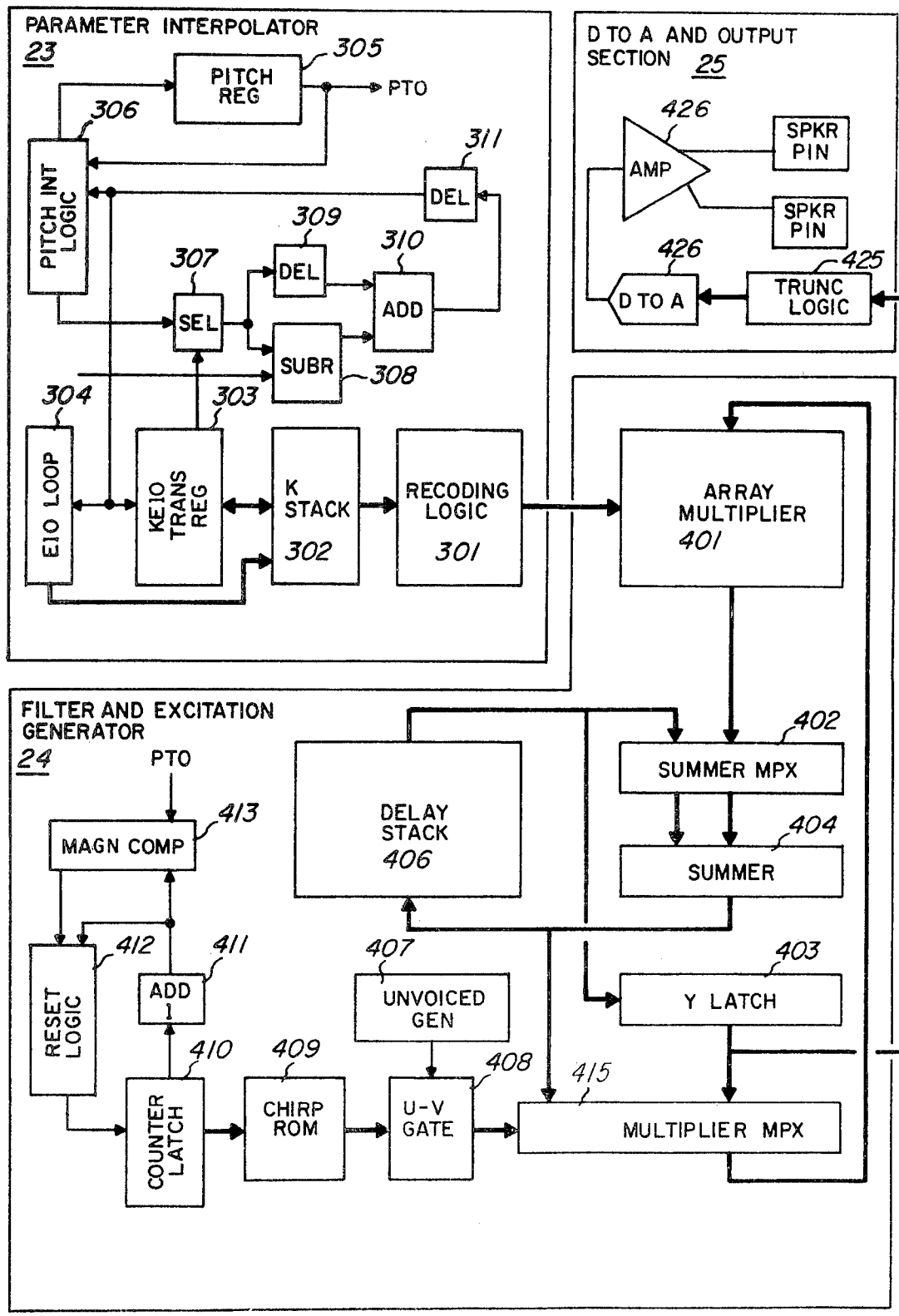

FIGS. 4a and 4b form a composite block diagram of the synthesizer 10. Synthesizer 10 is shown as having six major functional blocks, all but one of which are shown in greater detail in block diagram form in FIGS. 4a and 4b. The six major functional blocks are timing logic 20; ROM-Controller interface logic 21; parameter loading, storage and decoding logic 22; parameter interpolator 23; filter and excitation generator 24 and D to A and output section 25. Subsequently, these major functional blocks will be described in detail with respect to FIGS. 5, 6, 7a–7d, 8a–8f, 9a–9d, 10a–10c and 11a–11d.

ROM/Controller Interface Logic

Referring again to FIGS. 4a and 4b, ROM/Controller interface logic 21 couples synthesizer 10 to read-only-memories 12A and 12B and to controller 11. The control 1-8 (CTL1–CTL8), chip select (CS) and processor data clock (PDC) pins are coupled, in this embodiment, to the controller while the address 1-8 (ADD1–ADD8) and instruction 0-1 (I0-I1) pins are connected to ROMs 12A and 12B (as well as ROMs 13A–13B, if used). ROM/ Controller interface logic 21 sends address information from controller 11 to the Read-Only-Memories 12A–12B and preferably returns digital information from the ROMs back to the controller 11; logic 21 also brings data back from the ROMs for use by synthesizer 10 and initiates speech. A Chip Select (CS) signal enables tristate buffers, such as buffers 213, and a three bit command latch 210. A Processor Data Clock (PDC) signal sets latch 210 to hold the data appearing at CTL1–CTL4 pins from the controller. Command latch 210 stores a three bit command from controller 11, which is decoded by command decoder 211. Command decoder 211 is responsive to eight commands which are: speak (SPK) or speak slowly (SPKSLW) for causing the synthesizer to access data from the Read-Only-Memory and speak in response thereto either at a normal rate or at a slow rate; a reset (RST) command for resetting the synthesizer to zero; a test talk (TSTTALK) so that the controller can assertain whether or not the synthesizer is still speaking; a load address (LA) where four bits are received from the controller chip at the CTL1–CTL8 pins and transferred to the ROMs as an address digit via the ADD1–ADD8 pins and associated buffers 214; a read and branch (RB) command which causes the Read-Only-Memory to take the contents of the present and subsequent address and use that for a branch address; a read (RE) command which causes the Read-Only-Memory to output one bit of data on ADD1, which data shifts into a four bit data input register 212; and an output command which transfers four bits of data in the data input register 212 to controller 11 via buffers 213 and the CTL1–CTL8 pins. Once the synthesizer 10 has commenced speaking in response to a SPK or SPKSLW command it continues speaking until ROM interface logic 21 encounters a RST command or an all ones gate 207 (see FIG. 8a–8f) detects an "energy equal to fifteen" code and resets talk latch 216 in response thereto. As will be seen, an "energy equal to 15" code is used as the last frame of data in a plurality of frames of data for generating words, phrases or sentences. The LA, RE and RB commands decoded by decoder 211 are re-encoded via ROM control logic 217 and transmitted to the read-only-memories via the instruction (I0-I1) pins.

The processor Data Clock (PDC) signal serves other purposes than just setting latch 210 with the data on CTL1–CTL4. It signals that an address is being transferred via CTL1–CTL8 after an LA or OUTPUT command has been decoded or that the TSTTALK test is to be performed and outputted on pin CTL8. A pair of latches 218a and 218b (FIGS. 8a–8f) associated with decoder 211 disable decoder 211 when the aforementioned LA, TSTTALK and OUTPUT commands have been decoded and a subsequent PDC occurs so that the data then on pins CTL1–CTL8 is not decoded.

A TALK latch 216 is set in response to a decoded SPK or SPKSLW command and is reset: (1) during a power up clear (PUC) which automatically occurs whenever the synthesizer is energized; (2) by a decoded RST command or (3) by an "energy equals fifteen" code in a frame of speech data. The TALKD output is delayed output to permit all speech parameters to be inputed into the synthesizer before speech is attempted. The slow talk latch 215 is set in response to a decoded SPKSLW command and reset in the same manner as latch 216. The SLOWD output is similarly a delayed output to permit all the parameters to be inputted into the synthesizer before speech is attempted.

Parameter Loading, Storage and Decoding Logic

The parameter loading, storage and decoding logic 22 includes a six bit long parameter input register 205 which receives serial data from the read-only-memory via pin ADD1 in response to a RE command outputted to the selected read-only-memory via the instruction pins. A coded parameter random access memory (RAM) 203 and condition decoders and latches 208 are connected to receive the data inputted into the parameter input register 205. As will be seen, each frame of speech data is inputted in three to six bit portions via parameter input register 205 to RAM 203 in a coded format where the frame is temporarily stored. Each of the coded parameters stored in RAM 203 is converted to a ten bit parameter by parameter ROM 202 and temporarily stored in a parameter output register 201.

As will be discussed with respect to FIG. 6, the frames of data may be either wholly or partially inputted into parameter input register 205, depending upon the length of the particular frame being inputted. Condition decoders and latches 208 are responsive to particular portions of the frame of data for setting repeat, pitch equal zero, energy equal zero, old pitch and old energy latches. The function of these latches will be discussed subsequently with respect to FIGS. 8a-8F. The condition decoders and latches 208 as well as various timing signals are used to control various interpolation control gates 209. Gates 209 generate an inhibit signal when interpolation is to be inhibited, a zero parameter signal when the parameter is to be zeroed and a parameter load enable signal which among other things, permits data in parameter input register 205 to be loaded into the coded parameter RAM 203.

Parameter Interpolator

The parameters in parameter output register 201 are applied to the parameter interpolator functional block 23. The inputted K1-K10 speech parameters, including speech energy are stored in a K-stack 302 and E10 loop 304, while the pitch parameter is stored in a pitch register 305. The speech parameters and energy are applied via recoding logic 301 to array multiplier 401 in the filter and excitation generator 24. As will be seen, however, when a new parameter is loaded into parameter output register 201 it is not immediately inserted into K-stack 302 or E10 loop 304 or register 305 but rather the corresponding value in K-stack 302, E10 loop 304 or register 305 goes through eight interpolation cycles during which a portion of the difference between the present value in the K-stack 302, E10 loop 304 or register 305 and the target value of that parameter in parameter output register 201 is added to the present value in K-stack 302, E10 loop 304 or register 305.

Essentially the same logic circuits are used to perform the interpolation of pitch, energy and the K1-K10 speech parameters. The target value from the parameter output register 201 is applied along with the present value of the corresponding parameter to a subtractor 308. A selector 307 selects either the present pitch from pitch logic 306 or present energy or K coefficient data from KE10 transfer register 303, according to which parameter is currently in parameter output register 201, and applied the same to subtractor 308 and a delay circuit 309. As will be seen, delay circuit 309 may provide anywhere between zero delay to three bits of delay. The output of delay circuit 309 as well as the output of subtractor 308 is supplied to an adder 310 whose output is applied to a delay circuit 311. When the delay associated with delay circuit 309 is zero, the target value of the particular parameter in parameter output register 201 is effectively inserted into K-stack 302, E10 loop 304 or pitch register 305, as is appropriate. The delay in delay circuit 311 is three to zero bits, being three bits when the delay in the delay circuit 309 is zero bits, whereby the total delay through selector 307, delay circuits 309 and 311, adder 310 and subtractor 308 is constant. By controlling the delays in delay circuit 309 and 311, either all, ½, ¼ or ⅛ of the difference outputted from subtractor 308 (that being the difference between the target value and the present value) is added back into the present value of the parameter. By controlling the delays in the fashion set forth in Table I, a relatively smooth eight step parameter interpolation is accomplished.

U.S. Pat. No. 4,209,844 discusses with reference to FIG. 7 thereof a speech synthesis filter wherein speech coefficients K1-K9 are stored in the K-stack continuously, until they are updated, while the K10 coefficient and the speech energy (referred to by the letter A in U.S. Pat. No. 4,209,844) are periodically exchanged. In parameter interpolator 23, speech coefficients K1-K9 are likewise stored in stack 302, until they are updated, whereas the energy parameter and the K10 coefficient effectively exchange places in K-stack 302 during a twenty time period cycle of operaations in the filter and excitation generator 24. To accomplish this function, E10 loop 304 stores both the energy parameter and the K10 coefficient and alternately inputs the same into the appropriate location in K-stack 302. KE10 transfer register 303 is either loaded with the K10 or energy parameter from E10 loop 304 or the appropriate K1-K9 speech coefficient from K-stack 302 for interpolation by logics 307-311.

As will be seen, recoding logic 301 preferably performs a Booth's algorithm on the data from K-stack 302, before such data is applied to array multiplier 401. Recording logic 301 thereby permits the size of the array multiplier 401 to be reduced compared to the array multiplier described in U.S. Pat. No. 4,209,844.

Filter and Excitation Generator

The filter excitation generator 24 includes the array multiplier 401 whose output is connected to a summer multiplexer 402. The output of summer multiplexer 402 is coupled to the input of summer 404 whose output is coupled to a delay stack 406 and multiplier multiplexer 415. The output of the delay stack 406 is applied as an input to summer multiplexer 402 and to Y latch 403. The output of Y latch 403 is coupled to an input of multiplier multiplexer 415 and is applied as an input to truncation logic 425. The output of multiplier multiplexer 415 is applied as an input to array multiplier 401. As will be seen filter and excitation generator 24 make use of the lattice filter described in U.S. Pat. No. 4,209,844. Various minor interconnections are not shown in FIG. 4b for sake of clarity, but which will be described with reference to FIGS. 10a-10c, 11a-11d. The arrangement of the foregoing elements generally agrees with the arrangement shown in FIG. 7 of U.S. Pat. No. 4,209,844 thus array multiplier 401 corresponds to element 30', summer multiplexer 402 corresponds to elements 37b', 37c' and 37d', gates 414 (FIGS. 11a-11d) correspond to element 33', delay stack 406 corresponds to elements 34' and 35', Y latch 403 corresponds to element 36' and multiplier multiplexer 415 corresponds to elements 38a', 38b', 38c' and 38d'.

The voice excitation data is supplied from unvoiced/voice gate 408. As will be subsequently described in greater detail, the parameters inserted into parameter input gate register 205 are supplied in a compressed data format. According to the data compression scheme used, when the coded pitch parameter is equal to zero in input register 205, it is interpreted as an unvoiced condition by condition decoders and latches 208. Gate 408 responds by supplying randomized data from unvoiced generator 407 as the excitation input. When the coded pitch parameter is of some oher value, however, it is decoded by parameter ROM 202, loaded into parameter output register 201 and eventually inserted into pitch register 305, either directly or by the interpolation scheme previously described. Based on the period indicated by the number in pitch register 305, voiced excitation is derived from chirp ROM 409. As discussed in U.S. Pat. No. 4,209,844, the voiced excitation signal may be an impulse function or some other repeating function such as a repeating chirp function. In this embodiment, a chirp has been selected as this tends to reduce the "fuzziness" from the speech generated (because it apparently more closely models the action of the vocal cords than does a impulse function) which chirp is repetitively generated by chirp ROM 409. Chirp ROM 409 is addressed by counter latch 410, whose address is incremented in an add one circuit 411. The address in counter latch 410 continues to increment in add one circuit 411, recirculating via reset logic 412 until magnitude comparator 413, which compares the magnitude of the address being outputted from add one circuit 411 and the contents of the pitch register 305, indicates that the value in counter latch 410 then compares with or exceeds the value in pitch register 305, at which time reset logic 412 zeroes the address in counter latch 410. Beginning at address zero and extending through approximately fifty addresses is the chirp function in chirp ROM 409. Counter latch 410 and chirp ROM 409 are set up so that addresses larger than fifty do not cause any portion of the chirp function to be outputted from chirp ROM 409 to UV gate 408. In this manner the chirp function is repetitively generated on a pitch related period during voiced speech.

SYSTEM TIMING

Figure 5:
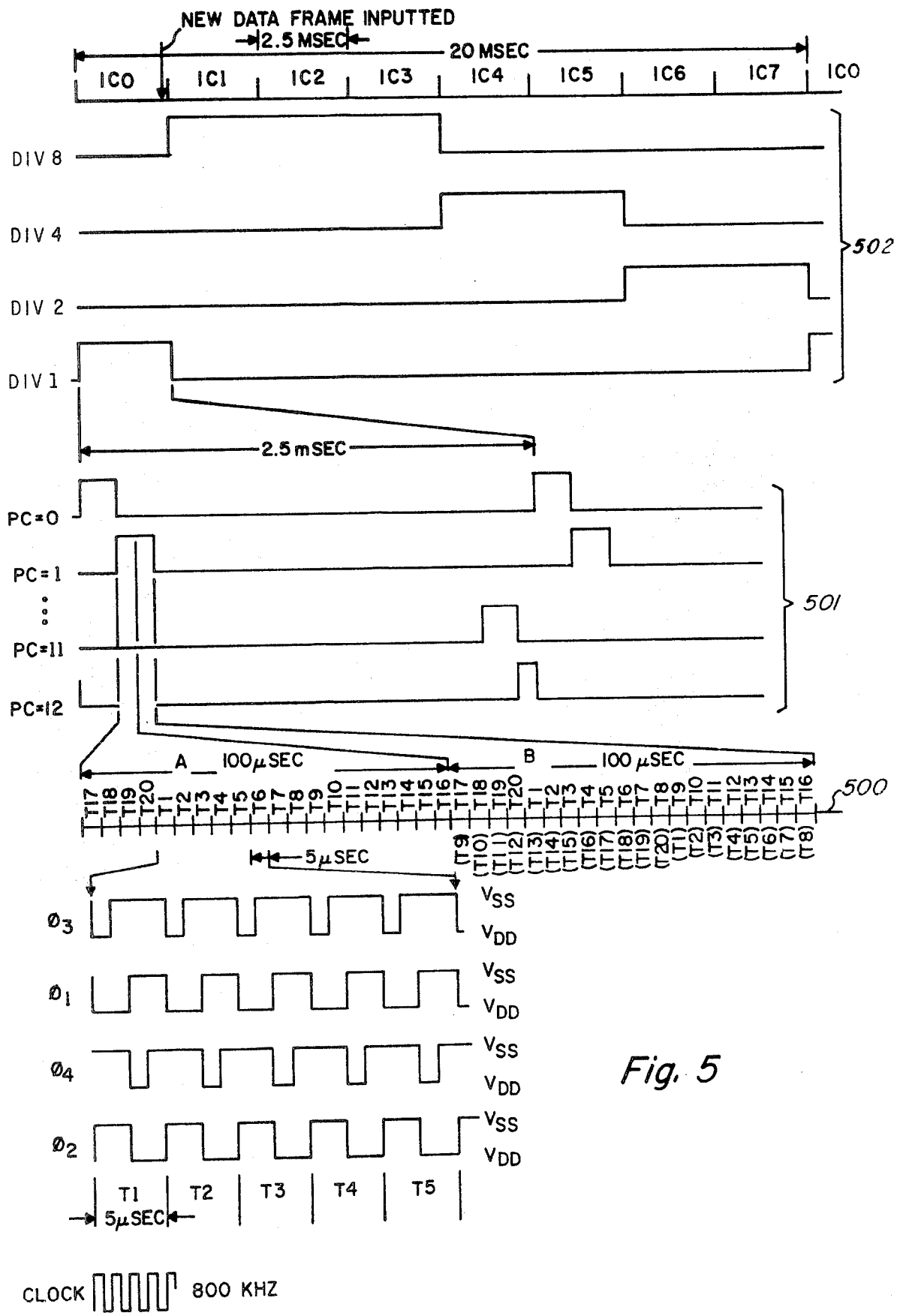
FIG. 5 is a timing diagram of various timing signals preferably used on the synthesizer.

FIG. 5 depicts the timing relationships between the occurrences of the various timing signals generated on synthesizer chip 10. Also depicted are the timing relationships with respect to the time new frames of data are inputted to synthesizer chip 10, the timing relationship with respect to the interpolations performed on the inputted parameters, the timing relations with respect to the foregoing with the time periods of the lattice filter and the relationship of all the foregoing to the basic clock signals.

The synthesizer is preferably implemented using precharged, conditional discharge type logics and therefore FIG. 5 shows clocks $\phi 1$–$\phi 4$ which may be appropriately used with such precharge-conditional discharge logic. There are two main clock phases ($\phi 1$ and $\phi 2$) and two precharge clock phases ($\phi 3$ and $\phi 4$). Phase $\phi 3$ goes low during the first half of phase $\phi 1$ and serves as a precharge therefor. Phase $\phi 4$ goes low during the first half of phase $\phi 2$ and serves as a precharge therefore. A set of clocks $\phi 1$–$\phi 4$ is required to clock one bit of data and thus corresponds to one time period.

The time periods are labeled T1–T20 and each preferably has a time period on the order of five microseconds. Selecting a time period on the order of five microseconds permits, as will be seen, data to be outputted from the digital filter at a ten kilohertz rate (i.e., at a 100 microsecond period) which provides for a frequency response of five kilohertz in the D to A output section 25 (FIG. 4b). It will be appreciated by those skilled in the art, however, that depending on the frequency response which is desired and depending upon the number of Kn speech coefficients used, and also depending upon the type of logics used, that the periods or frequencies of the clocks and clock phases shown in FIG. 5 may be substantially altered, if desired.

As is explained in U.S. Pat. No. 4,207,844, one cycle time of the lattice filter in filter excitation generator 24, preferably comprises twenty time periods, T1–T20. For reasons not important here, the numbering of these time periods differs between this application and U.S. Pat. No. 4,209,844. To facilitate an understanding of the differences in the numbering of the time periods, both numbering schemes are shown at the time period time line 500 in FIG. 5. At time line 500, the time periods, T1–T20 which are not enclosed in parentheses identify the time periods according to the convention used in this application. On the other hand, the time periods enclosed in parentheses identify the time periods according to the convention used in U.S. Pat. No. 4,209,844. Thus, time period T17 is equivalent to time period (T9).

At numeral 501 is depicted the parameter count (PC) timing signals. In this embodiment there are thirteen PC signals, PC=0 through PC=12. The first twelve of these, PC=0 through PC=11 correspond to times when the energy, pitch, and K1–K10 parameters, respectively, are available in parameter output register 201. Each of the first twelve PC's comprise two cycles, which are labeled A and B. Each such cycle starts at time period T17 and continues to the following T17. During each PC, the target value from the parameter output register 201 is interpolated with the existing value in K-stack 302 in parameter interpolator 23. During the A cycle, the parameter being interpolated is withdrawn from the K-stack 302, E10 loop 304 or pitch register 305, as appropriate, during an appropriate time period. During the B cycle, the newly interpolated value is reinserted in the K-stack (or E10 loop or pitch register). The thirteenth PC, PC=12, is provided for timing purposes so that all twelve parameters are interpolated once each during a 2.5 millisecond interpolation period.

As was discussed with respect to the parameter interpolator 23 of FIG. 4b and Table I, eight interpolations are performed for each inputting of a new frame of data from ROMs 12A–12B into synthesizer 10. This is seen at numeral 502 of FIG. 5 where timing signals DIV 1, DIV 2, DIV 4 and DIV 8 are shown. These timing signals occur during specific interpolation counts (IC) as shown. There are eight such interpolation counts, IC0–IC7. New data is inputted from the ROMs 12A–12B into the synthesizer during IC0. These new target values of the parameters are then used during the next eight interpolation counts, IC1 through IC0; the existing parameters in the pitch register 305 K-stake 302 and E10 loop 304 are interpolated once during each interpolation count. At the last interpolation count, IC0, the present value of the parameters in the pitch register 305, K-stack 302 and E 10 loop 304 finally attain the target values previously inputted toward the last IC0 and thus new target values may then again be inputted as a new frame of data. Inasmuch as each interpolation count has a period of 2.5 milliseconds, the period at which new data frames are inputted to the synthesizer chip is 20 microseconds or equivalent to a frequency of 50 hertz. The DIV 8 signal corresponds to those interpolation counts in which one-eighth of the difference produced by subtractor 308 is added to the present values in adder 310 whereas during DIV 4 one-fourth of the difference is added in, and so on. Thus, during DIV 2, ½ of the difference from subtractor 308 is added to the present value of the parameter in adder 310 and lastly during DIV 1 the total difference is added in adder 310. As has been previously mentioned, the effect of this interpolation scheme can be seen in Table I.

PARAMETER DATA COMPRESSION

It has been previously mentioned that new parameters are inputted to the speech synthesizer at a 50 hertz rate. It will be subsequently seen that in parameter interpolator 23 and excitation generator 24 (FIG. 4b) the pitch data, energy data and $K_{1-Kn}$ parameters are stored and utilized as ten bit digital binary numbers. If each of these twelve parameters were updated with a ten bit binary number at a fifty hertz rate from an external source, such as ROMs 12A and 12B, this would require a $12 \times 10 \times 50$ or 6,000 hertz bit rate. Using the data compression techniques which will be explained, this bit rate required for synthesizer 10 is reduced to on the order of 1,000 to 1,200 bits per second. And more importantly, it has been found that the speech compression schemes herein disclosed do not appreciably degrade the quality of speech generated thereby in comparison to using the data uncompressed.

Figure 6:
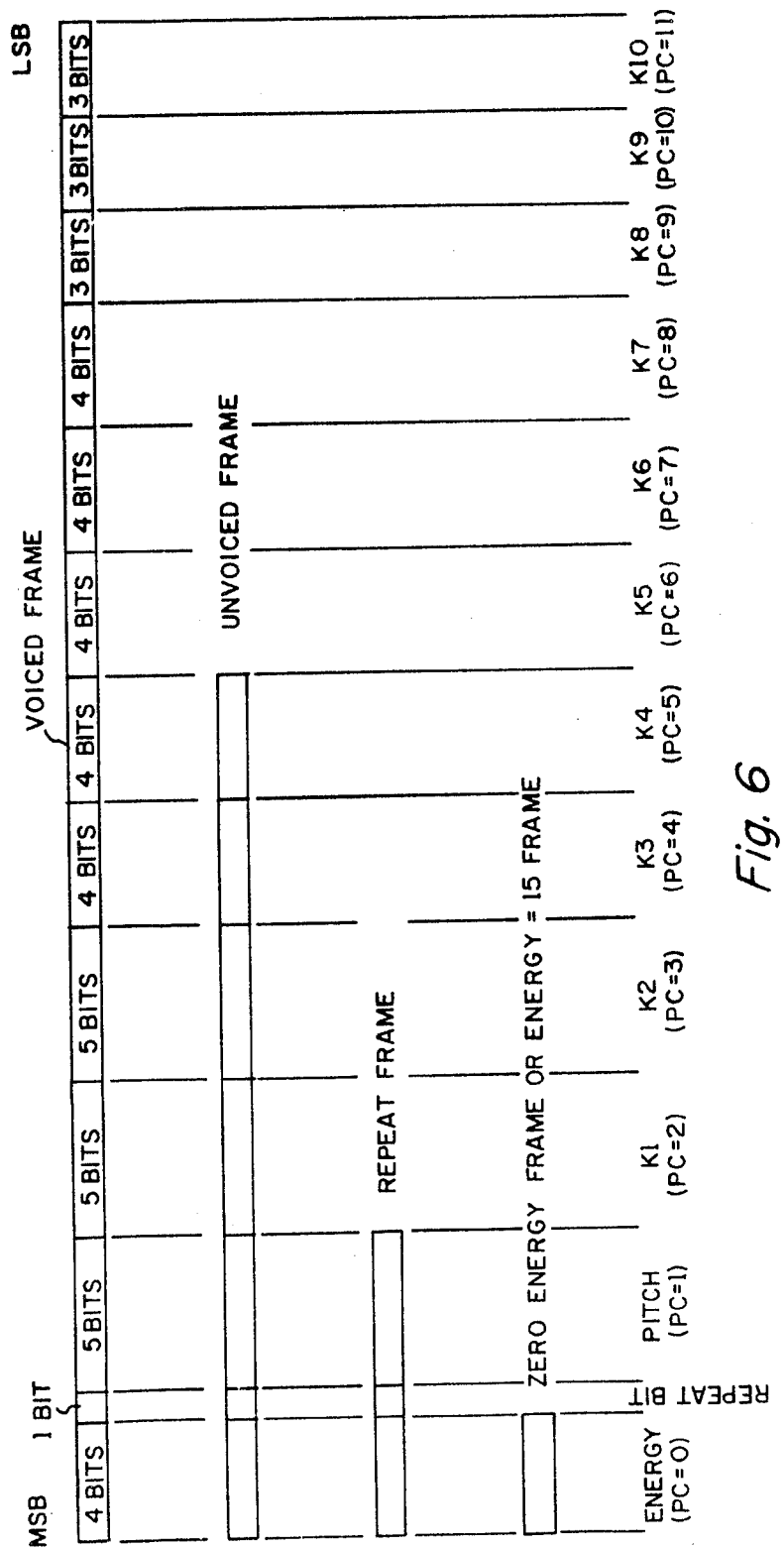
FIG. 6 pictorially shows the data compression scheme preferably used to reduce the data rate required by the synthesizer.

The data compression scheme used is pictorially shown in FIG. 6. Referring now to FIG. 6, it can be seen that there is pictorially shown four different lengths of frames of data. One, labeled voiced frame, has a length of 49 bits while another entitled unvoiced frame, has a length of 28 bits while still another called "repeat frame" has a length of ten bits and still another which may be alternatively called zero energy frame or energy = 15 frame has the length of but four bits. The "voiced frame" supplies four bits of data for a coded energy parameter as well as coded four bits for each of five speech parameters K3 through K7. Five bits of data are reserved for each of three coded parameters, pitch, K1 and K2. Additionally, three bits of data are provided for each of three coded speech parameters K8–K10 and finally another bit is reserved for a repeat bit.

In lieu of inputting ten bits of binary data for each of the parameters, a coded parameter is inputted which is converted to a ten bit parameter by addressing parameter ROM 202 with the coded parameter. Thus, coefficient K1, for example, may have any one of thirty-two different values, according to the five bit code for K1, each one of the thirty-two values being a ten bit numerical coefficient stored in parameter ROM 202. Thus, the actual values of coefficients K1 and K2 may have one of thirty-two different values while the actual values of coefficients K3 through K7 may be one of sixteen different values and the values of coefficients K8 through K10 may be one of eight different values. The coded pitch parameter is five bits long and therefore may have up to thirty-two different values. However, only thirty-one of these reflect actual pitch values, a pitch code of 00000 being used to signify an unvoiced frame of data. The coded energy parameter is four bits long and therefore would normally have sixteen available ten bit values; however, a coded energy parameter equal to 0000 indicates a silent frame such as occur as pauses in and between words, sentences and the like. A coded energy parameter equal to 1111 (energy equals fifteen), on the other hand, is used to signify the end of a segment of spoken speech, thereby indicating that the synthesizer is to stop speaking. Thus, of the sixteen codes available for the coded energy parameter, fourteen are used to signify different ten bit speech energy levels.

Coded coefficients K1 and K2 have more bits than coded coefficients K3–K7 which in turn have more bits than coded coefficients K8 through K10 because coefficient K1 has a greater effect on speech than K2 which has a greater effect on speech than K3 and so forth through the lower order coefficients. Thus given the greater significance of coefficients K1 and K2 than coefficients K8 through K10, for example, more bits are used in coded format to define coefficients K1 and K2 than K3–K7 or K8–K10.

Also it has been found that voiced speech data needs more coefficients to correctly model speech than does unvoiced speech and therefore when unvoiced frames are encountered, coefficients K5 through K10 are not updated, but rather are merely zeroed. The synthesizer realizes when an unvoiced frame is being outputted because the encoded pitch parameter is equal to 0000.

It has also been found that during speech there often occur instances wherein the parameters do not significantly change during a twenty millisecond period; particularly, the K1–K10 coefficients will often remain nearly unchanged. Thus, a repeat frame is used wherein new energy and new pitch are inputted to the synthesizer, however, the K1–K10 coefficients previously inputted remain unchanged. The synthesizer recognizes the ten bit repeat frame because the repeat bit between energy and pitch then comes up whereas it is normally off. As previously mentioned, there occur pauses between speech or at the end of speech which are preferably indicated to the synthesizer; such pauses are indicated by a coded energy frame equal to zero, at which time the synthesizer recognizes that only four bits are to be sampled for that frame. Similarly, only four bits are sampled when an "energy equals fifteen" frame is encountered. Using coded values for the speech in lieu of actual values, alone would reduce the data rate to $48 \times 50$ or 2400 bits per second. By additionally using variable frame lengths, as shown in FIG. 6, the data rate maybe further reduced to on the order of one thousand to twelve hundred bits per second, depending on the speaker and on the material spoken.

The effect of this data compression scheme can be seen from Table II where the coding for the word "HELP" is shown. Each line represents a new frame of data. As can be seen, the first part of the word "HELP", "HEL", is mainly voiced while the "P" is unvoiced. Also note the pause between "HEL" and "P" and the advantages of using the repeat bit. Table III sets forth the encoded and decoded speech parameter. The 3, 4 or 5 bit code appears as a hexadecimal number in the left-hand column, while the various decoded parameter values are shown as ten bit, two's complement numbers expressed as hexadecimal numbers in tabular form under the various parameters. The decoded speech parameter is stored in ROM 203. The repeat bit is shown in Table II between the pitch and K parameters for sake of clarity; preferably, according to the embodiment of FIG. 6, the repeat bit occurs just before the most significant bit (MSB) of the pitch parameter.

SYNTHESIZER LOGIC DIAGRAMS

The various portions of the speech synthesizer of FIGS. 4a and 4b will now be described with reference to FIGS. 7a through 14b which, depict, in detail, the logic circuits implemented on a semiconductor chip, for example, to form the synthesizer 10. The following discussion, with reference to the aforementioned drawings, refers to logic signals available at many points in the circuit. It is to be remembered that in P channel MOS devices a logical zero corresponds to a negative voltage, that is, Vdd, while a logical one refers to a zero voltage, that is, Vss. It should be further remembered that P-channel MOS transistors depicted in the aforementioned figures are conductive when a logical zero, that is, a negative voltage, is applied at their respective gates. When a logic signal is referred to which is unbarred, that is, has no bar across the top of it, the logic signal is to be interpreted as "TRUE" logic; that is, a binary one indicates the presence of the signal (Vss) whereas a binary zero indicates the lack of the signal (Vdd). Logic signal names including a bar across the top thereof are "FALSE" logic; that is, a binary zero (Vdd voltage) indicates the presence of the signal whereas a binary one (Vss voltage) indicates that the signal is not present. It should also be understood that a numeral three in clocked gates indicates that phase $\phi 3$ is used as a precharge whereas a four in a clocked gate indicates that phase $\phi 4$ is used as a precharge clock. An "S" in the gate indicates that the gate is statically operated.

Timing Logic Diagram

Referring now to FIGS. 7a–7d, they form a composite, detailed logic diagram of the timing logic for synthesizer 10. Counter 510 is a pseudorandom shift counter including a shift register 510a and feed back logic 510b. The counter 510 counts into pseudorandom fashion and the TRUE and FALSE outputs from shift register 510a are supplied to the input section 511 of a timing PLA. The various T time periods decoded by the timing PLA are indicated adjacent to the output lines thereof. Section 511c of the timing PLA is applied to an output timing PLA 512 generating various combinations and sequences of time period signals, such as T odd, $\overline{T10}$-$\overline{T18}$, and so forth. Sections 511a and 511b of timing PLA 511 will be described subsequently.

The parameter count in which the synthesizer is operating is maintained by a parameter counter 513. Parameter counter 513 includes an add one circuit and circuits which are responsive to SLOW and SLOW D. In SLOW, the parameter counter repeats the A cycle of the parameter count twice (for a total of three A cycles) before entering the B cycle. That is, the period of the parameter count doubles so that the parameters applied to the lattice filter are updatd and interpolated at half the normal rate. To assure that the inputted parameters are interpolated only once during each parameter count during slow speaking operations each parameter count comprises three A cycles followed by one B cycle. It should br recalled that during the A cycle the interpolation is begun and during the B cycle the interpolated results are reinserted back into either K-stack 302, E10 loop 304 or pitch register 305, as appropriate. Thus, merely repeating the A cycle has no effect other than to recalculate the same value of a speech parameter but since it is only reinserted once back into either K-stack 302, E10 loop 304 or pitch register 305 only the results of the interpolation immediately before the B cycle are retained.

Inasmuch as parameter count 513 includes an add one circuit, the results outputted therefrom, PC1–PC4, represent in binary form, the particular parameter count in which the synthesizer is operating. Output PC0 indicates in which cycle, A or B, the parameter count is. The parameter counter outputs PC1–PC4 are decoded by timing PLA 514. The particular decimal value of the parameter count is decoded by timing PLA 514 which is shown adjacent to the timing PLA 514 with nomenclature such as PC=0, PC=1, PC=7 and so forth. The relationship between the particular parameters and the value of PC is set forth in FIG. 6. Output portions 511a and 511b of timing PLA 511 are also interconnected with outputs from timing PLA 514 whereby the Transfer K (TK) signal goes high during T9 of PC=2 or T8 of PC=3 or T7 of PC=4 and so forth through T1 of PC=10. Similarly, a LOAD Parameter (LDP) timing signal goes high during T5 of PC=0 or T1 of PC=1 or T3 of PC=2 and so forth through T7 of PC=11. As will be seen, signal TK is used in controlling the transfer of data from parameter output register 201 to subtractor 308, which transfer occurs at different T times according to the particular parameter count the parameter counter 513 is in to assure that the appropriate parameter is being outputted from KE10 transfer register 303. Signal LDP is, as will be seen, used in combination with the parameter input register to control the number of bits which are inputted therein according to the number of bits associated with the parameter then being loaded according to the number of bits in each coded parameter as defined in FIG. 6.

Interpolation counter 515 includes a shift register and an add one circuit for binary counting the particular interpolation cycle in which the synthesizer 10 is operating. The relationship between the particular interpolation count in which the synthesizer is operating and the DIV1, DIV2, DIV4 and DIV8 timing signals derived therefrom is explained in detail with reference to FIG. 5 and therefore additional discussion here would be superfluous. It will be noted, however, that interpolation counter 515 includes a three bit latch 516 which is loaded at TI. The output of three bit latch 516 is decoded by gates 517 for producing the aforementioned DIV1 through DIV8 timing signals. Interpolation counter 515 is responsive to a signal RESETF from parameter counter 513 for permitting interpolation counter 513 to increment only after PC=12 has occurred.

ROM/Controller Interface Logic Diagram

Turning now to FIGS. 8a–8f, which form a composite diagram, there is shown a detailed logic diagram of ROM/Controller interface logic 21. Parameter input register 205 is coupled, at its input to address pin ADD7. Register 205 is a six bit shift register, most of the stages of which are two bits long. The stages are two bits long in this embodiment inasmuch as ROMs 12A and 12B output, as will be seen, data at half the rate at which data is normally clocked in synthesizer 10. At the input of parameter input register 205 is a parameter input control gate 220 which is responsive to the state of a latch 221. Latch 221 is set in response to LDP, PC0 and DIV1 all being a logical one. It is reset at T14 and in response to parameter load enable from gate 238 being a logical zero. Thus, latch 221 permits gate 220 to load data only during the A portion (as controlled by PC0) of the appropriate parameter count and at an appropriate T time (as controlled by LDP) of IC0 (as controlled by DIV1) provided parameter load enable is at a logical one. Latch 221 is reset by T14 after the data has been inputted into parameter register 205.

The coded data in parameter input register 205 is applied on lines IN0–IN4 to coded parameter RAM 203, which is addressed by PC1–PC4 to indicate which coded parameter is then being stored. The contents of register 205 is tested by all one's gate 207, all zeroes gate 206 and repeat latch 208a. As can be seen, gate 206 tests for all zeroes in the four least significant bits of register 205 whereas gate 207 tests for all ones in those bits. Gate 207 is also responsive to PC0, DIV1, T16 and PC=0 so that the zero condition is only tested during the time that the coded energy parameter is being loaded into parameter ROM 203. The repeat bit occurs in this embodiment immediately in front of the coded pitch parameter; therefore, it is tested during the A cycle of PC=1. Pitch latch 208b is set in response to all zeroes in the coded pitch parameter and is therefore responsive to not only gate 206 but also the most significant bit of the pitch data on line 222 as well as PC=1. Pitch latch 208b is set whenever the loaded coded pitch parameter is a 00000 indicating that the speech is to be unvoiced.

Energy=0 latch 208c is responsive to the output of gate 206 and PC=0 for testing whether all zeroes have been inputted as the coded energy parameter and is set in response thereto. Old pitch latch 208d stores the output of the pitch=0 latch 208b from the prior frame of speech data while old energy latch 208e stores the output of energy=0 latch 208c from the prior frame of speech data. The contents of old pitch latch 208d and pitch=0 latch 208b are compared in comparison gates 223 for the purpose of generating an INHIBIT signal. As will be seen, the INHIBIT signal inhibits interpolations and this is desirable during changes from voiced to unvoiced or unvoiced to voiced speech so that the new speech parameters are automatically inserted into K-stack 302, E10 loop 304 and pitch register 305 as opposed to being more slowly interpolated into those memory elements. Also, the contents of old energy latch 208e are energy=0 latch 208c is tested by NAND gate 224 for inhibiting interpolation for a transition from a non-speaking frame to a speaking frame of data. The outputs of NAND gate 224 and gates 223 are coupled to a NAND gate 235 whose output is inverted to INHIBIT by an inverter 236. Latches 208a-208c are reset by gate 225 and latches 208d and 208e are reset by gate 226. When the excitation signal is unvoiced, the K5-K10 coefficients are set to zero, as aforementioned. This is accomplished, in part, by the action of gate 237 which generates a ZPAR signal when pitch is equal to zero and when the parameter counter is greater than five, as indicated by PC 5 from PLA 514.

Also shown in FIGS. 8a-8f is a command latch 210 which comprises three latches 210a, b, and c which latch in the data at CTL2,4 and 8 in response to a processor data clock (PDC) signal in conjunction with a chip select (CS) signal. The contents of command latch 210 is decoded by command decoder 211 unless disabled by latches 218a and 218b. As previously mentioned, these latches are responsive to decoded LA, output and TTALK commands for disabling decoder 211 from decoding what ever data happens to be on the CTL2-CTL8 pins when subsequent PDC signals are received in conjunction with the LA, output and TTALK commands. A decoded TTALK command sets TTALK latch 219. The output of TTALK latch 219, which is reset by a Processor Data Clock Leading Edge (PDCLE) signal or by an output from latch 218b, controls along with the output of latch 218a NOR gates 227a and b. The output of NOR gate 227a is a logical one if TTALK latch 219 is set, thereby coupling pins CTL1 to the talk latch via tristate buffer 228 and inverters 229. Tristate latch 228 is shown in detail in FIG. 8d. NOR gate 227b, on the other hand, outputs a logical one if an output code has been detected, setting latch 228a and thereby connecting pins CTL1 to the most significant bit of data input register 212.

Data is shifted into data input register 212 from address pin 8 in response to a decoded read command by logics 230. RE, RB and LA instructions are outputted to ROM via instruction pins $I_0-I_1$ from ROM control logic 217 via buffers 214c. The contents of data input register 212 is outputted to CTL1-CTL4 pins via buffers 213 and to the aforementioned CTL1 pin via buffer 228 when NOR gate 227b inputs a logical one. CTL1-CTL4 pins are connected to address pins ADD1-ADD4 via buffers 214a and CTL8 pin is connected to ADD8 pin 8 via a control buffer 214b which is disabled when addresses are being loaded on the ADD1-ADD8 pins by the signal on line 231.

Figure 8A:
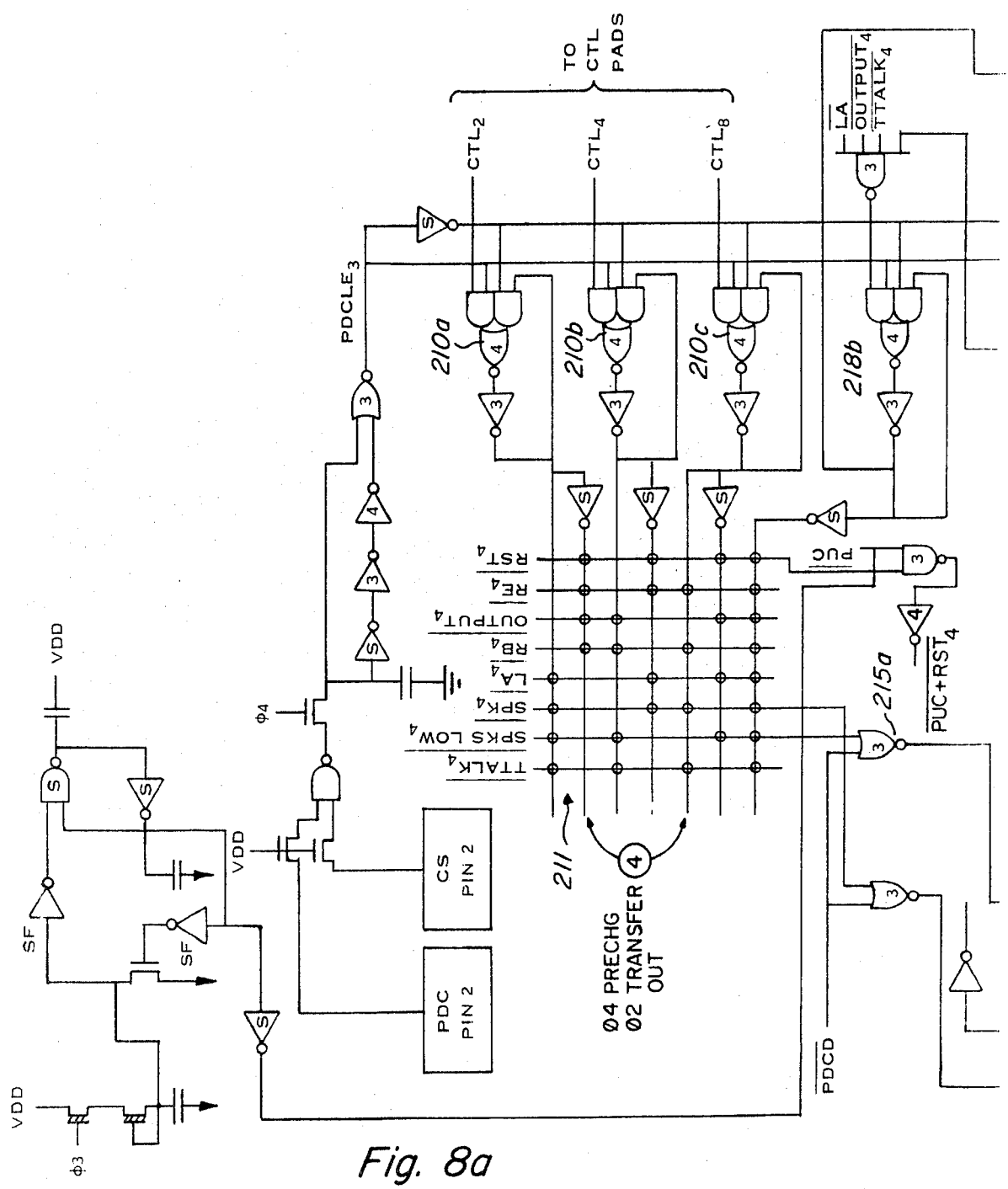
Figure 8C:
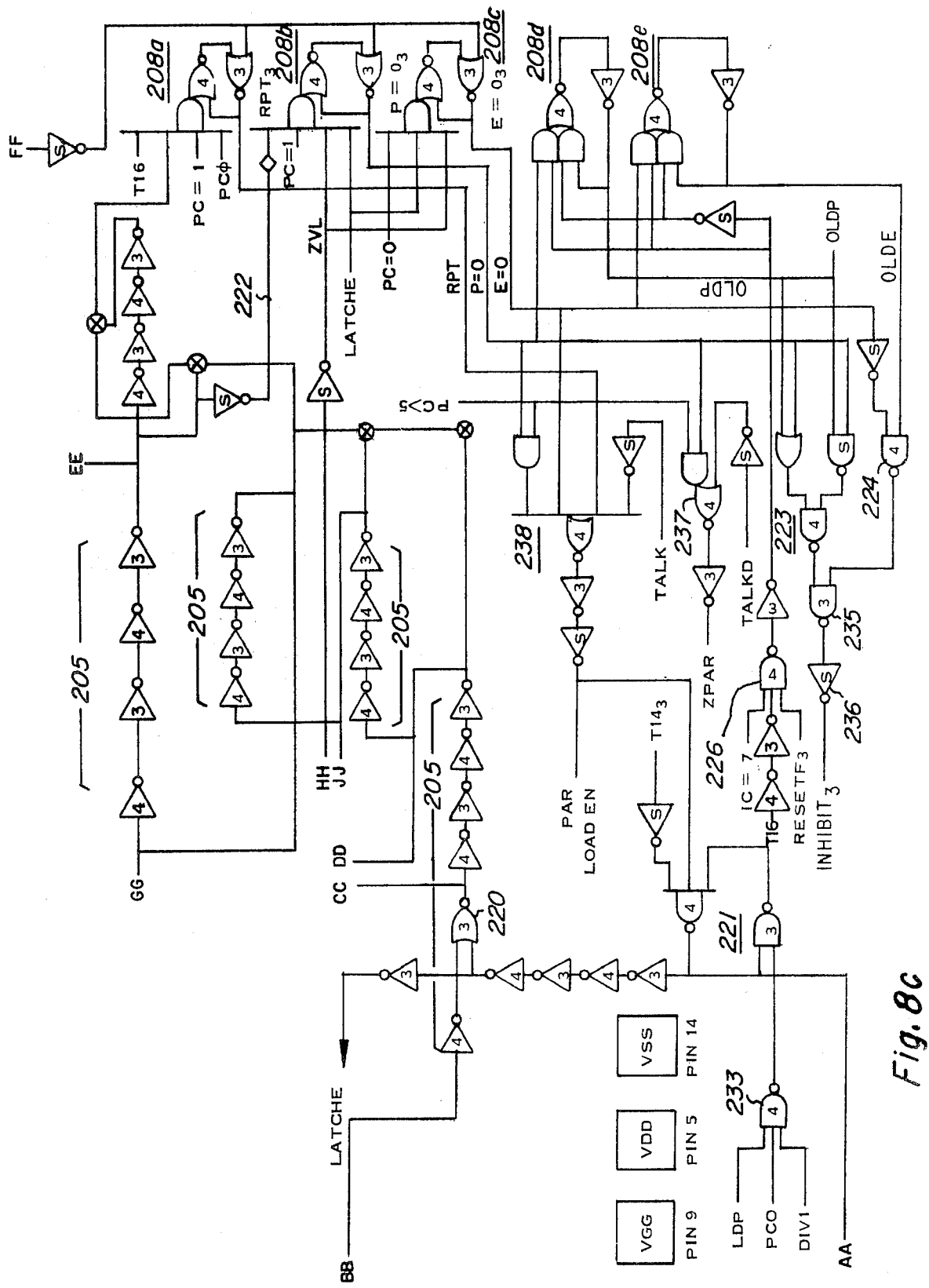
Figure 8D:
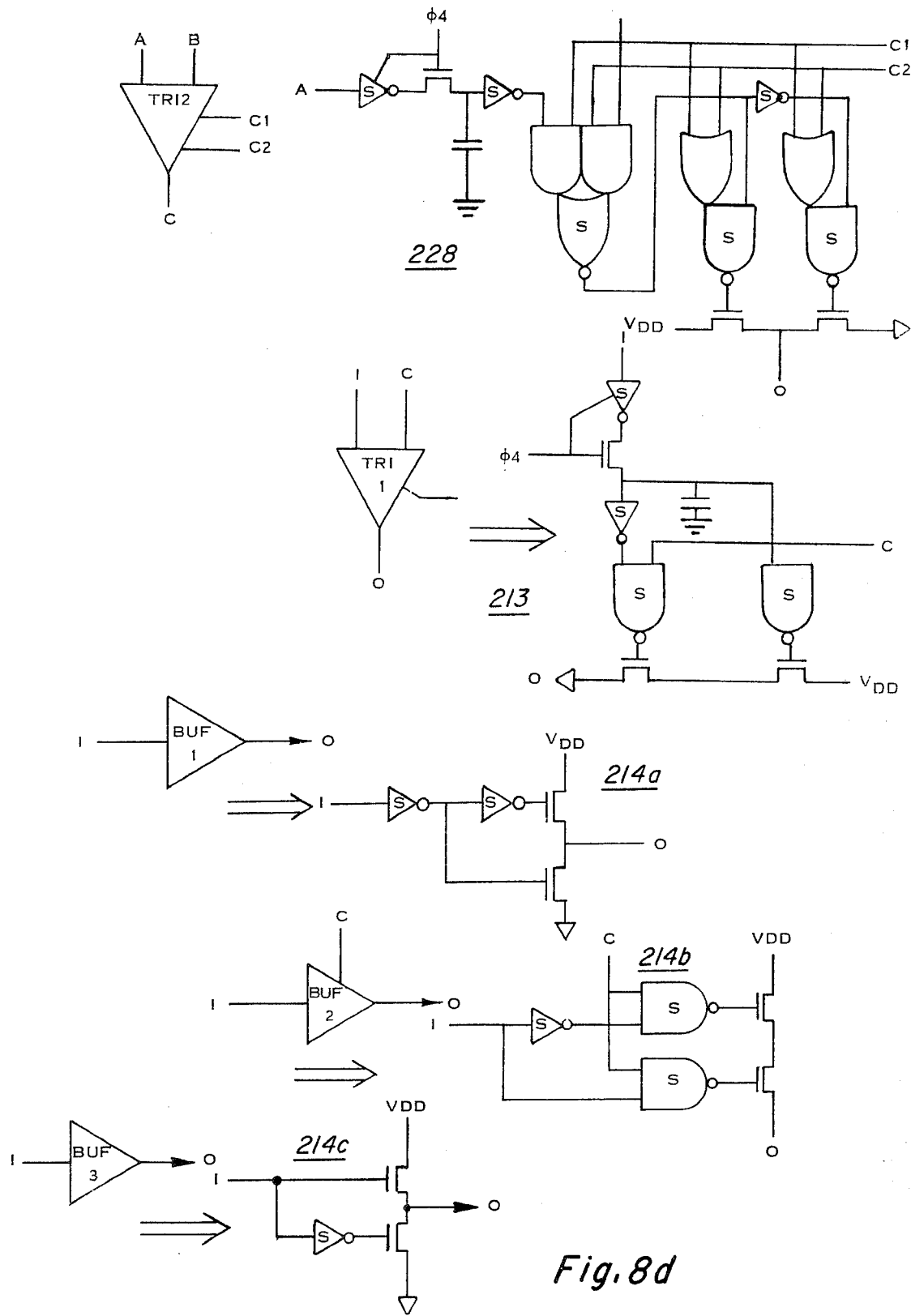
Figure 8E:
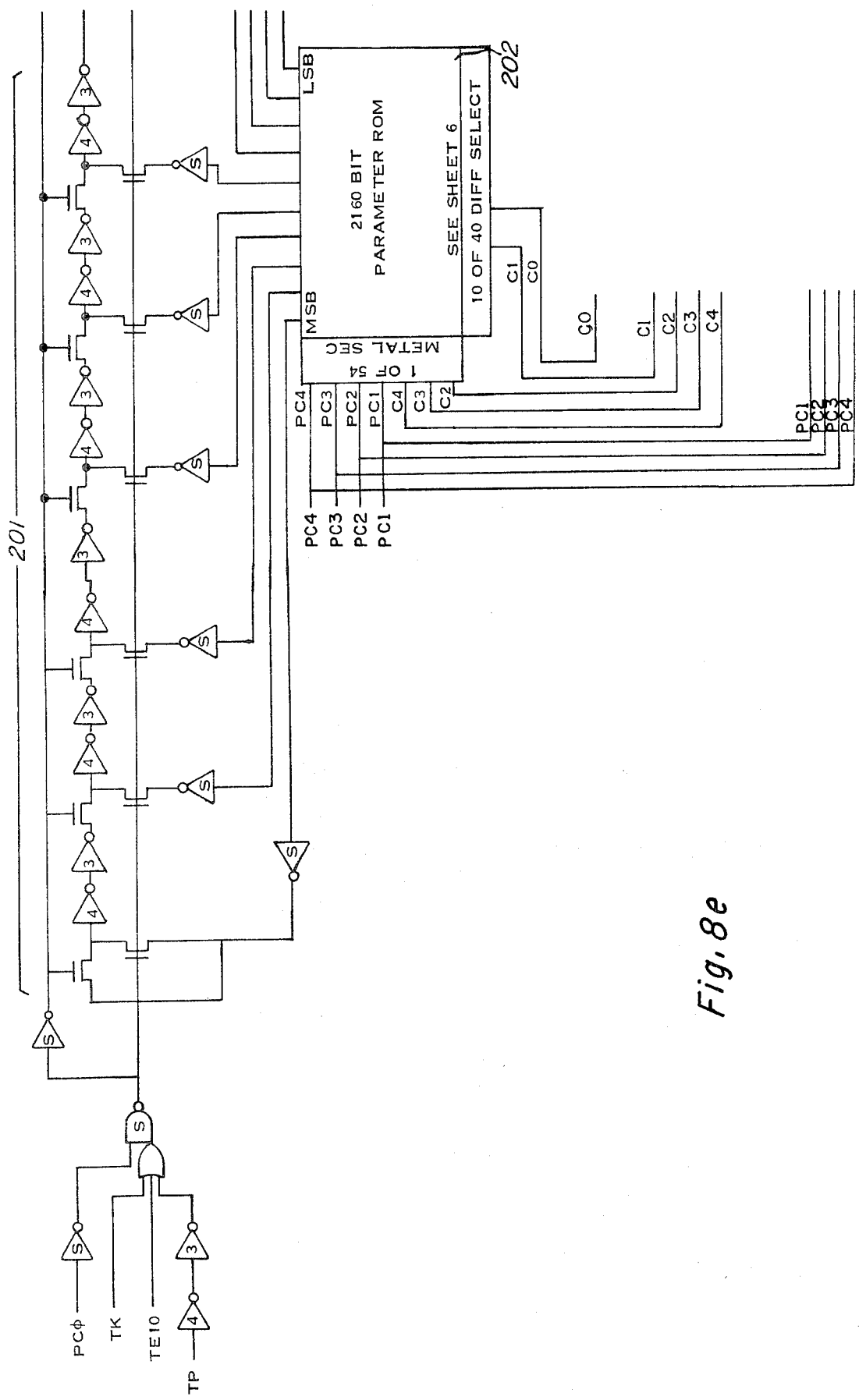
Figure 8F:
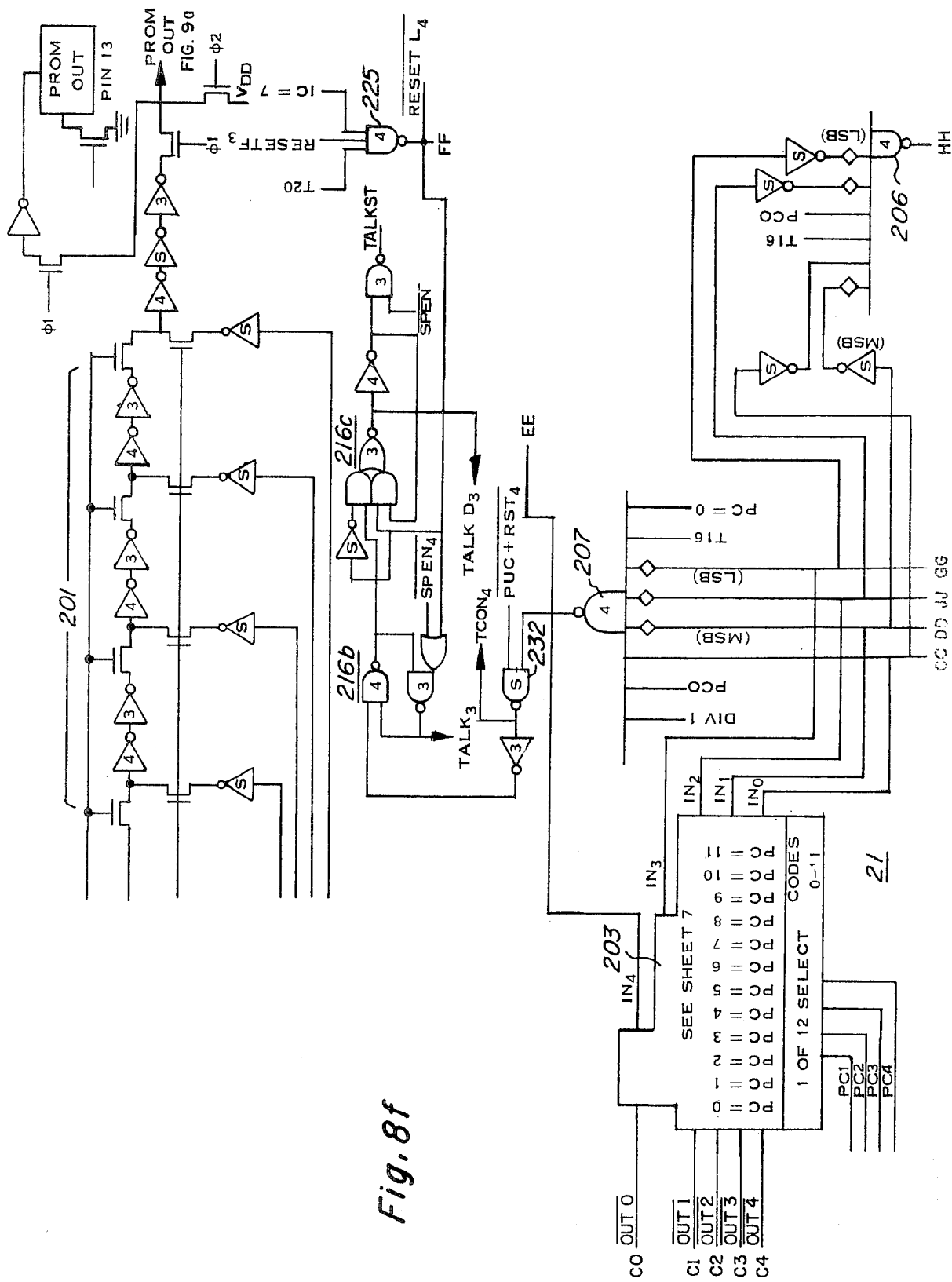

The Talk latch 216 shown in FIG. 8f preferably comprises three latches 216a, 216b and 216c. Latch 216a is set in response to a decoded SPK command and generates, in response thereto, a speak enable (SPEN) signal. As will be seen, SPEN is also generated in response to a decoded SPKSLOW command by latch 215a. Latch 216b is set in response to speak enable during IC7 as controlled by gate 225. Latches 216a and 216b are reset in response to (1) a decoded reset command, (2) an energy equals fifteen code or (3) on a power-up clear by gate 232. Talk delayed latch 216c is set with the contents of latch 216b at the following IC7 and retains that data through eight interpolation counts. As was previously mentioned, the talk delayed latch permits the speech synthesizer to continue producing speech data for eight interpolation cycles after a coded energy=0 condition has been detected setting latch 208c. Likewise, slow talk latch 215 is implemented with latches 215a, 215b and 215c. Latch 215a enables the speak enable signal while latches 215b and 215c enable the production of the SLOWD signal in much the same manner as latches 216b and 216c enable the production of the TALKD signal.

Considering now, briefly, the timing interactions for inputting data into parameter input register 205, it will be recalled that this is controlled chiefly by a control gate 220 in response to the state of a parameter input latch 221. Of course, the state of the latch is controlled by the LDP signal applied to gate 233. The PC0 and DIV1 signals are applied to gate 233 to assure that the parameters are loaded during the A cycle of a particular parameter count during IC0. The particular parameter and the parameter T-Time within the parameter count is controlled by LDP according to the portion 511a of timing PLA 511 (FIGS. 7a-7d). The first parameter inputted (Energy) is four bits long and therefore LDP is initiated during time period T5 (as can be seen in FIGS. 7a-7d). During parameter count 1, the repeat bit and pitch bits are inputted, this being six bits which are inputted according to LDP which comes up at time period T1. Of course, there are four time periods difference between T1 and T5 but only two bits difference in the length of the inputted information. This occurs because it takes two time periods to input each bit into parameter input register 205 (which has two stages per each inputted bit) due to the fact that ROMs 12A-12B are preferably clocked at half the rate at that which synthesize 10 is clocked. By clocking the ROM chips at half the rate, that the synthesizer 10 chip is clocked simplifies the addressing of the read-only-memories in the aforesaid ROM chips and yet, as can be seen, data is supplied to the synthesizer 10 in plenty of time for performing numerical operations thereon. Thus, in section 511a of timing PLA 511, LDP comes up at T1 when the corresponding parameter count indicates that a six bit parameter is to be inputted, comes up at T3 when the corresponding parameter count indicates that a five bit parameter is to be inputted, comes up at T5 when the corresponding parameter count indicates that a four bit parameter is to be inputted and comes up at time period T7 when the corresponding parameter count (e.g. parameter counts 9, 10 and 11 which correspond to a three bit coded parameter) indicates that a three bit parameter is to be inputted. ROMs 12A–12B are signaled that the addressed parameter ROM is to output information when signaled via $I_0$ instruction pin, ROM control logic 217 and line 234 which provides information to ROM control logic 217 from latch 221.

PARAMETER INTERPOLATOR LOGIC DIAGRAM

Referring now to FIGS. 9a–9d, which form a composite diagram the parameter interpolator logic 23 is shown in detail. K-stack 302 comprises ten registers each of which store ten bits of information. Each small square represents one bit of storage, according to the convention depicted at numeral 330. The contents of each shift register is arranged to recirculate via recirculation gates 314 under control of a recirculation control gate 315. K-stack 302 stores speech coefficients K1—K9 and temporarily stores coefficient K10 or the energy parameter generally in accordance with the speech synthesis apparatus of FIG. 7 of U.S. Pat. No. 4,209,844. The data outputted from K-stack 302 to recoding logic 301 at various time periods is shown in Table IV. In Table III of U.S. Pat. No. 4,209,844, is shown the data outputted from the K-stack of FIG. 7 thereof. Table IV of this patent differs from Table III of the aforementioned patent because of (1) recoding logic 301 receives the same coefficient on lines 32-1 through 32-4, on lines 32-5 and 32-6, on lines 32-7 and 32-8 and on lines 32-9 and 32-10 because, as will be seen, recoding logic 301 responds to two bits of information for each bit which was responded to by the array multiplier of the aforementioned U.S. patent; (2) because of the difference in time period nomenclature as was previously explained with reference to FIG. 5; and (3) because of the time delay associated with the recoding logic 301.

Figure 10A:
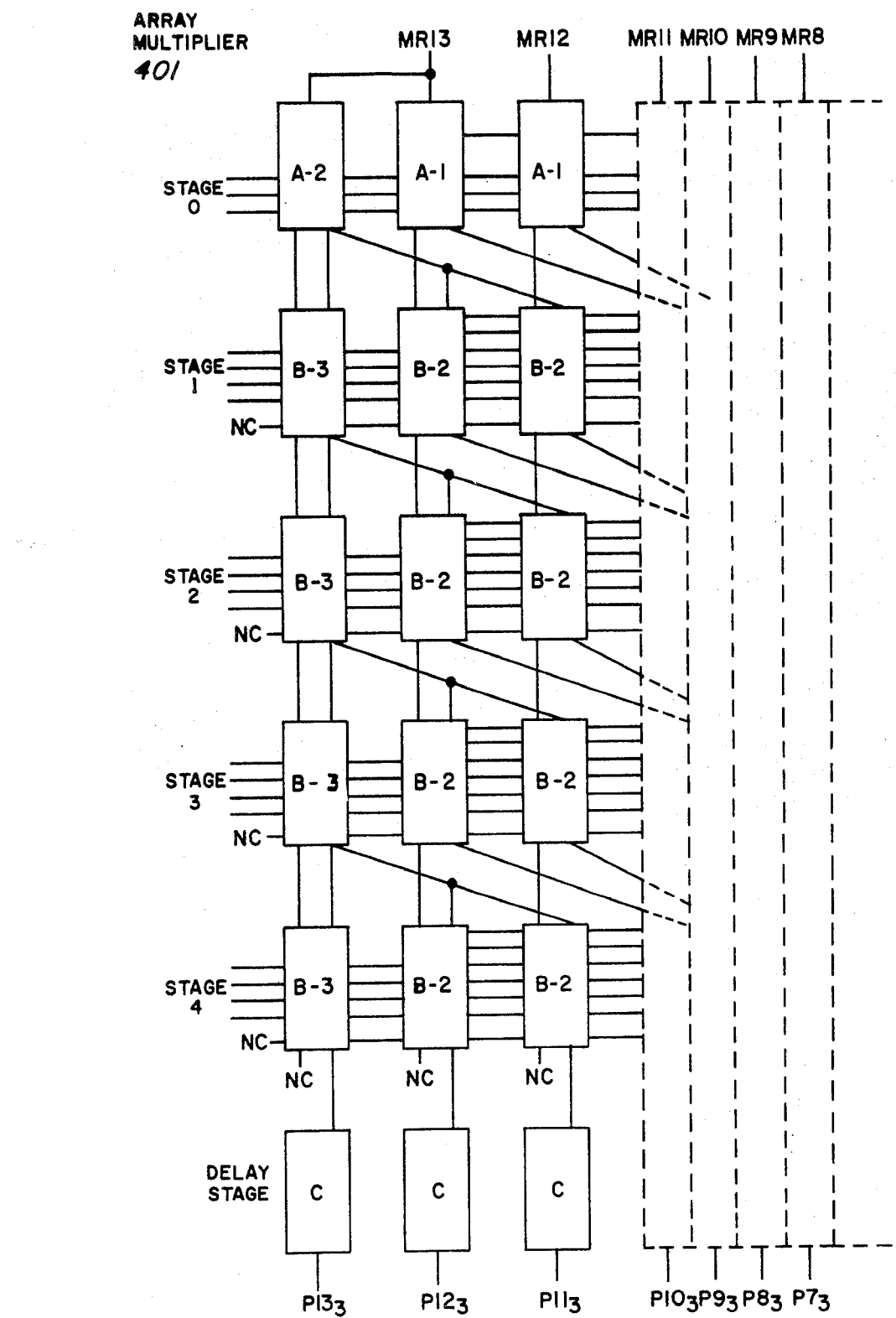
FIGS. 10a–10c form a composite logic diagram of the array multiplier.
Figure 10B:
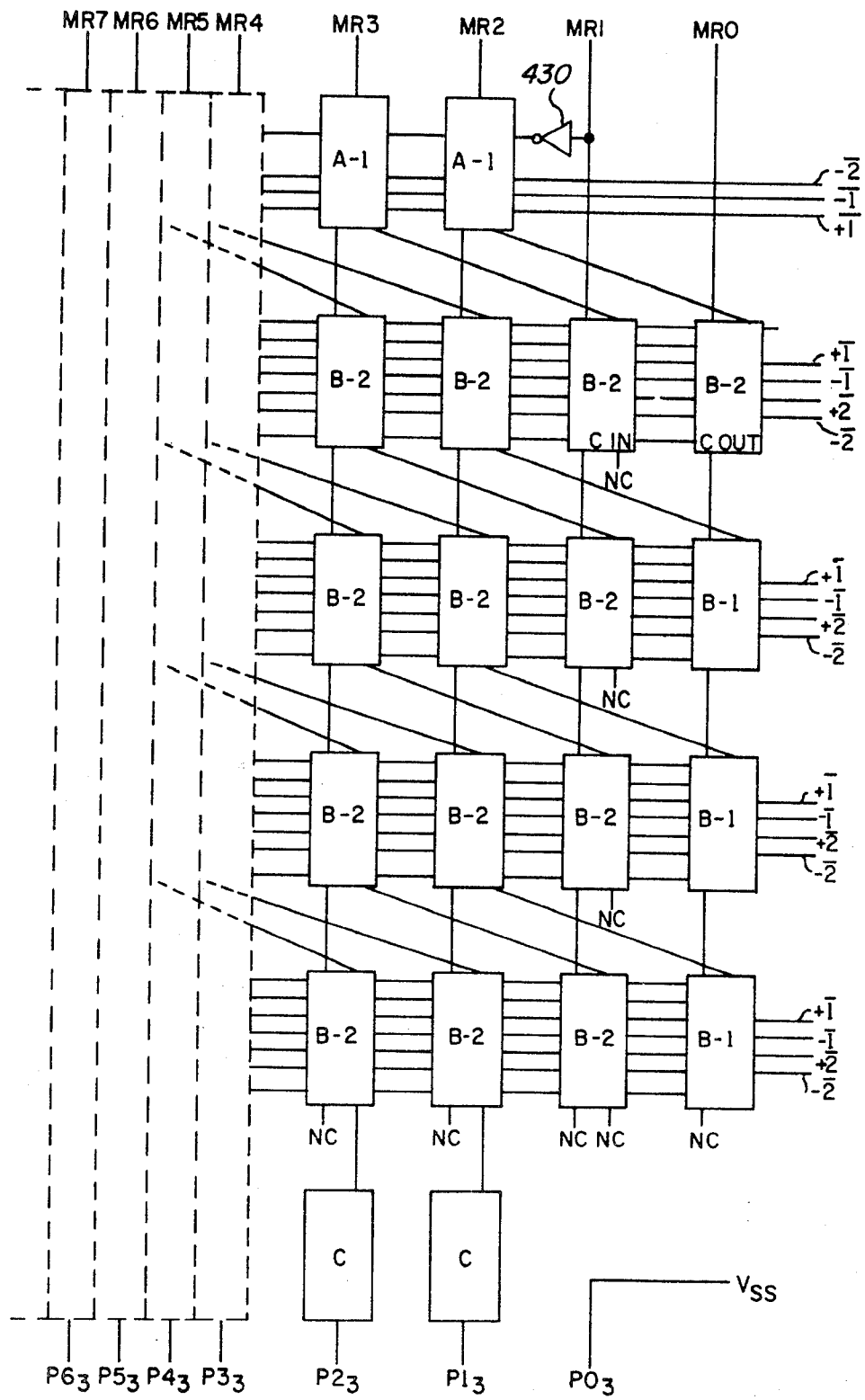
Figure 10C:
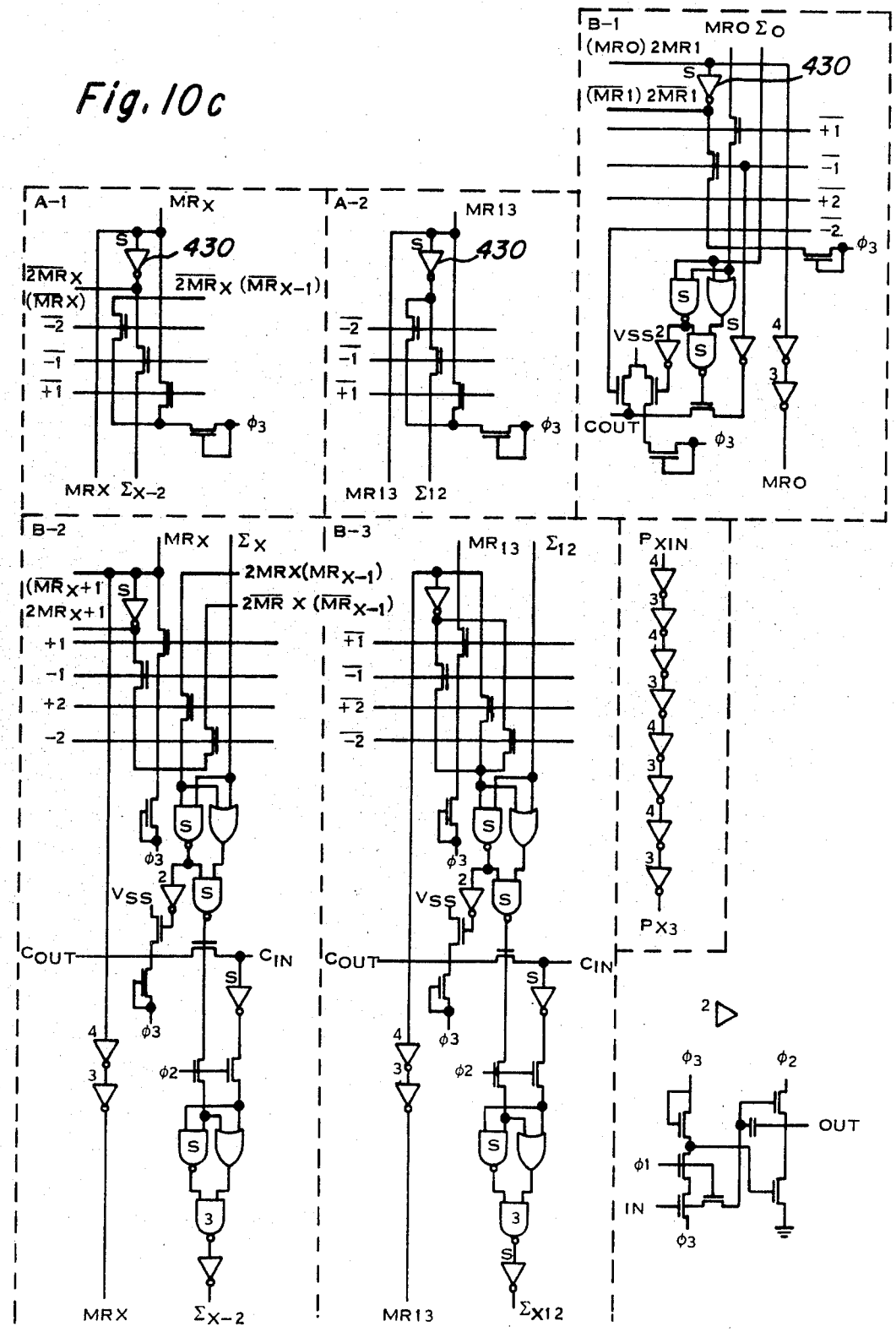
Figure 11A:
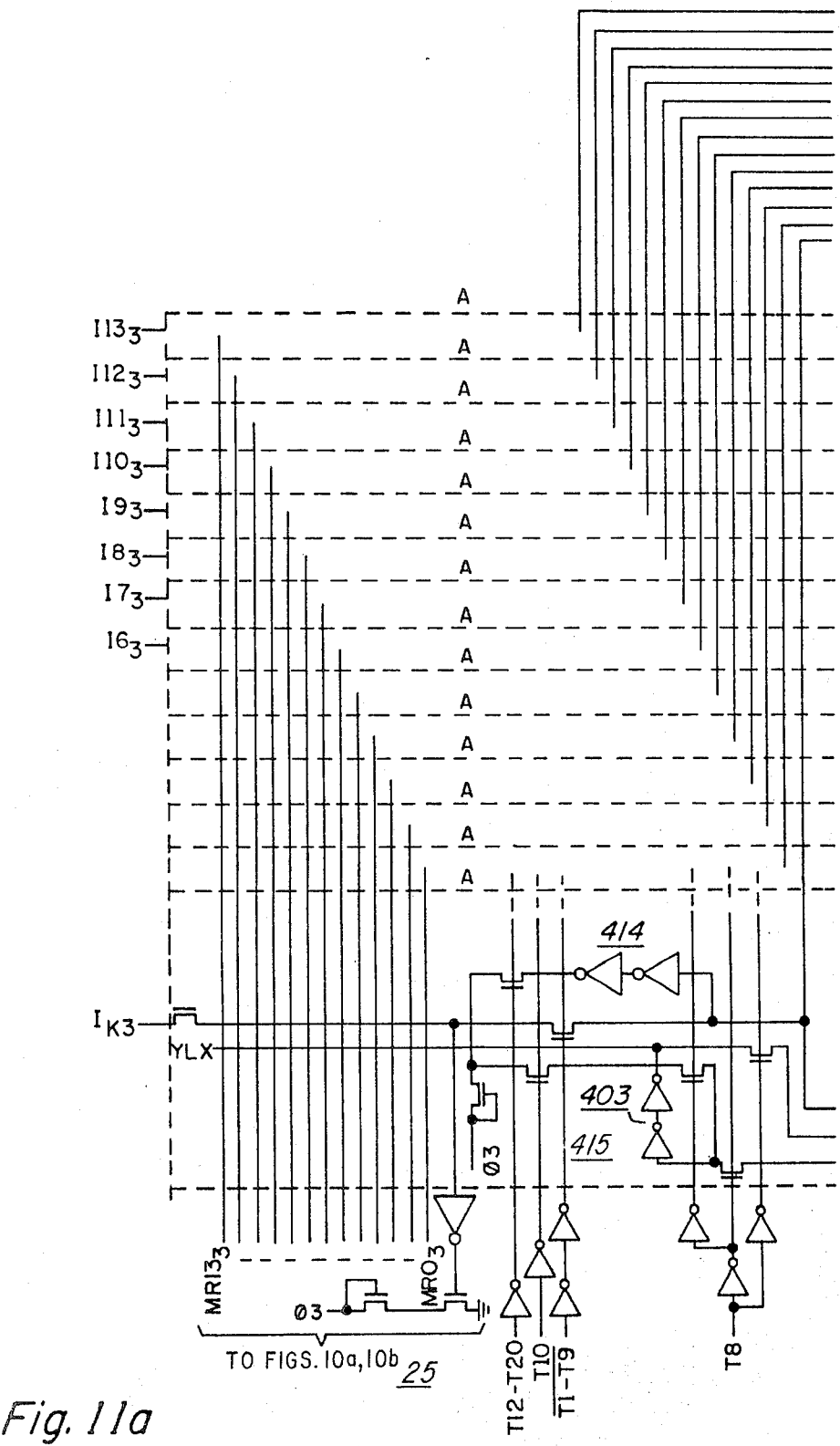
Figure 11C:
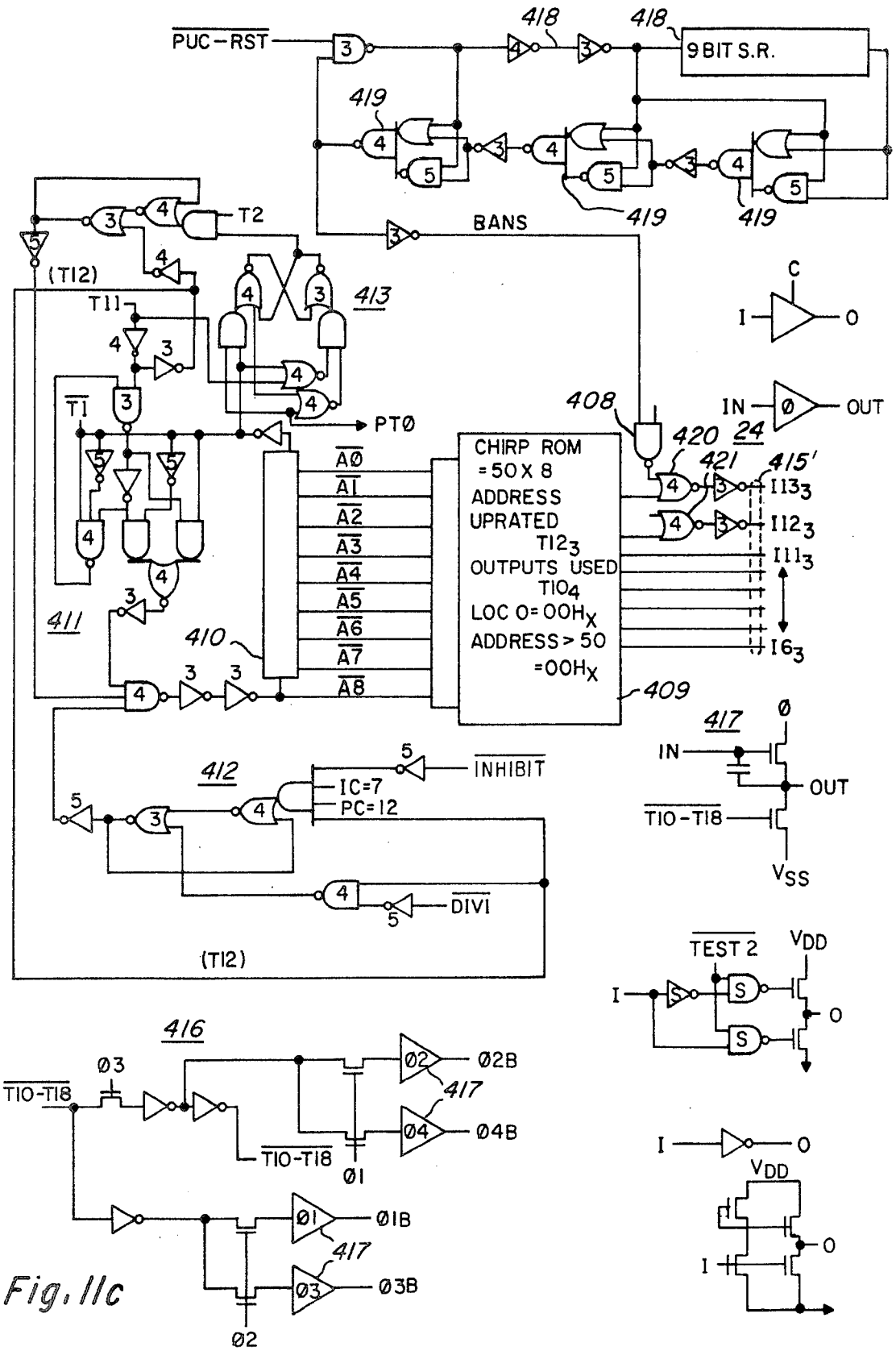

Recoding logic 301 couples K-stack 302 to array multiplier 401 (FIGS. 10a–10c). Recoding logic 301 includes four identical recoding stages 312a–312d, only one of which 312a, is shown in detail. The first stage of the recoding logic, 313, differs from stages 312a–312d basically because there is, of course, no carry, such as occurs on input A in stages 312a–312d, from a lower order stage. Recoding logic outputs $+\overline{2}$, $-\overline{2}$, $+\overline{1}$ and $-\overline{1}$ to each stage of a five stage array multiplier 401, except for stage zero which receives only $-\overline{2}$, $+\overline{1}$ and $-\overline{1}$ outputs. Effectively recoding logic 301 permits array multiplier to process, in each stage thereof, two bits in lieu of one bit of information, using Booth's algorithm. Booth's algorithm is explained in "Theory and Application of Digital Signal Processing", published by Prentice-Hall 1975, at pp. 517-18.

The K10 coefficient and energy are stored in E10 loop 304. E10 loop preferably comprises a twenty stage serial shift register; ten stages 304a of E10 loop 304 are preferably coupled in series and another ten stages 304b are also coupled in series but also have parallel outputs and inputs to K-stack 302. The appropriate parameter, either energy or the K10 coefficient, is transferred from E10 loop 304 to K-stack 302 via gates 315 which are responsive to a NOR gate 316 for transferring the energy parameter from E10 loop 304 to K-stack 302 at time period T10 and transferring coefficient K10 from E10 loop 304 to K-stack 302 at time period T20. NOR gate 316 also controls recirculation control gate 315 for inhibiting recirculation in K-stack 302 when data is being transferred.

KE10 transfer register 303 facilitates the transferring of energy or the K1–K10 speech coefficients which are stored in E10 loop 304 or K-stack 302 to subtractor 308 and delay circuit 309 via selector 307. Register 303 has nine stages provided by paired inverters and a tenth stage being effectively provided by selector 307 and gate 317 for facilitating the transfer of ten bits of information either from E10 loop 304 or K-stack 302. Data is transferred from K-stack 302 to register 303 via transfer gates 318 which are controlled by a Transfer K (TK) signal generated by decoder portion 511b of timing PLA 511 (FIGS. 7a–7d). Since the particular parameter to be interpolated and thus shifted into register 303 depends upon the particular parameter count in which the synthesizer is operating and since the particular parameter available to be outputted from K-stack 302 is a function of particular time period time synthesizer is operating in, the TK signal comes up at T9 for the pitch parameter, T8 for the K1 parameter, T7 for te K2 parameter and so forth, as is shown in FIGS. 7a–7d. The energy parameter or the K10 coefficient is clocked out of E10 loop 304 into register 303 via gates 319 in response to a TE10 signal generated by a timing PLA 511. After each interpolation, that is during the B cycle, data is transferred from register 303 into (1) K-stack 302 via gates 318 under control of signal TK, at which time recirculation gates 314 are turned off by gate 315, or (2) E10 loop 304 via gates 319.

A ten bit pitch parameter is stored in a pitch register 305 which includes a nine stage shift register as well as recirculation elements 305a which provide another bit of storage. The pitch parameter normally recirculates in register 305 via gate 305a except when a newly interpolated pitch parameter is being provided on line 320, as controlled by pitch interpolation control logics 306. The output of pitch register 305 (PT0) or the output from register 303 is applied by selector 307 to gate 317. Selector 307 is also controlled by logics 306 for normally coupling the output of register 303 to gate 317 except when the pitch is to be interpolated. Logics 306 are responsive for outputting pitch to subtractor 308 and delay 309 during the A cycle of PC=1 and for returning the interpolated pitch value on line 320 on the B cycle of PC=1 to register 305. Gate 317 is responsive to a latch 321 for only providing pitch, energy or coefficient information to subtractor 308 and delay circuit 309 during the interpolation. Since the data is serially clocked, the information may be started to be clocked during an A portion and PC0 may switch to a logical one sometime during the transferring of the information from register 303 or 305 to subtractor 308 or delay circuit 309, and therefore, gate 317 is controlled by an A cycle latch 321, which latch is set with PC0 at the time a transfer coefficient (TK) transfer E10 (TE10) or transfer pitch (TP) signal is generated by timing PLA 511.

Figure 7A:
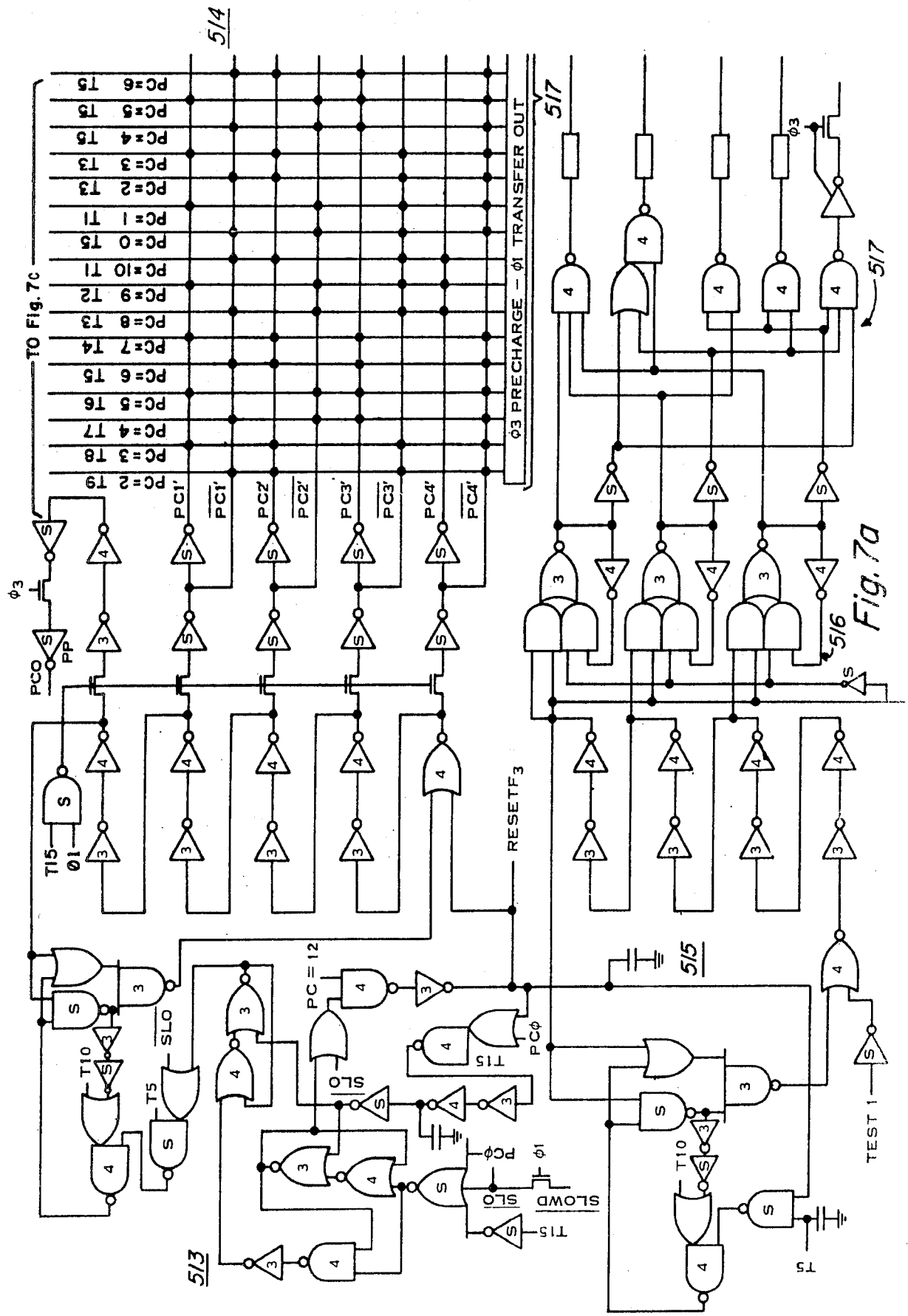
FIGS. 7a–7d form a composite logic diagram of the synthesizer's timing circuits.
Figure 9A:
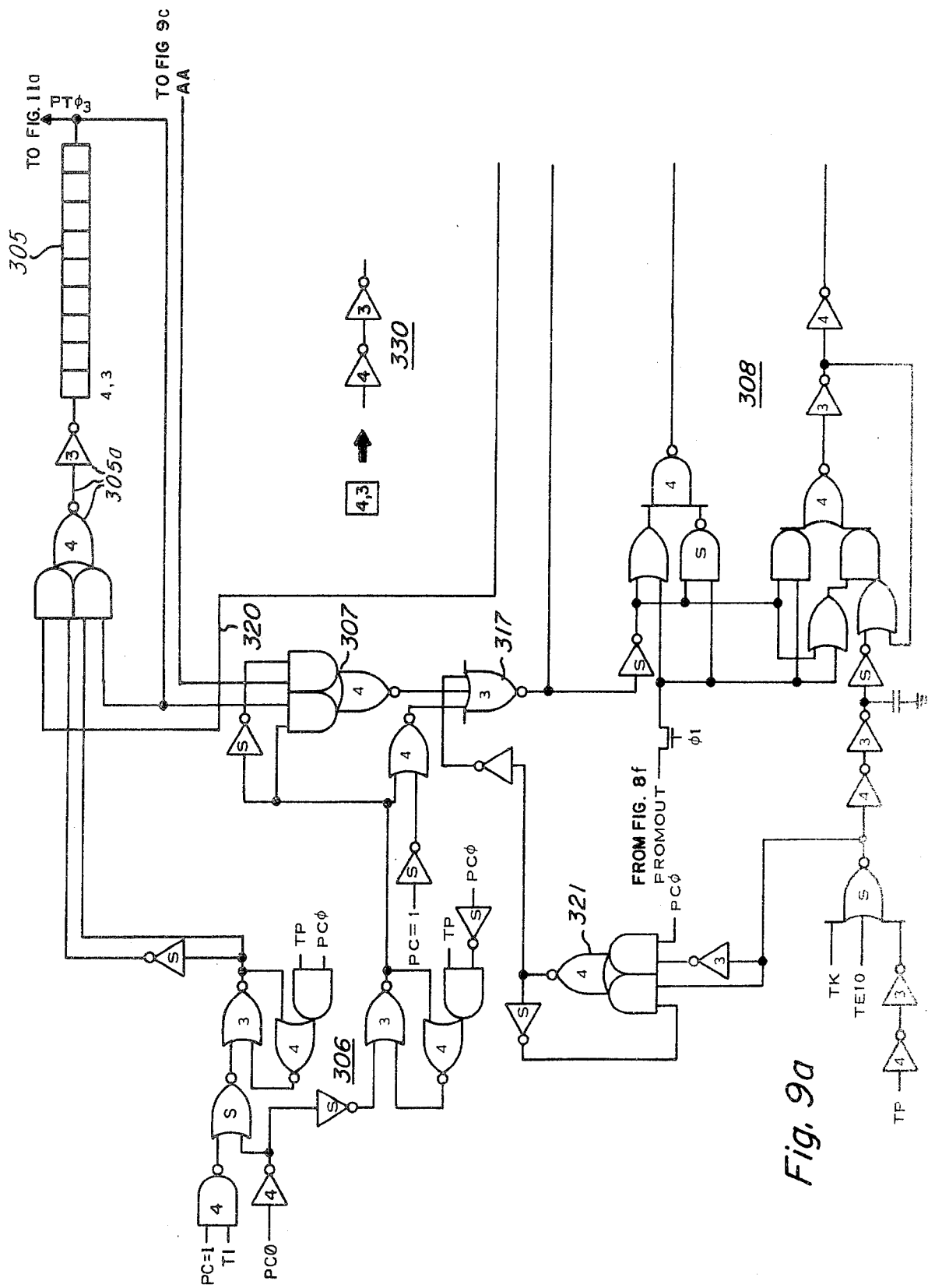
FIGS. 9a–9d form a composite logic diagram of the interpolator logics.
Figure 9B:
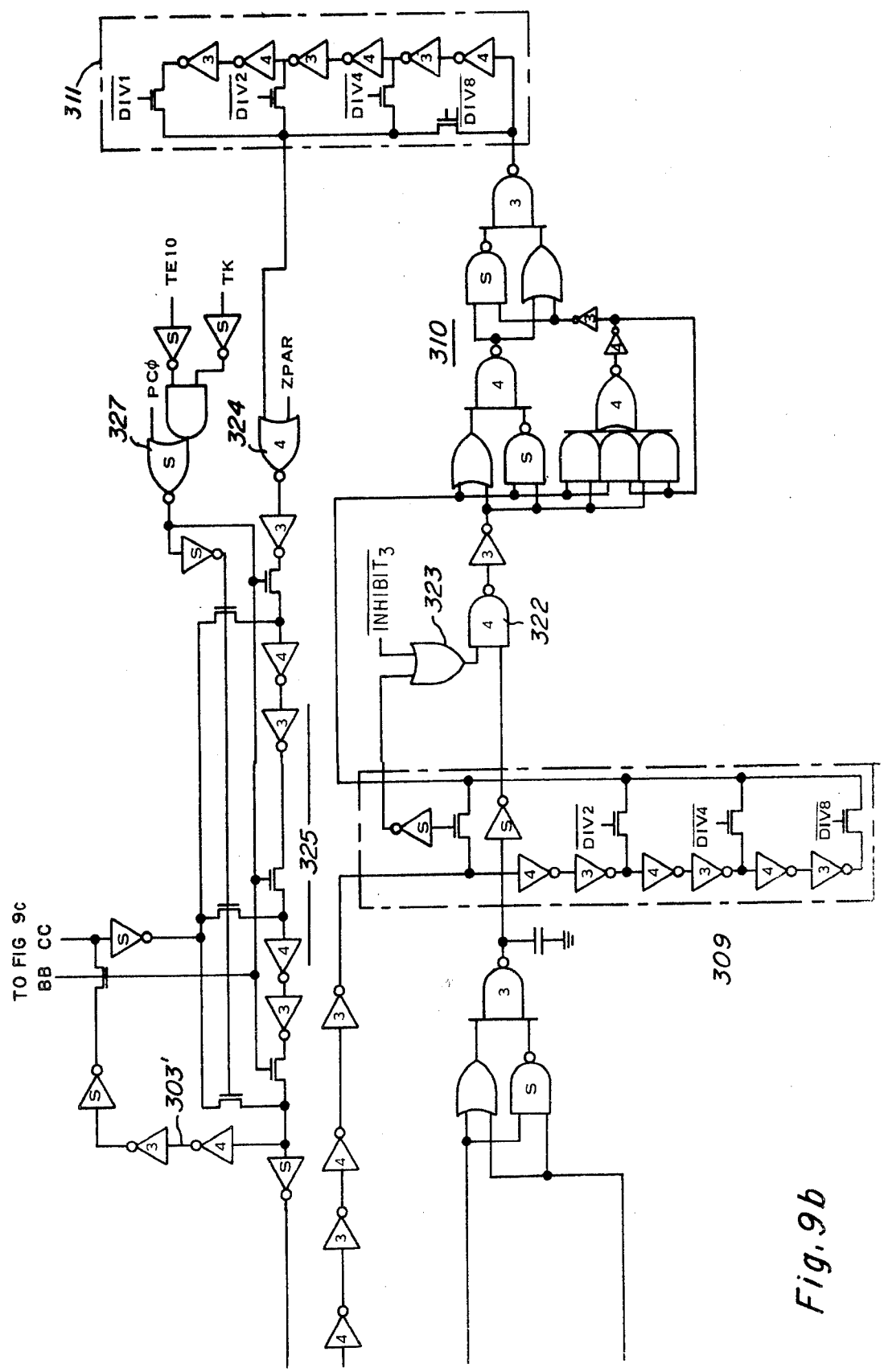
Figure 9C:
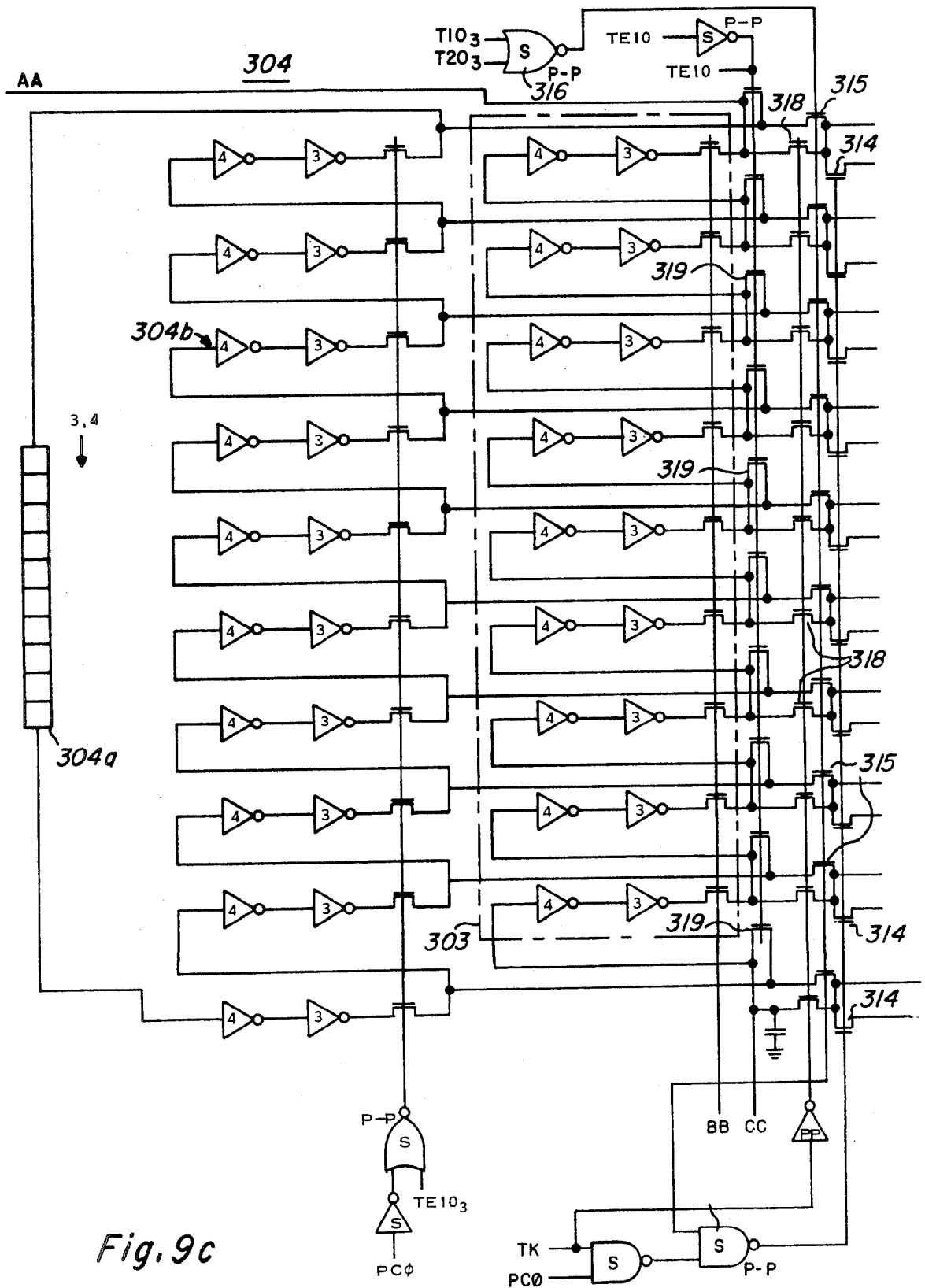
Figure 9D:
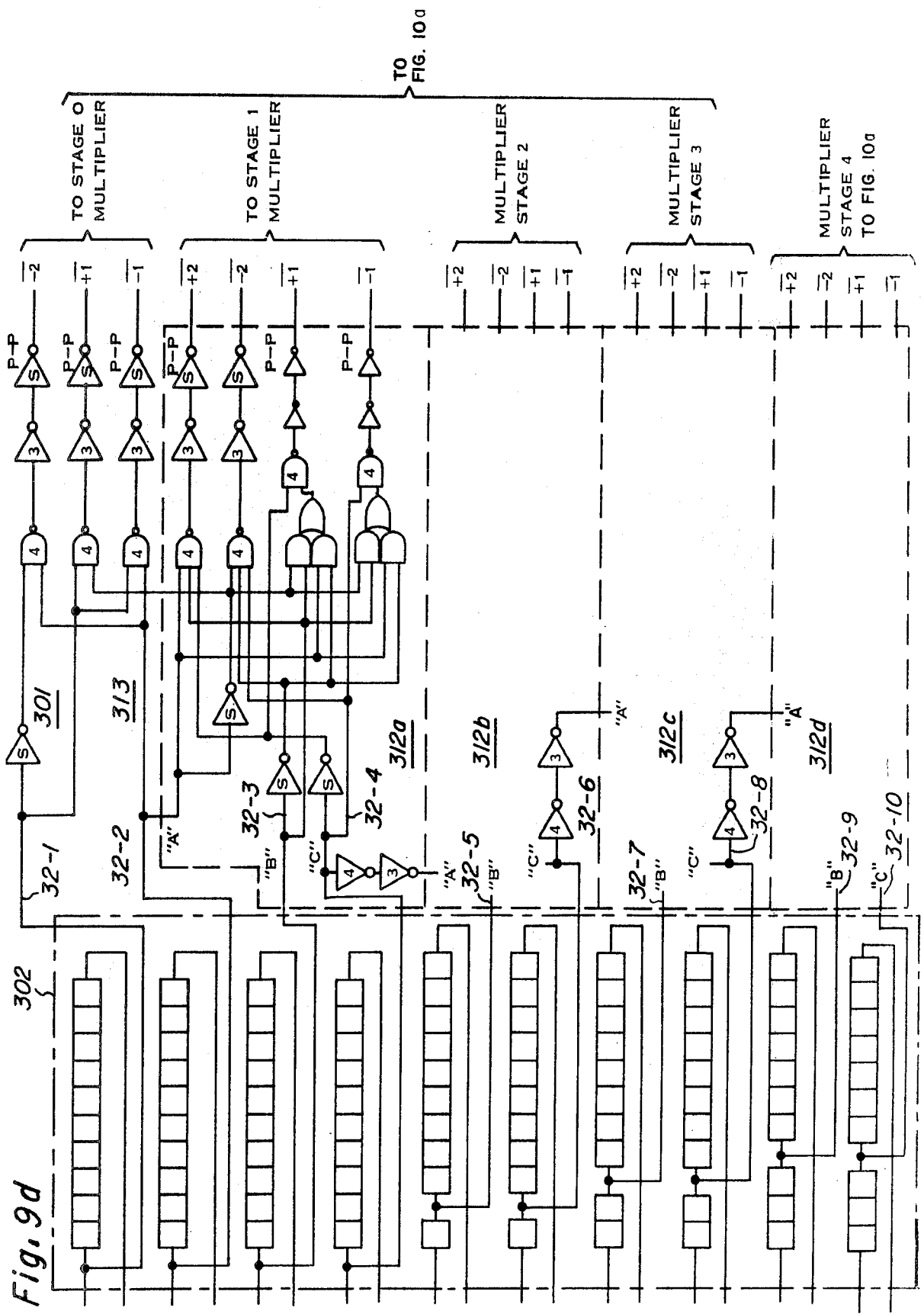

The output of gate 317 is applied to subtractor 308 and delay circuit 309. The delay in delay circuit 309 depends on the state of DIV1–DIV8 signals generated by interpolation counter 515 (FIG. 7a). Since the data exits gate 317 with the least significant bit first, by delaying the data in delay circuit 309 a selective amount, and applying the output to adder 310 along with the output of subtractor 308, the more delay there is in circuit 309, the smaller the effective magnitude of the difference from subtractor 308 which is subsequently added back in by adder 310. Delay circuit 311 couples adder 310 back into registers 303 and 305. Both delay circuits 309 and 311 can insert up to three bits of delay and when delay circuit 309 is at its maximum, delay circuit 311 is at its minimum delay and vice-versa. A NAND gate 322 couples the output of subtractor 308 to the input of adder 310. Gate 322 is responsive to the output of an OR gate 323 which is in turn responsive to INHIBIT from inverter 326 (FIGS. 8c and 9b). Gates 322 and 323 act to zero the output from subtractor 308 when the INHIBIT signal comes up unless the interpolation counter is at IC0 in which case the present values in K-stack 302, E10 loop 304 and pitch register 305 are fully interpolated to their new target values in a one step interpolation. When an unvoiced frame (FIG. 6) is supplied to the speech synthesis chip, coefficients K5-K10 are set to zero by the action of gate 324 which couples delay circuit 311 to shift register 325 whose output is then coupled to gates 305a and 303'. Gate 324 is responsive to the zero parameter (ZPAR) signal generated by gate 237 (FIGS. 8c and 9b).

Gate 326 disables shifting in the 304b portion of E10 loop 304 when a newly interpolated value of energy or K10 is being inputted into portion 304b from register 303. Gate 327 controls the transfer gates coupling the stages of register 303, which stages are inhibited from serially shifting data therebetween when TK or TE10 goes high during the A cycle, that is, when register 303 is to be receiving data from either K-stack 302 or E10 loop 304 as controlled by transfer gates 318 or 319, respectively. The output of gates 327 is also connected to various stages of shift register 325 and to a gate coupling 303' with register 303. Whereby up to the thre bits which may trail the ten most significant bits after an interpolation operation may be zeroed.

Array Multiplier Logic Diagram

FIGS. 10a-10c form a composite logic diagram of array multiplier 401. Array multipliers are sometimes referred to as Pipeline Multipliers. For example, see "Pipeline Multiplier" by Granville E. Ott, published by the University of Missouri.

Array multiplier 401 has five stages, stage 0 through stage 4, and a delay stage. The delay stage is used in array multiplier 401 to give it the same equivalent delay as the array multiplier shown in U.S. Pat. No. 4,209,844. The input to array multiplier 401 is provided by signals $MR_0$-$MR_{13}$, from multiplier multiplexer 415. $MR_{13}$ is the most significant bit while $MR_0$ is the least significant bit. Another input to array multiplier are the aforementioned +2, −2, +1 and −1 outputs from recoding logic 301 (FIG. 9b). The output from array multiplier 401, $P_{13}$-$P_0$, is applied to summer multiplexer 402. The least significant bit thereof, P0, is in this embodiment always made a logical one because doing so establishes the mean of the truncation error as zero instead of $-\frac{1}{2}$ LSB which value would result from a simple truncation of a two's complement number.

Array multiplier 401 is shown by a plurality of box elements labled A-1, A-2, B-1, B-2, B-3 or B-C. The specific logic elements making up these box elements are shown in FIG. 10c in lieu of repetitively showing these elements and making up a logic diagram of array multiplier 401, for simplicity sake. The A-1 and A-2 block elements make up stage zero of the array multiplier and thus are each responsive to the $\overline{-2}$, $\overline{+1}$ and $\overline{-1}$ signals outputted from decoder 313 and are further responsive to MR2-MR13. When multiplies occur in array multiplier 401, the most significant bit is always maintained in the left most column elements while the partial sums are continuously shifted toward the right. Inasmuch as each stage of array multiplier 401 operates on two binary bits, the partial sums, labeled $\Sigma n$, are shifted to the right two places. Thus no A type blocks are provided for the MR0 and MR1 data inputs to the first stage. Also, since each block in array multiplier 401 is responsive to two bits of information from K-stack 302 received via recoding logic 301, each block is also responsive to two bits from multiplier multiplexer 415, which bits are inverted by inverters 430, which bits are also supplied in true logic to the B type blocks.

Filter and Excitation Generator Logic Diagram

FIGS. 11a-11d form a composite, detailed logic diagram of lattice filter and excitation generator 24 (other than array multiplier 401) and output section 25. In filter and excitation generator 24 is a summer 404 which is connected to receive at one input thereof either the true or inverted output of array multiplier 401 (see FIGS. 10a-10c). on lines P0-P13 via summer multiplexer 402. The other input of adder 404 is connected via summer multiplexer 402 to receive either the output of adder 404 (at T10-T18), the output of delay stack 406 on lines 440-453 at T20-T7 and T9), the output of Y-latch 403 (at T8) or a logical zero from $\phi 3$ precharge gate 420 (at T19 when no conditional discharge is applied to this input). The reasons these signals are applied at these times can be seen from FIG. 8 of the aforementioned U.S. Pat. No. 4,209,844; it is to be remembered of course, that the time period designations differ as discussed with reference to FIG. 5 hereof.

The output of adder 404 is applied to delay stack 406, multiplier multiplexer 415, one period delay gates 414 and summer multiplexer 402. Multiplier multiplexer 415 includes one period delay gates 414 which are generally equivalent to one period delay 34' of FIG. 7 in U.S. Pat. No. 4,209,844. Y-latch 403 is connected to receive the output of delay stack 406. Multiplier multiplexer 415 selectively applies the output from Y-latch 403, one period delay gates 414, or the excitation signal on bus 415' to the input MR0-MR13 of array multiplier 401. The inputs D0-D13 to delay stack 406 are derived from the outputs of adder 404. The logics for summer multiplexer 402, adder 404, Y-latch 403, multiplier multiplexer 415 and one period delay circuit 414 are only shown in detail for the least significant bit as enclosed by dotted line reference A. The thirteen most significant bits in the lattice filter also are provided by logics such as those enclosed by the reference line A, which logics are denoted by long rectangular phantom line boxes labeled "A." The logics for each parallel bit being processed in the lattice filter are not shown in detail for sake of clarity. The portions of the lattice filter handling bits more significant than the least significant bit differ from the logic shown for elements 402, 403, 404, 415, and 414 only with respect to the interconnections made with truncation logics 425 and bus 415' which connects to UV gate 408 and chirp ROM 409. In this respect, the output from UV gate 408 and chirp ROM 409 is only applied to inputs I13-I6 and therefore the input labeled $I_x$ within the reference A phantom line is not needed for the six least significant bits in the lattice filter. Similarly, the output from the Y-latch 403 is only applied for the ten most significant bits, $YL_{13}$ through $YL_4$, and therefore the connection labeled YLx within the reference line A is not required for the four least significant bits in the lattice filter.

Delay stack 406 comprises 14 nine bit long shift registers, each stage of which comprise inverters clocked on $\phi 4$ and $\phi 3$ clocks. As is discussed in U.S. Pat. No. 4,209,844, the delay stack 406 which generally corresponds to shift register 35' of FIG. 7 of the aforementioned patent, is only shifted on certain time periods. This is accomplished by logics 416 whereby $\phi 1B-\phi 4B$ clocks are generated from T10–T18 timing signal from PLA 512 (FIGS. 7a–7d). The clock buffers 417 in circuit 416 are also shown in detail in FIGS. 11c.

Delay stack 406 is nine bits long whereas shift register 35' in FIG. 7 of U.S. Pat. No. 4,209,844 was eight bits long; this difference occurs because the input to delay stack 406 is shown as being connected from the output of adder 404 as opposed to the output of one period delay circuit 414. Of course, the input to delay stack 406 could be connected from the outputs of one period delay circuit 414 and the timing associated therewith modified to correspond with that shown in U.S. Pat. 4,209,844.

The data handled in delay stack 406, array multiplier 401, adder 404, summer multiplexer 402, Y-latch 403, and multiplier multiplexer 415 is preferably handled in two's complement notation.

Unvoiced generator 407 is a random noise generator comprising a shift register 418 with a feedback term supplied by feedback logics 419 for generating pseudo-random terms in shift register 418. An output is taken therefrom and is applied to UV gate 408 which is also responsive to OLDP from latch 208d (FIG. 8c). Old pitch latch 208d controls gate 408 because pitch=0 latch 208b changes state immediately when the new speech parameters are inputted to register 205. However, since this occurs during interpolation count IC0 and since, during an unvoiced condition the new values are not interpolated into K-stack 302, E10 loop 304 and pitch register 305 until the following IC0, the speech excitation value cannot change from a periodic excitation from chirp ROM 409 to a random excitation from unvoiced generator 407 until eight interpolation cycles have occurred. Gate 420 nors the output of gate 408 into the most significant bit of the excitation signal, $I_{13}$, thereby effectively causing the sign bit to ramdomly change during unvoiced speech. Gate 421 effectively forces the most significant bit of the excitation signal, $I_{12}$, to a logical one during unvoiced speech conditions. Thus the combined effect of gates 408, 420 and 421 is to cause a randomly changing sign to be associated with a steady decimal equivalent value of 0.5 to be applied to the lattice filter and Filtering Excitation Generator 24.

Figure 14A:
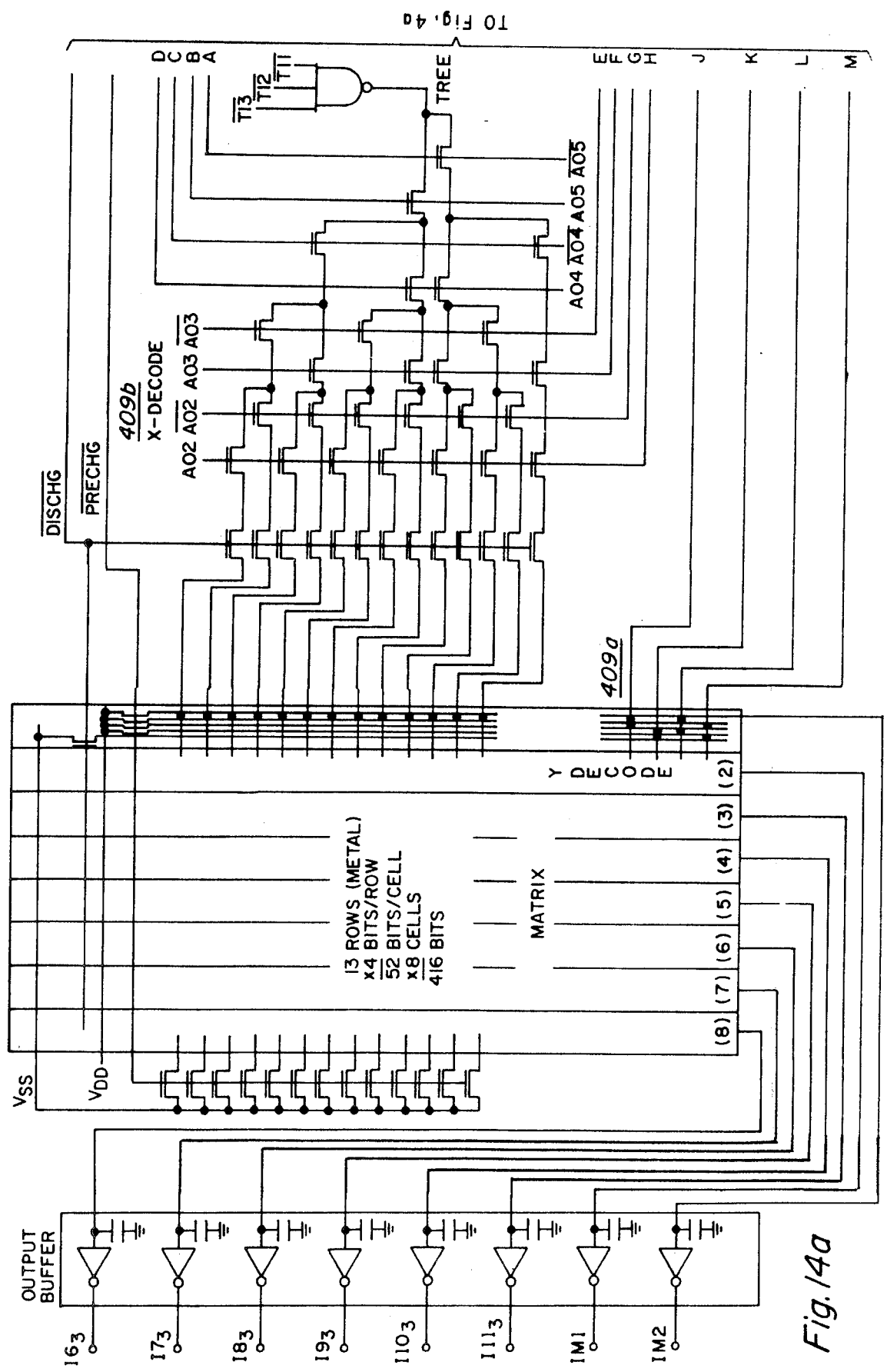
FIGS. 14a–14b form a composite diagram of the chip ROM.
Figure 14B:
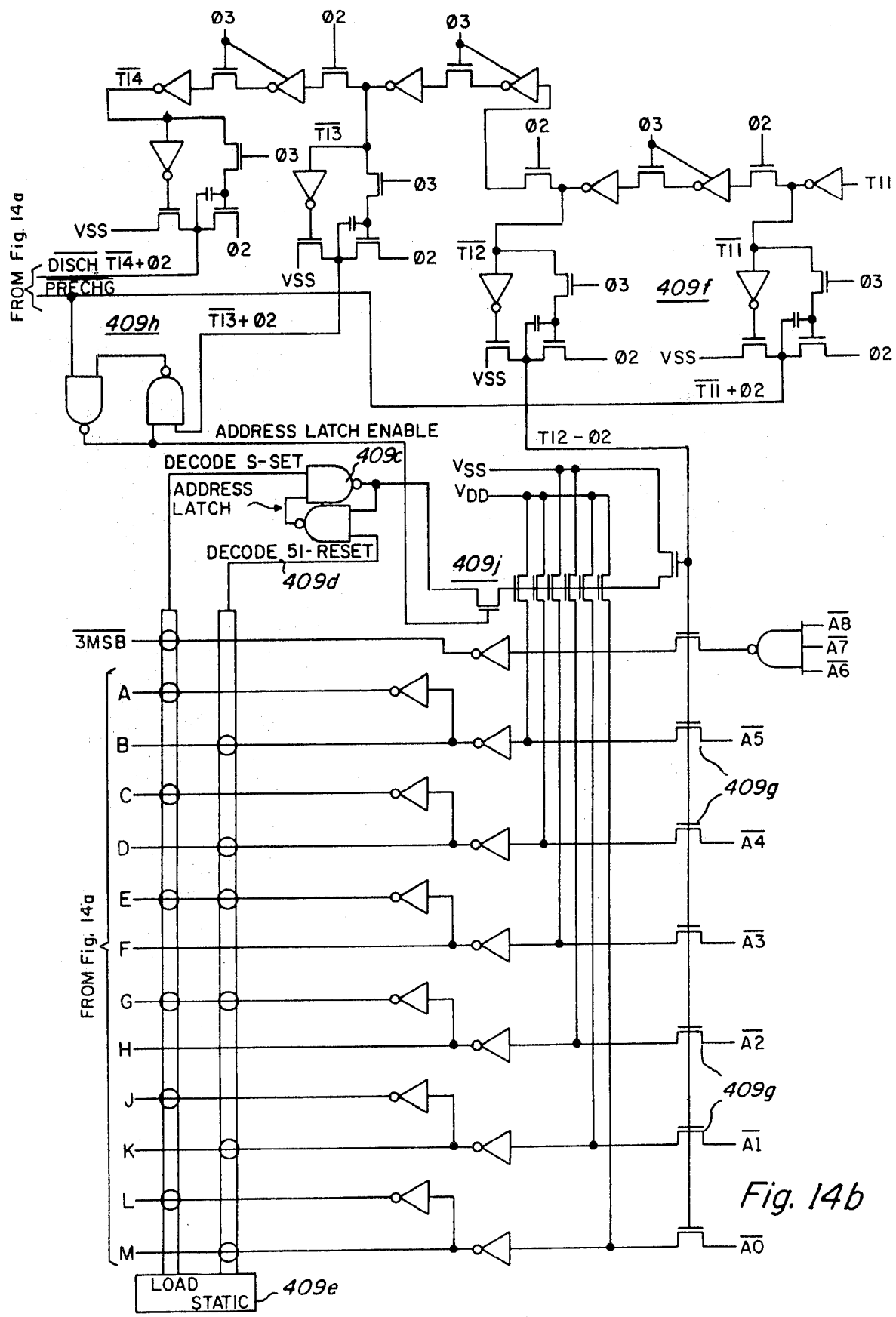

During voiced speech, chirp ROM 409 provides an eight bit output on lines $I_6-I_{13}$ to the lattice filter. This output comprises forty-one successively changing values which, when graphed, represent a chirp function. The contents of ROM 409 are listed in Table V; ROM 409 is set up to invert its outputs and thus the data is stored therein in complemented format. The chirp function value and the complemented value stored in the chirp ROM are expressed in two's complement hexadecimal notation. ROM 409 is addressed by an eight bit register 410 whose contents are normally updated during each cycle through the lattice filter by add one circuit 411. The output of register 410 is compared with the contents of pitch register 305 in a magnitude comparator 413 for zeroing the contents of 410 when the contents of register 410 become equal to or greater than the contents of register 305. ROM 409, which is shown in greater detail in FIGS. 14a–14b, is arranged so that addresses greater than 110010 cause all zeroes to be outputted on lines $I_{13}-I_6$ to multiplier multiplexer 415. Zeros are also stored in address locations 41-14 51. Thus, the chirp may be expanded to occupy up to address location fifty, if desired.

Random Access Memory Logic Diagram

Referring now to FIGS. 12a–12b, there is shown a composite detailed logic diagram of RAM 203. RAM 203 is addressed by address on PC1–PC4, which address is decoded in a PLA 203a and defines which coded parameter is to be inputted into RAM 203. RAM 203 stores the twelve coded parameters, the parameters having bit lengths varying between three bits and five bits according to the coded scheme described with reference to FIG. 6. Each cell, reference B, of RAM 203 is shown in greater detail in FIG. 12b. Read/Write control logic 203b is responsive to T1, DIV1, PC0 and parameter load enable for writing into the RAM 203 during the A cycle of each parameter count during interpolation count zero when enabled by parameter load enable from logics 238 (FIG. 8c). Data is inputted to RAM 203 on lines IN0–IN4 from register 205 as shown in FIGS. 8c and 8f and data is outputted on lines C0–C4 to ROM 202 as is shown in FIGS. 8e and 8f.

Parameter Read-Only-Memory Logic Diagram

Figure 13A:
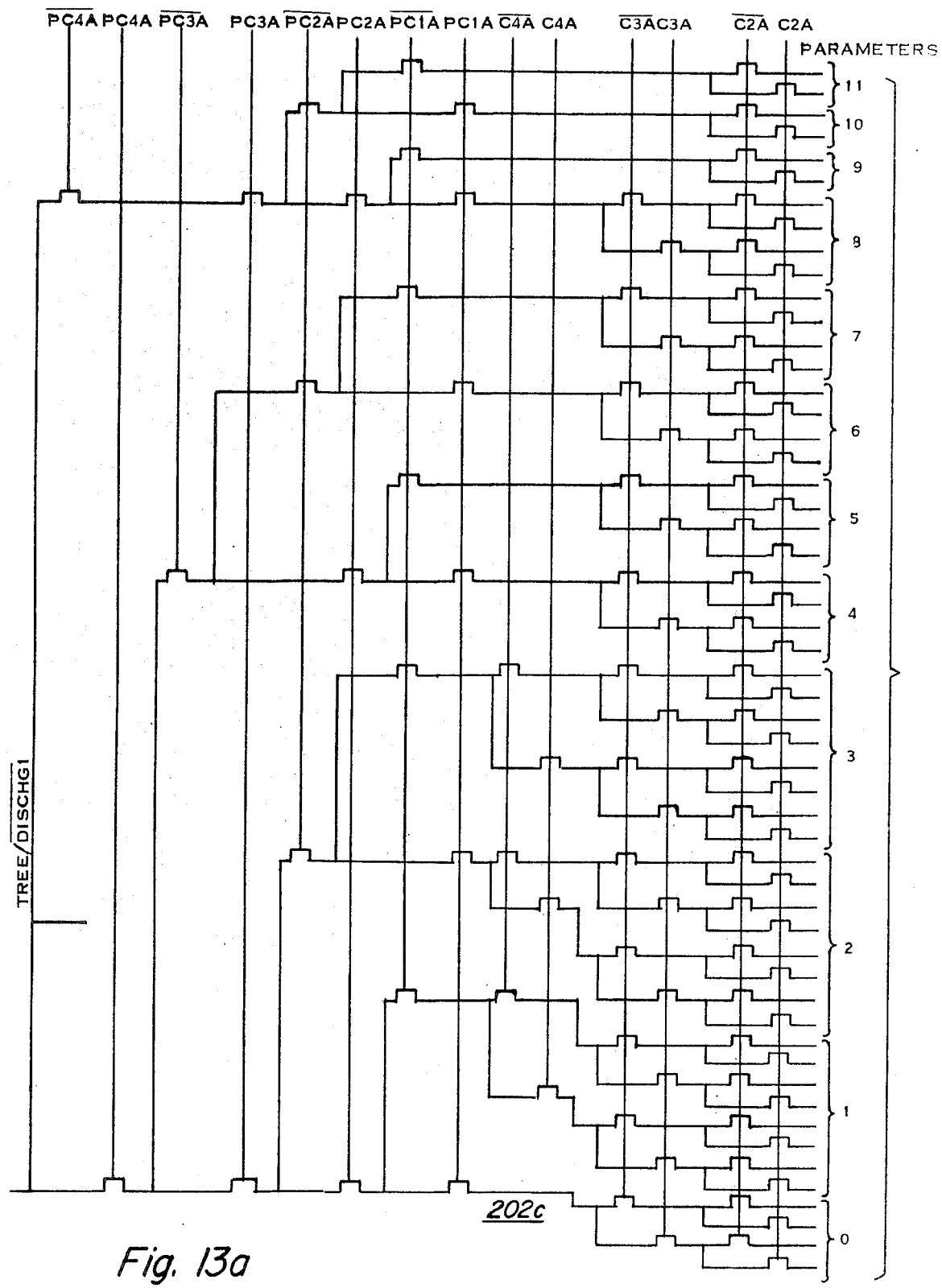
FIGS. 13a–13c are schematic diagrams of the parameter ROM.
Figure 13B:
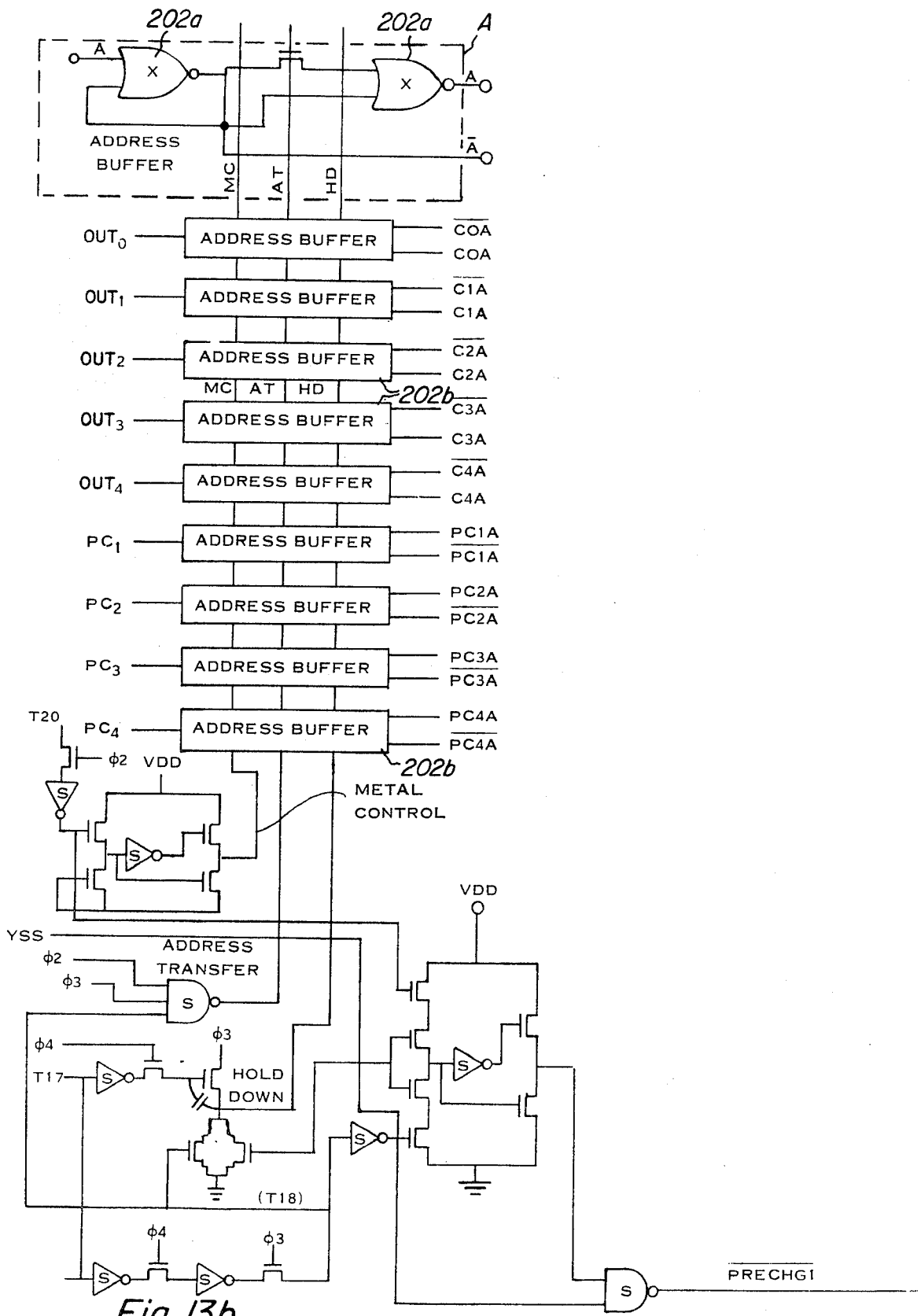
Figure 13C:
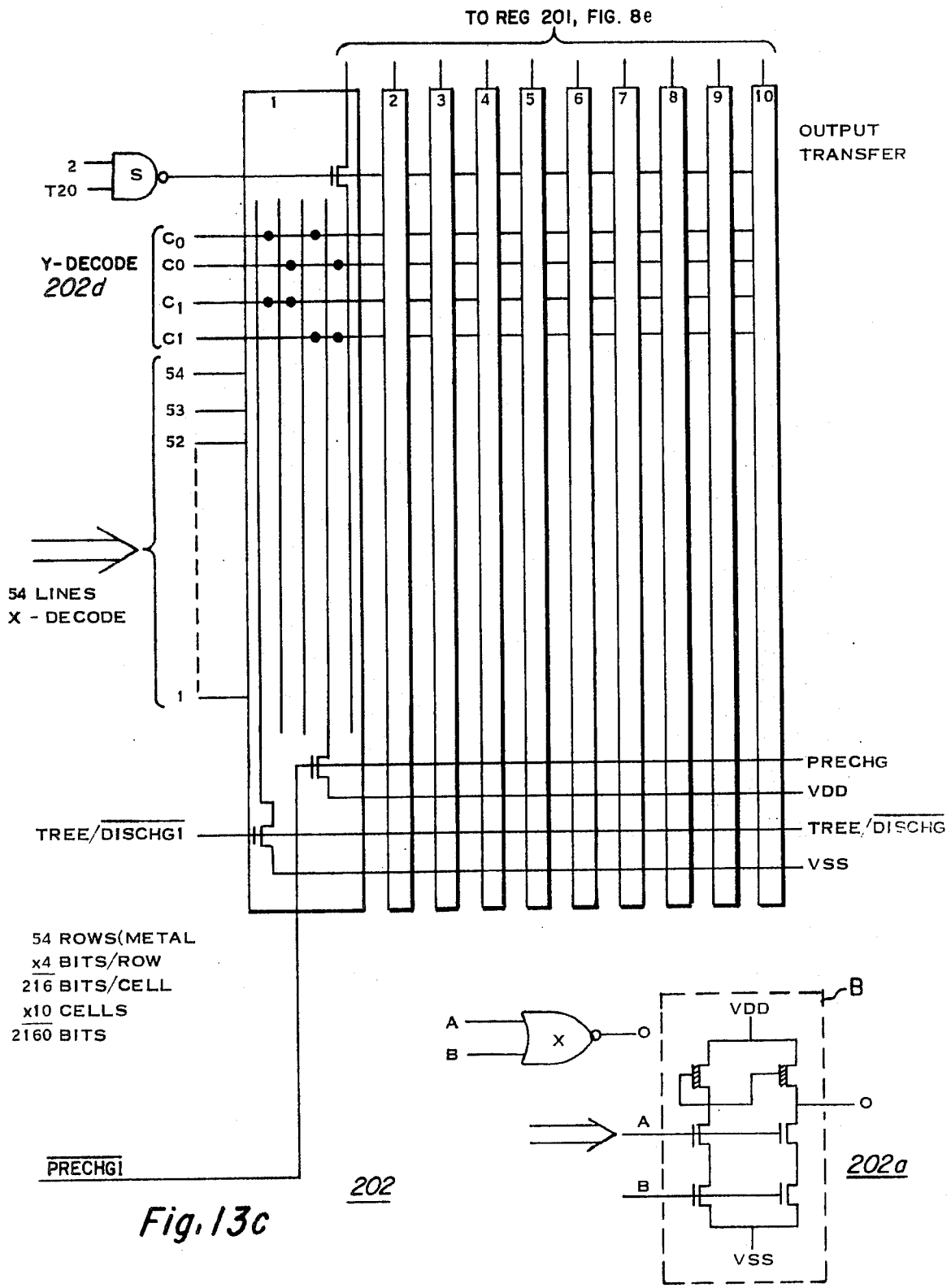

In FIGS. 13a–13c, there is shown a logic diagram of ROM 202. ROM 202 is preferably a virtual ground ROM of the type disclosed in U.S. Pat. No. 3,934,233. Address information from RAM 203 and from parameter counter 513 are applied to address buffers 202b which are shown in detail at reference A. The NOR gates 202a used in address buffers 202b are shown in detail at reference B. The outputs of the address buffers 202b are applied to an X-decoder 202c or to a Y-decoder 202d. The ROM is divided into ten sections labeled reference C, one of which is shown in greater detail. The outline for output line from each of the sections is applied to register 201 via inverters as shown in FIGS. 8e and 8f. X-decoder selects one of fifty-four X-decode lines while Y-decoder 202d tests for the presence or nonpresence of a transistor cell between an adjacent pair of diffusion lines, as is explained in greater detail in the aforementioned U.S. Pat. No. 3,934,233. The data preferably stored in ROM 202 of this embodiment is listed in Table III.

Chirp Read-Only-Memory Logic Diagram

FIGS. 14a–14b form a composite diagram of chirp ROM 409. ROM 409 is addressed via address lines $\overline{A_0}-\overline{A_8}$ from register 410 (FIG. 11c) and output information on lines $I_6-I_{11}$ to multiplier multiplexer 415 and lines $I_{m1}$ and $I_{m2}$ to gates 421 and 420, all which are shown in FIGS. 11a–11d. As was previously discussed with reference to FIGS. 11a–11d, chirp ROM outputs all zeros after a predetermined count is reached in register 410, which, in this case is the count equivalent to a decimal 51. ROM 409 includes a Y-decoder 409a which is responsive to the address on lines $\overline{A_0}$ and $\overline{A_1}$ (and $A_0$ and $A_1$) and an X-decoder 409b which is responsive to the address on lines $\overline{A_2}$ through $\overline{A_5}$ (and $A_2-A_5$).

ROM 409 also includes a latch 409c which is set when decimal 51 is detected on lines $\overline{A_0}-\overline{A_5}$ according to line 409c from a decoder 409e. Decoder 409e also decodes a logical zero on lines $\overline{A_0}$-$\overline{A_8}$ for resetting latch 409c. ROM 409 includes timing logics 409f which permit data to be clocked in via gates 409g at time period T12. At this time decoder 409e checks to determine whether either a decimal 0 or decimal 51 is occurring on address lines $\overline{a_0}$-$\overline{A_8}$. If either condition occurs, latch 409c, which is a static latch, is caused to flip.

An address latch 409h is set at time period T13 and reset at time period T11. Latch 409h permits latch 409c to force a decimal 51 onto lines $\overline{A_0}$-$\overline{A_5}$ when latch 409c is set. Thus, for addresses greather than 51 address register 410, the address is first sampled at time period T12 to determine whether it has been reset to zero by reset logic 412 (FIG. 11c) for the purpose of resetting latch 409c and if the address has not been reset to zero then whatever address has been inputted on lines $\overline{A_0}$-$\overline{A_8}$ is written over by logics 409j at T13. Of course, at location 51 in ROM 409 will be stored all zeros on the output lines I6-I11, IM1 and IM2. Thus by the means of logics 409c, 409h and 409j addresses of a preselected value, in this case a decimal 51, are merely tested to determine whether a reset has occurred but are not permitted to address the array of ROM cells via decoders 409a and 409b. Addresses between a decimal 0 and 50 address the ROM normally via decoders 409a and 409b. The ROM matrix is preferably of the virtual ground type described in U.S. Pat. No. 3,934,233. As aforementioned, the contents of ROM 409 are listed in Table V. The chirp function is located at addresses 00-40 while zeros are located at addresses 41-51.

Truncation Logic and Digital-To-Analog Converter

Turning again to FIGS. 11a-11d, the truncation logic 425 and Digital-to-Analog (D/A) converter are shown in detail. Truncation logic 425 includes circuitry for converting the two's complement data on $YL_{13}$-$YL_{14}$ to sign magnitude data. Logics 425a test the MSB from Y-latch 403 on line $YL_{13}$ for the purpose of generating a sign bit and for controlling the two's complement to sign magnitude conversion accomplished by logics 425c. The sign bit is supplied in true and false logic on lines D/Asn and $\overline{D/Asn}$ to D/A converter 426.

Logics 425c convert the two's complement data from Y-latches 403 in lines $YL_{10}$-$YL_4$ to simple magnitude notation on lines $\overline{D/A_6}$-$\overline{D/A_0}$. Only the logics 425c associated with YL10 are shown in detail for sake of simplicity.

Logics 425b sample the $YL_{12}$ and $YL_{11}$ bits from the Y-latches 403 and perform a magnitude truncation function thereon by forcing outputs $\overline{D/A_6}$ through $\overline{D/A_0}$ to a logical zero (i.e., a value of one if the outputs were in true logic) wherever either $YL_{12}$ or $YL_{11}$ is a logical one and $YL_{13}$ is a logical zero, indicating that the value is positive or either $YL_{12}$ or $YL_{11}$ is a logical zero and $YL_{13}$ is a logical one, indicating that the value is negative (and complemented, of course). Whenever one of these conditions occurs, a logical zero appears on line 427 and Vss is thereby coupled to the output buffer 428 in each of logics 425c. The magnitude function effectively truncates the more significant bits on $YL_{11}$ and $YL_{12}$. It is realized that this is somewhat unorthodox truncation, since normally the less significant bits are truncated in most other circuits where truncation occurs. However, in this circuit, large positive or negative values are effectively cliped. More important digital speech information, which has smaller magnitudes, is effectively amplified by a factor of four by this truncation scheme.

Figure 23A:
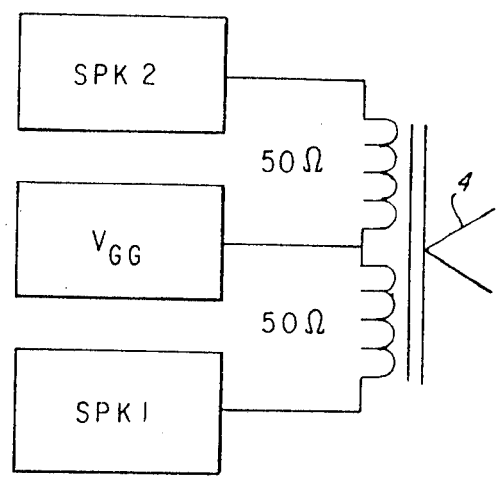
FIGS. 23a–23c depict embodiments of the speaker system.

The outputs $\overline{D/A_6}$-$\overline{D/A_0}$, along with $\overline{D/Asn}$ and D/Asn, are coupled to D/A converter 426. D/A converter 426 preferably has seven MOS devices 429 coupled to the seven lines $\overline{D/A_6}$ through $\overline{D/A_0}$ from truncation logics 425. Devices 429 are arranged, by controlling their length to width rations, to pass different amounts of electrical current, the device 429 coupled to $\overline{D/A_6}$ passing twice as much current (when on) as the device 429 coupled to $\overline{D/A_5}$. Likewise the device 429 coupled to $\overline{D/A_5}$ is capable of passing twice as much current as the device 429 coupled to $\overline{D/A_4}$. This two to one current passing capability similarly applies to the remaining devices 429 coupled to the remaining lines $\overline{D/A_3}$-$\overline{D/A_0}$. Thus, device 429 coupled to $\overline{D/A_1}$, is likewise capable of passing twice as much current as the device 429 coupled to $\overline{D/A_2}$. All devices 429 are connected in parallel, one side of which is preferably coupled to Vss and the other side is preferably coupled to either side of the speaker 4 via transistors 430 and 431. Transistor 430 is controlled by $\overline{D/Asn}$ which is applied to its gates; transistor 431 is turned off and on in response to D/Asn. Thus, either transistor 430 or 431 is on depending on the state of the sign bit, D/Asn. The voice coil of speaker 4 preferably has a 100 ohm impedance and has a center tap connecter to Vgg as shown in FIG. 23a. Thus, the signals on lines $\overline{D/A_6}$-$\overline{DA_0}$ control the magnitude of current flow through the voice coil while the signals on lines D/Asn and $\overline{D/Asn}$ control the direction of that flow.

Figure 23B:
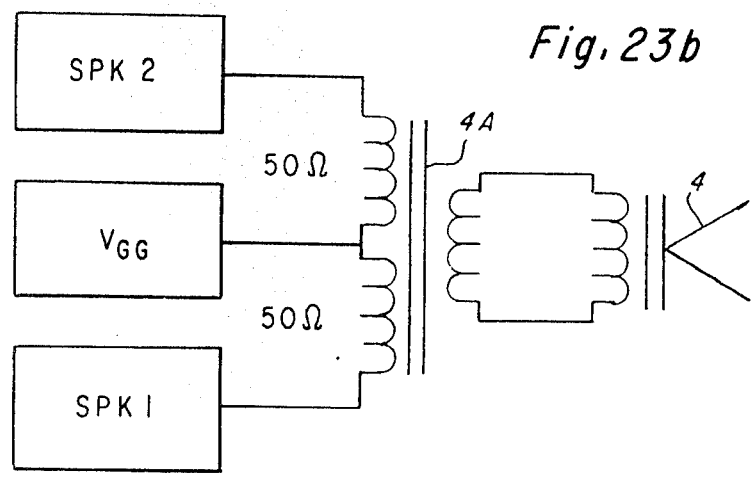
Figure 23C:
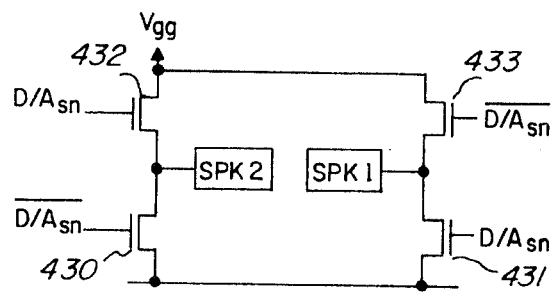

Alternatively to using a center-tapped 100 ohm voice coil, a more conventional eight ohm speaker may be used along with a transformer having a 100 ohm center tapped primary (connected to Vgg and transistors 430 and 431) and an eight ohm secondary (connected to the speaker's terminals) as shown in FIG. 23b. In yet another embodiment, the center tap may be eliminated altogether by utilizing transistors 432 and 433 as shown in FIG. 23c, which are not used in the embodiments utilizing the center tapped transformer or voice coil.

It should now be appreciated by those skilled in the art that D/A converter 426 not only converts digital sign magnitude information on lines $\overline{D/A_6}$-$\overline{D/A_0}$ and D/Asn-$\overline{D/Asn}$ to an analog signal, but has effectively amplified this analog signal to sufficient levels to permit a speaker to be driven directly from the MOS synthesis chip 10 (or via the aforementioned transformer, if desired). Of course, those skilled in the art will appreciate that simple D/A converters, such as that disclosed here, will find use in other applications in addition to speech synthesis circuits.

THE SPEECH SYNTHESIZER CHIP

Figure 22:
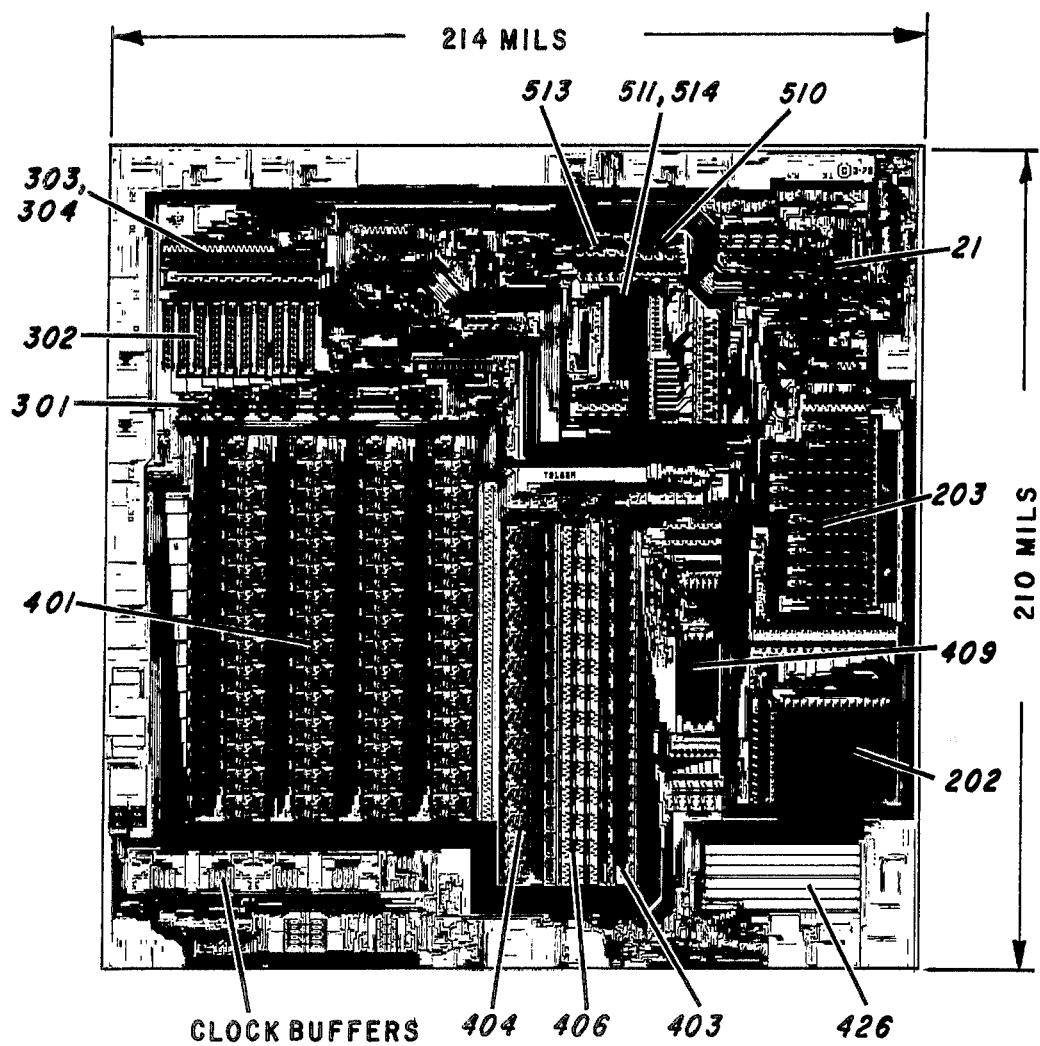
FIG. 22 is a plan view of the synthesizer chip herein described, showing the metal mask or metal pattern, enlarged about fifty times.

In FIG. 22 a greatly enlarged plan view of a semiconductor chip which contains the entire system of FIGS. 4a and 4b is illustrated. The chip is only about two hundred fifteen mils (about 0.215 inches) on a side. In the example shown, the chip is manufactured by the P-channel metal gate process using the following design rules: metal line width 0.25 mil; metal line spacing 0.25 mil; diffusion line width 0.15 mil; and diffusion line spacing 0.30 mil. Of course, as design rules are tightened with the advent of electron beam mask production or slice writing, and other techniques, it will be possible to further reduce the size of the synthesizer chip. The size of the synthesizer chip can, of course also be reduced by not taking advantage of some of the features preferably used on the synthesizer chip.

The total active area of speech synthesizer chip 10 is approximately 45,000 square mils.

It will also be appreciated by those skilled in the art, that other MOS manufacturing techniques, such as N-channel, complementary MOS (CMOS) or silicon gate processes may alternatively be used.

The various parts of the system are labeled with the same reference numerals previously used in this descripion.

CONTROLLER LOGIC DIAGRAMS

The controller used in the learning aid is preferably a microprocessor of the type described in U.S. Pat. No. 4,074,355, with modifications which are subsequently described. U.S. Pat. No. 4,074,355 is hereby incorporated herein by reference. It is to be understood, of course, that other microprocessors, as well as future microprocessors, may well find use in applications such as the speaking learning aid described herein.

The microprocessor of U.S. Pat. No. 4,074,355 is an improved version of an earlier microprocessor described in U.S. Pat. No. 3,991,305.

Figure 7B:
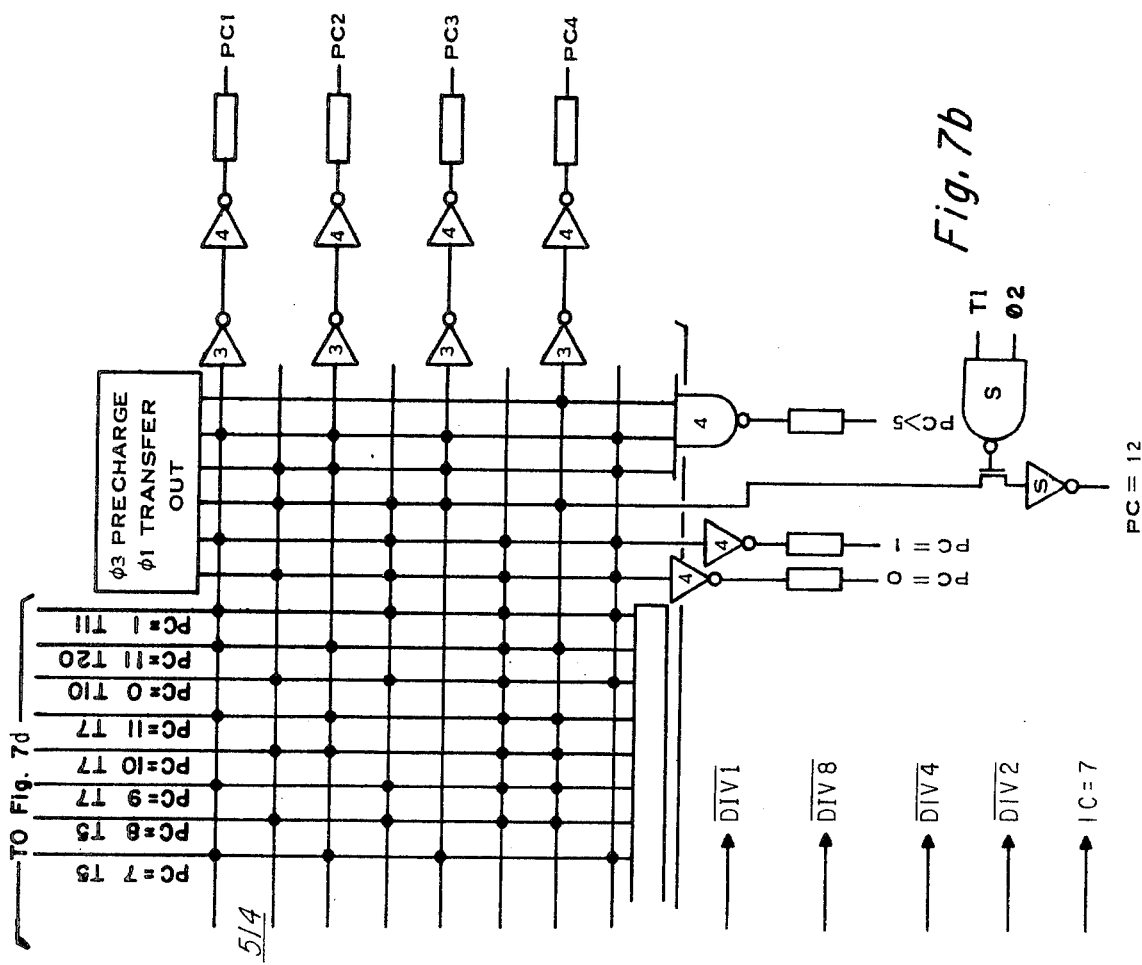
Figure 7C:
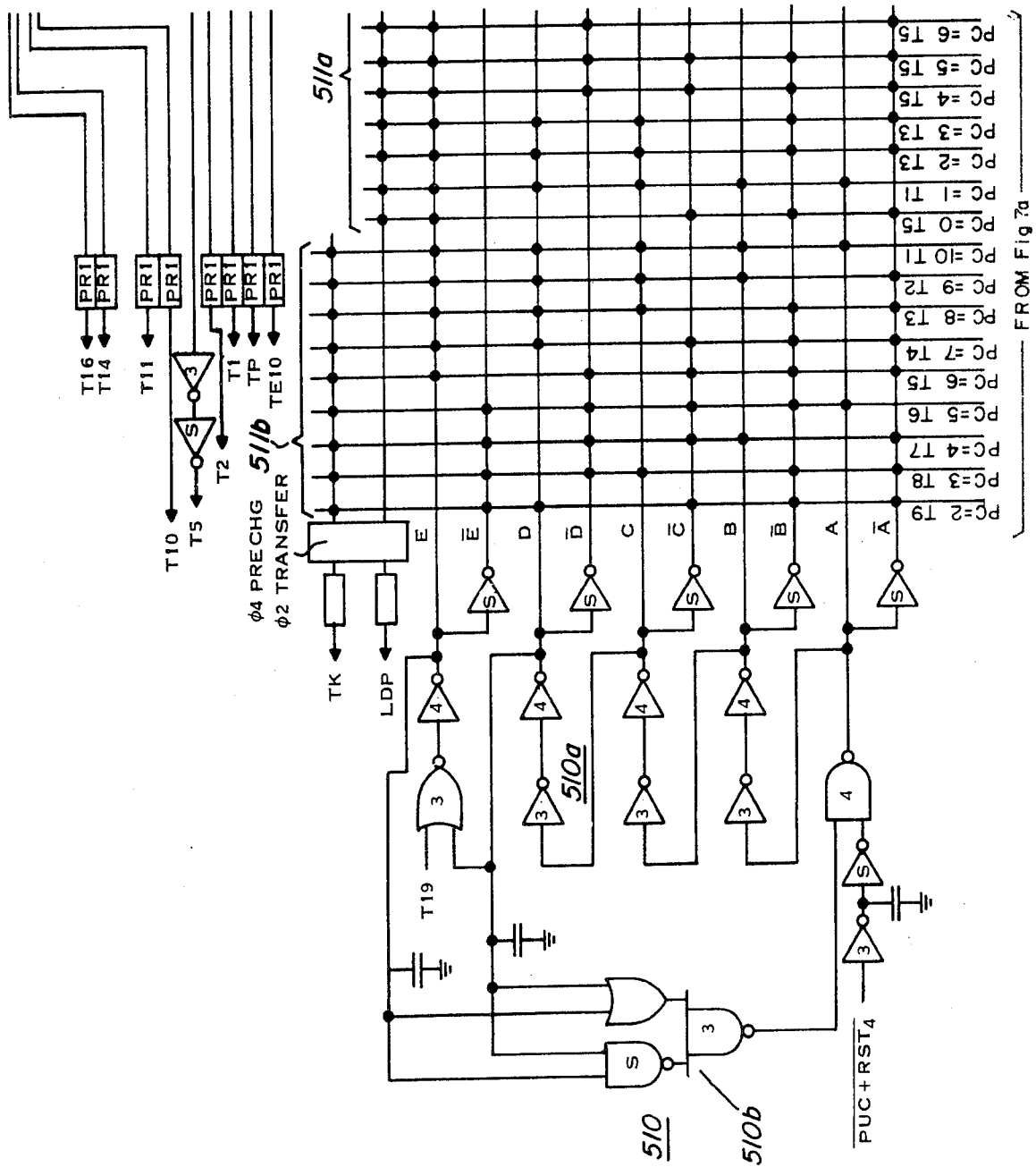
Figure 7D:
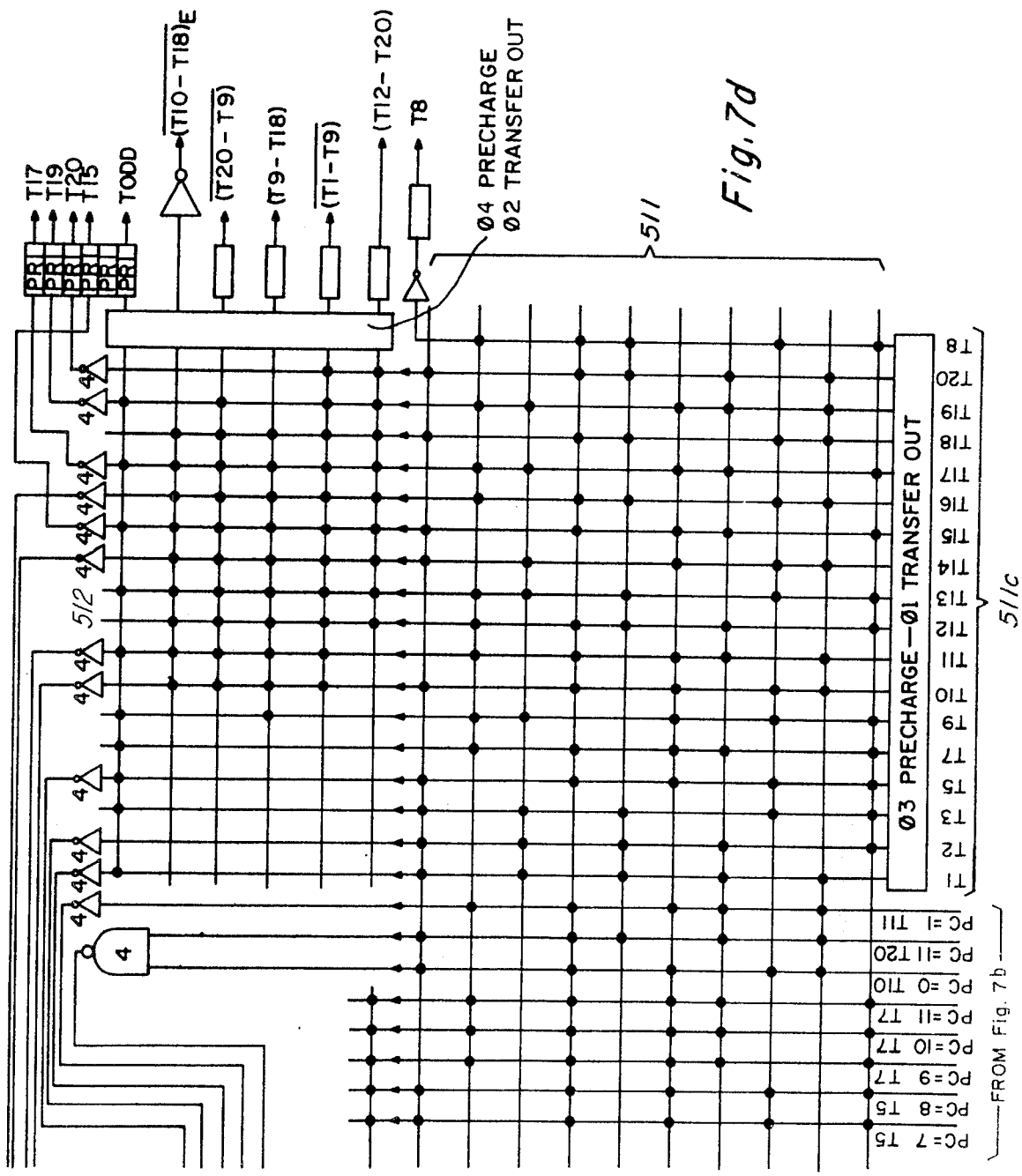
Figure 15A:
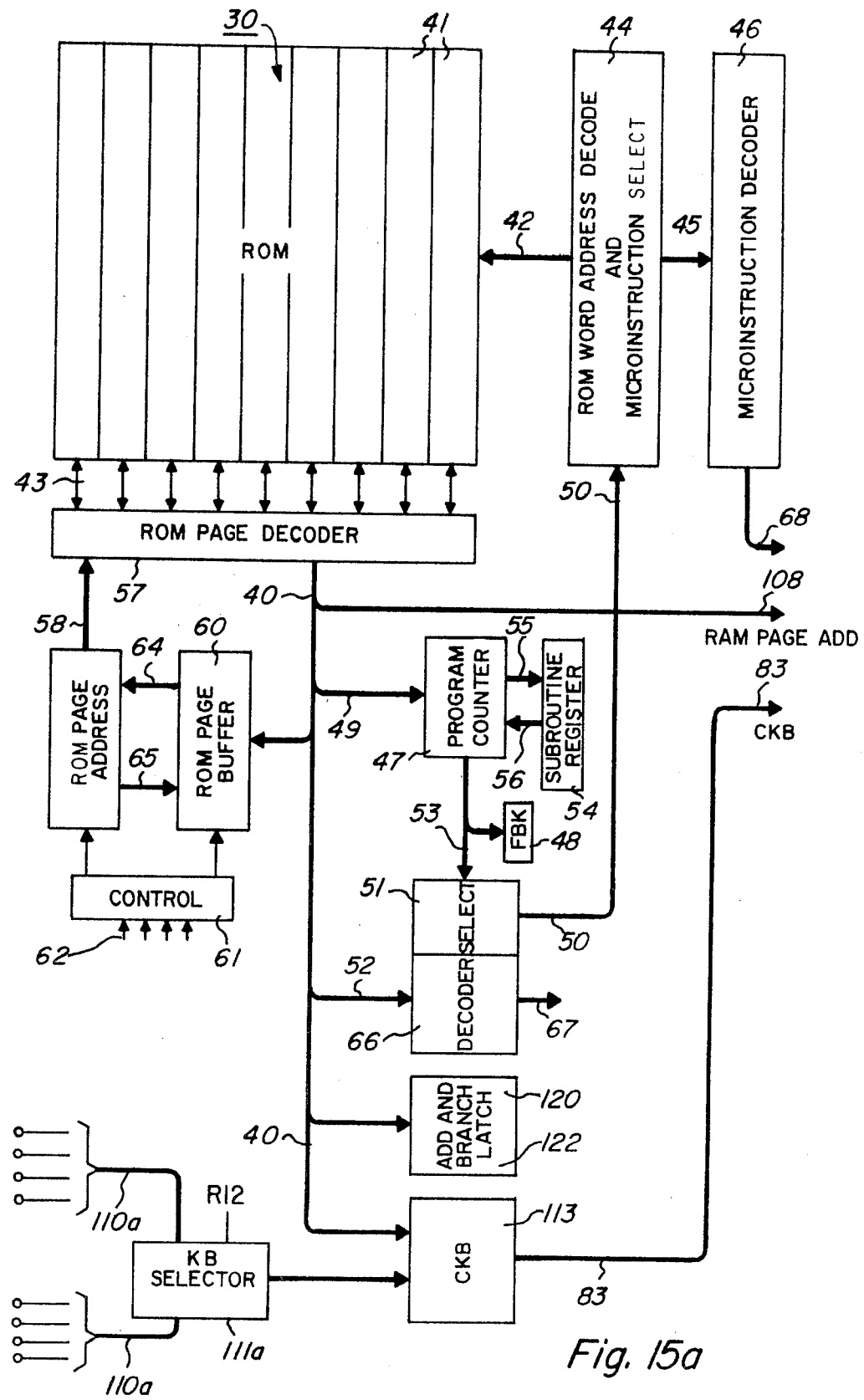
FIGS. 15a–15b form a composite block diagram of a microprocessor which may be utilized as the controller.
Figure 15B:
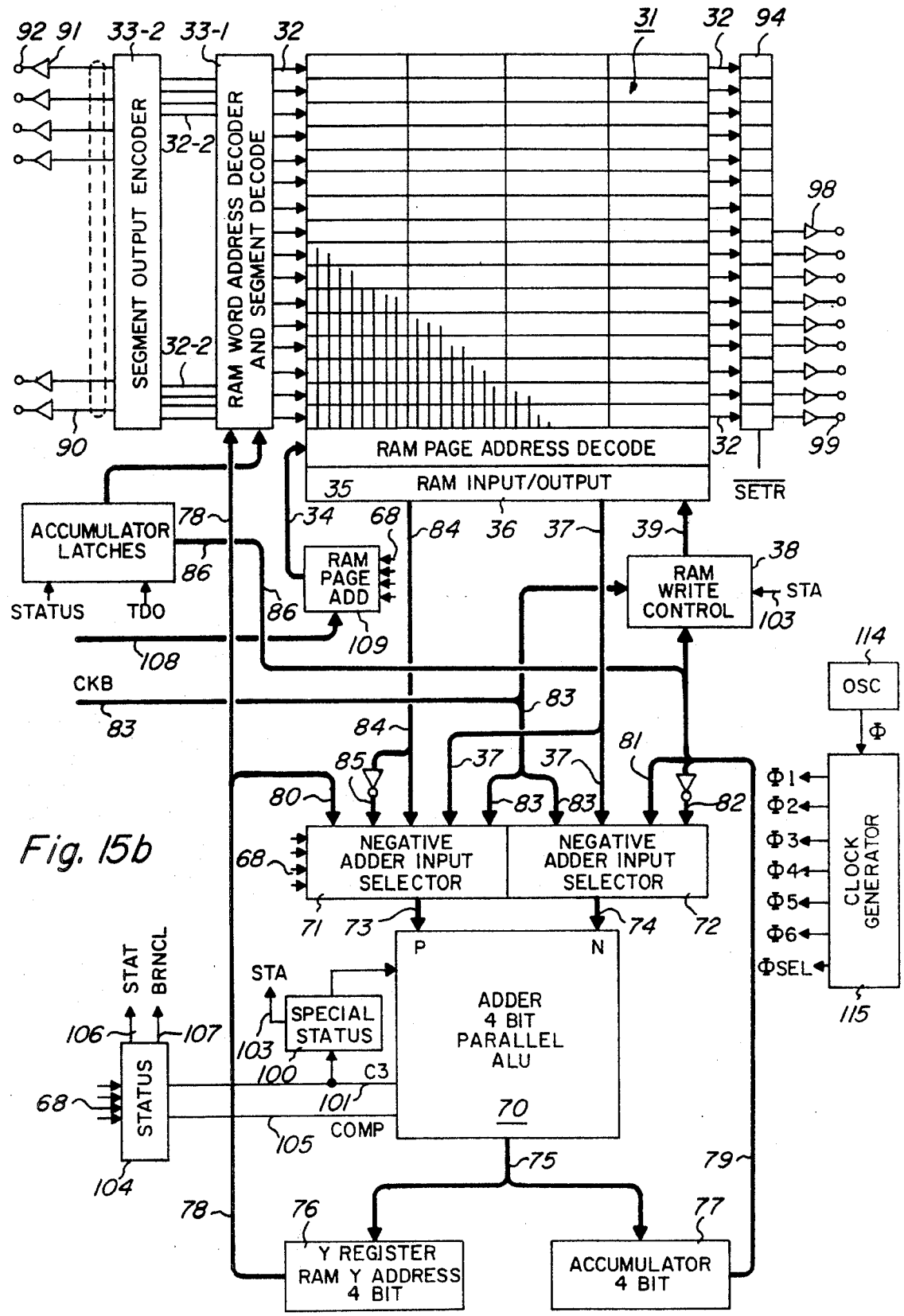

Referring now to FIGS. 15a–15b, which form a composite block diagram of the microprocessor preferably used in the learning aid, it should be appreciated that this block diagram generally corresponds with the block diagram of FIGS. 7a and 7b of U.S. Pat. No. 4,074,355; several modifications are also shown. The numbering shown in FIGS. 15a and 15b, generally agrees with that of U.S. Pat. No. 4,074,355. The modifications will now be described in detail.

Figure 16A:
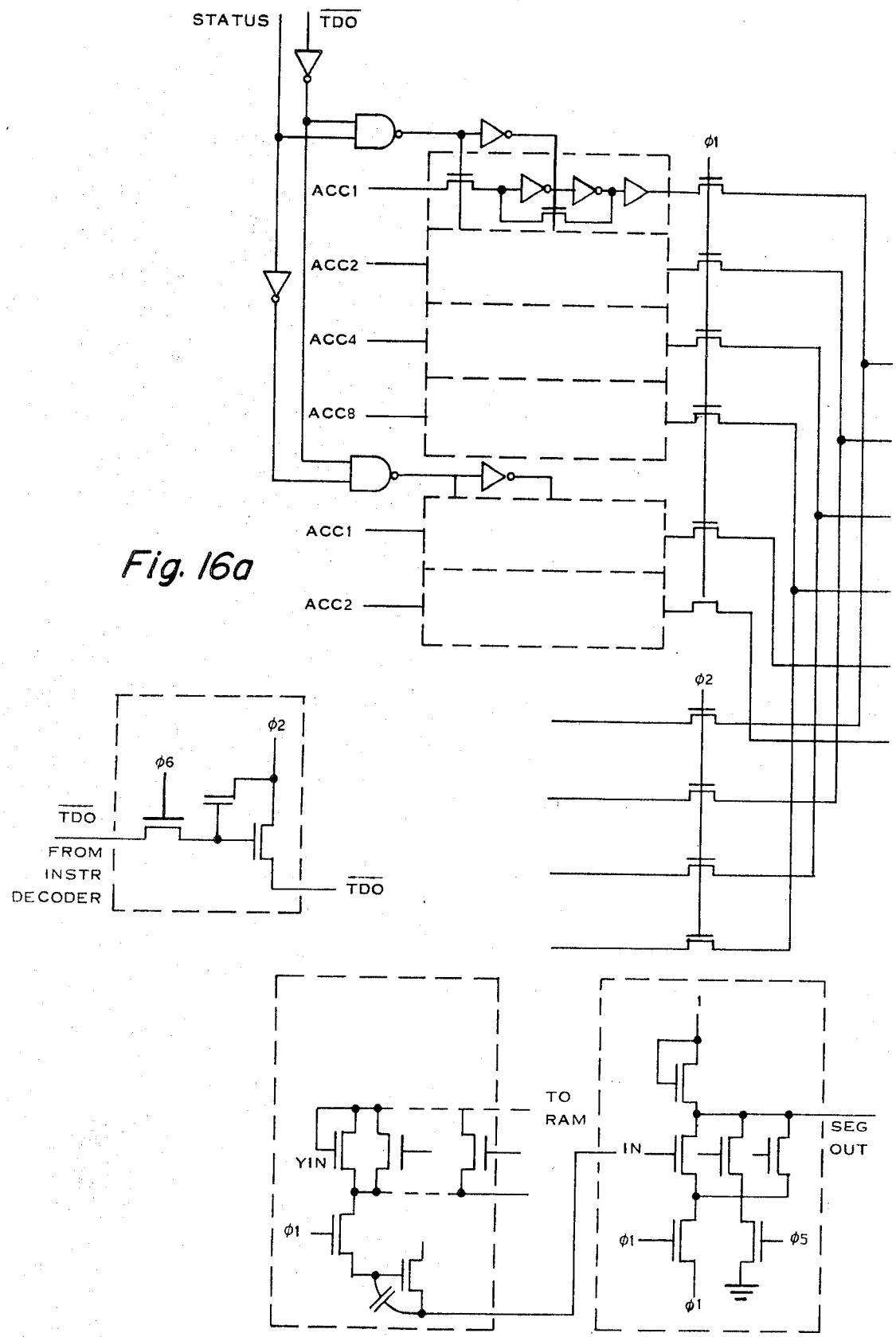
FIGS. 16a–16c form a composite logic diagram of the segment decoder of the microprocessor.
Figure 16B:
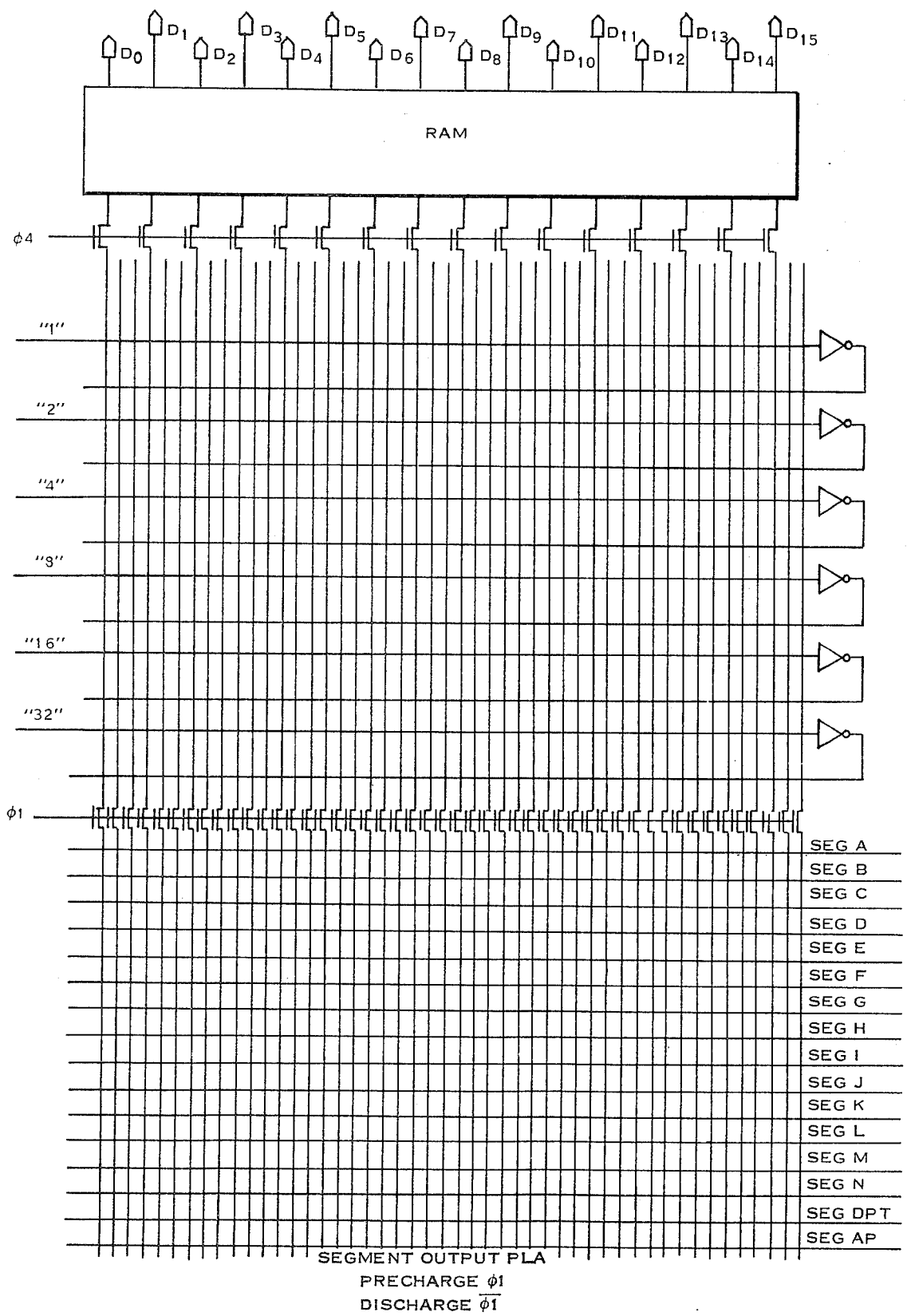
Figure 16C:
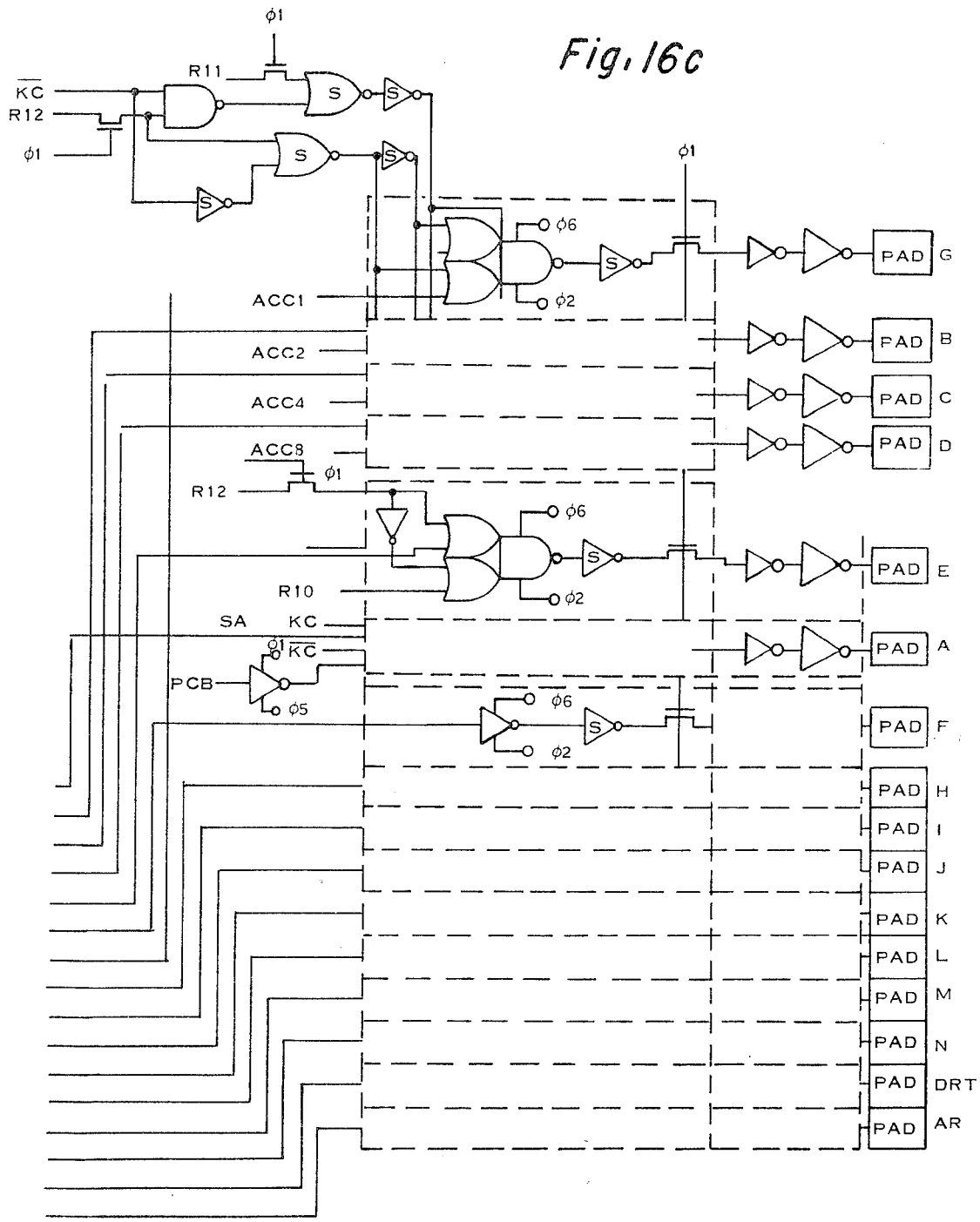

Referring now to the composite diagram formed by FIGS. 16a–16c, which replace FIG. 13 of U.S. Pat. No. 4,074,355, there can be seen the segment decoder and RAM address decoder 33-1 which decodes RAMY for addressing RAM 31 or ACC1-ACC8 for decoding segment information. Decoder 33-1 generally corresponds to decoder 33 in the aforementioned U.S. patent. The segment information is re-encoded into particular segment line information in output section 32-2 and outputted on bus 90 to segment drivers 91. Six bits of data from the processor's four bit accumulator 77 are decoded in decoder 33-1 as is now described. First, four bits on bus 86 are latched into accumulator latches 87-1 through 87-8 on a TDO (Transfer Data Out) instruction when status is a logical one. Then, two bits on bus 86 (from lines 86-1 and 86-2) are latched into accumulator latches 87-16 and 86-32, respectively, on another TDO instruction when status is a logical zero. Then the six bits in latches 87-1 through 87-32 are decoded in decoder 33-1. Segment drivers 91 may preferably be of one of three types, 91A, 91B or 91C as shown in FIGS. 16a–16c. The 91A type driver permits the data on ACC-1-ACC8 to be communicated externally via pins SEG G, SEG B, SEG C and SEG d. The 91B type driver coupled to pin SEG E permits the contents of digit register 94-10 to be communicated externally when digit register 94-12 is set. The 91C type driver coupled to pin SEG A permits the contents of the program counter to be outputted during test operations.

Figure 17:
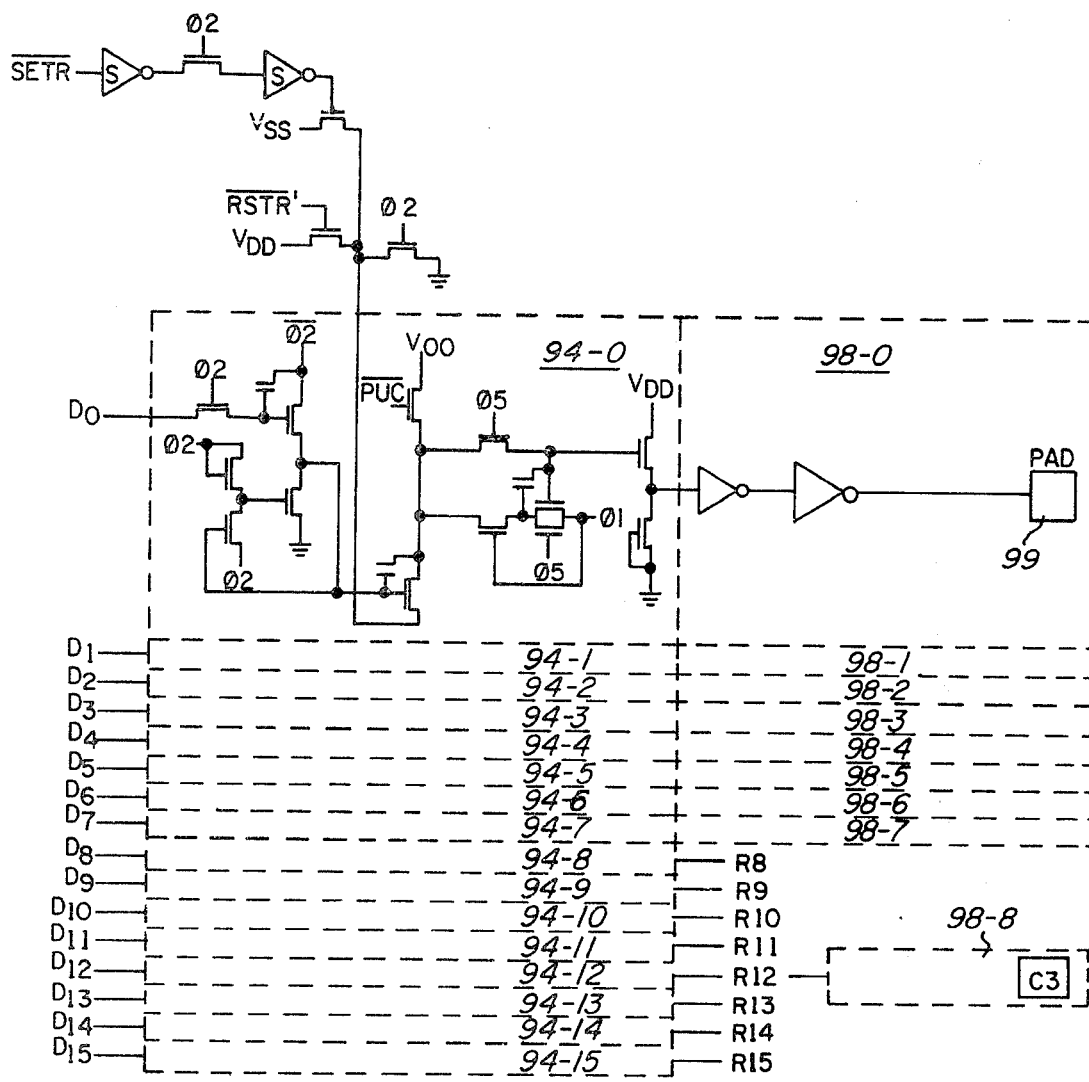
FIG. 17 depicts the digit output buffers and digit registers of the microprocessor.

The digit buffers registers and TDO latches of FIG. 14 of U.S. Pat. No. 4,074,355 are also preferably replaced with the digit buffers registers of FIG. 17 herein inasmuch as (1) the DDIG signal is no longer used and (2) the digit latches (elements 97 in U.S. Pat. No. 4,074,355) are no longer used. For simplicity's sake, only one of the digit output buffer registers 94 is shown in detail. An additional output buffer 98-8 communicates the contents of register 94-12, which is the chip select signal, to synthesizer 10.

To facilitate bi-directional communication with synthesizer 10, the microprocessor of U.S. Pat. No. 4,074,355 is preferably modified to permit bi-directional communication on pins SEG G, SEG B, SEG C and SEG D. Thus, in FIG. 18, these SEG pins are coupled to the normal K lines, 112-1 through 112-8, via an input selector 111a for inputting information when digit register 94-12 (R12) is set. Further, these pins are also coupled to ACC1-ACC8 via segment drivers 91A when digit registers 94-12 (R12) and 94-11 (R11) are set for outputting information in accumulator 77.

Figure 18:
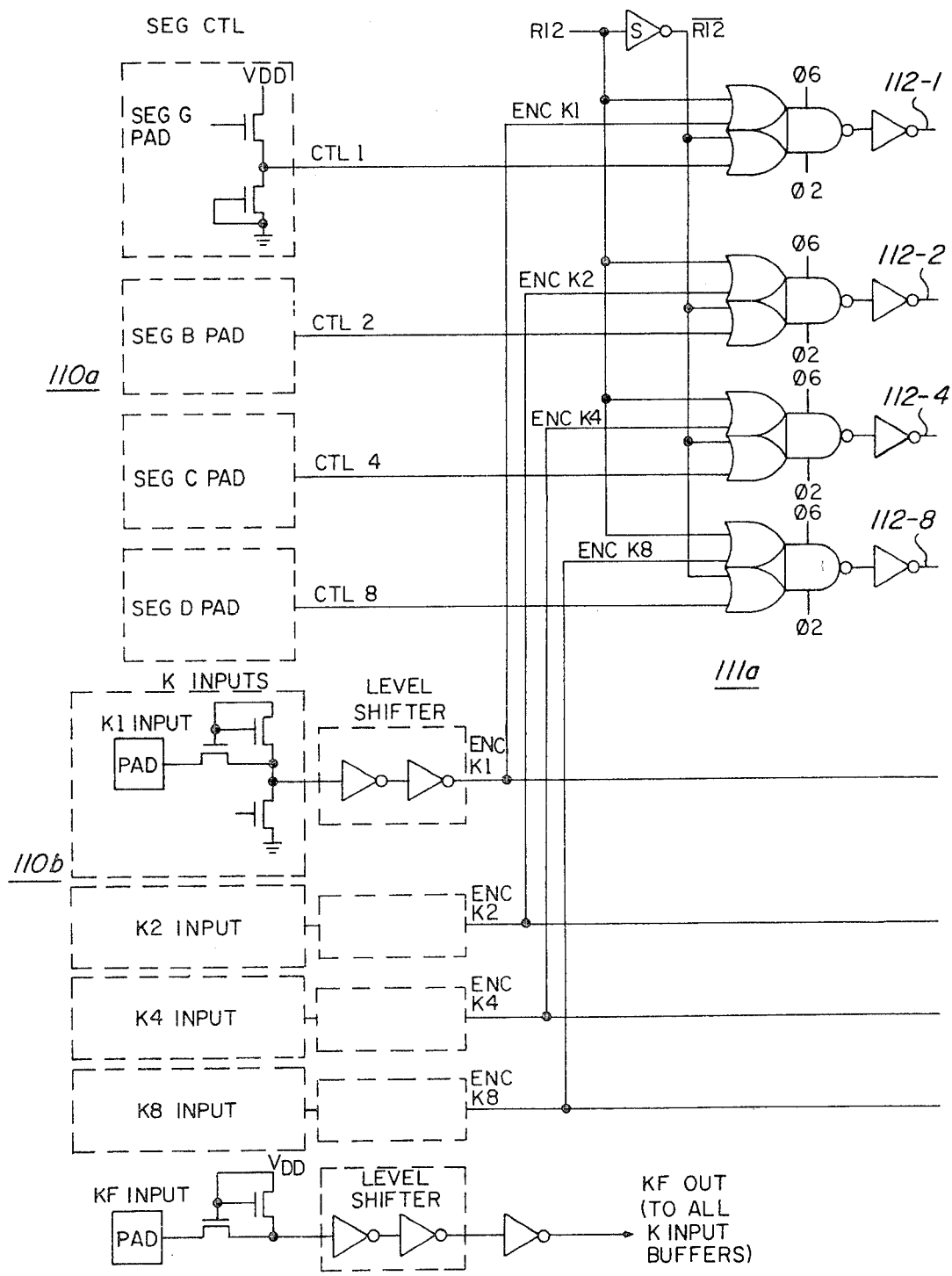
FIG. 18 depicts the KB selector circuit of the microprocessor.

Thus, when digit latch 94-12 (which communicates the chip select signal externally) is set, SEG E is coupled to R10 (digit register 94-10) for communicating the PDC signal to synthesizer 10. Also, ACC1-ACC8 is outputted on SEG G and SEG B-SEG D, during the time R12 and R11 are set. When R11 is a logical 0, i.e., is reset, segment drivers 91A are turned off and data may be read into CKB circuit 113 for receiving data from ROMs 12A and 12B via synthesizer 10, for instance. FIG. 18 replaces the keyboard circuit 111 shown in FIG. 22 of U.S. Pat. No. 4,064,554.

Preferably, pins SEG G and SEG B-SEG D are coupled to CTL-CTL8 pins of synthesizer 10, while pin SEG E is coupled to the PCD pin of synthesizer 10.

In Table VI is listed the set of instructions which may be stored in the main Read-Only-Memory 30 of FIGS. 15a–15b to provide controller 11. Referring now to Table VI, there are several columns of data which are, reading from left to right: STMT (Statement Number), PC (Program Counter), CODE, PLOC (Physical Location), TITLE, and DEST (Destination). In U.S. Pat. No. 4,074,355, it can be seen that main Read-Only-Memory 30 is addressed with a seven bit address in program counter 47 and a four bit address in a buffer 60. The address in buffer 60 is referred to as a page address in the main Read-Only-Memory. The instructions listed on Table VI, ROM Page 0, correspond to page zero in the microprocessor while the instructions listed in Table VI, ROM Page 1, are those on page one and so forth through to the instructions in Table VI, ROM Page 15, which are stored on page fifteen in the microprocessor.

The program counter 47 of the aforementioned microprocessor is comprised of a feedback shift register and therefore counts in a pseudorandom fashion, thus the addresses in the PC column of Table VI which are expressed as a hexadecimal number, exhibit such pseudorandomness. If the instruction starting at page zero were read sequentially from the starting position in the program counter (00) then the instruction would be read out in the order shown in Table VI. In the STMT column is listed a sequentially increasing decimal number associated with each source statement and its instruction and program counter address as well as those lines in which only comments appear. When an instruction requiring either a branch or call is to be performed, the address to which the program counter will jump and the page number to which the buffer will jump, if required, is reflected by the binary code comprising the instruction or instructions performing the branch or call. For sake of convenience, however, the DEST column indicates the statement number in Table VI to which the branch or call will be made. For example, the instruction at statement 107 is a branch instruction, with a branch address of 3E in hexadecimal. To facilitate finding the 3E address in the program counter, the DEST column directs the reader to statement 92 where the 3E address is located.

READ-ONLY-MEMORY LOGIC DIAGRAMS

Figure 19:
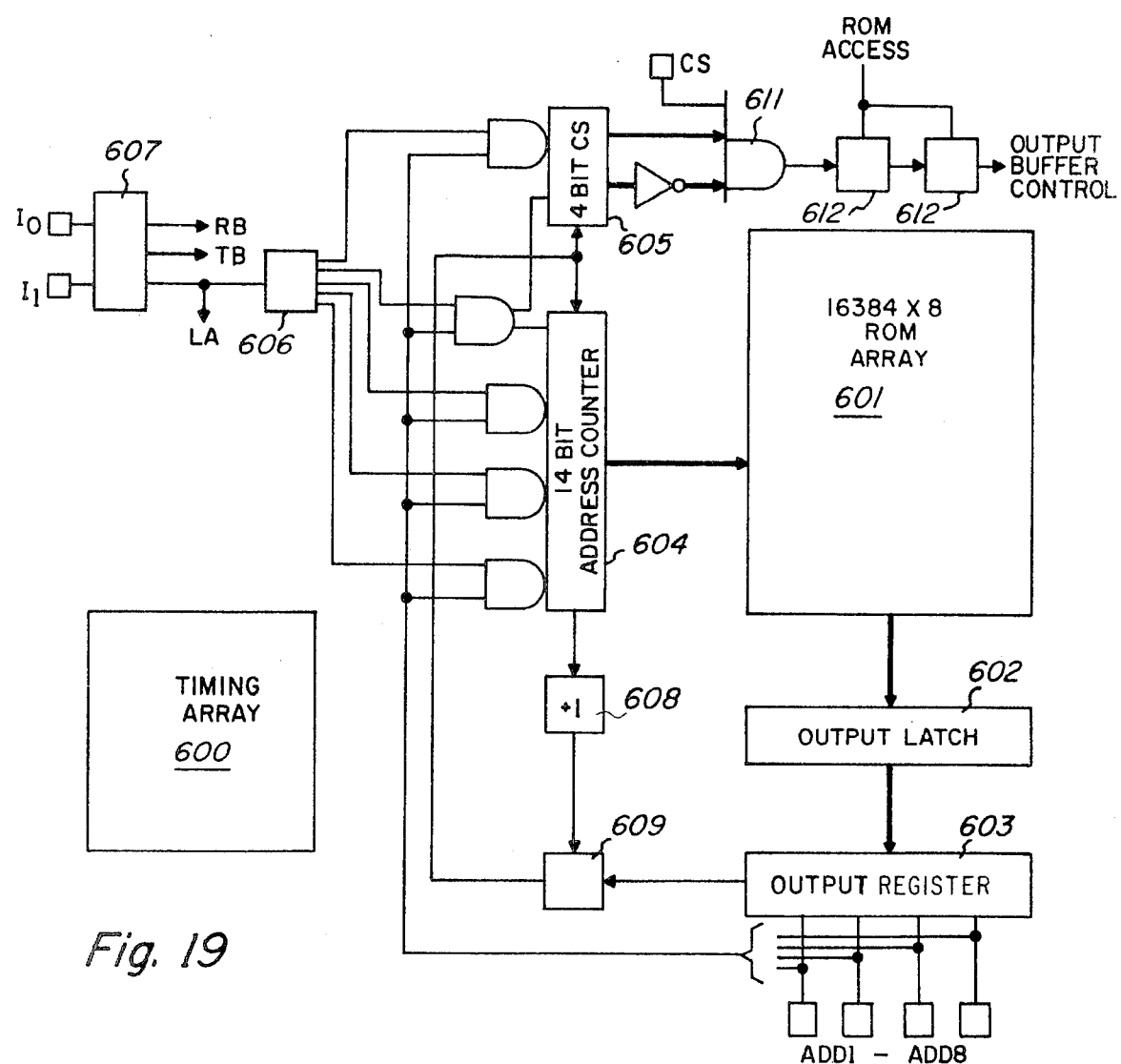
FIG. 19 is a block diagram of a ROM employed as a memory of the electronic teaching apparatus.

Any one of Read-Only-Memories 12A and 12B or 13A and 13B is shown in FIGS. 19, 20a–20f and 21a–21d. FIG. 19 is a block diagram of any one of these ROMs. FIGS. 20a–20f form a composite logic diagram of the control logic for the ROMs while FIGS. 21a–21d form a composite logic diagram of the X and Y address decoders and pictorially show the array of memory cells.

Referring now to FIG. 19, the ROM array 601 is arranged with eight output lines, one output line from each section of 16,384 bits. The eight output lines from ROM array 601 are connected via an output latch 602 to an eight bit output register 603. The output register 603 is interconnected with pins ADD1-ADD8 and arranged either to communicate the four high or low order bits from output register 603 via the four pins ADD1-ADD8 or alternatively to communicate the bit serially from output register 603 via pin ADD1. The particular alternative used may be selective according to mask programmable gates.

ROM array 601 is addressed via a 14 bit address counter 604. The address counter 604 has associated therewith a four bit chip select counter 605. Addresses in address counter 604 and chip select counter 605 are loaded four bits at a time from pins ADD1-ADD8 in response to a decoded Load Address (LA) command. The first LA command loads the four least significant bits in address counter 604 (bits $A_0$-$A_3$), and subsequent LA commands load the higher order bits, ($A_4$-$A_7$, $A_8$-$A_{11}$ and $A_{12}$-$A_{13}$). During the fourth LA cycle the $A_{12}$ and $A_{13}$ bits are loaded at the same time the CS0 and CS1 bits in chip select counter 605 are loaded. Upon the fifth LA command the two most significant bits in chip select counter 605 are loaded from ADD1 and ADD2. A counter 606 counts consecutively received LA commands for indicating where the four bits on ADD-1-ADD8 are to be inputted into counters 604 and/or 605.

Commands are sent to the ROM chip via $I_0$ and $I_1$ pins to a decoder 607 which outputs the LA command a TB (transfer bit) and an RE (read and branch) command.

Address register 604 and chip select register 605 have an add-one circuit 608 associated therewith for incrementing the address contained therein. When a carry occurs outside the fourteen bit number stored in address register 604 the carry is carried into chip select register 605 which may enable the chip select function if not previously enabled or disable the chip select function if previously enabled, for example. Alternatively, the eight bit contents of output register 603 may be loaded into address register 604 by means of selector 609 in response to an RB command. During an RB command, the first byte read out of array 601 is used as the lower order eight bits while the next successive byte is used for the higher order six bits in counter 604.

The output of chip select register 605 is applied via programmable connectors 610 to gate 611 for comparing the contents of chip select counter 605 with a preselected code entered by the programming of connectors 610. Gate 611 is also responsive to a chip select signal on the chip select pin for permitting the chip select feature to be based on either the contents of the four bit chip select register 605 and/or the state of the chip select bit on the CS pin. The output of gate 611 is applied to two delay circuits 612, the output of which controls the output buffers associated with outputting information from output register 603 to pins ADD1-ADD8. The delay imposed by delay circuits 612 effects the two byte delay in this embodiment, because the address information inputted on pins ADD1-ADD8 leads the data outputted in response thereto by the time required to access ROM array 601. The CS pin is preferably used in the embodiment of the learning aid disclosed herein.

A timing PLA 600 is used for timing the control signals outputted to ROM array 601 as well as the timing of other control signals.

Figure 20A:
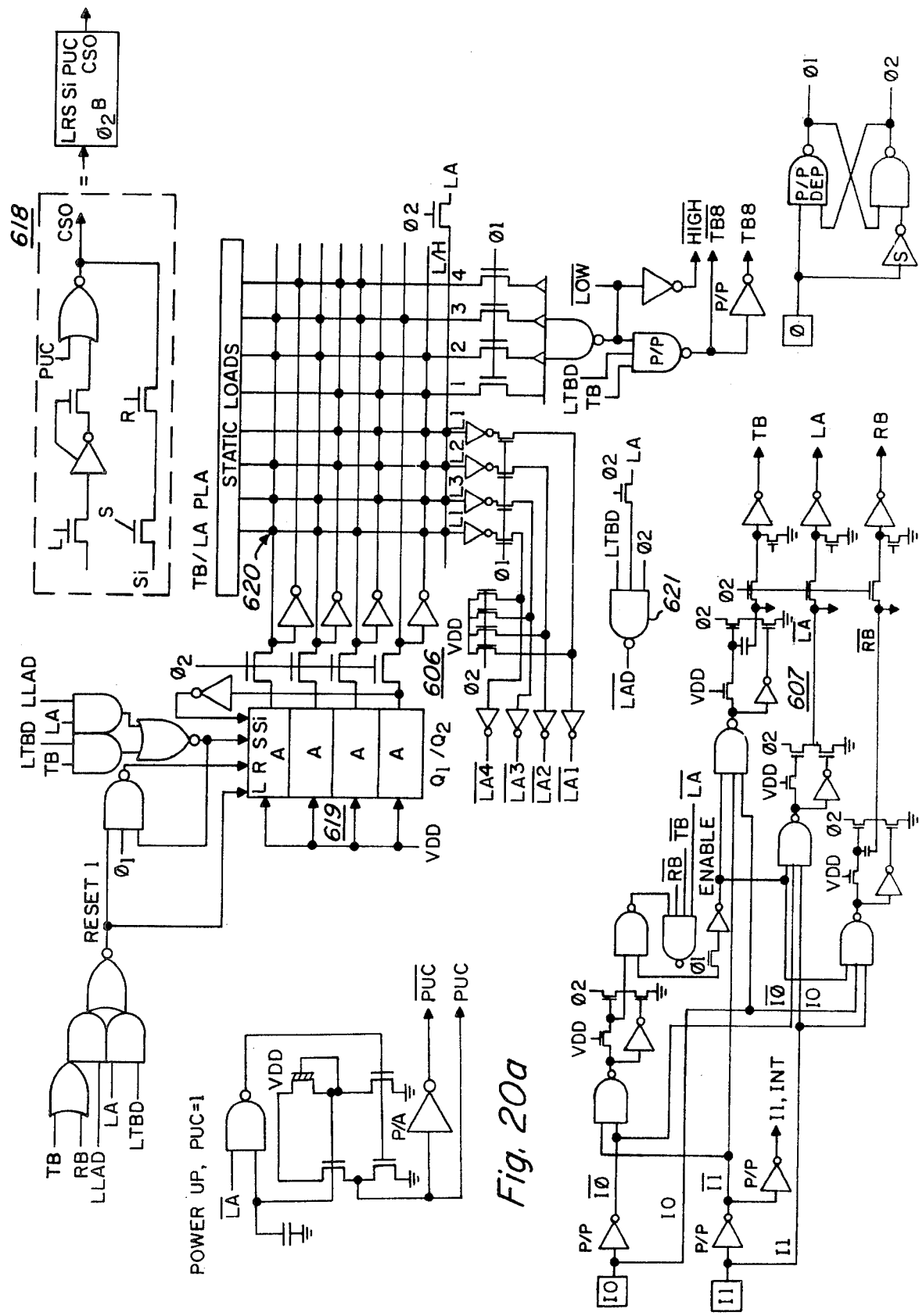
Figure 20B:
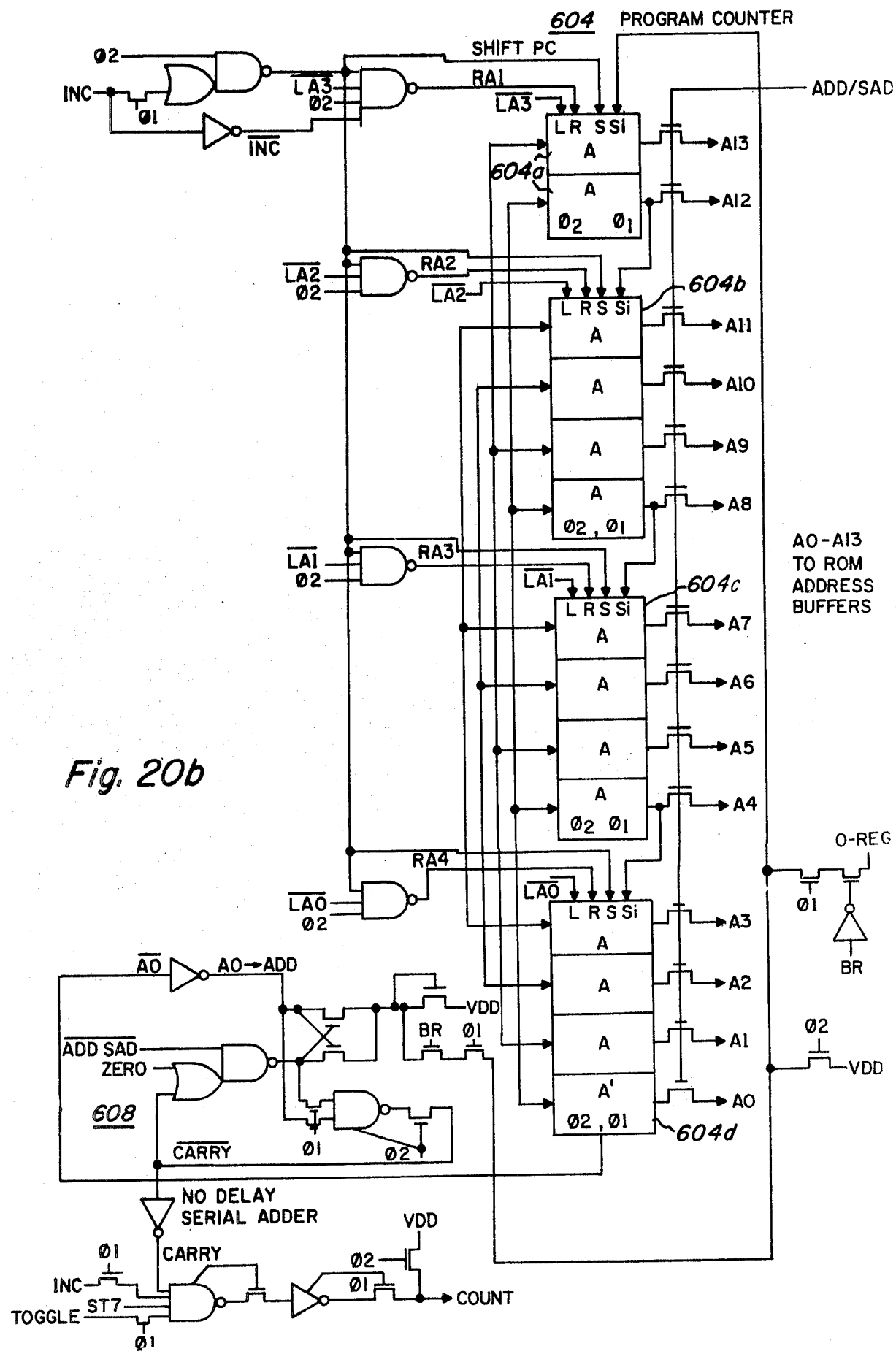
Figure 20C:
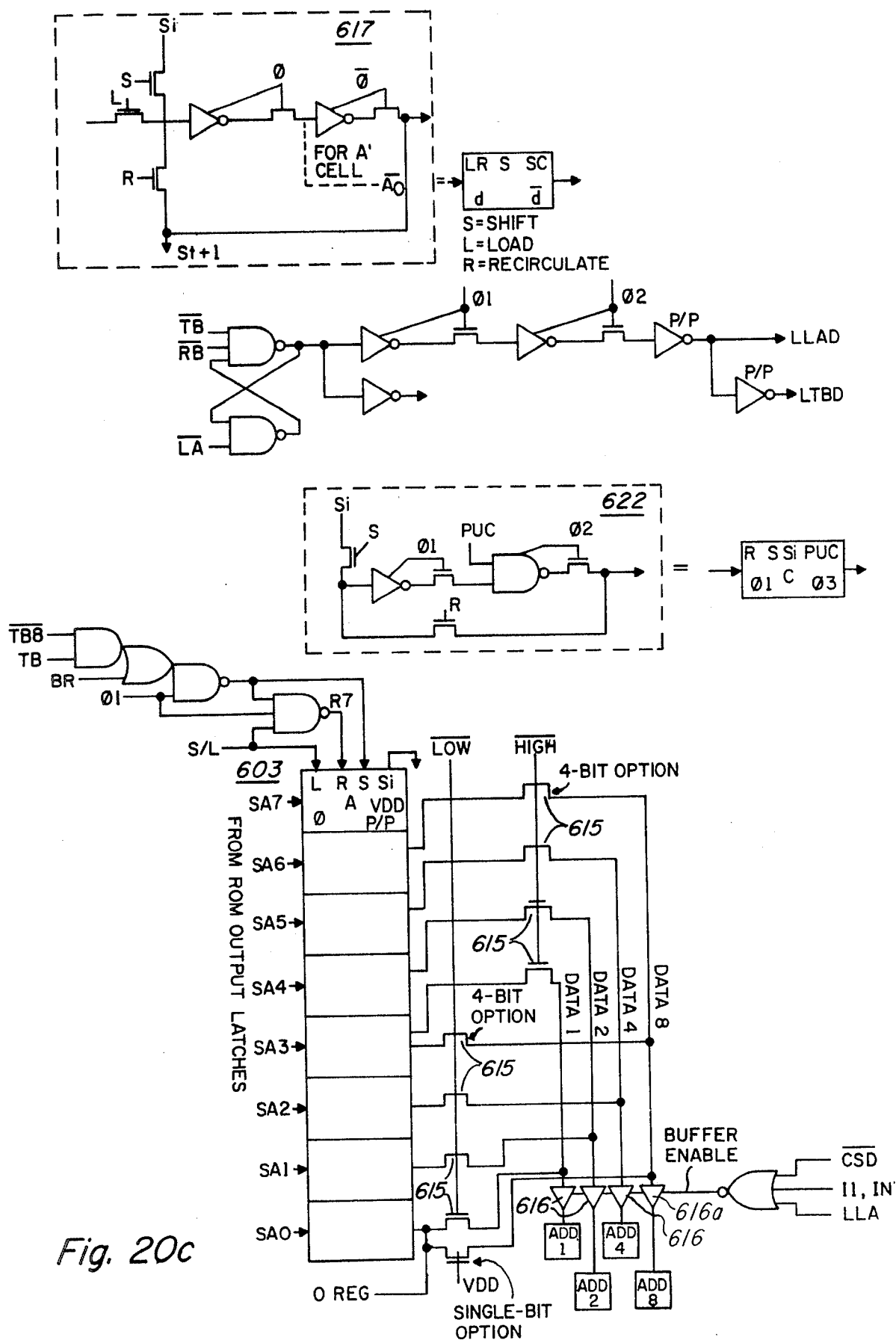
Figure 20D:
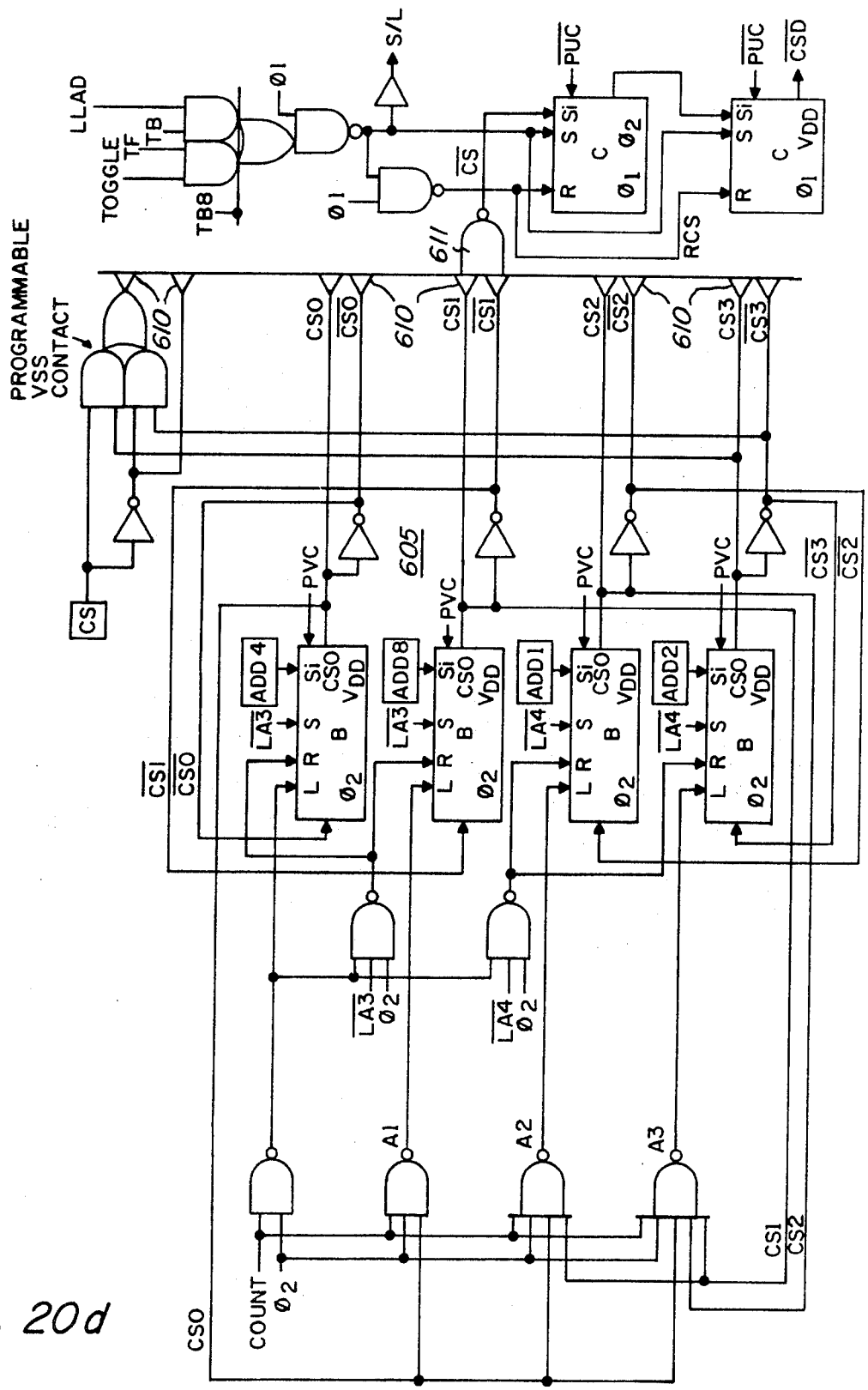
Figure 20F:
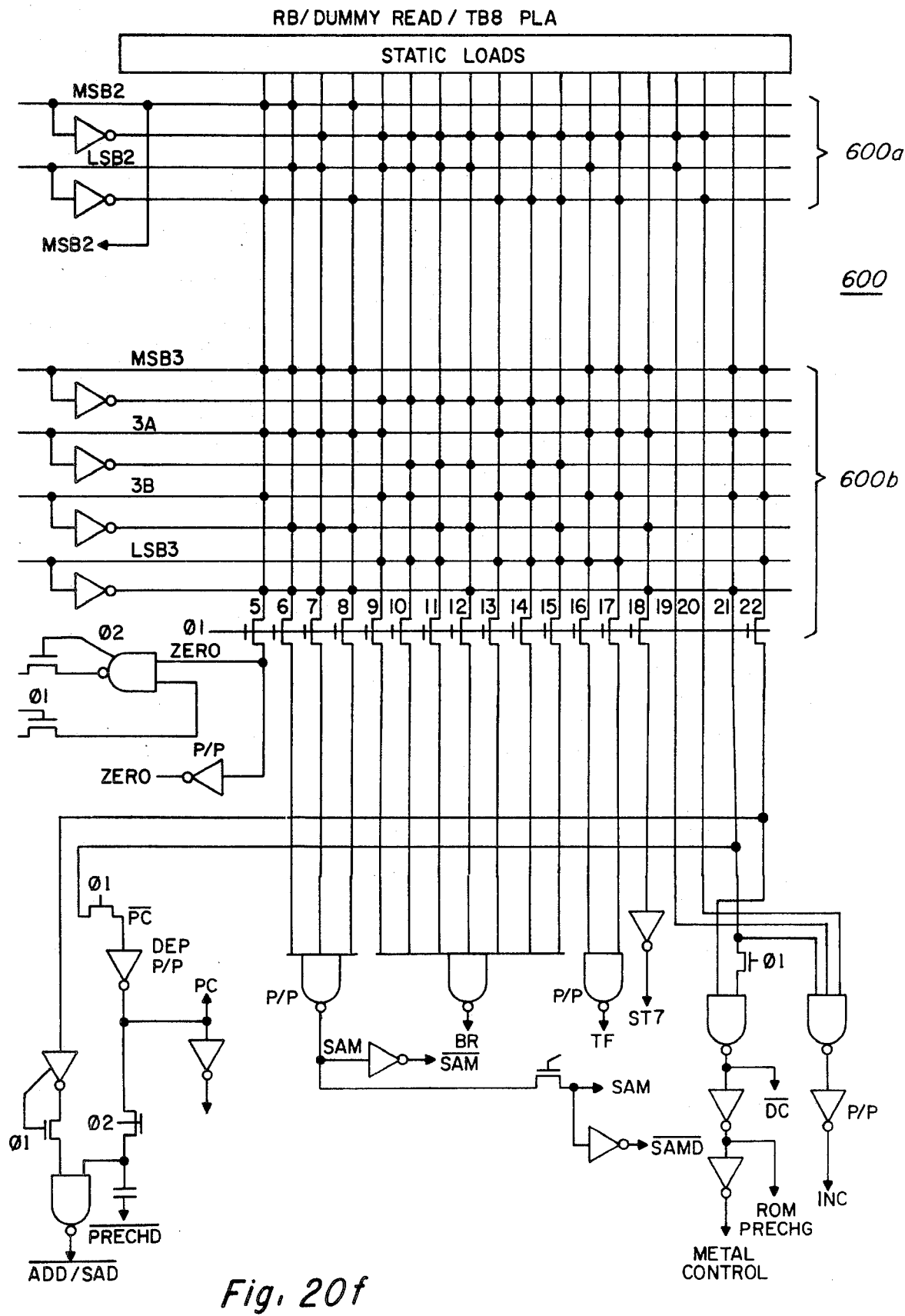
Figure 21A:
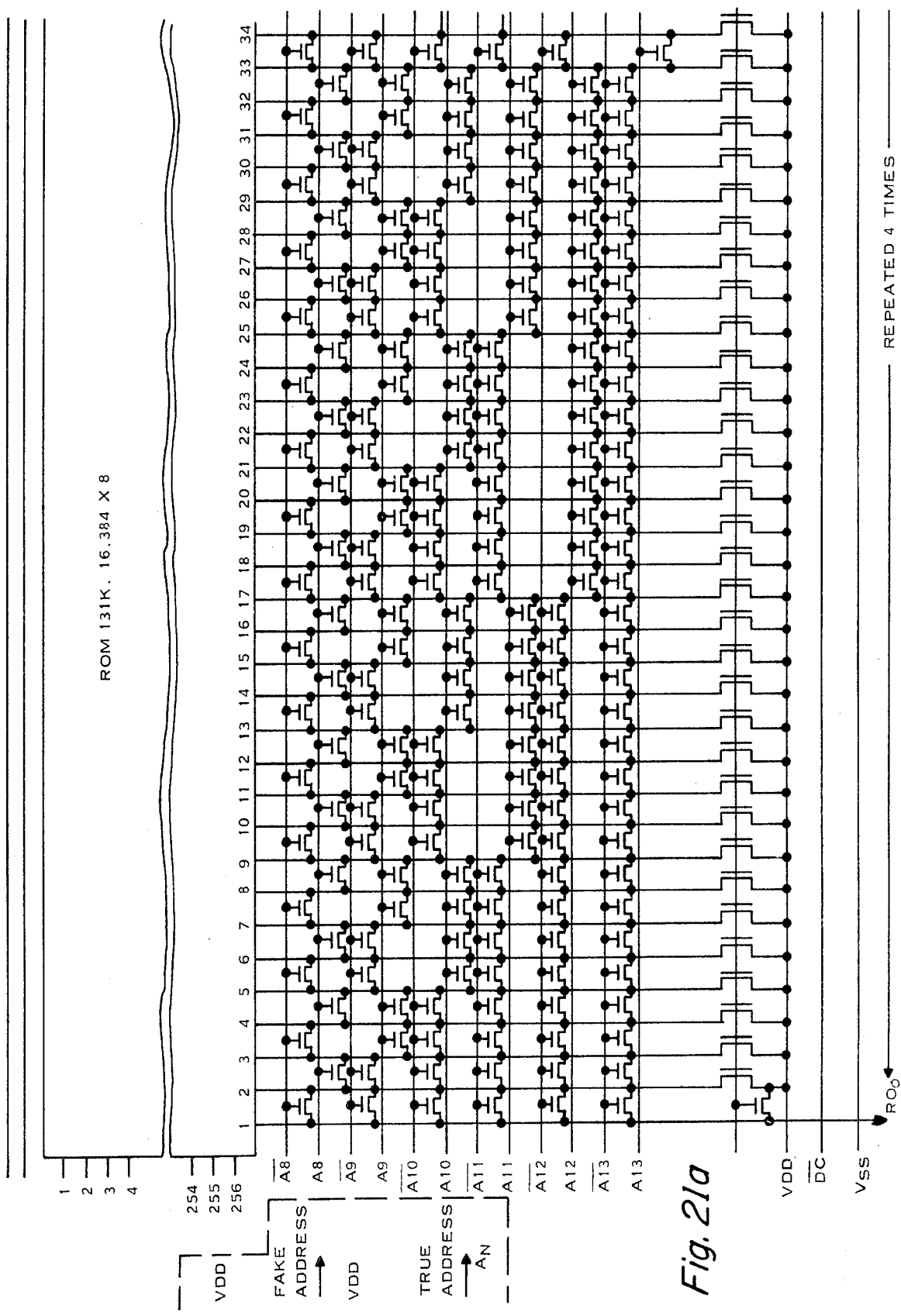
Figure 2I:
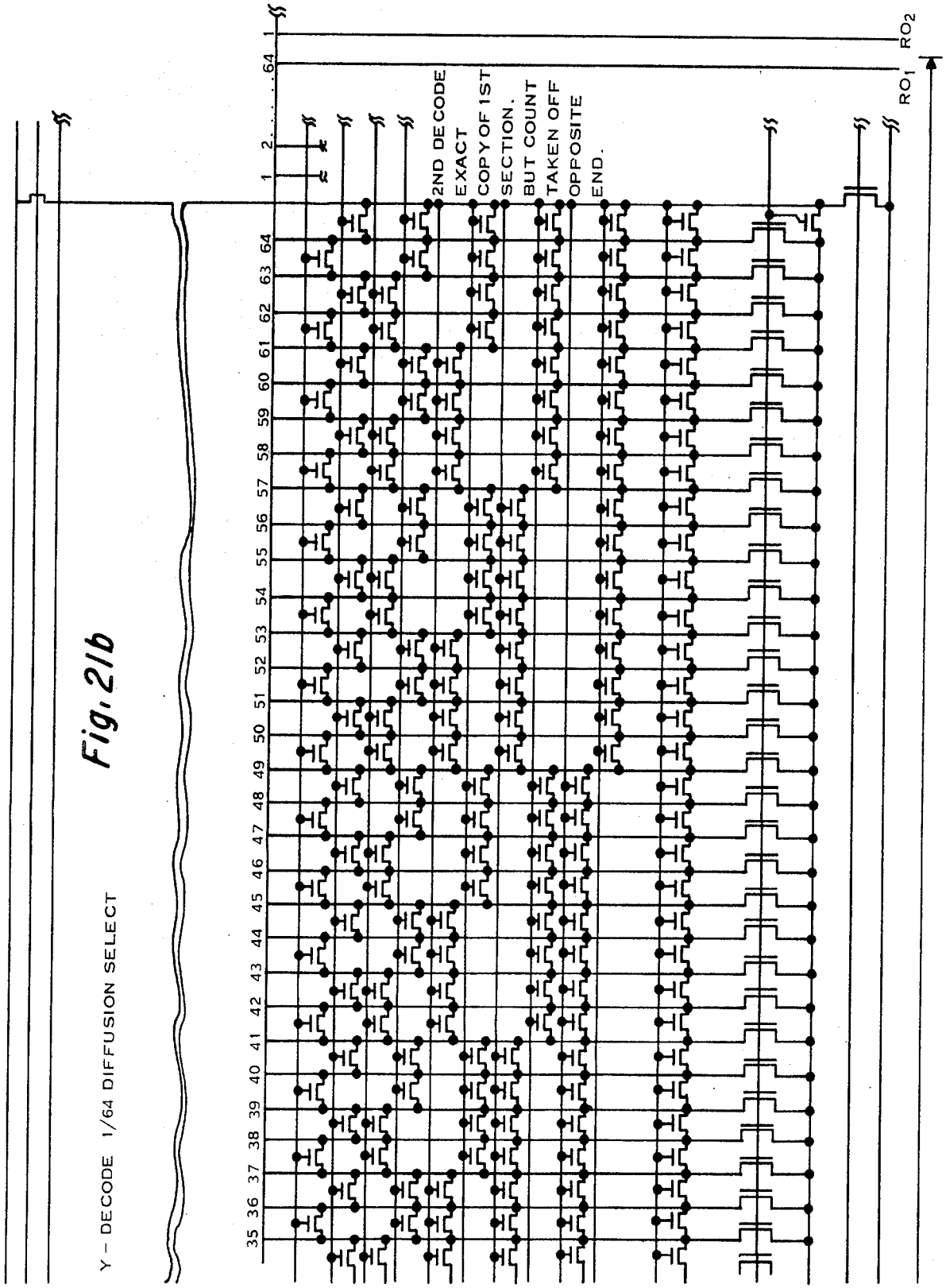
Figure 21D:
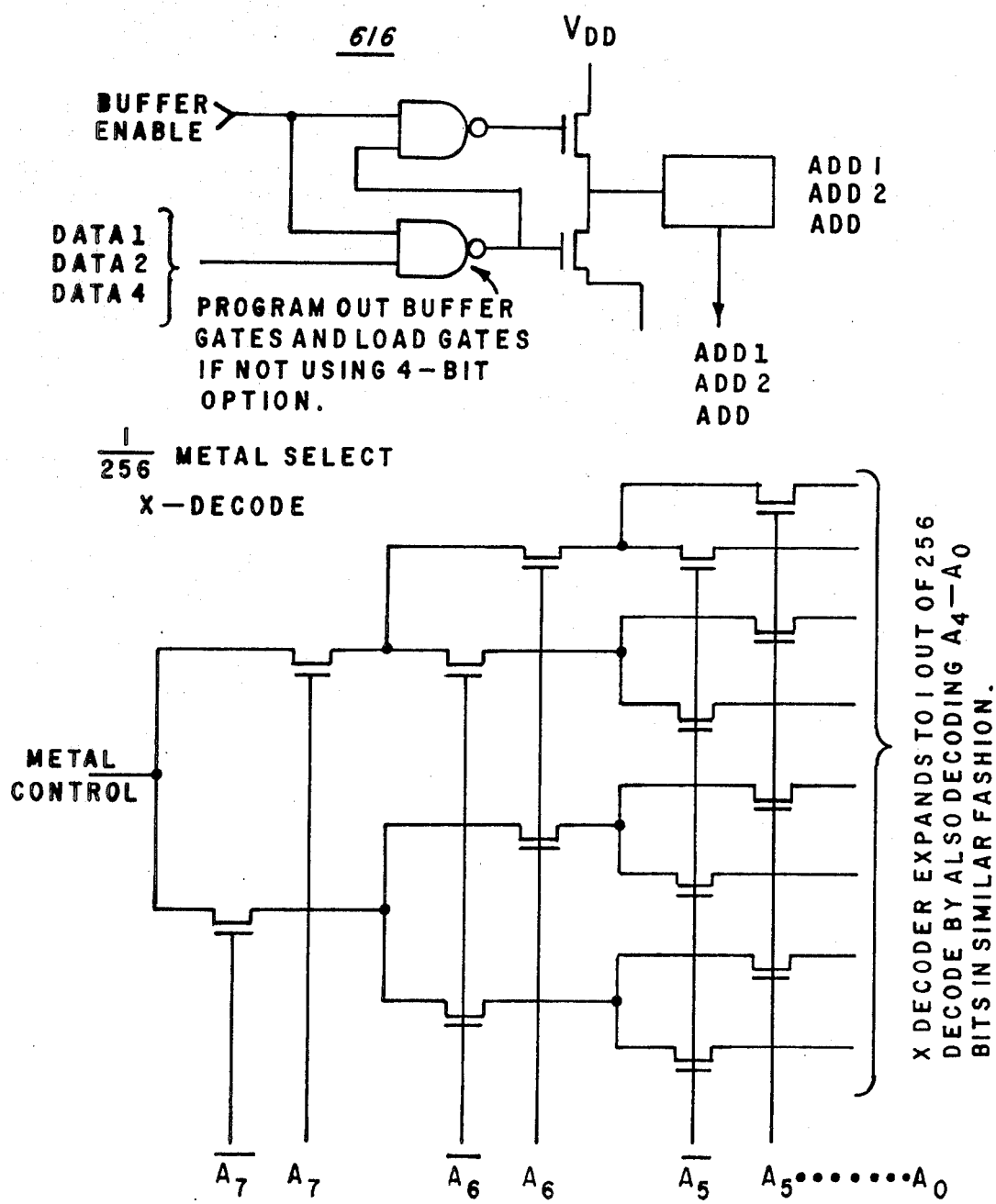

Referring now to the composite drawing formed by FIGS. 20a–20c, output register 603 is formed by eight "A" bit latches, an exemplary one of which is shown at 617. The output of register 603 is connected in parallel via a four bit path controlled on $\overline{\text{LOW}}$ or $\overline{\text{HIGH}}$ signals to output buffers 616 for ADD1-ADD4 and 616a for ADD8. Buffers 616 and 616a are shown in detail in FIGS. 21c and 21d.

Gates 615 which control the transferring of the parallel outputs from register 603 via in response to $\overline{\text{LOW}}$ and $\overline{\text{HIGH}}$ are preferably mask level programmable gates which are preferably not programmed when this chip is used with the learning aid described herein. Rather the data in register 603 is communicated serially via programmable gate 614 to buffer 616a and pin ADD8. The bits outputted to ADD1-ADD8 in response to a $\overline{\text{HIGH}}$ signal are driven from the third through sixth bits in register 603 rather that the fourth through seventh bits inasmuch as a serial shift will normally be accomplished between a $\overline{\text{LOW}}$ and $\overline{\text{HIGH}}$ signal.

Address register 604 comprises fourteen of the bit latches shown at 617. The address in address 604 on lines $A_0$-$A_{13}$ is communicated to the ROM X and Y address buffers shown in FIGS. 21c and 21d. Register 604 is divided into four sections 604a–604d, the 604d section loading four bits from ADD1-ADD8 in response to an $\overline{\text{LA0}}$ signal, the 604c section loading four bits from ADD1-ADD8 in response to an $\overline{\text{LA1}}$ signal and likewise for section 604b in response to an $\overline{\text{LA2}}$ signal. Section 604a is two bits in length and loads the ADD1 and ADD2 bits in response to an $\overline{\text{LA3}}$ signal. The chip select register 605 comprise four B type bit latches of the type shown at 618. The low order bits, CS0 and CS1 are loaded from ADD4 and ADD8 in response to an $\overline{\text{LA3}}$ signal while the high order bits CS2 and CS3 are loaded from ADD1 and ADD2 on an $\overline{\text{LA4}}$ signal. The $\overline{\text{LA0}}$-$\overline{\text{LA4}}$ signals are generated by counter 606. Counter 607 includes a four bit register 619 comprised of four A bit latches 617. The output of the four bit counter 619 is applied to a PLA 620 for decoding the LA1-LA4 signals. The $\overline{\text{LA0}}$ signal is generated by a NAND gate 621. As can be seen, the $\overline{\text{LA0}}$ signal comes up in response to an LA signal being immediately after a TB signal. The gate 621 looks for a logical one on the LA signal and a logical one on an LTBD (latched transfer bit delay) signal from latch 622. Decoder 607 decodes the $I_0$ and $I_1$ signals applied to pins $I_0$ and $I_1$ for decoding the TB, LA and RB control signals. The signals on the $I_0$ and $I_1$ pins are set out in Table X. Latch circuit 622 is responsive to LA, RB and TB for indicating whether the previously received instruction was either an LA or a TB or RB command.

In addition to counting successive LA commands, four bit counter 609 and PLA 620 are used to count successive TB commands. This is done because in this embodiment each TB command transfers one bit from register 603 on pin ADD8 to the synthesizer chip 10 and output register 603 is loaded once each eight successive TB commands. Thus, PLA 620 also generates a TB8 command for initiating a ROM array addressing sequence. The timing sequence of counter 619 and PLA 620 is set forth in Table X. Of course, the $\overline{LA1}$-$\overline{LA4}$ signal is only generated responsive to successive LA commands while the TB8 signals only generate in response to successive TB commands.

Add-one circuit 608 increments the number in program counter 604 in response to a TB command or an RB command. Since two successive bytes are used as a new address during an RB cycle, the card address and the present address incremented by one must be used to generate these two bytes. The output of add-one circuit 608 is applied via selector 609 for communicating the results of the incrementation back to the input of counter 604. Selector 609 permits the bits in output register 603 to be communicated to program counter 604 during an RB cycle as controlled by signal BR from array 600. Add-one circuit 608 is also coupled via COUNT to chip select counter 605 for incrementing the number stored therein whenever a CARRY would occur outside the fourteen bits stored in program counter 604. The output of chip select counter 605 is applied via programmable gate 610 to gate 611. The signal on the CS pin may also be applied to gate 611 or compared with the contents of CS3. Thus, gate 611 can test for either (1) the state of the CS signal, (2) a specific count in counter 605 or (3) a comparison between the state on the chip select and the state of CS3 or (4) some combination of the foregoing, as may be controlled by those knowledgeable in the art according to how programmable links 610 are programmed during chip manufacture. The output of gate 611 is applied via two bit latches of the C type, which are shown at 622. Timing array 600 controls the timing of ROM sequencing during RB and TB sequences. Array 600 includes PLA sections 600a and 600b and counters 623 and 624. Counter 623 is a two bit counter comprising two A type bit latches shown at 617. Counter 623 counts the number of times a ROM access is required to carry out a particular instruction. For instance, a TB command requires one ROM access while an RB command requires three ROM accesses. Counter 624, which comprises four "A" type bit latches of the type shown at 617, counts through the ROM timing sequence for generating various control signals used in accessing ROM array 601. The timing sequence for TB command is shown in Table VIII which depicts the states in counter 623 and 624 and the signals generated in response thereto. A similar timing sequence for an RB command is shown in Table VII. The various signals generated by PLA 600a and 600b will now be briefly described. The BR signal controls the transfer of two serial bits from the output register 603 to the program counter 604. The TF signal controls the transfer of eight bits from the sense amp output latch 602 (FIGS. 19 and 21c) to output register 603 on lines SA0-SA7. INC controls the serial incrementing of the program counter, two bits for each INC signal generated. PC is the precharge signal for the ROM array and normally exists for approximately ten microseconds. The DC signal discharges the ROM 601 array and preferably lasts for approximately ten microseconds for each DC signal. This particular ROM array uses approximately seventy microseconds to discharge and thus seven DC signals are preferably generated during each addressing sequence. SAM gates the data outputted from the ROM into the sense amp output latch 602 while SAD sets the address lines by gating the address from the program counter into the ROM address buffers 625 (FIGS. 21c).

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

TABLE I

The synthesizer 10 includes interpolation logics to accomplish a nearly linear interpolation of all twelve speech parameters at eight points within each frame, that is, once each 2.5 msec. The parameters are interpolated one at a time as selected by the parameter counter. The interpolation logics calculate a new value of a parameter from its present value (i.e. the value currently stored in the K-stack, pitch register or E-10 loop) and the target value stored in encoded form in RAM 203 (and decoded by ROM 202). The value computed by each interpolation is listed below. Where $P_i$ is the present value of the parameter,
$P_{i+1}$ is the new parameter value
$P_t$ is the target value
$N_i$ is an integer determined by the interpolation counter The values of $N_i$ for specific interpolation counts and the values $\dfrac{P_i - P_o}{P_t - P_o}$ ($P_o$ is initial parameter value) are as follows:

| INTERPOLATION COUNT | $N_i$ | $\dfrac{P_i - P_o}{P_t - P_o}$ |
|---|---|---|
| 1 | 8 | 0.125 |
| 2 | 8 | 0.234 |
| 3 | 8 | 0.330 |
| 4 | 4 | 0.498 |
| 5 | 4 | 0.623 |
| 6 | 2 | 0.717 |
| 7 | 2 | 0.859 |
| 0 | 1 | 1.000 |

TABLE II

"HELP"

```
0000
0100000000100110111010010111
0111000001
1101100100100001010010000110011110001010100101010
1101100111
1110100111
1101101000011010111110101010100101111000100101101
1101101000011100101110001100110110000100100011101
1101100110100010101001101001111110110101010000110
1011100101
1010100100011010011110001100111101110010001010110
1001100001
1001011101
⎫
⎬ HEL
⎭
```

TABLE II-continued

"HELP"

1000011011
0010011100001010010111011001111001010111001011011

TABLE II-continued

"HELP"

```
    0000
 5  0000
    0000
    0111000000101000101110111000
    0111000000100010101110110110
    0101000001
    0011000000100110011110100110
10  0010000001001000101101110101
    0000
    1111
        │ │ │ │ │ │ │ │ │ │
        K₁ K₂ K₃ K₄ K₅ K₆ K₇ K₈ K₉ K₁₀
15      REPEAT
      PITCH
    ENERGY
```

TABLE III

DECODED PARAMETERS

| CODE | E | P | K1 | K2 | K3 | K4 | K5 | K6 | K7 | K8 | K9 | K10 |
|------|-----|-----|-----|-----|-----|-----|-----|-----|-----|-----|-----|-----|
| 00 | 000 | 000 | 20B | 288 | 269 | 2DE | 2C2 | 33F | 302 | 333 | 307 | 342 |
| 01 | 001 | 029 | 20E | 29B | 283 | 304 | 2E5 | 368 | 326 | 390 | 349 | 37B |
| 02 | 002 | 02B | 211 | 2B1 | 2A3 | 32F | 30B | 393 | 34C | 3F6 | 392 | 3B7 |
| 03 | 003 | 02D | 216 | 2C8 | 2C9 | 35D | 336 | 3BF | 374 | 05C | 3ED | 3F6 |
| 04 | 004 | 02F | 21B | 2E2 | 2F4 | 38E | 364 | 3EC | 39F | 0BB | 030 | 035 |
| 05 | 006 | 031 | 222 | 2FE | 326 | 3C2 | 395 | 01A | 3CB | 10D | 07E | 073 |
| 06 | 008 | 033 | 22B | 31D | 35E | 3F7 | 3C8 | 047 | 3F8 | 150 | 0C6 | 0AD |
| 07 | 00B | 035 | 235 | 33D | 39A | 02C | 3FD | 073 | 024 | 183 | 105 | 0E3 |
| 08 | 010 | 037 | 242 | 35F | 3D9 | 061 | 031 | 09E | 051 | | | |
| 09 | 017 | 03A | 251 | 384 | 019 | 093 | 065 | 0C6 | 07C | | | |
| 0A | 021 | 03C | 264 | 3A9 | 059 | 0C2 | 096 | 0EB | 0A5 | | | |
| 0B | 02F | 03F | 27B | 3CF | 095 | 0EE | 0C4 | 10E | 0CC | | | |
| 0C | 03F | 042 | 296 | 3F6 | 0CE | 116 | 0EF | 12D | 0F0 | | | |
| 0D | 055 | 046 | 2B5 | 01D | 101 | 139 | 116 | 14A | 112 | | | |
| 0E | 072 | 049 | 2D9 | 044 | 12E | 158 | 139 | 163 | 130 | | | |
| 0F | 000 | 04C | 303 | 06A | 155 | 173 | 158 | 179 | 14C | | | |
| 10 | | 04F | 331 | 08F | | | | | | | | |
| 11 | | 053 | 364 | 0B2 | | | | | | | | |
| 12 | | 057 | 39A | 0D4 | | | | | | | | |
| 13 | | 05A | 3D3 | 0F3 | | | | | | | | |
| 14 | | 05E | 00D | 110 | | | | | | | | |
| 15 | | 063 | 046 | 12B | | | | | | | | |
| 16 | | 067 | 07E | 144 | | | | | | | | |
| 17 | | 06B | 0B3 | 15A | | | | | | | | |
| 18 | | 070 | 0E4 | 16E | | | | | | | | |
| 19 | | 076 | 110 | 180 | | | | | | | | |
| 1A | | 07B | 137 | 190 | | | | | | | | |
| 1B | | 081 | 159 | 19E | | | | | | | | |
| 1C | | 086 | 176 | 1AB | | | | | | | | |
| 1D | | 08C | 18F | 1B6 | | | | | | | | |
| 1E | | 093 | 1A4 | 1C0 | | | | | | | | |
| 1F | | 099 | 1B5 | 1FA | | | | | | | | |

TABLE IV

DATA OUTPUTTED FROM K-STACK 302 TO RECODING LOGIC 301 BY TIME PERIODS

| K-STACK OUTPUT | | TIME PERIODS | | | | | | | | | |
|------|------|------|------|------|------|------|------|------|------|------|------|
| BIT | LINE | T8 | T9 | T10 | T11 | T12 | T13 | T14 | T15 | T16 | T17 |
| LSB | 32-1 | K₂ | K₁ | A | K₉ | K₈ | K₇ | K₆ | K₅ | K₄ | K₃ |
| | 32-2 | K₂ | K₁ | A | K₉ | K₈ | K₇ | K₆ | K₅ | K₄ | K₃ |
| | 32-3 | K₂ | K₁ | A | K₉ | K₈ | K₇ | K₆ | K₅ | K₄ | K₃ |
| | 32-4 | K₂ | K₁ | A | K₉ | K₈ | K₇ | K₆ | K₅ | K₄ | K₃ |
| | 32-5 | K₃ | K₂ | K₁ | A | K₉ | K₈ | K₇ | K₆ | K₅ | K₄ |
| | 32-6 | K₃ | K₂ | K₁ | A | K₉ | K₈ | K₇ | K₆ | K₅ | K₄ |
| | 32-7 | K₄ | K₃ | K₂ | K₁ | A | K₉ | K₈ | K₇ | K₆ | K₅ |
| | 32-8 | K₄ | K₃ | K₂ | K₁ | A | K₉ | K₈ | K₇ | K₆ | K₅ |
| | 32-9 | K₅ | K₄ | K₃ | K₂ | K₁ | A | K₉ | K₈ | K₇ | K₆ |
| MSB | 32-10 | K₅ | K₄ | K₃ | K₂ | K₁ | A | K₉ | K₈ | K₇ | K₆ |
| BIT | LINE | T18 | T19 | T20 | T21 | T22 | T23 | T24 | T25 | T26 | T27 |
| LSB | 32-1 | K₂ | K₁ | K₁₀ | K₉ | K₈ | K₇ | K₆ | K₅ | K₄ | K₃ |
| | 32-2 | K₂ | K₁ | K₁₀ | K₉ | K₈ | K₇ | K₆ | K₅ | K₄ | K₃ |
| | 32-3 | K₂ | K₁ | K₁₀ | K₉ | K₈ | K₇ | K₆ | K₅ | K₄ | K₃ |

TABLE IV-continued

DATA OUTPUTTED FROM K-STACK 302 TO RECODING LOGIC 301 BY TIME PERIODS

| K-STACK OUTPUT | | | | | TIME PERIODS | | | | | |
|---|---|---|---|---|---|---|---|---|---|---|
| | 32-4 | $K_2$ | $K_1$ | $K_{10}$ | $K_9$ | $K_8$ | $K_7$ | $K_6$ | $K_5$ | $K_4$ | $K_3$ |
| | 32-5 | $K_3$ | $K_2$ | $K_1$ | $K_{10}$ | $K_9$ | $K_8$ | $K_7$ | $K_6$ | $K_5$ | $K_4$ |
| | 32-6 | $K_3$ | $K_2$ | $K_1$ | $K_{10}$ | $K_9$ | $K_8$ | $K_7$ | $K_6$ | $K_5$ | $K_4$ |
| | 32-7 | $K_4$ | $K_3$ | $K_2$ | $K_1$ | $K_{10}$ | $K_9$ | $K_8$ | $K_7$ | $K_6$ | $K_5$ |
| | 32-8 | $K_4$ | $K_3$ | $K_2$ | $K_1$ | $K_{10}$ | $K_9$ | $K_8$ | $K_7$ | $K_6$ | $K_5$ |
| | 32-9 | $K_5$ | $K_4$ | $K_3$ | $K_2$ | $K_1$ | $K_{10}$ | $K_9$ | $K_8$ | $K_7$ | $K_6$ |
| MSB | 32-10 | $K_5$ | $K_4$ | $K_3$ | $K_2$ | $K_1$ | $K_{10}$ | $K_9$ | $K_8$ | $K_7$ | $K_6$ |

TABLE V

| | CHIRP ROM CONTENTS | |
|---|---|---|
| ADDRESS | CHIRP FUNCTION VALUE | STORED VALUE (COMPLEMENTED) |
| 00 | 00 | FF |
| 01 | 2B | D4 |
| 02 | D4 | 2B |
| 03 | 33 | CC |
| 04 | B3 | 4C |
| 05 | 12 | ED |
| 06 | 25 | DA |
| 07 | 14 | EB |
| 08 | 02 | FD |
| 09 | E2 | 1D |
| 10 | C6 | 39 |
| 11 | 03 | FC |
| 12 | 60 | 9F |
| 13 | 5B | A4 |
| 14 | 05 | FA |
| 15 | 0F | E0 |
| 16 | 26 | D9 |
| 17 | FC | 03 |
| 18 | A6 | 59 |
| 19 | A5 | 5A |
| 20 | D6 | 29 |
| 21 | DD | 22 |
| 22 | DD | 22 |
| 23 | FD | 02 |
| 24 | 25 | DA |
| 25 | 2B | D4 |
| 26 | 23 | DC |
| 27 | 22 | DD |
| 28 | 0F | F0 |
| 29 | FF | 00 |
| 30 | F8 | 07 |
| 31 | EF | 10 |
| 32 | ED | 12 |
| 33 | EF | 10 |
| 34 | F7 | 08 |
| 35 | F7 | 08 |
| 36 | FA | 05 |
| 37 | 01 | FE |
| 38 | 04 | FB |
| 39 | 03 | FC |
| 40 | 01 | FE |

TABLE VI

```
              ASSEMBLER FOR   1100  CHIP VERS 00.04         09/16/80 (80.260) 13:15:00
                                                                            PAGE 0001
ACCESS NAMES TABLE
 SOURCE ACCESS NAME:       SYS08.SPEECH.SRC.SM1100
 OBJECT ACCESS NAME:       SYS08.SPEECH.OBJ.SM1100
 LISTING ACCESS NAME:      SYS08.SPEECH.LIST.SM1100
 OPTIONS:                  D,O,R,X,S,NOW
 ROMSIZE:                  2048 STEPS
 ROM PAGE SIZE:            0064 STEPS
 MAXIMUM NUMBER OF PAGES:  32

CD1100     ASSEMBLER FOR   1100  CHIP VERS 00.04         09/16/80 (80.260) 13:15:00
                                                      CHAP  0 ROM PAGE  0 PAGE 0002
    STMT   PC   CODE PLOC                                                  <DEST >

0032 * ---------------------------------------------------------------------
0033 *
0034 *                  1100 PLA ASSIGNMENTS/DEFINITIONS
0035 *
0036 *                           INPUT              OUTPUT
0037 *
0038 *    FUNCTION              STAT/ACC                 O-LINES
0039 *                                         3   0   1   2   4   5   6   7
0040 *
0041 *    TERM                     XX         CTL8 CTL4 CTL2 CTL1 OL4 OL5 OL6 OL7
0042 *
0043 *    RESET SPEECH(SP)/ADDR 0  10          0   0   0   0   0   0   0   0
0044 *                   /ADDR 1  11          0   0   0   1   0   0   0   0
0045 *    OVERLAY LINE  4/ADDR 2  12          0   0   1   0   1   0   0   0
0046 *                   /ADDR 3  13          0   0   1   1   1   0   0   0
0047 *    OUTPUT DATA    /ADDR 4  14          0   1   0   0   0   0   0   0
0048 *                   /ADDR 5  15          0   1   0   1   0   1   0   0
0049 *    OVERLAY LINE  5/ADDR 6  16          0   1   1   0   0   1   0   0
0050 *                   /ADDR 7  17          0   1   1   1   0   0   0   0
0051 *    OVERLAY LINE  6/ADDR 8  18          1   0   0   0   1   0   1   0
0052 *                   /ADDR 9  19          1   0   0   1   0   0   0   0
0053 *    OVERLAY LINE  7/ADDR A  1A          1   0   1   0   0   0   0   1
0054 *                   /ADDR B  1B          1   0   1   1   0   0   0   0
0055 *                   /ADDR C  1C          1   1   0   0   0   0   0   0
0056 *                   /ADDR D  1D          1   1   0   1   0   0   0   0
0057 *                   /ADDR E  1E          1   1   1   0   0   0   0   0
0058 *                   /ADDR F  1F          1   1   1   1   0   0   0   0
0059 *    LOAD SPEECH ADDR        02          0   0   1   0   0   0   0   0
0060 *    READ 350                08          1   0   0   0   0   0   0   0
0061 *    START SPEAKING          0A          1   0   1   0   0   0   0   0
0062 *    TEST TALK LATCH         0E          1   1   1   0   0   0   0   0
0063 *
0064 *    TOTAL TERMS             20
0065 *
0066 *    SET   PDC                                 SET   R10
0067 *    RESET PDC                                 RESET R10
0068 *
0069 *    SET POWER UP  LATCH                       SET   R9
0070 *    SET POWER OFF LATCH                       RESET R9
0071 *
0072 *    WHEN READING THE 350 ROM VIA THE O LINE INTERFACE IT IS
0073 *    NECESSARY TO INSURE THE OVERLAY INTERFACE(O-R LINE)
0074 *    CODE COMBINATION DOES NOT MATCH THE OVERLAY CODE IN PLACE OR
0075 *    K LINE WILL RESPOND WITH A TRUE BIT.
0076 *
```

```
0077 *         OVERLAY CODE ASSIGNMENTS (R5-07-06-05-04)
0078 *
0079 *   >00  RESERVED FOR THE NO OVERLAY CASE
0080 *   >1F  RESERVED FOR THE DIAGNOSTIC TEST OL
0081 *   >01  RESIDENT OL
0082 *         .
0083 *         .
0084 *   >0A  RESIDENT OL
0085 *   >0B  DROPIN   OL
0086 *   >0C  DROPIN   OL
0087 *   >0D  DROPIN   OL
0088 *   >0F  DROPIN   OL
0089 *   >10  DROPIN   OL
0090 *         .
0091 *         .
0092 *   >1E  DROPIN   OL
0093 *
0094 *              SUBROUTINES IN SUPPORT OF THIS PRODUCT
0095 *
0096 *       NAME                   FUNCTION
0097 *
0098 *
0099 *       LOADADDR    TO LOAD AN ADDRESS INTO THE 350 ROM
0100 *                   AND EITHER SPEAK OR READ THE DATUM POINTED TO.
0101 *
0102 *       READX       READ A BYTE OF DATA INTO THE DATUM REGISTER
0103 *                   DATUM IS STORED IN BIT REVERSE ORDER BY NIBBLES
0104 *
0105 *       SPEAK       TO SPEAK THE WORD POINTED TO BY LOADADDR CALL
0106 *                   NORMALLY DONE AUTOMATICALLY BY LOADADDR
0107 *                   WILL WAIT UNTIL THE SPEECH COMPLETES TALKING
0108 *
0109 *       BUMPTIME    TO INCREMENT THE TIMER
0110 *
0111 *------------------------------------------------------------------
0112 *
0113 *         ----------------------------------------
0114 *         !                                      !
0115 *         !       DEFINITIONS/ABBREVIATIONS      !
0116 *         !                                      !
0117 *         ----------------------------------------
0118 *       OL                   OVERLAY
0119 *       MSD                  MOST SIGNIFICANT DIGIT
0120 *       LSD                  LEAST SIGNIFICANT DIGIT
0121 *
0122 *       MODE FLAG  BIT 0  ON  = BASIC  OFF= LEARN
0123 *                  BIT 1  ON  = RASBERRY TONE ISSUED
0124 *                  BIT 2  OFF = DROPIN OL, ON = RESIDENT OL
0125 *                  BIT 3  OFF = CHAPTER 1 RETURN
0126 *                         ON  = CHAPTER 0 RETURN
0127 *
0128 *       MODE1 FLAG BIT 0  UNUSED
0129 *                  BIT 1  READ MODE ON  = SERIAL READ
0130 *                                    OFF = LOAD & READ
0131 *                  BIT 2  ZZ
0132 *                  BIT 3  ZZ
0133 *                    WHERE ZZ = PHRASE MODE RETURN
0134 *                          00 = P6MODE
0135 *                          01 = P1MODE
0136 *                          10 = P4MODE
0137 *                          11 = PXMODE
0138 *
0139 *       MODE2 FLAG BIT 0 ON = LEARN MODE IN ACTIVE STATE
0140 *                  BIT 1 ON = PX ANSWER MODE RETURN
0141 *                  BIT 1 OFF = P4 WRONG MODE RETURN
0142 *                  BIT 2 ON = TT
0143 *                  BIT 3 ON = TT
0144 *                    WHERE TT = RETURN CODE
0145 *                          00 = P19RETURN
0146 *                          01 = TONE GROUP 1 RETURN
0147 *                          02 = TONE GROUP 3 RETURN
0148 *                          03 = TONE GROUP 2 RETURN
```

```
0149 ************************************************************************
0150 *        ROM MAP
0151 *        X=         Y=
0152 ************************************************************************
0153 *
0154 *  **************** EQUATES    ****************************
0155 *
0156       000A        YCORCTR   EQU       >A        LRN CORRECT COUNTER
0157       0009        YMOD4TMP  EQU       9         TEMP. MODULO4 BUFFER
0158       000D        MAXSW+1   EQU       13        MAXIMUM SWITCHES/PICTURE
0159       000C        YBASIC    EQU       >C        BASIC P6 RESPONSE
0160       0007        YSW#      EQU       >7        Y SWITCH CORRECT COUNT
0161       000C        YCOUNT    EQU       >C        TEMPORARY COUNTER USED FOR LO
0162       000F        YRTEMP    EQU       >F        TEMPORARY R LINE USED FOR LRN
0163       000F        YKTEMP    EQU       >F        TEMPORARY K LINE USED FOR LRN
0164       000C        YLEARN    EQU       >C        LEARN P1 RESPONSE
0165       0001        YLINK1    EQU       1         LINK BUFFER # 1
0166       0002        YLINK2    EQU       2         LINK BUFFER # 2
0167 *                                     ALLOWS FOR 6 OBJECT BUFFERS
0168       0008        YLNKEND   EQU       8         LINK BUFFER END CONSTANT
0169       0000        YOLMSD    EQU       0         OVERLAY MOST  SIGN. BIT ADDR.
0170       0000        OLMSD     EQU       0         OVERLAY MOST  SIGN. BIT ADDR.
0171       0000        YTHATS    EQU       0         THATS ADDRESS POINTER
0172       0001        YOLLSD    EQU       1         OVERLAY LEAST SIGN. BIT ADDR.
0173       0001        OLLSD     EQU       1         OVERLAY LEAST SIGN. BIT ADDR.
0174       0002        YOLTABD1  EQU       2         OVERLAY SAVE DIGIT 1
0175       0003        YOLTABD2  EQU       3         OVERLAY SAVE DIGIT 2
0176       0004        YOLTABD3  EQU       4         OVERLAY SAVE DIGIT 3
0177       0005        YOLTABD4  EQU       5         OVERLAY SAVE DIGIT 4
0178       000E        K14       EQU       14        CONSTANT 14
0179       000E        YROMTEMP  EQU       >E        TEMP. ROM ADDRESS Y POINTER
0180       0002        XK        EQU       2         OLD K BUFFER/K SWITCH BUFFER
0181       0000        XDIG1     EQU       0         TEMP. ROM ADDRESS X DIGIT1(LS
0182       0005        XDIG2     EQU       5         TEMP. ROM ADDRESS X DIGIT2
0183       0004        XDIG3     EQU       4         TEMP. ROM ADDRESS X DIGIT3
0184       0003        XDIG4     EQU       3         TEMP. ROM ADDRESS X DIGIT4(MS
0185       000D        YMODEFLG  EQU       >D        MODE FLAG Y VALUE
0186       0003        XMODE     EQU       3         MODE FLAG X VALUE
0187       000D        YMODE     EQU       >D        MODE FLAG Y VALUE
0188       000D        YDATDIG1  EQU       >D        INPUT DATUM DIGIT 1(LSD)
0189       000C        YDATDIG2  EQU       >C        INPUT DATUM DIGIT 2
0190       000B        YDATDIG3  EQU       >B        INPUT DATUM DIGIT 3(
0191       000A        YDATDIG4  EQU       >A        INPUT DATUM DIGIT 4(MSD)
0192       0009        YDATDIG5  EQU       >9        INPUT DATUM/ADDR DIGIT 5
0193       0008        YDATDIG6  EQU       >8        INPUT DATUM/ADDR DIGIT 6
0194       0006        YDATDIG8  EQU       >6
0195       000D        YRK       EQU       >D        R/K Y BUFFER POINTER
0196       000D        YKEYRX    EQU       >D
0197       000E        YKEYKX    EQU       >E
0198       000E        YKLINE    EQU       >E        K LINE Y POINTER
0199       000D        YRLINE    EQU       >D        R LINE Y POINTER
0200       0000        XROMADDR  EQU       0         350 ROM ADDRESS POINTER X VAL
0201       000D        YROMADDR  EQU       >D        350 ROM ADDRESS POINTER Y VAL
0202       000D        YLSDDATA  EQU       >D        LEAST SIGN. DATA DIGIT Y VALU
0203       0006        YMSDDATA  EQU       >6        MOST  SIGN. DATA DIGIT Y VALU
0204       0003        XMODEFLG  EQU       3         MODE FLAG X VALUE
0205       0005        XMODE1    EQU       5         MODE1 FLAG X VALUE
0206       000D        YMODE1    EQU       >D        MODE1 FLAG Y VALUE
0207       000B        YMODE2    EQU       >B        MODE2 FLAG Y VALUE
0208       0007        XMODE2    EQU       >7        MODE2 FLAG X VALUE
0209       000E        YMODULO   EQU       >E        MODULO BUFFER (USUALLY 0,2,4,
0210       0007        XTIME     EQU       7         TIMER    X VALUE
0211       0003        YTIMET2   EQU       3         TIMER T2 Y VALUE
0212       0006        YTIMELSD  EQU       6         TIMER LSD Y VALUE
0213       0005        YTIMENSD  EQU       5         TIMER NSD Y VALUE
0214       0004        YTIMEMSD  EQU       4         TIMER MSD Y VALUE
0215       0003        YTIMSD+1  EQU       3         TIMER MSD -1  Y VALUE
0216       000A        PDC       EQU       10        PROGRAM DATA CLOCK R LINE
0217       0009        K1        EQU       9         DELAY CONSTANT VALUE
0218       0008        K2        EQU       8         10  SEC TIME CONSTANT
0219       000B        K3        EQU       11        110 SEC TIME CONSTANT
0220       0008        K4        EQU       08         30 SEC TIME CONSTANT
```

```
0221   000C    K5        EQU     12       120 SEC TIME CONSTANT
0222   000E    K6        EQU     14       150 SEC TIME CONSTANT
0223   0003    T2MSB     EQU     3        TIMER 2 Y LOCATION
0224   0000    YOLD      EQU     >0       Y OLD KEY VALUE FOR DIAGNOSTI
0225   0001    YNEXTKEY  EQU     >1       Y NEXT TAGET KEY VALUE      "
0226   0008    YMODBUF   EQU     8        MODULO SAVE BUFFER
0227   0009    YTIMEBUF  EQU     9        Y TIME BUFFER SAVE
0228   0007    XTIMEBUF  EQU     7        X TIME BUFFER SAVE
0229   000D    YCOUNT1   EQU     >D       Y TEMP. COUNTER1 VALUE
0230   0004    XCOUNT1   EQU     >4       X TEMP. COUNTER1 VALUE
0231   0007    XCOUNT    EQU     7        X COUNT
0232   0007    XOLACT    EQU     7        X OVERLAY ACTIVE
0233   0001    XOL#      EQU     1        X OVERLAY IN PLACE
0234   0006    XKNEW     EQU     6        X K LINE NEW
0235   0007    XSW#      EQU     7        X SWITCH #
0236   0006    XRKEY     EQU     6        X R KEY LINE
0237   0006    XKEYRX    EQU     6        X R KEY LINE
0238   0002    XKEYOLD   EQU     2        X   KEY SAVE TARGET VALUE
0239   0006    XRNEW     EQU     6        X R  NEW KEY
0240   0002    XKTEMP    EQU     2        X K LINE REG.
0241   0006    XRTEMP    EQU     6        X R LINE REG.
0242   0002    XKBUFP    EQU     2        X K LINE REG.
0243   0006    XRBUF     EQU     6        X R LINE REG.
0244   0007    XCORCTR   EQU     7        X CORRECT COUNTER
0245   0007    XMODBUF   EQU     7        X MOD BUFFER
0246 *
0247 *              (.C377.AJO.MEMO.ROMMAPSM)
0248 *
0249 *
0250 *         SPEAK & SEEK ROM LAYOUT                   6/03/80
0251 *
0252 *    ****************************************************************
0253 *    PROMP PHRASES ARE DEFINED AS FOLLOWS
0254 *
0255 *       P0    OVERLAY UNIQUE 8 NOTE TUNE
0256 *       P1-1  FIND 'THE'
0257 *       P1-2  WHERE'S 'THE'
0258 *       P1-3  DO YOU SEE 'THE'
0259 *       P1-4  CAN YOU FIND 'THE'
0260 *       P2    THAT'S 'THE'
0261 *       P3    PRESS A PICTURE
0262 *       P4-1  (SOUND OF SILENCE)
0263 *       P4-2  LOOK AGAIN, 'THATS THE'
0264 *       P4-3  LOOK AGAIN, 'THATS THE'
0265 *       P4-4  TRY AGAIN,  'THATS THE'               REV C
0266 *       P5-1  RIGHT,                                REV C
0267 *       P5-2  YOU'RE RIGHT,                         REV C
0268 *       P5-3  YES,                                  REV C
0269 *       P5-4  GOOD,                                 REV C
0270 *       P6-1  THIS IS 'THE'
0271 *       P6-2  YOU FOUND 'THE'
0272 *       P6-3  HERE'S 'THE'
0273 *       P6-4  (SOUND OF SILENCE)
0274 *       P7    'FIXED 4 NOTE TUNE' + SPEAK 7 SEEK
0275 *       P8    'RASBERRY NOTE TUNE-USED FOR NO OVERLAY CASE'
0276 *       P9    'RASBERRY NOTE TUNE-USED FOR INVALID OVERLAY CASE'
0277 *       P10   RAM NO GO
0278 *       P11   KEY TEST
0279 *       P12   RAM GO
0280 *       P13   KEY GO
0281 *       P14   RESIDENT TEST
0282 *       P15   SUM NO GO
0283 *       P16   SUM GO
0284 *       P17   KEY NO GO
0285 *       P18   DROP IN TEST
0286 *       P19   TONE A
0287 *       P20   TONE B
0288 *       P21   TONE C
0289 *       P22   TONE D
0290 *
```

```
0291 *
0292 *PPPPPPPPPPPPPPPPPPPPPPPPPPPPPPPPPPPPPPPPPPPPPPPPPPPPP
0293 *                    PAGE 0
0294 *              SPEECH I/O SUBROUTINES
0295 *                   2ND VERSION
0296 *                MUST REMAIN ON PAGE 0
0297 *                 AS THEY USE PAGE 16
0298 *
0299 *              READ SUBROUTINE CONT. 2ND VERSION
0300 *
0301 *          READ 350 DATUM NIBBLES
0302 *          ADDRESS PREVIOUSLY LOADED
0303 *          BY LOADADDR CALL
0304 *          NIBBLE WILL BE SHIFTED LEFT
0305 *          FOR EACH CALL/LOOP
0306 *          EITHER ONE TWO OR FOUR NIBBLES
0307 *          WILL BE READ DEPENDING ON ENTRY
0308 *          USED. ALSO A SERIAL NEXT DATA MODE
0309 *          OR JAM ADDRESS & READ MODE FLAG
0310 *          IS SETUP BASED ON CALL.
0311 *
0312 0000 0040 0001  READ     TCY     0         JAM & READ 4 NIBBLES
0313 0001 0023 0002  DOIT     TYA
0314 0003 004B 0003           TCY     YMODE1
0315 0007 002D 0004           LDX     XMODE1
0316 000F 0036 0005           RBIT    1         SET FIRST TIME READ MODE
0317 001F 009D 0006           BR      SETCTR                       < 0330>
0318 003F 0043 0007  READ1    TCY     12        JAM & READ 1 NIBBLE
0319 003E 0081 0008           BR      DOIT                         < 0313>
0320 003D 0043 0009  READNEX1 TCY     12        READ NEXT NIBBLE
0321 003B 0023 0010  DOITNEXT TYA
0322 0037 004B 0011           TCY     YMODE1
0323 002F 002D 0012           LDX     XMODE1
0324 001E 0032 0013           SBIT    1         SETS SERIAL READ MODE
0325 003C 009D 0014           BR      SETCTR                       < 0330>
0326 0039 0041 0015  READNEX2 TCY     8         READ NEXT 2 NIBBLES
0327 0033 00BB 0016           BR      DOITNEXT                     < 0321>
0328 0027 0040 0017  READNEXT TCY     0         READ NEXT 4 NIBBLES
0329 000E 00BB 0018           BR      DOITNEXT                     < 0321>
0330 001D 002C 0019  SETCTR   LDX     1
0331 003A 004F 0020           TCY     15
0332 0035 0003 0021           TAM
0333 002B 004B 0022  SHIFTSET TCY     YLSDDATA
0334 0016 003E 0023  SHIFTLF  XMA
0335 002C 003C 0024           DCY
0336 0018 005A 0025           YNEC    5     (YMSDDATA-1)
0337 0030 0096 0026           BR      SHIFTLF                      < 0334>
0338 0021 0041 0027  SETREAD  TCY     8
0339 0002 0023 0028           TYA
0340 0005 0001 0029           YNEA              RESETS STATUS LATCH
0341 000B 000A 0030           TDO               SET UP READ CONTROL COMMAND
0342 0017 002D 0031           LDX     XMODE1
0343 002E 004B 0032           TCY     YMODE1
0344 001C 0001 0033           YNEA              SETS STATUS LATCH
0345 0038 000B 0034           COMCP
0346 0031 003A 0035           TBIT    1
0347 *                 BRANCHES FOR SERIAL READ
0348 0023 00BE 0036           BR      NXTBIT    ON CHAPTER 1 PAGE 0 < 1464>
0349 0006 0045 0037           TCY     PDC
0350 *                 SEND 4 PDC TO LOAD 280 DATA BUFFER
0351 000D 002C 0038           LDX     1
0352 001B 000D 0039           SETR              LSB LOADED
0353 0036 0045 0040           TCY     PDC       DUMMY INST
0354 002D 000C 0041           RSTR
0355 001A 0045 0042           TCY     PDC
0356 0034 000D 0043           SETR              NOW SHIFTED 1 BIT
0357 *                 BRANCHES FOR LOAD CALL BEFORE READ
0358 0029 0080 0044           BR      FIRSTTIM  ON CHAPTER 1 PAGE 0 < 1457>
0359 0012 0070 0045  RDLINK   ALEC    0
0360 0024 0091 0046           BR      CKCHAPT   GO RETURN          < 0362>
0361 0008 00AB 0047           BR      SHIFTSET  GO SHIFT LEFT THIS < 0333>
0362 0011 004B 0048  CKCHAPT  TCY     YMODE
```

```
0363 0022 002E 0049           LDX     XMODE
0364 0004 003B 0050           TBIT    3
0365 0009 00A6 0051           BR      DONE        BRANCHES FOR TALK OR  <0367>N
0366 0013 000B 0052           COMCP
0367 0026 002C 0053  DONE     LDX     1
0368 000C 0047 0054           TCY     YROMTEMP
0369 0019 000F 0055           RETN
0370 0032 0023 0056  SAVECNT1 TYA
0371 0025 0094 0057           BR      SAVEIT                            <0375>
0372 000A 002C 0058  SAVECNT  LDX     1
0373 0015 004B 0059           TCY     YDATDIG1
0374 002A 0021 0060           TMA                 GET COUNT INITIAL VALUE
0375 0014 002F 0061  SAVEIT   LDX     XCOUNT
0376 0028 0043 0062           TCY     YCOUNT
0377 0010 0003 0063           TAM
0378 0020 0091 0064           BR      CKCHAPT                           <0362>
0379                          PAGE    1
0380 *PPPPPPPPPPPPPPPPPPPPPPPPPPPPPPPPPPPPPPPPPPPPPPPPPPPPPPP
0381 *                        LOAD ADDRESS INTO 280/350
0382 *                        IN PREPARATION FOR A DATA
0383 *                        READ
0384 *
0385 *                        LOAD ADDRESS LINES
0386 *                        ADDRESS POINTER IN Y UPON ENTRY
0387 0000 0028 0001  LOADADDR LDX     XROMADDR    X = 0
0388 0001 0023 0002           TYA
0389 0003 004B 0003           TCY     >D
0390 0007 0003 0004           TAM                 SAVES ADDRESS POINTER
0391 000F 003F 0005           CLA
0392 001F 004F 0006           TCY     15
0393 003F 0003 0007           TAM                 SET UP LOOP CONSTANT
0394 003E 0044 0008  SENDLOAD TCY     2
0395 003D 0023 0009           TYA
0396 003B 0001 0010           YNEA                RESETS STATUS LATCH
0397 0037 000A 0011           TDO                 SET IN LOAD ADDRESS COMMAND
0398 002F 0045 0012           TCY     PDC
0399 001E 000D 0013           SETR
0400 003C 0045 0014           TCY     PDC
0401 0039 000C 0015           RSTR
0402 0033 004F 0016           TCY     15
0403 0027 0021 0017           TMA                 LOOP VALUE
0404 000E 004B 0018           TCY     >D
0405 001D 0022 0019           TMY                 GET ADDRESS POINTER (Y VALUE)
0406 003A 0001 0020           YNEA                SETS STATUS LATCH
0407 0035 0070 0021           ALEC    0
0408 002B 008D 0022           BR      OUTDATA                           <0424>
0409 0016 002D 0023           LDX     XDIG2
0410 002C 0078 0024           ALEC    1
0411 0018 008D 0025           BR      OUTDATA                           <0424>
0412 0030 0029 0026           LDX     XDIG3
0413 0021 0074 0027           ALEC    2
0414 0002 008D 0028           BR      OUTDATA                           <0424>
0415 0005 002E 0029           LDX     XDIG4
0416 000B 007C 0030           ALEC    3
0417 0017 008D 0031           BR      OUTDATA                           <0424>
0418 002E 003F 0032  BANKZERO CLA
0419 001C 000A 0033           TDO
0420 0038 0045 0034           TCY     PDC
0421 0031 000D 0035           SETR
0422 0023 000B 0036           COMCP
0423 0006 0099 0037           BR      LOADCONT                          <1590>
0424 000D 0021 0038  OUTDATA  TMA                 GET ADDR NIBBLE
0425 001B 000A 0039           TDO
0426 0036 0028 0040           LDX     XROMADDR
0427 002D 0045 0041           TCY     PDC
0428 001A 000D 0042           SETR
0429 0034 000C 0043           RSTR
0430 0029 004F 0044           TCY     15          INCREMENT LOOP POINTER
0431 0012 0002 0045           IMAC
0432 0024 0003 0046           TAM
0433 0008 00BE 0047           BR      SENDLOAD                          <0394>
0434 *                        GUARANTEE BANK BITS ARE ZERO
0435 *
0436 0011 000B 0048  MOVEOLAD          COMCP
```

```
0437 0022 0080 0049
0438 *
0439 *                    GET ROM NUMBER & STORE IN XDIG4
0440 *                    ALSO UPDATE XDIG3 TO ZERO
0441 *                    VALUES STORED IN THE Y POINTED ON ENTRY
0442 *                    Y RETURNED TO THE CALLER
0443 *
0444 0004 000B 0050  ROM#LOAD  COMCP
0445 0009 00B1 0051            BR        ROM#CONT                              < 1566>
0446 0013 0043 0052  ATRIBGET  TCY       YDATDIG2
0447 0026 0021 0053            TMA
0448 000C 001D 0054            LDP       11
0449 0019 007E 0055            ALEC      7
0450 0032 0083 0056            BR        GETATTRI                              < 1067>
0451 *                              NO ATTRUBUTES SO GET OBJ.
0452 0025 0091 0057            BR        GETOBJ                                < 1117>
0453 000A 0041 0058  CKKEYCON  TCY       8
0454 0015 000D 0059            SETR
0455 002A 0011 0060            BL        CKKEY                                 < 0940>
     0014 00A6 0061
0456                           PAGE      2
0457 *PPPPPPPPPPPPPPPPPPPPPPPPPPPPPPPPPPPPPPPPPPPPPPPPPPPPP
0458 0000 00F0 0001  CKOLOFF   CALL      CLRR08                                < 0497>
0459 0001 000B 0002            COMCP
0460 *                              TO TEST FOR OVERLAY REMOVED
0461 0003 0015 0003            CALLL     GETOL                                 < 2134>
     0007 00C0 0004
0462 *                              GO FETCH OL # IN PLACE
0463 *---------------------------------------------------
0464 *         CHECK FOR OVERLAY ZERO SUBROUTINE
0465 *---------------------------------------------------
0466 000F 0040 0005  CKOLZERO  TCY       YOLMSD
0467 *                              ENTERS X = 1
0468 001F 0038 0006            TBIT      0
0469 003F 00BB 0007            BR        EXIT                                  < 0472>
0470 003E 0048 0008  CKOLLSD   TCY       YOLLSD
0471 003D 0021 0009            TMA
0472 003B 000F 0010  EXIT      RETN
0473 0037 0070 0011  CKZERO    ALEC      0
0474 002F 00B9 0012            BR        OLZERO                                < 0476>
0475 001E 001E 0013            BL        CKCMPR                                < 0872>
     003C 00A5 0014
0476 0039 002E 0015  OLZERO    LDX       XMODEFLG  OL # = 0
0477 0033 004B 0016            TCY       YMODEFLG
0478 *                              CHECK FOR RASBERRY TONE ISSUED
0479 0027 003A 0017            TBIT      1
0480 000E 00AC 0018            BR        LOOP7                                 < 0493>
0481 *
0482 *              PROGRAMS GETS HERE FOR THE FOLLOWING
0483 *                  NO OVERLAY IN PLACE (OL#=00)
0484 *                  INVALID OVERLAY (OL# NOT IN ROM)
0485 *
0486 *                        GO ISSUE P9 INVALID OL#
0487 *                        X036 ADDRESS
0488 *               FETCH P8 ADDRESS LOC. 0036 IN 350
0489 001D 0047 0019  SPEAK8    TCY       YROMTEMP
0490 *
0491 003A 0018 0020            CALLL     ROM#LOAD                              < 0444>
     0035 00C4 0021
0492 002B 0012 0022            BL        SPEAK8'  GO ISSUE RASBERRY            < 0619>
     0016 0080 0023
0493 002C 001C 0024  LOOP7     CALLL     BUMPTIME                              < 0582>
     0018 00EE 0025
0494 *
0495 *                        CHECK IF OFF KEY IS PRESSED
0496 *
0497 0030 0040 0026  CLRR08    TCY       0         CLEAR R KEY LINES
0498 0021 002C 0027            LDX       1
0499 0002 000C 0028  LOOP6     RSTR                Y IS ALSO INCREMENTED BY RSTR
0500 0005 0059 0029            YNEC      9
```

```
0501 000B 0082 0030              BR      LOOP6                              < 0499>
0502 0017 003F 0031              CLA
0503 002E 000F 0032              RETN
0504 001C 0041 0033              TCY     8
0505 0038 000D 0034              SETR
0506 0031 0008 0035              TKA     DUMMY
0507 0023 0008 0036   CKPWROFF   TKA
0508 0006 000C 0037              RSTR
0509 000D 004F 0038              TCY     15
0510 001B 0003 0039              TAM
0511 0036 0038 0040              TBIT    0            IS K1 ON?
0512 002D 00A6 0041              BR      PWROFF                             < 0524>
0513 001A 002F 0042   CK10SEC    LDX     XTIME
0514 0034 0042 0043              TCY     YTIMEMSD
0515 0029 0021 0044              TMA
0516 0012 0077 0045              ALEC    14           K2 SET TO 10 SEC VALUE
0517 0024 00AC 0046              BR      LOOP7                              < 0493>
0518 0008 004C 0047   BUMPT2     TCY     T2MSB
0519 0011 0002 0048              IMAC
0520 0022 0003 0049              TAM
0521 0004 0011 0050              LDP     8
0522 0009 0077 0051              ALEC    14           DOES 'A' = 110 SEC?
0523 0013 00B4 0052              BR      GETOL#       TRY AGAIN FOR LEGAL O< 0933>
0524 0026 0049 0053   PWROFF     TCY     9
0525 000C 002C 0054              LDX     1
0526 0019 000C 0055              RSTR                 POWER NOW OFF
0527 *            BR      PWROFF
0528 *---------------------------------------------------------------
0529 *                   VALID OL IN PLACE CK LRN MODE
0530 0032 004D 0056   LRNFLGCK   TCY     YMODE2
0531 0025 002F 0057              LDX     XMODE2
0532 000A 0038 0058              TBIT    0
0533 0015 00A8 0059              BR      CKCORKEY                           < 0535>
0534 002A 0017 0060              BL      COMPLP6                            < 1344>
     0014 00A5 0061
0535 0028 000B 0062   CKCORKEY   COMCP
0536 0010 001A 0063              BL      CKKEYCOR                           < 1811>
     0020 0080 0064
0537                              PAGE
0538 *---------------------------------------------------------------
0539 *
0540 *                   SUBROUTINE ADDRMOVE
0541 *
0542 *                   MOVES ADDRESS DATA FROM THE DATA
0543 *                   REGISTER INTO THE ADDRESS REGISTER
0544 *                   POINTED TO BY Y UPON ENTRY
0545 *                   Y UNALTERED UPON RETURN
0546 *
0547 0000 002C 0001   ADDRMOVE   LDX     1
0548 0001 0023 0002              TYA
0549 0003 004F 0003              TCY     15
0550 0007 0003 0004              TAM                  SAVE ORIGINAL Y VALUE
0551 000F 004B 0005              TCY     YDATDIG1
0552 001F 0021 0006              TMA
0553 003F 004F 0007              TCY     15
0554 003E 0022 0008              TMY                  GET ORIGINAL Y VALUE
0555 003D 002E 0009              LDX     XDIG4
0556 003B 0003 0010              TAM
0557 0037 002C 0011              LDX     1
0558 002F 0043 0012              TCY     YDATDIG2
0559 001E 0021 0013              TMA
0560 003C 004F 0014              TCY     15
0561 0039 0022 0015              TMY
0562 0033 0029 0016              LDX     XDIG3
0563 0027 0003 0017              TAM
0564 000E 002C 0018              LDX     1
0565 001D 004D 0019              TCY     YDATDIG3
0566 003A 0021 0020              TMA
0567 0035 004F 0021              TCY     15
0568 002B 0022 0022              TMY
0569 0016 002D 0023              LDX     XDIG2
0570 002C 0003 0024              TAM
0571 0018 002C 0025              LDX     1
```

```
0572 0030 0045 0026           TCY       YDATDIG4
0573 0021 0021 0027           TMA
0574 0002 004F 0028           TCY       15
0575 0005 0022 0029           TMY                 GET ORIGINAL Y VALUE
0576 000B 0028 0030           LDX       XDIG1
0577 0017 0090 0031           BR        RETN3'                          < 0616>
0578 *---------------------------------------------------------------
0579 *                  TIMER SUBROUTINE
0580 *
0581 *---------------------------------------------------------------
0582 002E 003F 0032  BUMPTIME CLA                 DELAY A FIXED AMOUNT OF TIME
0583 *                                  PRIOR TO BUMPING COUNT
0584 *                                  DELAY TO BE DETERMINED
0585 001C 0007 0033  LOOPTM1  DCA
0586 0038 003C 0034  LOOPTM2  DCY
0587 0031 005F 0035           YNEC      15
0588 0023 00B8 0036           BR        LOOPTM2                         < 0386>
0589 0006 0079 0037           ALEC      K1
0590 000D 00B6 0038           BR        BMPTIME                         < 0592>
0591 001B 009C 0039           BR        LOOPTM1                         < 0585>
0592 0036 002F 0040  BMPTIME  LDX       XTIME
0593 002D 0046 0041           TCY       YTIMELSD
0594 001A 0002 0042  LOOP5    IMAC                GET MEMORY INTO ACC & INCREMENT
0595 0034 0088 0043           BR        CARRY     BRANCHES ON OVERFLOW  < 0599>
0596 0029 0003 0044           TAM
0597 0012 000B 0045           COMCP
0598 0024 0080 0046           BR        TIMECONT                        < 1669>
0599 0008 0003 0047  CARRY    TAM
0600 0011 003C 0048           DCY
0601 0022 003C 0049           YNEC      YTIMSD+1
0602 0004 009A 0050           BR        LOOP5                           < 0594>
0603 0009 004B 0051  RETURN3  TCY       YMODE
0604 0013 002E 0052           LDX       XMODE
0605 0026 003B 0053           TBIT      3
0606 000C 00B2 0054           BR        RETN3                           < 0608>
0607 0019 000B 0055           COMCP
0608 0032 002C 0056  RETN3    LDX       1
0609 0025 004F 0057           TCY       15
0610 000A 0022 0058           TMY                 GETS ORIGINAL Y VALUE
0611 0015 000F 0059           RETN
0612 *
0613 002A 002F 0060  CKCOUNT  LDX       XCOUNT
0614 0014 0043 0061           TCY       YCOUNT
0615 0028 0000 0062           DMAN
0616 0010 0003 0063  RETN3'   TAM
0617 0020 0089 0064           BR        RETURN3                         < 0603>
0618                          PAGE      4
0619 0000 002D 0001  SPEAK3'  LDX       XDIG2
0620 0001 004C 0002           TCY       3
0621 0003 0023 0003           TYA
0622 0007 0047 0004           TCY       YROMTEMP
0623 000F 0003 0005           TAM                 (5,TEMP) = 3
0624 001F 0025 0006           AMAAC               A NOW = 6
0625 003F 002D 0007           LDX       XDIG1
0626 003E 0003 0008           TAM                 (2,TEMP) = 6
0627 003D 0040 0009           TCY       0         SETS BRANCH FLAG
0628 *                 LOAD/READ/MOVE/LOAD/SPEAKIT ROUTINE
0629 *                 RETURN FLAG IN Y ON ENTRY
0630 *                 Y < 8 = CHAPTER 0 RETURN
0631 003B 0023 0010  LOAD&SPK TYA                 SAVE RETURN FLAG
0632 0037 004B 0011           TCY       YCOUNT1
0633 002F 0029 0012           LDX       XCOUNT1
0634 001E 0003 0013           TAM
0635 003C 0047 0014           TCY       YROMTEMP
0636 0039 0018 0015           CALLL     LOADADDR  LOAD                  < 0387>
     0033 00C0 0016
0637 0027 0010 0017           CALLL     READ      READ 2 BYTES          < 0312>
     000E 00C0 0018
0638 001D 001C 0019           CALLL     ADDRMOVE  MOVE THE NEW ADDRESS< 0547>R
     003A 00C0 0020
0639 *                                  GET READY TO SPEAK
0640 0035 0018 0021           CALLL     LOADADDR LOAD & SPEAK PS        < 0387>
     002B 00C0 0022
```

```
0641 0016 001B 0023           CALLL    SPEAKIT                       < 1200>
     002C 00C3 0024
0642 0018 004B 0025           TCY      YCOUNT1
0643 0030 0029 0026           LDX      XCOUNT1
0644 0021 0021 0027           TMA
0645 0002 001A 0028           LDP      5
0646 0005 0070 0029           ALEC     0
0647 000B 0030 0030           BR       SETRASP                       < 0685>
0648 0017 001E 0031           LDP      7
0649 002E 0078 0032           ALEC     1
0650 001C 00AB 0033           BR       SPEAKPO                       < 0841>
0651 0038 0011 0034           LDP      8
0652 0031 0074 0035           ALEC     2
0653 0023 0080 0036           BR       GETMOD4                       < 0884>
0654 0006 000B 0037           COMCP
0655 000D 001D 0038           BL       LDSPKRTN                      < 2243>
     001B 0093 0039
0656 *                        SET RASBERRY FLAG
0657 *------------------------------------------------------
0658 *                        OVERLAY NUMBER
0659 *                          DETERMINED
0660 *
0661 *------------------------------------------------------
0662 0036 0048 0040  OLHIT    TCY      OLLSD
0663 002D 0021 0041           TMA                   CK FOR DIAGNOSTIC OL 1F
0664 001A 0077 0042           ALEC     14
0665 0034 0084 0043           BR       NOT1F                         < 0672>
0666 0029 003C 0044           DCY
0667 0012 001F 0045           LDP      15
0668 0024 000B 0046           COMCP
0669 0008 0038 0047           TBIT     0
0670 0011 0080 0048           BR       DIAGTEST                      < 2456>
0671 0022 000B 0049           COMCP
0672 0004 001A 0050  NOT1F    BL       CKOL#                         < 0691>
     0009 009F 0051
0673 0013 0014 0052  KEYSCAN  CALLL    CLRR08    CLEAR KEYBOARD R LIN< 0497>
     0026 00F0 0053
0674 000C 0019 0054           BL       KEYSCAN1                      < 0954>
     0019 0080 0055
0675 0032 0023 0056  KEYTEST' TYA
0676 0025 0048 0057  KEYTEST  TCY      1
0677 000A 0003 0058           TAM            SAVE TARGET K VALUE
0678 0013 0044 0059           TCY      2
0679 002A 0022 0060  NXTKEY   TMY            GET NEW Y VALUE
0680 0014 000B 0061           COMCP
0681 0028 0019 0062           BL       KEYCONT1                      < 2102>
     0010 0086 0063
0682                          PAGE
0683 *PPPPPPPPPPPPPPPPPPPPPPPPPPPPPPPPPPPPPPPPPPPPPPPPPPPPPPPPPPPPPPPP
0684 *
0685 0000 004B 0001  SETRASP  TCY      YMODE
0686 0001 002E 0002           LDX      XMODE
0687 0003 0032 0003           SBIT     1         RASBERRY TONE ISSUED ONCE
0688 0007 0014 0004           BL       LOOP7     GO BUMP T1          < 0493>
     000F 00AC 0005
0689 *
0690 *                        DETERMINE IF DROPIN OR RESIDENT OVERLAY
0691 001F 002E 0006  CKOL#    LDX      XMODE
0692 003F 004B 0007           TCY      YMODE
0693 003E 0031 0008           SBIT     2         ASSUME DROPIN OL #
0694 003D 0075 0009           ALEC     10
0695 003B 00AF 0010           BR       CKOLMSD                       < 0697>
0696 0037 009D 0011           BR       OLDATA                        < 0713>
0697 002F 0040 0012  CKOLMSD  TCY      OLMSD
0698 001E 002C 0013           LDX      XOL#
0699 003C 0038 0014           TBIT     0
0700 0039 009D 0015           BR       OLDATA    DROPIN OL HIT       < 0713>
0701 0033 002E 0016  SETRESF  LDX      XMODE
0702 0027 004B 0017           TCY      YMODE
0703 000E 0035 0018           RBIT     2         SETS RESIDENT OL# BIT
0704 *
```

```
0705  *                    GET ALL THE OVERLAY SPECIFICS
0706  *                    & STORES IN DEDICATED RAM LOCATIONS
0707  *
0708  *                    NOW CHECK OL # FOR LEGALITY WITH
0709  *                    THE ROM OL # TABLE
0710  *
0711  *                    START WITH FIRST OL#
0712  *                    GET ITS ADDRESS (0000)
0713  001D 0047 0019  OLDATA    TCY       YROMTEMP
0714  003A 003F 0020            CLA
0715  0035 002D 0021            LDX       XDIG2
0716  002B 0003 0022            TAM                 (5,TEMP) = 0
0717  0016 0028 0023            LDX       XDIG1
0718  002C 0003 0024            TAM                 (2,TEMP) = 0
0719  0018 0018 0025            CALLL     ROM#LOAD                      < 0444>
      0030 00C4 0026
0720  0021 0018 0027            CALLL     LOADADDR                      < 0387>
      0002 00C0 0028
0721  0005 0010 0029            CALLL     READ      GET OL ADDRESS      < 0312>
      000B 00C0 0030
0722  0017 001C 0031            CALLL     ADDRMOVE                      < 0547>
      002E 00C0 0032
0723  001C 0047 0033  NOTFFFF   TCY       YROMTEMP
0724  0033 0018 0034            CALLL     LOADADDR                      < 0387>
      0031 00C0 0035
0725  0023 0010 0036            CALLL     READ                          < 0312>
      0006 00C0 0037
0726  *
0727  *                    MOVE OL NUMBER INTO ACTIVE OL SLOT
0728  *                    DATA REG. CONTAINS THE CURRENT OL #
0729  000D 002C 0038  OLMOVE    LDX       1
0730  001B 0045 0039            TCY       YDATDIG4
0731  0036 0021 0040            TMA
0732  002D 002F 0041            LDX       XOLACT
0733  001A 0048 0042            TCY       YOLLSD
0734  0034 0003 0043            TAM
0735  0029 002C 0044            LDX       1
0736  0012 004D 0045            TCY       YDATDIG3
0737  0024 0021 0046            TMA
0738  0008 002F 0047            LDX       XOLACT
0739  0011 0040 0048            TCY       YOLMSD
0740  0022 0003 0049            TAM       OL # NOW IN ACTIVE OL SLOT
0741  *                    CHECK FOR NEW OL# MATCH
0742  *               OL # CANIDATE IN THE DATA REG.
0743  *               OL TABLE ADDRESS IN ADDRESS REG.
0744  *               SET BASIC/LEARN MODE FLAG
0745  0004 0043 0050            TCY       YDATDIG2
0746  0009 003B 0051            TBIT      3         BASIC ONLY FLAG
0747  0013 0095 0052            BR        SETBASIC                      < 0754>
0748  *               SEE IF OL MATCHES THE ACTIVE OL REG.
0749  0026 001B 0053  OLMATCH?  CALLL     COMPARE#                      < 1240>
      000C 00DB 0054
0750  0019 0016 0055            LDP       6
0751  0032 0070 0056            ALEC      0
0752  0025 00B9 0057            BR        GETNEXT   OL # DOESN'T MATCH< 0772>X
0753  000A 00A1 0058            BR        SHIFT4    OL FOUND SO SAVE A< 0783>
0754  0015 004B 0059  SETBASIC  TCY       YMODE
0755  002A 002E 0060            LDX       XMODE
0756  0014 0030 0061            SBIT      0         SET BASIC FLAG
0757  0028 00A6 0062            BR        OLMATCH?                      < 0749>
0758  *PPPPPPPPPPPPPPPPPPPPPPPPPPPPPPPPPPPPPPPPPPPPPPPPPPPPPPPPP
0759                            PAGE
0760  0000 0018 0001  ATTRRTN   CALLL     ROM#LOAD                      < 0444>
      0001 00C4 0002
0761  *                    ARTICLE ADDRESS SETUP
0762  0003 0018 0003            CALLL     LOADADDR                      < 0387>
      0007 00C0 0004
0763  000F 0010 0005            CALLL     READ      READ THE ART. ADDRESS< 0312>
      001F 00C0 0006
0764  003F 0048 0007            TCY       YLINK1
0765  003E 001C 0008            CALLL     ADDRMOVE  MOVE THE ART. ADDR. < 0547>
      003D 00C0 0009
```

```
0766 *                                    INTO THE LINK BUFFER
0767 *                                 NOW FETCH THE ATTRIBUTE
0768 003B 0040 0010            TCY     OLMSD
0769 0037 002C 0011            LDX     1
0770 002F 0033 0012            SBIT    3
0771 001E 0015 0013            BL      GETARTAD                            < 1021>
     003C 00BD 0014
0772 0039 0010 0015    GETNEXT CALLL   READNEXT    NEXT DATA = OL ADDR< 0328>
     0033 00E7 0016
0773 0027 0047 0017            TCY     YROMTEMP
0774 000E 001C 0018            CALLL   ADDRMOVE                            < 0547>
     001D 00C0 0019
0775 *                          SEE IF ADDRESS IS FXXX(END OF STRING)
0776 003A 0045 0020    CKFFFF  TCY     YDATDIG4
0777 0035 0022 0021            TMY
0778 002B 001A 0022            LDP     5
0779 0016 005F 0023            YNEC    15
0780 002C 009C 0024            BR      NOTFFFF                             < 0723>
0781 0018 0014 0025            BL      SPEAK8      SAME AS SPEAKP9         < 0489>
     0030 009D 0026
0782 *                       SAVE OL TABLE ADDRESS
0783 0021 0049 0027    SHIFT4  TCY     YDATDIG5
0784 0002 002C 0028            LDX     1
0785 0005 0021 0029            TMA
0786 000B 003C 0030    SHIFT   DCY
0787 0017 003E 0031            XMA
0788 002E 0054 0032            YNEC    YOLTABD1
0789 001C 008B 0033            BR      SHIFT                               < 0786>
0790 0038 000F 0034            RETN
0791 0031 00E1 0035            CALL    SHIFT4                              < 0783>
0792 0023 00E1 0036            CALL    SHIFT4                              < 0783>
0793 0006 00E1 0037            CALL    SHIFT4                              < 0783>
0794 *                      GO COMPUTE THATS ADDRESS X030-X031
0795 000D 0040 0038            TCY     YTHATS
0796 001B 0018 0039            CALLL   ROM#LOAD                            < 0444>
     0036 00C4 0040
0797 *                          RESET RASBERRY FLAG
0798 002D 004B 0041            TCY     YMODE
0799 001A 002E 0042            LDX     XMODE
0800 0034 0036 0043            RBIT    1           RESETS RASBERRY FLAG ISSUED
0801 0029 0040 0044            TCY     YTHATS
0802 0012 003F 0045            CLA
0803 0024 0028 0046            LDX     XDIG1
0804 0008 0003 0047            TAM
0805 0011 0004 0048            A2AA
0806 0022 002D 0049            LDX     XDIG2
0807 0004 0004 0050            A2AA
0808 0009 0007 0051            DCA
0809 0013 0003 0052            TAM
0810 0026 0018 0053            CALLL   LOADADDR                            < 0387>
     000C 00C0 0054
0811 0019 001E 0055            BL      PG6LNK'                             < 0820>
     0032 0080 0056
0812 0025 0045 0057    KEYTEST2 TCY    >A
0813 000A 0012 0058            BL      KEYTEST                             < 0676>
     0015 00A5 0059
0814 002A 003B 0060    KEYCKEND TBIT   3                                   < 0812>
0815 0014 00A5 0061            BR      KEYTEST2
0816 0028 000B 0062            COMCP
0817 0010 0012 0063            BL      EXTPORT                             < 1785>
     0020 00B1 0064
0818 *PPPPPPPPPPPPPPPPPPPPPPPPPPPPPPPPPPPPPPPPPPPPPPPPPPPPPPPPPPP
0819                            PAGE    7
0820 0000 0010 0001    PG6LNK' CALLL   READ                                < 0312>
     0001 00C0 0002
0821 0003 0040 0003            TCY     YTHATS
0822 0007 001C 0004            CALLL   ADDRMOVE  THATS ADDRESS NOW ST< 0547>
     000F 00C0 0005
0823 001F 0047 0006    SPEAKP7 TCY     YROMTEMP
0824 003F 0018 0007            CALLL   ROM#LOAD                            < 0444>
     003E 00C4 0008
0825 003D 002D 0009            LDX     XDIG2
```

```
0826 003B 004C 0010           TCY       3
0827 0037 0023 0011           TYA
0828 002F 0047 0012           TCY       YROMTEMP
0829 001E 0003 0013           TAM                        (5,TEMP) = 3
0830 003C 0028 0014           LDX       XDIG1
0831 0039 0042 0015           TCY       4
0832 0033 0023 0016           TYA
0833 0027 0047 0017           TCY       YROMTEMP
0834 000E 0003 0018           TAM                        (2,TEMP) = 4
0835 001D 0048 0019           TCY       1
0836 *                              GO LOAD & SPEAK PRODUCT NAME/TONE
0837 003A 0012 0020           BL        LOAD&SPK                          < 0631>
     0035 00BB 0021
0838 *                              GO ISSUE 'PO' OVERLAY TUNE
0839 *                              FIRST COMPUTE PO ADDRESS
0840 *
0841 002B 0018 0022  SPEAKPO  CALLL     MOVEOLAD  GET OL TABLE ADDR. IN< 0436>I
     0016 00D1 0023
0842 *                           NOW ADD 6 TO THE VALUE
0843 002C 0047 0024           TCY       YROMTEMP
0844 0018 0028 0025           LDX       XDIG1
0845 0030 0021 0026           TMA
0846 0021 0006 0027           A6AA
0847 0002 00A9 0028           BR        EXIT4                             < 0863>
0848 0005 0003 0029  OVERFL2  TAM
0849 000B 002D 0030           LDX       XDIG2
0850 0017 0002 0031           IMAC
0851 002E 00B1 0032           BR        OVERFL3                           < 0854>
0852 001C 0003 0033           TAM
0853 0038 0092 0034           BR        SPEAKO                            < 0864>
0854 0031 0003 0035  OVERFL3  TAM
0855 0023 0029 0036           LDX       XDIG3
0856 0006 0002 0037           IMAC
0857 000D 00AD 0038           BR        OVERFL4                           < 0860>
0858 001B 0003 0039           TAM
0859 0036 0092 0040           BR        SPEAKO                            < 0864>
0860 002D 0003 0041  OVERFL4  TAM
0861 001A 002E 0042           LDX       XDIG4
0862 0034 0002 0043           IMAC
0863 0029 0003 0044  EXIT4    TAM
0864 0012 0047 0045  SPEAKO   TCY       YROMTEMP
0865 0024 0018 0046           CALLL     LOADADDR  LOAD PO ADDRESS         < 0387>
     0003 00C0 0047
0866 0011 0010 0048           CALLL     READ                              < 0312>
     0022 00C0 0049
0867 0004 001C 0050           CALLL     ADDRMOVE                          < 0547>
     0009 00C0 0051
0868 0013 0013 0052           CALLL     CKADZERO                          < 1172>
0869 000C 000B 0053           COMCP
0870 0019 0011 0055           BL        PG22LINK                          < 2015>
     0032 00B9 0056
0871 *                              IS ACTIVE OL# = IN PLACE OL#
0872 0025 001B 0057  CKCMPR   CALLL     COMPARE#                          < 1240>
     000A 00DB 0058
0873 0015 001F 0059           LDP       15
0874 002A 0070 0060           ALEC      0
0875 0014 0080 0061           BR        CLRRAM    NO MATCH SO START OVE< 1364>
0876 0028 0012 0062           BL        KEYSCAN   ADDED TO CK OL CHAN< 0673>
     0010 0093 0063
0877                                   PAGE
0878 *PPPPPPPPPPPPPPPPPPPPPPPPPPPPPPPPPPPPPPPPPPPPPPPPPPPPPPP
0879 *
0880 *                              NOW SETUP FOR THE BASIC MODE
0881 *
0882 *                              FETCH THE MODULO NUMBER FROM T1
0883 *                              AND STORE IN THE MODULO BUFFER
0884 0000 0046 0001  GETMOD4  TCY       YTIMELSD
0885 0001 002F 0002           LDX       XTIME
0886 0003 0021 0003           TMA
0887 0007 002C 0004           LDX       1
0888 000F 0047 0005           TCY       YMODULO
0889 001F 0003 0006           TAM
```

```
0890 003F 0037 0007           RBIT      3
0891 003E 0034 0008           RBIT      0        MODULO BUFFER NOW 0,2,4,6 IN
0892 003D 0021 0009           TMA
0893 003B 002E 0010           LDX       XMODE
0894 0037 004B 0011           TCY       YMODE    VALUE NOW 0,2,4 OR 6
0895 002F 003B 0012           TBIT      3
0896 001E 00B9 0013           BR        MOD4RTN                             < 0898>
0897 003C 000B 0014           COMCP
0898 0039 000F 0015  MOD4RTN  RETN
0899 *
0900 *                              NOW BUILD P6 CHOICE
0901 *                              AND STORE IN BASIC REGISTER
0902 *                              MAKE P6= 0028-002F
0903 0033 0006 0016           A6AA
0904 0027 0004 0017           A2AA
0905 000E 0043 0018           TCY       YBASIC
0906 001D 0028 0019           LDX       XDIG1
0907 003A 0003 0020           TAM
0908 0035 002D 0021           LDX       XDIG2
0909 002B 0044 0022           TCY       2
0910 0016 0023 0023           TYA
0911 002C 0043 0024           TCY       YBASIC
0912 0018 0003 0025           TAM
0913 0030 0018 0026           CALLL     ROM#LOAD                            < 0444>
     0021 00C4 0027
0914 *         BASIC BUFFER NOW CONTAINS P6 ADDR. PTR.
0915 0002 0018 0028           CALLL     LOADADDR                            < 0367>
     0005 00C0 0029
0916 000B 0010 0030           CALLL     READ                                < 0312>
     0017 00C0 0031
0917 002E 0043 0032           TCY       YBASIC
0918 001C 001C 0033           CALLL     ADDRMOVE  BASIC ADDRESS NOW IN      < 0347>B
     0038 00C0 0034
0919 *                              GO RESET TIMER T1
0920 0031 003F 0035  CLRTM    CLA
0921 0023 0042 0036           TCY       YTIMEMSD
0922 0006 002F 0037           LDX       XTIME
0923 000D 0020 0038           TAMIY
0924 001B 0037 0039           RBIT      3
0925 0036 0035 0040           RBIT      2        VALUE STILL MOD36
0926 *                              MOVE IN THE ARTICLE ADDRESS INTO
0927 *                              THE LINK BUFFER(1) AFTER A SWITCH IS
0928 *                              SELECTED. WILL BE SOUND OF SILENCE IF
0929 *                              P6-4 SELECTED
0930 *                              SCAN THE KEYBOARD FOR A KEY INPUT
0931 *
0932 002D 0012 0041           BL        KEYSCAN                             < 0673>
     001A 0093 0042
0933 0034 000B 0043  GETOL#   COMCP
0934 0029 0015 0044           CALLL     GETOL                               < 2134>
     0012 00C0 0045
0935 0024 0014 0046           CALLL     CKOLZERO                            < 0466>
     0008 00CF 0047
0936 0011 0014 0048           LDP       2
0937 0022 0070 0049           ALEC      0
0938 0004 00B9 0050           BR        OLZERO                              < 0476>
0939 0009 0012 0051           BL        OLHIT                               < 0662>
     0013 00B6 0052
0940 0026 0008 0053  CKKEY    TKA
0941 000C 000C 0054           RSTR
0942 0019 0003 0055           TAM
0943 0032 0014 0056           LDP       2        PWR OFF TEST
0944 0025 0038 0057           TBIT      0
0945 000A 00A6 0058           BR        PWROFF                              < 0524>
0946 0015 004E 0059           TCY       7
0947 002A 000D 0060           SETR
0948 0014 0008 0061           TKA
0949 0028 000B 0062           COMCP
0950 0010 0015 0063           BL        KEYCK                               < 2189>
     0020 0099 0064
0951 *
```

```
0952                      PAGE
0953  *              ENTERS A = 0 Y = 9
0954 0000 0001 0001  KEYSCAN1  YNEA                      SETS STATUS LATCH
0955 0001 0040 0002            TCY       0
0956 0003 000A 0003            TDO                       SET OL LINES TO 00 AS A NOP
0957 0007 0041 0004            TCY       8
0958 000F 0010 0005            CALLL     SAVECNT1                      < 0370>
     001F 00F2 0006
0959 003F 000E 0007  ONHITCK   KNEZ
0960 003E 00BF 0008            BR        ONHITCK                       < 0959>
0961 003D 001C 0009            CALLL     BUMPTIME                      < 0582>
     003B 00EE 0010
0962 0037 0041 0011            TCY       8
0963 002F 000D 0012  CKKEY     SETR
0964 001E 0008 0013            TKA       DUMMY
0965 003C 0008 0014            TKA
0966 0039 000C 0015            RSTR
0967 0033 0024 0016            TAY       SAVE OLD K
0968 0027 0008 0017            TKA
0969 000E 0001 0018            YNEA      A = 0 IF VALID KEY
0970 001D 00AE 0019            BR        KEYONCK                       < 0980>
0971 003A 000E 0020  NOKEYON   KNEZ
0972 0035 00BA 0021            BR        NOKEYON                       < 0971>
0973 002B 001C 0022            CALLL     BUMPTIME    KEY DEBOUNCE TIME < 0582>
     0016 00EE 0023
0974 002C 001C 0024            CALLL     CKCOUNT                       < 0613>
     0018 00EA 0025
0975 0030 0024 0026            TAY
0976 0021 005F 0027            YNEC      >F
0977 0002 00AF 0028            BR        CKKEY                         < 0963>
0978 0005 000B 0029  CK10SEC   COMCP
0979 000B 001E 0030            BL        CK10CONT                      < 1983>
     0017 0088 0031
0980 002E 0050 0032  KEYONCK   YNEC      0
0981 001C 00B1 0033            BR        KEYON                         < 0983>
0982 0038 00BA 0034            BR        NOKEYON                       < 0971>
0983 0031 0023 0035  KEYON     TYA       GETS SAVED K VALUE
0984 0023 0047 0036            TCY       YKEYKX
0985 0006 002B 0037            LDX       XKNEW
0986 000D 0003 0038            TAM
0987 001B 0043 0039  SAVER     TCY       YCOUNT
0988 0036 002F 0040            LDX       XCOUNT
0989 002D 0021 0041            TMA
0990 001A 002B 0042            LDX       XKNEW
0991 0034 004B 0043            TCY       YKEYRX
0992 0029 0003 0044            TAM
0993 0012 0022 0045            TMY       GETS CANIDATE R VALUE
0994 0024 0051 0046            YNEC      8
0995 0008 0099 0047            BR        CKR8                          < 1001>
0996 0011 0047 0048  CKR8      TCY       YKEYKX
0997 0022 0038 0049            TBIT      0
0998 0004 00A6 0050            BR        PWROFF''                      < 1000>
0999 0009 0014 0051  LRNCK'    BL        LRNFLGCK                      < 0530>
     0013 00B2 0052
1000 0026 0014 0053  PWROFF''  BL        PWROFF                        < 0524>
     000C 00A6 0054
1001 0019 005A 0055  CKR5      YNEC      5
1002 0032 0089 0056            BR        LRNCK'                        < 0999>
1003 0025 0047 0057            TCY       YKEYKX
1004 000A 0037 0058            RBIT      3
1005 0015 0026 0059            MNEZ
1006 002A 0089 0060            BR        LRNCK'                        < 0999>
1007 0014 00BA 0061            BR        NOKEYON                       < 0971>
1008 *                         GET NEXT AS OL INTERSECTION
```

```
1009                           PAGE
1010 *PPPPPPPPPPPPPPPPPPPPPPPPPPPPPPPPPPPPPPPPPP
1011 0000 002E 0001  CLRNXT  LDX     XMODE
1012 0001 0033 0002          SBIT    3
1013 0003 0048 0003          TCY     YLINK1
1014 *                MOVE ZEROES INTO LINK BUF.
1015 0007 001C 0004  CLRNXT' CALLL   ADDRMOVE                        < 0547>
     000F 00C0 0005
1016 001F 0005 0006          IYC
1017 003F 0051 0007          YNEC    YLNKEND
1018 003E 0087 0008          BR      CLRNXT'                         < 1015>
1019 *                COMPUTE ANSWER STRING POINTER
1020 *                USED AS A SUBROUTINE VIA BRANCHES
1021 003D 0018 0009  GETARTAD CALLL  MOVEOLAD MOVE OL ADDRESS TO     < 0436>
     003B 00D1 0010
1022 *                THE DIGIT BUFFER
1023 0037 0017 0011          CALLL   ANSADD   BUILD ANSW STRING AD.  < 1277>
     002F 00C0 0012
1024 001E 0018 0013          CALLL   LOADADDR                        < 0387>
     003C 00C0 0014
1025 0039 0010 0015          CALLL   READ     GO GET ANSWER ADDRESS  < 0312>
     0033 00C0 0016
1026 0027 001C 0017          CALLL   ADDRMOVE                        < 0547>
     000E 00C0 0018
1027 001D 0013 0019          CALLL   CKADZERO                        < 1172>
     003A 00E4 0020
1028 0035 0070 0021          ALEC    0
1029 002B 00A9 0022          BR      NOPSWIT                         < 1046>
1030 *                  NOW FETCH ARTICLE AD.
1031 0016 0018 0023          CALLL   LOADADDR LOAD IN ANSWER ADDR.   < 0387>
     002C 00C0 0024
1032 0018 0010 0025          CALLL   READ1    READ SWITCH DATA  N    < 0318>
     0030 00FF 0026
1033 0021 0010 0027          CALLL   SAVECNT                         < 0372>
     0002 00CA 0028
1034 0005 0010 0029          CALLL   READNEX1 READ SWITCH COUNT      < 0320>
     000B 00FD 0030
1035 0017 0040 0031          TCY     OLMSD
1036 002E 0039 0032          TBIT    2
1037 001C 00AD 0033          BR      LRNRTN                          < 1043>
1038 0038 0010 0034  NEXTSW  CALLL   READNEX2                        < 0326>
     0031 00F9 0035
1039 0023 001C 0036          CALLL   CKCOUNT                         < 0613>
     0006 00EA 0037
1040 000D 0070 0038          ALEC    0
1041 001B 0095 0039          BR      READART                         < 1059>
1042 0036 00B8 0040          BR      NEXTSW                          < 1038>
1043 002D 000B 0041  LRNRTN  COMCP
1044 001A 0014 0042          BL      SVSW#                           < 1614>
     0034 00BC 0043
1045 *          ANSWER ADDRESS = 0000 SO KEY UNUSED
1046 0029 0040 0044  NOPSWIT TCY     OLMSD
1047 0012 002C 0045          LDX     1
1048 0024 0037 0046          RBIT    3        RESET TEMP. BRANCH BITS
1049 0008 003A 0047          TBIT    1
1050 0011 0089 0048          BR      KYSCAN                          < 1053>
1051 0022 0039 0049          TBIT    2
1052 0004 0099 0050          BR      NOPSWIT'                        < 1056>
1053 0009 0036 0051  KYSCAN  RBIT    1
1054 0013 0035 0052          RBIT    2
1055 0026 0012 0053          BL      KEYSCAN                         < 0673>
     000C 0093 0054
1056 0019 0035 0055  NOPSWIT' RBIT   2
1057 0032 000B 0056          COMCP
1058 0025 001A 0057          BL      LEARN'                          < 1866>
     000A 008A 0058
1059 0015 0010 0059  READART CALLL   READNEX2 READ ARTICLE DATA A',  < 0326>
     002A 00F9 0060
1060 *                CHECK FOR RETURN BRANCH
1061 0014 000B 0061          COMCP
1062 0028 0012 0062          BL      RTNLNK'                         < 1758>
     0010 00BC 0063
```

```
1063                              PAGE
1064 0000 001F 0001              BL        CLRRAM   IN CASE K4 WASN'T RESET< 1364>
     0001 0030 0002
1065 *
1066 *
1067 0003 004F 0003    GETATTRI TCY       15
1068 0007 002B 0004             LDX       6
1069 000F 0003 0005             TAM       (6,15) = # OF ATTRIBUTES
1070 001F 002F 0006             LDX       XTIME    NOT NEEDED IF XMODE2=XTIME
1071 *                 GET T1 VALUE
1072 003F 0046 0007             TCY       YTIMELSD
1073 *                 GET TIME LSD IN ACC
1074 003E 0021 0008             TMA       GET TIME VALUE
1075 *                 SAVE CANIDATE MODULO ATTRIBUTE #
1076 003D 002F 0009             LDX       7
1077 003B 004F 0010             TCY       15
1078 0037 0003 0011             TAM       (7,15) = CANIDATE ATTRIB. #
1079 002F 0037 0012             RBIT      3       MODULO 0-7
1080 001E 0021 0013             TMA
1081 003C 002B 0014    LOOP12B  LDX       6
1082 0039 0027 0015             SAMAN     ACC = (6,15)-ATTR# CANIDATE
1083 0033 00B5 0016             BR        ATT#HIT  (7,15) = VALID ATTR.< 1088>
1084 0027 002F 0017             LDX       7
1085 000E 0000 0018             DMAN
1086 001D 0003 0019             TAM       (6,15) = # OF ATTR.-1
1087 003A 00BC 0020             BR        LOOP12B                           < 1081>
1088 0035 0010 0021    ATT#HIT  CALLL     READNEXT GO GET NEXT DATA         < 0328>
     002B 00E7 0022
1089 0016 002B 0023             LDX       6
1090 002C 004F 0024             TCY       15
1091 0018 0000 0025             DMAN
1092 0030 0003 0026             TAM
1093 0021 002F 0027             LDX       7
1094 0002 0026 0028             MNEZ
1095 0005 0097 0029             BR        DECMEM                            < 1097>
1096 000B 00B1 0030             BR        ATADDHIT                          < 1103>
1097 0017 0000 0031    DECMEM   DMAN
1098 002E 0003 0032             TAM
1099 001C 0026 0033             MNEZ
1100 0038 00B5 0034             BR        ATT#HIT                           < 1088>
1101 *                 ATTRIBUTE ADDRESS IN
1102 *                 DATDIG1-4
1103 0031 0044 0035    ATADDHIT TCY       YLINK2
1104 *                 MOVE ADDRESS INTO LINK BUFFER2
1105 0023 001C 0036             CALLL     ADDRMOVE                          < 0547>
     0006 00C0 0037
1106 *------------------------------------------------
1107 *        SKIP OVER THE OTHER ATTRIBUTE ADDRESSES
1108 000D 002B 0038    LOP12A   LDX       6
1109 001B 004F 0039             TCY       15
1110 0036 0021 0040             TMA
1111 002D 0070 0041             ALEC      0
1112 001A 0091 0042             BR        GETOBJ                            < 1117>
1113 0034 0007 0043             DCA
1114 0029 0003 0044             TAM
1115 0012 0010 0045             CALLL     READNEXT READ PAST ATTRIBUTE A< 0328>
     0024 00E7 0046
1116 0008 008D 0047             BR        LOP12A                            < 1108>
1117 0011 0010 0048    GETOBJ   CALLL     READNEX2                          < 0326>
     0022 00F9 0049
1118 *                 OBJECT DATA NOW STARTS IN YDATDIG1,2
1119 *                 OX WHERE X = NUMBER OF OBJ. LINKS
1120 0004 0043 0050             TCY       YDATDIG2
1121 0009 0021 0051             TMA
1122 0013 0010 0052             CALLL     SAVEIT                            < 0375>
     0026 00D4 0053
1123 *                 SAVES # OF OBJECTS
1124 000C 0044 0054             TCY       YLINK2
1125 0019 0023 0055             TYA
1126 0032 002B 0056             LDX       6
1127 0025 004F 0057             TCY       15
```

```
1128 000A 0013 0058            BL       NXTLINK'                              < 1134>
     0015 0080 0059
1129 002A 0047 0060  SPKSEED   TCY      YROMTEMP 0
1130 0014 001C 0061            CALLL    ADDRMOVE                              < 0547>
     0028 00C0 0062
1131 0010 001F 0063            BL       KEYSPKK                               < 1425>
     0020 0086 0064
1132 *PPPPPPPPPPPPPPPPPPPPPPPPPPPPPPPPPPPPPPPPPPPPPPPPP
1133                           PAGE     12
1134 0000 0003 0001  NXTLINK'  TAM
1135 0001 0010 0002  LINKNEXT  CALLL    READNEXT GET FIRST OBJ. ADDR.         < 0328>
     0003 00E7 0003
1136 0007 004F 0004            TCY      15
1137 000F 002B 0005            LDX      6
1138 001F 0002 0006            IMAC
1139 003F 0003 0007            TAM               READY FOR NEXT LINK
1140 003E 0022 0008            TMY
1141 003D 001C 0009            CALLL    ADDRMOVE                              < 0547>
     003B 00C0 0010
1142 0037 001C 0011            CALLL    CKCOUNT                               < 0613>
     002F 00EA 0012
1143 001E 0070 0013            ALEC     0
1144 003C 00B3 0014            BR       SPKP6CK                               < 1147>
1145 0039 0081 0015            BR       LINKNEXT                              < 1135>
1146 *                         GET NEXT LINK
1147 0033 000B 0016  SPKP6CK   COMCP
1148 0027 001B 0017            BL       SPKP6CK'                              < 2322>
     000E 0080 0018
1149 001D 0018 0019  PG12LNK   CALLL    LOADADDR                              < 0387>
     003A 00C0 0020
1150 0035 001B 0021            CALLL    SPEAKIT                               < 1200>
     002B 00C3 0022
1151 0016 0048 0023            TCY      YLINK1
1152 002C 0018 0024            CALLL    LOADADDR                              < 0387>
     0018 00C0 0025
1153 0030 001B 0026            CALLL    SPEAKIT                               < 1200>
     0021 00C3 0027
1154 0002 0044 0028  SAYLNK2   TCY      YLINK2
1155 0003 002B 0029            LDX      6
1156 000B 0023 0030            TYA
1157 0017 004F 0031            TCY      15
1158 002E 0003 0032            TAM               SETUPS INITIAL LINK POINTER
1159 001C 0044 0033            TCY      YLINK2
1160 0038 00E4 0034            CALL     CKADZERO                              < 1172>
1161 0031 0070 0035            ALEC     0
1162 0023 00AD 0036            BR       CKLINK                                < 1167>
1163 0006 0018 0037  SPKIT     CALLL    LOADADDR                              < 0387>
     000D 00C0 0038
1164 001B 001B 0039            CALLL    SPEAKIT  SPEAKS OBJECT STRING         < 1200>
     0036 00C3 0040
1165 *                         NO BASIC/ARTICLE INCLUDED
1166 *                         DETERMINE HOW MANY TO SPEAK & LOOP
1167 002D 004F 0041  CKLINK    TCY      15
1168 001A 002B 0042            LDX      6
1169 0034 0002 0043            IMAC
1170 0029 0003 0044            TAM
1171 0012 0022 0045            TMY               LINK Y POINTER
1172 0024 002E 0046  CKADZERO  LDX      XDIG4
1173 0008 0026 0047            MNEZ
1174 0011 00B2 0048            BR       GOODADDR                              < 1182>
1175 0022 0029 0049            LDX      XDIG3
1176 0004 0026 0050            MNEZ
1177 0009 00B2 0051            BR       GOODADDR                              < 1182>
1178 0013 002D 0052            LDX      XDIG2
1179 0026 0026 0053            MNEZ
1180 000C 00B2 0054            BR       GOODADDR                              < 1182>
1181 0019 0028 0055            LDX      XDIG1
1182 0032 0021 0056  GOODADDR  TMA               ACC = 0 IF BAD ADDR/LINK END
1183 0025 000F 0057            RETN
1184 000A 0070 0058            ALEC     0
1185 0015 00A8 0059            BR       ENDSPKP6                              < 1188>
```

```
1186 002A 0051 0060            YNEC      YLNKEND    END OF LINK BUFFER
1187 0014 0086 0061            BR        SPKIT                          < 1163>
1188 0023 000B 0062  ENDSPKP6  COMCP
1189 0010 0016 0063            BL        CKRETURN                       < 1919>
     0020 0091 0064
1190 *PPPPPPPPPPPPPPPPPPPPPPPPPPPPPPPPPPPPPPPPPPPPPPPPPP
1191 *                          SPEAK P7 'SPEAK & SEEK'
1192 *                          X034-X035 ADDRESS IN ROM
1193                  ORGPG     13
1194 0000 001F 0001            BL        CLRRAM  IN CASE K2 WASN"T OFF< 1364>
     0001 0080 0002
1195 *                          DURING POWER ON
1196 *---------------------------------------------------------------
1197 *          SPEAK THE DATA ALREADY LOADED
1198 *          REQUIRES A CALL LOAD BEFORE
1199 *
1200 0003 0040 0003  SPEAKIT   TCY       0          FIRST CLEAR R 0-8
1201 0007 002C 0004            LDX       1
1202 000F 000C 0005  LOOPCLR   RSTR
1203 001F 0059 0006            YNEC      9
1204 003F 008F 0007            BR        LOOPCLR                        < 1202>
1205 003E 0045 0008            TCY       10
1206 003D 0023 0009            TYA                  SETUS SPEAK CONTROL CONSTANT
1207 003B 0001 0010            YNEA                 RESETS STATUS LATCH
1208 0037 000A 0011            TDO                  >0A
1209 002F 000D 0012            SETR
1210 001E 000C 0013            RSTR                 280 NOW SPEAKING
1211 003C 0047 0014            TCY       14
1212 0039 0023 0015            TYA                  SETUP TEST TALK LATCH
1213 0033 0001 0016            YNEA                 RESETS STATUS LATCH
1214 0027 000A 0017            TDO                  >0D
1215 000E 0045 0018            TCY       PDC
1216 001D 000D 0019            SETR                 1ST PDC LOADS COMMAND
1217 003A 000C 0020            RSTR
1218 0035 0045 0021            TCY       PDC
1219 002B 000D 0022            SETR                 2ND PDC APPLIES TALK TO CTLS
1220 0016 000C 0023            RSTR
1221 002C 004F 0024  TALKLP    TCY       15
1222 0018 0008 0025            TKA                  CKECK K4 FOR ON
1223 0030 0003 0026            TAM
1224 0021 0039 0027            TBIT      2
1225 0002 00AC 0028            BR        TALKLP                         < 1221>
1226 0005 0045 0029  TALKOVER  TCY       PDC
1227 000B 000D 0030            SETR                 3RD PDC RELEASES OUTPUT
1228 0017 000C 0031            RSTR
1229 002E 004B 0032  CKCHAPT   TCY       YMODE
1230 001C 002E 0033            LDX       XMODE
1231 0038 003B 0034            TBIT      3
1232 0031 0086 0035            BR        DONE'     BRANCHES FOR TALK OR < 1234>N
1233 0023 000B 0036            COMCP
1234 0006 002C 0037  DONE'     LDX       1
1235 000D 000F 0038            RETN
1236 *          COMPARE OVERLAY # TO ROM OL #
1237 *                    'COMPARE#'
1238 *          A = ZERO UPON RETURN IF NO MATCH
1239 *---------------------------------------------------------------
1240 001B 0048 0039  COMPARE#  TCY       YOLLSD
1241 0036 002C 0040            LDX       XOL#
1242 002D 0021 0041            TMA
1243 001A 002F 0042            LDX       XOLACT
1244 0034 0022 0043            TMY
1245 0029 0001 0044            YNEA
1246 0012 0084 0045            BR        NOTEQUAL                       < 1251>
1247 0024 0040 0046            TCY       YOLMSD
1248 0008 0021 0047            TMA
1249 0011 002C 0048            LDX       XOL#
1250 0022 0022 0049            TMY
1251 0004 0001 0050  NOTEQUAL  YNEA
1252 0009 0099 0051            BR        NOMATCH                        < 1256>
1253 0013 004F 0052            TCY       15
```

```
1254 0026 0023 0053              TYA
1255 000C 00B2 0054              BR    EXIT1                        < 1257>
1256 0019 003F 0055   NOMATCH    CLA
1257 0032 00AE 0056   EXIT1      BR    CKCHAPT'                     < 1229>
1258 0025 0018 0057   KEYSPK''   CALLL LOADADDR                     < 0387>
     000A 00C0 0058
1259 0015 00C3 0059              CALL  SPEAKIT    RAM NO GO         < 1200>
1260 002A 001F 0060              CALLL CKKEYS                       < 1427>
     0014 00ED 0061
1261 *                  CLEAR R & OL LINES
1262 *         TEST ALTERNATE R   LINES R0,R2,R4,R6,R8
1263 *                     K LINES K1,K4
1264 0028 004A 0062              TCY   5
1265 0010 0012 0063              BL    KEYTEST'                     < 0675>
     0020 00B2 0064
1266                             PAGE
1267 *PPPPPPPPPPPPPPPPPPPPPPPPPPPPPPPPPPPPPPPPPPPPPPPPPPPPPPPPPPP
1268 *************************************************************
1269 *              ANSWER STRING ADDRESS SUBROUTINE
1270 *              FETCHES THE ADDRESS OF THE
1271 *              ANSWER USING THE KEY STORED IN THE
1272 *              R/K BUFFER
1273 *              ADDRESS RETURNED IN THE DIGIT ADDR. BUFFER
1274 *              ASSUMES OL TABLE ADDRESS IN THE DIG. BUFFER
1275 *              UPON CALL
1276 *************************************************************
1277 0000 004F 0001   ANSADD     TCY   15
1278 0001 003F 0002              CLA
1279 0003 002E 0003              LDX   XDIG4
1280 0007 0003 0004              TAM              SET LOOP FLAG
1281 *                  ADD TABLE BIAS & R/K DELTA
1282 *                  TO THE TABLE ADDRESS
1283 000F 0041 0005   ADDO8      TCY   8
1284 001F 0023 0006              TYA
1285 003F 0028 0007   LOOP14     LDX   XDIG1
1286 003E 0047 0008              TCY   YROMTEMP
1287 003D 0025 0009              AMAAC
1288 003B 009E 0010              BR    ADDIG2                       < 1291>
1289 0037 0003 0011              TAM
1290 002F 00AE 0012              BR    ADDRK                        < 1311>
1291 001E 0003 0013   ADDIG2     TAM
1292 003C 002D 0014              LDX   XDIG2
1293 0039 0047 0015              TCY   YROMTEMP
1294 0033 0002 0016              IMAC
1295 0027 00BA 0017              BR    ADDDIG3                      < 1298>
1296 000E 0003 0018              TAM
1297 001D 00AE 0019              BR    ADDRK                        < 1311>
1298 003A 0003 0020   ADDDIG3    TAM
1299 0035 0029 0021              LDX   XDIG3
1300 002B 0047 0022              TCY   YROMTEMP
1301 0016 0002 0023              IMAC
1302 002C 00A1 0024              BR    ADDDIG4                      < 1305>
1303 0018 0003 0025              TAM
1304 0030 00AE 0026              BR    ADDRK                        < 1311>
1305 0021 0003 0027   ADDDIG4    TAM
1306 0002 002E 0028              LDX   XDIG4
1307 0005 0047 0029              TCY   YROMTEMP
1308 000B 0002 0030              IMAC
1309 0017 0003 0031              TAM              DIGIT BUFFER NOW POINTS TO TC
1310 *                  OF THE ANSWER STRING TABLE                   C
1311 002E 004F 0032   ADDRK      TCY   15
1312 001C 002E 0033              LDX   XDIG4
1313 0038 0002 0034              IMAC
1314 0031 0003 0035              TAM
1315 0023 0078 0036              ALEC  1
1316 0006 00A9 0037              BR    ADDINK                       < 1323>
1317 000D 000B 0038              COMCP
1318 001B 0074 0039              ALEC  2
1319 0036 00BD 0040              BR    ADDRLSD                      < 2399>
1320 002D 007C 0041              ALEC  3
1321 001A 00B3 0042              BR    ADDRMSD                      < 2406>
1322 0034 0030 0043              BR    RETNCK    MUST BE ON PAGE 30  < 2391>
1323 0029 0047 0044   ADDINK     TCY   YKLINE    POINT TO K VALUE
```

```
1324 0012 002B 0045            LDX      XKNEW
1325 0024 003F 0046            CLA
1326 0008 0038 0047            TBIT     0
1327 0011 00B2 0048            BR       ADD1            <1336>
1328 0022 003A 0049            TBIT     1
1329 0004 0099 0050            BR       ADD2            <1335>
1330 0009 0039 0051            TBIT     2
1331 0013 008C 0052            BR       ADD4            <1334>
1332 *                         K8 MUST BE SET
1333 0026 0004 0053  ADD8      A2AA
1334 000C 0004 0054  ADD4      A2AA
1335 0019 0004 0055  ADD2      A2AA
1336 0032 00BF 0056  ADD1      BR       LOOP14          <1285>
1337 *------------------------------------------------------------
1338 *                     COMPLETE P6  SENTENCE OR
1339 *                     COMPLETE P1  SENTENCE OR
1340 *                     COMPLETE P4  SENTENCE OR
1341 *                     COMPLETE P5  SENTENCE
1342 *                         THAN SPEAK IT
1343 *
1344 0025 002C 0057  COMPLP6   LDX      1
1345 *                     CLEAR THE OBJECT BUFFER
1346 *                     ALSO USED AS A SUBROUTINE VIA BRANCHES
1347 000A 0045 0058  CLRNEXT   TCY      YDATDIG4
1348 0015 0060 0059  CLRNEXT'  TCMIY    0
1349 002A 0057 0060            YNEC     YMODULO
1350 0014 0095 0061            BR       CLRNEXT'        <1348>
1351 0028 004B 0062            TCY      YMODE
1352 0010 0015 0063            BL       CLRNXT          <1011>
     0020 0080 0064
1353                           ORGPG    15
1354 *PPPPPPPPPPPPPPPPPPPPPPPPPPPPPPPPPPPPPPPPPPPPPPPPPPPPPPPPPPPPPPPP
1355 *
1356 *
1357 *
1358 *                     POWER UP / CLEAR ROUTINE
1359 *
1360 *            THIS ROUTINE SETS UP INITIAL CONDITIONS IN RAM
1361 *
1362 *------------------------------------------------------------
1363 *
1364 0000 003F 0001  CLRRAM    CLA               CLEARS ALL OF RAM
1365 0001 0003 0002  LOOP      TAM
1366 0003 0009 0003            COMX
1367 0007 0020 0004            TAMIY
1368 000F 0009 0005            COMX
1369 001F 0050 0006            YNEC     0        WRAP AROUND CONDITION
1370 003F 0081 0007            BR       LOOP            <1365>
1371 003E 000F 0008            RETN
1372 003D 00C0 0009            CALL     CLRRAM   CLEAR RAM REG. 0 & 4  <1364>
1373 003B 002C 0010            LDX      1
1374 0037 00C0 0011            CALL     CLRRAM   CLEAR RAM REG. 1 & 5  <1364>
1375 002F 002A 0012            LDX      2
1376 001E 00C0 0013            CALL     CLRRAM   CLEAR RAM REG. 2 & 6  <1364>
1377 003C 002E 0014            LDX      3
1378 0039 00C0 0015            CALL     CLRRAM   CLEAR RAM REG. 3 & 7  <1364>
1379 *
1380 0033 0049 0016            TCY      9        JUST IN CASE FIRST ONE FAILED
1381 0027 000D 0017            SETR              LATCHES POWER UP TRANSISTOR ON
1382 *                                                                        N
1383 *                                                                        N
1384 *                         RESET SPEECH DEVICE(280)                       N
1385 *                                                                        N
1386 *                         RESETS TALK LATCH, INTERPOLATE,                N
1387 *                         PARAMETER, & TIME COUNTERS                     N
1388 *                                                                        N
1389 000E 0001 0018            YNEA              SETS STATUS LATCH
1390 001D 000A 0019  RESET     TDO               RESETS ALL CONTROL LINES
1391 003A 0045 0020  LOOP1     TCY      PDC
1392 0035 000D 0021            SETR
1393 002B 0007 0022            DCA
1394 0016 000C 0023            RSTR
1395 002C 007B 0024            ALEC     13
```

```
1396 0018 00A1 0025            BR      RESET1                       < 1400>
1397 0030 00BA 0026            BR      LOOP1                        < 1391>
1398 *                         280 NOW CLEAR
1399 *                         DO DUMMY READ TO SYNC. CHIPS
1400 0021 0041 0027  RESET1    TCY     8
1401 0002 0023 0028            TYA
1402 0005 0001 0029            YNEA            RESETS STATUS LATCH
1403 000B 000A 0030            TDO             SETS READ COMMAND INTO 280
1404 0017 0045 0031            TCY     PDC
1405 002E 000D 0032            SETR
1406 001C 000B 0033            COMCP
1407 0038 000C 0034            RSTR
1408 0031 001F 0035            BL      DOSPKDAT                     < 2500>
     0023 008D 0036
1409 *
1410 *
1411 *                         DIAGNOSTIC TESTS
1412 *
1413 *                    SPECIAL KEY ASSIGNMENTS
1414 *
1415 *       KEY #    R LINE    K LINE     FUNCTION
1416 *-------------------------------------------------------------
1417 *         6        7         8        KEYBOARD TEST 2
1418 *        12        7         2        CHECKSUM RESIDENT POINTERS
1419 *        18        7         1        CHECKSUM RESIDENT SPEECH
1420 *        24        7         4        CHECKSUM DROPIN  POINTERS
1421 *        30        5         1        CHECKSUM DROPIN  SPEECH
1422 *        36       VSS        2        ON KEY
1423 *        31        8         1        OFF KEY
1424 *-------------------------------------------------------------
1425 0006 0018 0037  KEYSPKK   CALLL    LOADADDR                    < 0387>
     000D 00C0 0038
1426 001B 001B 0039            CALLL    SPEAKIT  SPEAKS KEY GO/NOGO < 1200>
     0036 00C3 0040
1427 002D 003F 0041  CKKEYS    CLA
1428 001A 000A 0042            TDO              RESETS ALL O LINES
1429 0034 0040 0043  CLRRLINE  TCY      0
1430 0029 002C 0044            LDX      1
1431 0012 000C 0045  LOOP''    RSTR
1432 0024 0059 0046            YNEC     9
1433 0008 0092 0047            BR       LOOP''                      < 1431>
1434 0011 000F 0048            RETN
1435 0022 0018 0049            BL       CKKEYCON                    < 0453>
     0004 008A 0050
1436 *
1437 0009 002C 0051  DIAGCK'   LDX      1
1438 0013 003B 0052            TBIT     3
1439 0026 00B2 0053            BR       DIAGDO   DIAGNOSTIC MODE    < 1441>
1440 000C 0011 0054            BL       GETOL#                      < 0933>
     0019 00B4 0055
1441 0032 002F 0056  DIAGDO    LDX      7
1442 0025 0040 0057            TCY      0
1443 000A 0038 0058            TBIT     0        RAM GO FLAG
1444 0015 00A8 0059            BR       RAMNOGO                     < 1448>
1445 *                         RAMGO _KEY TEST
1446 002A 0044 0060  RAMGO'    TCY      2
1447 0014 0090 0061            BR       KEYSPK'                     < 1449>
1448 0028 0040 0062  RAMNOGO   TCY      0
1449 0010 001B 0063  KEYSPK'   BL       KEYSPK''                    < 1258>
     0020 00A3 0064
1450 *PPPPPPPPPPPPPPPPPPPPPPPPPPPPPPPPPPPPPPPPPP
1451                           CHAPTER
1452 *PPPPPPPPPPPPPPPPPPPPPPPPPPPPPPPPPPPPPPPPPPPPPPPPP
1453 *
1454 *                    THIS MUST RESIDE ON PAGE 16
1455 *                    CONTINUATION OF READ SUBROUTINE
1456 *
1457 0000 000C 0001  FIRSTTIM  RSTR
1458 0001 0045 0002            TCY      PDC
1459 0003 000D 0003            SETR             NOW SHIFTED ANOTHER BIT
1460 0007 000C 0004            RSTR
1461 000F 002D 0005            LDX      XMODE1
1462 001F 004B 0006            TCY      YMODE1
```

```
1463 003F 0032 0007            SBIT      1           CLEARS FIRST TIME FLAG
1464 003E 002C 0008   NXTBIT   LDX       1
1465 003D 0045 0009            TCY       PDC
1466 003B 000D 0010            SETR                  LSB NOW IN CTL1 POSITION
1467 0037 0045 0011            TCY       PDC         DUMMY INST
1468 002F 000C 0012            RSTR
1469 *
1470 001E 0042 0013            TCY       4
1471 003C 0023 0014            TYA
1472 0039 000A 0015            TDO                   SET UP DATA OUTPUT CONTROL COMMAND
1473 0033 0045 0016            TCY       PDC
1474 0027 000D 0017            SETR                  1ST PDC LOADS DATA CONTROL COMMAND
1475 000E 0045 0018            TCY       PDC         DUMMY INST
1476 001D 000C 0019            RSTR
1477 003A 0045 0020            TCY       PDC
1478 0035 000D 0021            SETR                  2ND PDC APPLIES OUTPUT BIT(CTL1) TO K4
1479 002B 0045 0022            TCY       PDC         DUMMY INST
1480 0016 000C 0023            RSTR
1481 *                                   BUILD INPUT NIBBLE
1482 *
1483 002C 004B 0024            TCY       YLSDDATA
1484 *                                   SHIFT RIGHT ONE BIT
1485 0018 0034 0025   CKBIT1   RBIT      0
1486 0030 003A 0026            TBIT      1
1487 0021 00B2 0027            BR        SETBIT0                              < 1517>
1488 0002 0036 0028   CKBIT2   RBIT      1
1489 0005 0039 0029            TBIT      2
1490 000B 008A 0030            BR        SETBIT1                              < 1519>
1491 0017 0035 0031   CKBIT3   RBIT      2
1492 002E 003B 0032            TBIT      3
1493 001C 00AA 0033            BR        SETBIT2                              < 1521>
1494 0038 0033 0034   CKINPUT  SBIT      3           CK FOR K4 SET
1495 0031 0008 0035            TKA
1496 0023 003E 0036            XMA
1497 0006 0039 0037            TBIT      2
1498 000D 009A 0038            BR        STOPREAD                             < 1502>
1499 001B 003E 0039            XMA
1500 0036 0037 0040            RBIT      3
1501 002D 003E 0041            XMA
1502 001A 003E 0042   STOPREAD XMA
1503 0034 0045 0043            TCY       PDC
1504 0029 000D 0044            SETR                  3RD PDC TERMINATES READ
1505 0012 0045 0045            TCY       PDC         DUMMY INST
1506 0024 000C 0046            RSTR
1507 *                                   CHECK FOR 4 BITS DONE
1508 0008 004F 0047            TCY       15
1509 0011 0002 0048            IMAC
1510 0022 0003 0049            TAM                   BUMP BIT COUNT
1511 0004 000B 0050            COMCP
1512 0009 0038 0051            TBIT      0
1513 0013 00A1 0052            BR        SETREAD    DO NEXT BIT               < 0338>
1514 0026 003A 0053            TBIT      1
1515 000C 00A1 0054            BR        SETREAD    DO NEXT BIT               < 0338>
1516 0019 0092 0055            BR        RDLINK                               < 0359>
1517 0032 0030 0056   SETBIT0  SBIT      0
1518 0025 0082 0057            BR        CKBIT2                               < 1488>
1519 000A 0032 0058   SETBIT1  SBIT      1
1520 0015 0097 0059            BR        CKBIT3                               < 1491>
1521 002A 0031 0060   SETBIT2  SBIT      2
1522 0014 00B8 0061            BR        CKINPUT                              < 1494>
1523 0028 002C 0062   PWROFF   LDX       1
1524 0010 0049 0063            TCY       9
1525 0020 000C 0064            RSTR                  POWER NOW OFF
1526                            PAGE     17
1527 *PPPPPPPPPPPPPPPPPPPPPPPPPPPPPPPPPPPPPPPPPPPPPPPPP
1528 0000 002C 0001   PG17LINK LDX       1
1529 *
1530 *                         MOVE ADDRESS FROM THE OL TABLE REG
1531 *                         TO THE TEMPORARY ROM ADDRESS REGISTER
1532 *
1533 0001 0044 0002            TCY       YOLTABD1
1534 0003 0021 0003            TMA
1535 0007 0028 0004            LDX       XDIG1
```

```
1536 000F 0047 0005                      TCY      YROMTEMP
1537 001F 0003 0006                      TAM
1538 003F 002C 0007                      LDX      1
1539 003E 004A 0008                      TCY      YOLTABD4
1540 003D 0021 0009                      TMA
1541 003B 002E 0010                      LDX      XDIG4
1542 0037 0047 0011                      TCY      YROMTEMP
1543 002F 0003 0012                      TAM
1544 001E 002C 0013                      LDX      1
1545 003C 0042 0014                      TCY      YOLTABD3
1546 0039 0021 0015                      TMA
1547 0033 0029 0016                      LDX      XDIG3
1548 0027 0047 0017                      TCY      YROMTEMP
1549 000E 0003 0018                      TAM
1550 001D 002C 0019                      LDX      1
1551 003A 004C 0020                      TCY      YOLTABD2
1552 0035 0021 0021                      TMA
1553 002B 0047 0022                      TCY      YROMTEMP
1554 0016 002D 0023                      LDX      XDIG2
1555 002C 0003 0024                      TAM
1556 0018 004B 0025   LOADLINK           TCY      YMODE
1557 0030 002E 0026                      LDX      XMODE
1558 0021 003B 0027                      TBIT     3
1559 0002 008B 0028                      BR       RETN1                   <1561>
1560 0005 000B 0029                      COMCP
1561 000B 000B 0030   RETN1              COMCP
1562 0017 004F 0031                      TCY      15
1563 002E 002E 0032                      LDX      XDIG4
1564 001C 0022 0033                      TMY      ORIGINAL VALUE RESTORED
1565 0038 000F 0034                      RETN
1566 0031 0023 0035   ROM#CONT  TYA
1567 0023 004F 0036                      TCY      15
1568 0006 002E 0037                      LDX      XDIG4
1569 000D 0003 0038                      TAM      SAVES ORIGINAL Y VALUE
1570 001B 0024 0039                      TAY
1571 0036 003F 0040                      CLA
1572 002D 0029 0041                      LDX      XDIG3
1573 001A 0003 0042                      TAM             (Y,XDIG3) = 0
1574 0034 004B 0043                      TCY      YMODE
1575 0029 002E 0044                      LDX      XMODE
1576 0012 0039 0045                      TBIT     2        IS DROPIN OL FLAG SET?
1577 0024 0091 0046                      BR       SETDROP                 <1579>
1578 0008 0084 0047                      BR       ROMRETN                 <1581>
1579 0011 0004 0048   SETDROP   A2AA
1580 0022 0004 0049             A2AA              DROPIN BIT NOW SET + THE ORIGINAL ACC
1581 0004 002E 0050   ROMRETN   LDX      XDIG4
1582 0009 004F 0051                      TCY      15
1583 0013 0022 0052                      TMY      GETS ORIGINAL Y VALUE
1584 0026 0003 0053                      TAM             (Y,XDIG4) = DROPIN 4 OR 0
1585 000C 0098 0054                      BR       LOADLINK  GO RETURN     <1556>
1586 *
1587 *
1588 *                  DO DUMMY READ TO SYNC. CHIPS
1589 *                     5TH ADDRESS NIBBLE=0
1590 0019 000C 0055   LOADCONT  RSTR
1591 0032 0041 0056                      TCY      3
1592 0025 0023 0057                      TYA
1593 000A 0001 0058                      YNEA              RESETS STATUS LATCH
1594 0015 000A 0059                      TDO               SETS READ COMMAND INTO 280
1595 002A 0043 0060                      TCY      PDC      DUMMY INST
1596 0014 000D 0061                      SETR
1597 0028 000C 0062                      RSTR
1598 0010 0098 0063                      BR       LOADLINK  DUMMY BRANCH NEEDED<1556>
1599 0020 0098 0064                      BR       LOADLINK                <1556>
1600 *-------------------------------------------------------------------
1601                                     PAGE     18
1602 *PPPPPPPPPPPPPPPPPPPPPPPPPPPPPPPPPPPPPPPPPPPPPPP
1603 *
1604 *          GO INITIALIZE ANSWER SWITCH BUFFER
1605 0000 0040 0001   USENEWRK  TCY      OLMSD
1606 0001 002C 0002             LDX      1
1607 0003 0031 0003             SBIT     2
```

```
1608 0007 001B 0004           CALLL    CPORTN                      < 2384>
     000F 00D4 0005
1609 001F 000B 0006           COMCP
1610 003F 0015 0007           BL       GETARTAD                    < 1021>
     003E 00BD 0008
1611 003D 0036 0009  SPKP4SPH RBIT     1
1612 003B 0011 0010           CALLL    CP1RTN                      < 2032>
     0037 00C5 0011
1613 002F 001B 0012           BL       SPKP4                       < 2352>
     001E 00B0 0013
1614 003C 0035 0014  SVSW#    RBIT     2
1615 0039 003A 0015           TBIT     1         NOP BRANCH?
1616 0033 00BD 0016           BR       SPKP4SPH                    < 1611>
1617 0027 002C 0017  SVSW#''  LDX      1
1618 000E 0043 0018           TCY      YDATDIG2     ????CHECK OUT THIS VALUE
1619 001D 0021 0019           TMA
1620 003A 004E 0020           TCY      YSW#         # OF CORRECT SWITCHES
1621 0035 002F 0021           LDX      XSW#
1622 002B 0003 0022           TAM
1623 0016 0011 0023           CALLL    CP1RTN                      < 2032>
     002C 00C5 0024
1624 0018 000B 0025  LOOPSW   COMCP
1625 0030 0010 0026           CALLL    READNEX2     SAVE ALL SWITCH< 0326>F
     0021 00F9 0027
1626 *                                 CK ON RETURN BRANCH
1627 0002 0040 0028           TCY      OLMSD
1628 0005 002C 0029           LDX      1
1629 000B 001C 0030           LDP      3
1630 0017 003B 0031           TBIT     3
1631 002E 009A 0032           BR       CKSWCMPR                    < 1723>
1632 001C 0014 0033           LDP      2
1633 *                        SWITCH # IN YDATDIG1,2
1634 *                        MOVE INTO CORRECT SWITCH BUFFER
1635 0038 004B 0034  SAVESW#  TCY      YDATDIG1
1636 0031 002C 0035           LDX      1
1637 0023 0021 0036           TMA
1638 0006 002F 0037           LDX      XCOUNT
1639 000D 0043 0038           TCY      YCOUNT
1640 001B 0022 0039           TMY
1641 0036 002B 0040           LDX      XRKEY
1642 002D 0003 0041           TAM                  SAVE LSD SWITCH #
1643 001A 0043 0042           TCY      YDATDIG2
1644 0034 002C 0043           LDX      1
1645 0029 0021 0044           TMA
1646 0012 002F 0045           LDX      XCOUNT
1647 0024 0043 0046           TCY      YCOUNT
1648 0008 0022 0047           TMY
1649 0011 002A 0048           LDX      XK           ?????????????
1650 0022 0003 0049           TAM      SAVE SWITCH MSD
1651 0004 000B 0050           COMCP
1652 0009 001C 0051           CALLL    CKCOUNT                     < 0613>
     0013 00EA 0052
1653 0026 0070 0053           ALEC     0
1654 000C 00B2 0054           BR       SAVERK       GO SAVE SELECTED R-< 1657>T
1655 0019 0098 0055           BR       LOOPSW                      < 1624>
1656 *                        SAVES R-K IN TARGET R-K BUFFER
1657 0032 002B 0056  SAVERK   LDX      XKNEW
1658 0025 004B 0057  RKSAVE   TCY      YKEYRX
1659 000A 0021 0058           TMA
1660 0015 0009 0059           COMX                  X NOW 6 OR 2
1661 002A 0020 0060           TAMIY
1662 0014 0009 0061           COMX                  X NOW 6 OR 2
1663 0028 0021 0062           TMA
1664 0010 0012 0063           BL       SAVERK'                     < 1747>
     0020 0080 0064
1665 *PPPPPPPPPPPPPPPPPPPPPPPPPPPPPPPPPPPPPPPPPPP
1666                          PAGE     19
1667 *                        MAKE TIMER MODULO 36 FOR
1668 *                        FIRST 6 BITS
1669 0000 0046 0001  TIMECONT TCY      YTIMELSD
1670 0001 0021 0002           TMA
1671 0003 0042 0003           TCY      4
```

```
1672 0007 0001 0004            YNEA
1673 000F 00B9 0005            BR      RETN3''                        <1687>
1674 001F 004A 0006            TCY     YTIMENSD
1675 003F 003A 0007            TBIT    1
1676 003E 00BB 0008            BR      HIT36                          <1681>
1677 003D 00B9 0009            BR      RETN3''                        <1687>
1678 *                 VALUE REACHED 36 COUNT
1679 *                 MUST CLEAR FIRST 6 BITS
1680 *                 AND BUMP BIT 7
1681 003B 0030 0010   HIT36    SBIT    0       FORCE TIMENSD >OR = 8
1682 0037 003F 0011            CLA
1683 002F 0046 0012            TCY     YTIMELSD
1684 001E 000B 0013            COMCP
1685 *                 GO STORE >F IN TIMELSD & THAN BUMP
1686 003C 0088 0014            BR      CARRY                          <0599>
1687 0039 000B 0015   RETN3''  COMCP
1688 0033 0089 0016            BR      RETURN3                        <0603>
1689 0027 001E 0017   CKAGAIN' LDP     7
1690 000E 003B 0018            TBIT    3
1691 001D 00D2 0019            CALL    ADD2''                         <1980>
1692 003A 001C 0020   CKAGAIN  LDP     3
1693 0035 004B 0021            TCY     YKEYRX
1694 002B 002B 0022            LDX     XRNEW
1695 0016 0003 0023            TAM
1696 *        ALEC    8
1697 *        BR      GETK
1698 *        A6AA
1699 *        DCA
1700 *        A2AA            NOW + 7 = 0-6
1701 *        BR      CKAGAIN
1702 002C 0046 0024   GETK     TCY     YTIMELSD
1703 0018 002F 0025            LDX     XTIME
1704 0030 0021 0026            TMA
1705 0021 0017 0027            BL      GETK'                          <2443>
     0002 008C 0028
1706 0005 0070 0029   CKK8''   ALEC    0
1707 000B 00A3 0030            BR      GETK8                          <1713>
1708 0017 0074 0031            ALEC    2       K1 OR K2 CASE
1709 002E 0086 0032            BR      ANSNEW?                        <1719>
1710 001C 0002 0033   GETK4    IMAC                    K4 CASE
1711 0038 0003 0034            TAM
1712 0031 0086 0035            BR      ANSNEW?                        <1719>
1713 0023 0033 0036   GETK8    SBIT    3       K8 CASE
1714 *                 CANIDATE ANSWER NOW IN R-K BUFFER
1715 *                     R-K BUF NOW SETUP K(1,2,4,8) R(0-8)
1716 *                     NOW CHECK FOR NEW ANSWER SELECTION
1717 *                     DOES NEW R-K = LAST SWITCH USED
1718 *              GET NEW SWITCH # AND COMPARE TO LAST ONE
1719 0006 0040 0037   ANSNEW?  TCY     YOLMSD
1720 000D 002C 0038            LDX     1
1721 001B 0033 0039            SBIT    3       TEMPORARY BRANCH BIT
1722 0036 0014 0040   USENEW'  BL      USENEWRK                       <1605>
     002D 0080 0041
1723 001A 0037 0042   CKSWCMPR RBIT    3       RESET TEMP. BRANCH FLAG
1724 0034 004B 0043            TCY     YDATDIG1
1725 0029 002C 0044            LDX     1
1726 0012 0021 0045            TMA                     GET SWITCH #
1727 0024 002F 0046            LDX     XCOUNT
1728 0008 0043 0047            TCY     YCOUNT
1729 0011 0022 0048            TMY
1730 0022 002B 0049            LDX     XRKEY
1731 0004 0022 0050            TMY                     GETS OLD R  VALUE
1732 0009 0001 0051            YNEA
1733 0013 00B6 0052            BR      USENEW'                        <1722>
1734 0026 0043 0053            TCY     YDATDIG2
1735 000C 002C 0054            LDX     1
1736 0019 0021 0055            TMA                     GETS NEW K VALUE
1737 0032 002F 0056            LDX     XCOUNT
1738 0025 0043 0057            TCY     YCOUNT
1739 000A 0022 0058            TMY
1740 0015 002A 0059            LDX     XK
1741 002A 0022 0060            TMY                     GETS OLD K  VALUE
```

```
1742 0014 0001 0061              YNEA
1743 0028 00B6 0062              BR       USENEW                              < 1722>
1744 0010 001A 0063              BL       LEARN     TRY AGAIN AS NOT NE< 1866>
     0020 008A 0064
1745                             PAGE     20
1746 *PPPPPPPPPPPPPPPPPPPPPPPPPPPPPPPPPPPPPPPPPPPPPPPPPPPPPPP
1747 0000 0009 0001  SAVERK      COMX              X NOW 6 OR 7
1748 0001 0003 0002              TAM
1749 0003 004B 0003  SPEAKP1     TCY      YMODE1
1750 0007 002D 0004              LDX      XMODE1
1751 000F 0031 0005              SBIT     2        SETUP FOR P1 PHRASE RETURN
1752 001F 0037 0006              RBIT     3
1753 003F 000B 0007              COMCP
1754 003E 0017 0008              BL       COMPLP6  GO GET & SPEAK P1  < 1344>
     003D 00A3 0009
1755 003B 000B 0010  ATRILNK     COMCP
1756 0037 0037 0011              RBIT     3
1757 002F 0018 0012              BL       ATRIBGET                           < 0446>
     001E 0093 0013
1758 003C 0040 0014  RTNLNK      TCY      OLMSD
1759 0039 002C 0015              LDX      1
1760 0033 003B 0016              TBIT     3        RETURN BIT
1761 0027 00BB 0017              BR       ATRILNK                            < 1755>
1762 *
1763 *                           FETCH A = ARTICLE INDEX
1764 *                           NOW IN DATDIG3
1765 000E 004B 0018  ARTINDEX    TCY      YDATDIG1
1766 001D 002C 0019              LDX      1
1767 003A 0021 0020              TMA
1768 0035 004F 0021              TCY      15
1769 002B 0003 0022              TAM
1770 0016 0023 0023              AMAAC
1771 002C 0006 0024              A6AA
1772 0018 0003 0025              TAM
1773 *                      ARTICLE INDEX*2 +6 NOW IN (1,15)
1774 *                      GO READ ARTICLE ADDRESS
1775 0030 0028 0026              LDX      XDIG1
1776 0021 0047 0027              TCY      YROMTEMP
1777 0002 0003 0028              TAM
1778 0003 003F 0029              CLA
1779 000B 002D 0030              LDX      XDIG2
1780 0017 0003 0031              TAM
1781 *                           GET AN
1782 002E 000B 0032              COMCP
1783 001C 0016 0033              BL       ATTRRTN                            < 0760>
     0038 0080 0034
1784 *                      VERIFY EXT. PORT CAN BE READ
1785 0031 0011 0035  EXTPORT     CALLL    CP1RTN                             < 2032>
     0023 00C5 0036
1786 0006 004A 0037              TCY      5
1787 000D 0023 0038              TYA
1788 001B 0047 0039              TCY      YROMTEMP
1789 0036 002D 0040              LDX      XDIG2
1790 002D 0003 0041              TAM
1791 001A 0006 0042              A6AA
1792 0034 0007 0043              DCA
1793 0029 0028 0044              LDX      XDIG1
1794 0012 0003 0045              TAM
1795 0024 0029 0046              LDX      XDIG3
1796 0008 0003 0047              TAM
1797 0011 002E 0048              LDX      XDIG4
1798 0022 0003 0049              TAM               PORT ADD. = AA5A
1799 0004 000B 0050              COMCP
1800 0009 0018 0051              CALLL    LOADADDR                           < 0387>
     0013 00C0 0052
1801 0026 000B 0053              COMCP
1802 000C 0010 0054              CALLL    READ                               < 0312>
     0019 00C0 0055
1803 0032 000B 0056              COMCP
1804 0025 0010 0057              CALLL    READNEXT GET ADDRESS TO SPEAK  < 0328>
     000A 00E7 0058
1805 0015 001B 0059              CALLL    CPORTN                             < 2384>
```

```
           002A 00D4 0060
1806 0014 0049 0061           TCY     YDATDIG5
1807 0023 002C 0062           LDX     1
1808 0010 001D 0063           BL      XPORT                       < 2249>
           0020 00A5 0064
1809                          PAGE    21
1810 *             NOW SEE IF CORRECT KEY WAS SELECTED
1811 0000 0011 0001  CKKEYCOR CALLL   CP1RTN                      < 2032>
           0001 00C5 0002
1812 0003 002F 0003           LDX     XSW#
1813 *             ADD LOGIC TO EITHER SPEAK P4 OR P19
1814 *             MUST SET RETURN FLAG
1815 0007 004E 0004           TCY     YSW#
1816 000F 0022 0005           TMY
1817 001F 000B 0006           COMCP
1818 003F 0010 0007           CALLL   SAVECNT1                    < 0370>
           003E 00F2 0008
1819 003D 002B 0009           LDX     XRNEW
1820 003B 004B 0010           TCY     YRLINE
1821 0037 0021 0011           TMA
1822 002F 004F 0012           TCY     YRTEMP
1823 001E 0003 0013           TAM             R TEMP SAVED
1824 003C 0047 0014           TCY     YKLINE
1825 0039 0021 0015           TMA
1826 0033 002A 0016           LDX     XK
1827 0027 004F 0017           TCY     YKTEMP
1828 000E 0003 0018           TAM             K TEMP SAVED
1829 *             GET R-K TO COMPARE TO
1830 001D 002F 0019  NXTSWIT  LDX     XCOUNT
1831 003A 0043 0020           TCY     YCOUNT
1832 0035 0022 0021           TMY             CURRENT SWITCH POINTED TO
1833 002B 002B 0022           LDX     XRBUF
1834 0016 0021 0023           TMA     GETS R VALUE
1835 002C 004F 0024           TCY     YRTEMP
1836 0013 0022 0025           TMY
1837 0030 0001 0026           YNEA
1838 0021 009B 0027           BR      CKDONE    GO CHECK FOR LAST < 1849>
1839 0002 0043 0028           TCY     YCOUNT
1840 0005 002F 0029           LDX     XCOUNT
1841 000B 0022 0030           TMY
1842 0017 002A 0031           LDX     XK
1843 002E 0021 0032           TMA             GETS K VALUE
1844 001C 004F 0033           TCY     YKTEMP
1845 0038 0022 0034           TMY
1846 0031 0001 0035           YNEA
1847 0023 009B 0036           BR      CKDONE                      < 1849>
1848 0006 001D 0037           BL      BUMPCCTR                    < 2203>
           000D 00BE 0038
1849 001B 000B 0039  CKDONE   COMCP
1850 0036 001C 0040           CALLL   CKCOUNT                     < 0613>
           002D 00EA 0041
1851 001A 0040 0042           TCY     0
1852 0034 0001 0043           YNEA
1853 0029 009D 0044           BR      NXTSWIT                     < 1830>
1854 0012 004B 0045  SPEAKP4  TCY     YMODE1
1855 0024 002D 0046           LDX     XMODE1
1856 0008 0033 0047           SBIT    3
1857 0011 0035 0048           RBIT    2       P4RETURN SET  NEW
1858 0022 001B 0049           CALLL   CPORTN                      < 2384>
           0004 00D4 0050
1859 0009 0040 0051           TCY     YOLMSD
1860 0013 002C 0052           LDX     1
1861 0026 0032 0053           SBIT    1       NOP P4 SPECIAL CHECK BIT
1862 000C 0031 0054           SBIT    2
1863 0019 000B 0055           COMCP
1864 *             RETURNS TO SPKP4 IF NOT NOP
1865 0032 0015 0056           BL      GETARTAD                    < 1021>
           0025 00BD 0057
1866 000A 0011 0058  LEARN    CALLL   CP1RTN                      < 2032>
           0015 00C5 0059
1867 002A 000B 0060           COMCP
1868 0014 001C 0061           CALLL   BUMPTIME                    < 0582>
           0023 00EE 0062
```

```
1869 0010 001E 0063           BL        LEARN                              < 1968>
     0020 00AE 0064
1870                           PAGE      22
1871 *PPPPPPPPPPPPPPPPPPPPPPPPPPPPPPPPPPPPPPPPPPPPPPPPPPPP
1872 0000 004D 0001  DOTONES   TCY       YMODE2
1873 0001 002F 0002            LDX       XMODE2
1874 0003 0035 0003            RBIT      2            10 CASE
1875 0007 0033 0004            SBIT      3   SETS UP TONEGRP1 RETURN
1876 *                         CONSIDER USING THE TWO MSD OF THE
1877 *                         OL # AREA WHERE TWO BITS EACH DEFINE
1878 *                         THE TONE STRING. ONLY USE THIS IF
1879 *                         PO IS ZERO.
1880 000F 000B 0005  SPKTONES  COMCP
1881 001F 0018 0006            CALLL     MOVEOLAD                          < 0436>
     003F 00D1 0007
1882 003E 0047 0008            TCY       YROMTEMP
1883 003D 000B 0009            COMCP
1884 003B 0018 0010            CALLL     LOADADDR                          < 0387>
     0037 00C0 0011
1885 002F 000B 0012            COMCP
1886 001E 0010 0013            CALLL     READ    OL# NOW IN DATA REG.      < 0312>
     003C 00C0 0014
1887 0039 0048 0015  TONEPAIR  TCY       1
1888 0033 000B 0016            COMCP
1889 0027 0010 0017            CALLL     SAVECNT1                          < 0370>
     000E 00F2 0018
1890 001D 002C 0019            LDX       1
1891 003A 004B 0020            TCY       YDATDIG1
1892 0035 0021 0021            TMA
1893 002B 002F 0022  NXTTONE   LDX       7
1894 0016 004F 0023            TCY       15
1895 002C 001E 0024            BL        SPKTONE                           < 1948>
     0018 00B7 0025
1896 0030 000B 0026  TONEGRP1  COMCP
1897 0021 0018 0027            CALLL     MOVEOLAD                          < 0436>
     0002 00D1 0028
1898 0005 0047 0029            TCY       YROMTEMP
1899 000B 000B 0030            COMCP
1900 0017 0018 0031            CALLL     LOADADDR                          < 0387>
     002E 00C0 0032
1901 001C 000B 0033            COMCP
1902 0038 0010 0034            CALLL     READ    OL# NOW IN DATA REG.      < 0312>
     0031 00C0 0035
1903 0023 0048 0036            TCY       1
1904 0006 000B 0037            COMCP
1905 000D 0010 0038            CALLL     SAVECNT1                          < 0370>
     001B 00F2 0039
1906 0036 002C 0040            LDX       1
1907 002D 0043 0041            TCY       YDATDIG2
1908 001A 0021 0042            TMA
1909 0034 004D 0043            TCY       YMODE2
1910 0029 002F 0044            LDX       XMODE2
1911 0012 0037 0045            RBIT      3            01 CASE FIRST TONE INDEX
1912 0024 0031 0046            SBIT      2
1913 0008 00AB 0047            BR        NXTTONE                           < 1893>
1914 *
1915 *                  00 P6 RETURN
1916 *                  01 P1 RETURN
1917 *                  10 P4 RETURN
1918 *                  11 P3 ANSWER RETURN AXMODAF
1919 0011 002D 0048  CKRETURN  LDX       XMODE1
1920 0022 004B 0049            TCY       YMODE1
1921 0004 0021 0050            TMA
1922 0009 007E 0051            ALEC      7
1923 0013 008A 0052            BR        CK2                               < 1928>
1924 0026 0017 0053            LDP       14       SAME PG AS PXRETN????????
1925 000C 0039 0054            TBIT      2
1926 0019 00A9 0055            BR        PXRETN                            < 2434>
1927 0032 001D 0056            BL        P4RETURN                          < 2197>
     0025 0030 0057
1928 000A 0011 0058  CK2       LDP       8        MUST BE PAGE FOR P1
1929 0015 0039 0059            TBIT      2
```

```
1930 002A 008C 0060              BR       P1RETURN                      < 2056>
1931 0014 000B 0061    P6RETURN  COMCP
1932 0028 0011 0062              BL       GETMOD4                       < 0884>
     0010 0030 0063
1933 *PPPPPPPPPPPPPPPPPPPPPPPPPPPPPPPPPPPPPPPPPPPPPPPPPPPPPPPPPP
1934 *                           PAGE     23
1935 0000 0033 0001    TONESET   SBIT     3        SETS TONEGRP RETURN
1936 *                 MAIN TONE LOGIC TO SPEAK
1937 *                 1,2 OR 4 FOUR NOTE TONES
1938 *                 ON ENTRY Y = # TO DO
1939 0001 002F 0002    GETTONE#  LDX      XTIME
1940 0003 0046 0003              TCY      YTIMELSD
1941 0007 0021 0004              TMA
1942 000F 002B 0005              LDX      6
1943 001F 004F 0006              TCY      15
1944 003F 0003 0007              TAM
1945 003E 004F 0008    SPKTONE   TCY      15
1946 003D 002B 0009              LDX      6
1947 003B 0002 0010              IMAC
1948 0037 0003 0011    SPKTONE'  TAM
1949 002F 0035 0012              RBIT     2        FORCE ADD TO BE 8,9,A,B
1950 001E 0033 0013              SBIT     3
1951 003C 0022 0014              TMY
1952 0039 000B 0015              COMCP
1953 0033 0018 0016              CALLL    LOADADDR                      < 0387>
     0027 00C0 0017
1954 000E 000B 0018              COMCP
1955 001D 001B 0019              CALLL    SPEAKIT                       < 1200>
     003A 00C3 0020
1956 0035 000B 0021              COMCP
1957 002B 001C 0022              CALLL    CKCOUNT                       < 0613>
     0016 00EA 0023
1958 002C 0019 0024              LDP      9
1959 0018 0070 0025              ALEC     0
1960 0030 00BC 0026              BR       CKLRNRTN                      < 2082>
1961 0021 001E 0027              BL       SPKTONE  DO NEXT TONE IN SEQ. < 1945>
     0002 00BE 0028
1962 *
1963 0005 000B 0029    LRNLNK    COMCP
1964 000B 001C 0030              CALLL    ADDRMOVE                      < 0547>
     0017 00C0 0031
1965 *                 READ
1966 *                 THE NEW SWITCH DATA AND COMPARE
1967 *                 AGAINST THE FIRST SWITCH #
1968 002E 002F 0032    LEARN     LDX      XTIME
1969 001C 004A 0033              TCY      YTIMENSD
1970 0038 0021 0034              TMA
1971 0031 0025 0035              AMAAC
1972 0023 004F 0036              TCY      15
1973 0006 0003 0037              TAM
1974 000D 0025 0038              AMAAC    LEFT SHIFTS 2 BITS
1975 001B 0046 0039              TCY      YTIMELSD
1976 0036 0039 0040              TBIT     2
1977 002D 00E9 0041              CALL     ADD1''                        < 1979>
1978 001A 001C 0042              BL       CKAGAIN'                      < 1689>
     0034 00A7 0043
1979 0029 0007 0044    ADD1''    DCA
1980 0012 0004 0045    ADD2''    A2AA
1981 0024 000F 0046              RETN
1982 *
1983 0008 002F 0047    CK10CONT  LDX      XTIME
1984 0011 0042 0048              TCY      YTIMEMSD
1985 0022 0021 0049              TMA
1986 0004 0071 0050              ALEC     K2       SET K2 TO 10 SEC VALUE CK 0
1987 0009 0094 0051              BR       KEYSCAN'                      < 1997>
1988 0013 002E 0052              LDX      XMODE
1989 0026 004B 0053              TCY      YMODE
1990 000C 0038 0054              TBIT     0
1991 0019 0094 0055              BR       KEYSCAN' BASIC ONLY MODE STAY < 1997>
1992 *
1993 0032 002E 0056              LDX      XMODE
1994 0025 004B 0057              TCY      YMODE
```

```
1995 000A 0034 0038          RBIT     0           LEARN MODE SET
1996 0015 0013 0059          BL       CKLRNFLG                         < 2257>
     002A 0080 0060
1997 0014 000B 0061  KEYSCAN COMCP
1998 0028 0014 0062          BL       CKOLOFF     ADDED TO CK OL CHANG < 0458>
     0010 0080 0063
1999 *
2000                         PAGE     24
2001 *PPPPPPPPPPPPPPPPPPPPPPPPPPPPPPPPPPPPPPPPPPPPPPPPPPPPPP
2002 0000 004C 0001  BUMPT2  TCY      T2MSB
2003 0001 002F 0002          LDX      XTIME
2004 0003 0002 0003          IMAC
2005 0007 0003 0004          TAM
2006 000F 007B 0005  CK150   ALEC     13          150 TIME CONSTANT
2007 001F 00BD 0006          BR       CK2MIN                           < 2009>
2008 003F 0010 0007          BL       PWROFF                           < 1523>
     003E 00A8 0008
2009 003D 0024 0009  CK2MIN  TAY
2010 003B 005D 0010          YNEC     11          120 TIME CONSTANT
2011 0037 008C 0011  P1RTN   BR       P1RETURN                         < 2056>
2012 002F 000B 0012  SPKPO   COMCP
2013 001E 001E 0013          BL       SPEAKPO                          < 0841>
     003C 00A8 0014
2014 *
2015 0039 00C5 0015  PG22LINK CALL    CP1RTN      SETS CHAPTET 1 RETURN< 2032>
2016 0033 0016 0016          LDP      6
2017 0027 0070 0017          ALEC     0
2018 000E 0080 0018          BR       DOTONES     GO SPEAK TONES AB,BC,< 1872>
2019 001D 0011 0019          LDP      8
2020 003A 000B 0020          COMCP
2021 0035 0018 0021          CALLL    LOADADDR                         < 0387>
     002B 00C0 0022
2022 0016 000B 0023          COMCP
2023 002C 001B 0024          CALLL    SPEAKIT                          < 1200>
     0018 00C3 0025
2024 0030 0019 0026          BL       TONEGRP2                         < 2096>
     0021 008B 0027
2025 *                       SPEAK P3  "PRESS A PICTURE"
2026 *                                X032-X033
2027 *
2028 0002 003F 0028  SPEAKP3 CLA
2029 *                       SUBROUTINE CHAPTER 1 RETURN
2030 *                       MUST REMAIN HERE
2031 *                       TWO ENTRIES
2032 0005 002E 0029  CP1RTN  LDX      XMODE
2033 000B 004B 0030          TCY      YMODE
2034 0017 0037 0031          RBIT     3           SET CHAPTER 1 RETURN FLAG
2035 002E 0047 0032          TCY      YROMTEMP
2036 001C 000F 0033          RETN
2037 0038 000B 0034          COMCP
2038 0031 0018 0035          CALLL    ROM#LOAD                         < 0444>
     0023 00C4 0036
2039 0006 002D 0037          LDX      XDIG2
2040 000D 004C 0038          TCY      3
2041 001B 0023 0039          TYA
2042 0036 0047 0040          TCY      YROMTEMP
2043 002D 0003 0041          TAM
2044 001A 002B 0042          LDX      XDIG1
2045 0034 0007 0043          DCA                  A NOW = 2
2046 0029 0003 0044          TAM
2047 0012 001B 0045          CALLL    CPORTN      GO SET CHAPTER 0 RETU< 2384
     0024 00D4 0046
2048 0008 002F 0047          LDX      XMODE2
2049 0011 004D 0048          TCY      YMODE2
2050 0022 0034 0049          RBIT     0           RESETS LEARN FLAG IF SET
2051 0004 000B 0050          COMCP
2052 0009 0044 0051          TCY      2
2053 0013 0012 0052          BL       LOAD&SPK                         < 0631>
     0026 00BB 0053
2054 *                       PRESS A PICTURE NOW SPEAKING
2055 *                       DOES T2 = 30 SEC
2056 000C 000B 0054  P1RETURN COMCP
```

```
2057 0019 002F 0055            LDX     XMODE2
2058 0032 004D 0056            TCY     YMODE2
2059 0023 0030 0057            SBIT    0           SETS LEARN ACTIVE FLAG
2060 000A 0011 0058            BL      CLRTM                               < 0920>
     0015 00B1 0059
2061 *
2062 002A 0035 0060   GETK''   RBIT    2
2063 0014 0037 0061            RBIT    3
2064 0028 0021 0062            TMA
2065 0010 001C 0063            BL      CKK8''                              < 1706>
     0020 0085 0064
2066                           PAGE    25
2067 0000 007C 0001   CKCTR=4' ALEC    3
2068 0001 00B0 0002            BR      CLRT2                               < 2
2069 0003 003F 0003            CLA
2070 0007 0003 0004            TAM                 CORRECT COUNTER CLEARED
2071 *        ADD LOGIC HERE TO SPEAK NEXT 4 TONES
2072 *        LAST TONE SPOKEN IN (6,15)
2073 *        GO BUILD TONE CODE SEQUENCE  TO SPK 4 TONES
2074 000F 0042 0005   TONE16   TCY     4
2075 001F 000B 0006            COMCP
2076 003F 0010 0007            CALLL   SAVECNT1                            < 0
     003E 00F2 0008
2077 003D 004D 0009            TCY     YMODE2
2078 003B 002F 0010            LDX     XMODE2
2079 0037 0031 0011            SBIT    2
2080 002F 001E 0012            BL      TONESET                             < 1'
     001E 0080 0013
2081 *
2082 003C 004D 0014   CKLRNRTN TCY     YMODE2
2083 0039 002F 0015            LDX     XMODE2
2084 0033 0039 0016            TBIT    2
2085 0027 0096 0017            BR      CK3BIT                              < 2'
2086 000E 0016 0018            LDP     6
2087 001D 003B 0019            TBIT    3
2088 003A 00B0 0020            BR      TONEGRP1    10 CASE                 < 1
2089 0035 001D 0021            BL      P19RETN     00 CASE                 < 2'
     002B 00AB 0022
2090 0016 003B 0023   CK3BIT   TBIT    3
2091 002C 00B0 0024            BR      CLRT2       11 CASE                 < 2'
2092 0018 008B 0025            BR      TONEGRP2    01 CASE                 < 2
2093 0030 002F 0026   CLRT2    LDX     XTIME
2094 0021 004C 0027            TCY     YTIMET2
2095 0002 0013 0028            BL      CLRT2''                             < 2
     0005 00BE 0029
2096 000B 002F 0030   TONEGRP2 LDX     XMODE2
2097 0017 004D 0031            TCY     YMODE2
2098 002E 001B 0032            LDP     13
2099 001C 0038 0033            TBIT    0           IS LEARN ACTIVE?
2100 0038 00B5 0034            BR      SAYBASIC                            < 2
2101 0031 0011 0035            BL      SPEAKP3                             < 2
     0023 0082 0036
2102 0006 000D 0037   KEYCONT1 SETR
2103 000D 0048 0038            TCY     1
2104 001B 0008 0039            TKA
2105 0036 0022 0040            TMY                 GET TARGET
2106 002D 0001 0041            YNEA
2107 001A 0099 0042            BR      KEYNOGO                             < 2
2108 0034 0044 0043            TCY     2
2109 0029 0004 0044            A2AA
2110 0012 0003 0045            TAM                 UP COUNT VALUE
2111 0024 0079 0046   CKKEYGO  ALEC    9           LAST R LINE TESTED
2112 0008 0089 0047            BR      KEYGO                               < 2
2113 0011 000B 0048            COMCP
2114 0022 0012 0049            BL      NXTKEY                              < 0
     0004 00AA 0050
2115 0009 004C 0051   KEYGO    TCY     3
2116 0013 000B 0052   KEYSPK   COMCP
2117 0026 001F 0053            BL      KEYSPKK     SPK KEYGO/KEYNOGO       < 1
     000C 0086 0054
2118 0019 004E 0055   KEYNOGO  TCY     7
2119 0032 0093 0056            BR      KEYSPK                              < 2116>
```

```
2120 0025 0041 0057  XPORT'''  TCY      YDATDIG6
2121 000A 0022 0058            TMY
2122 0015 000B 0059            COMCP
2123 002A 001F 0060            LDP      15
2124 0014 0055 0061            YNEC     >A
2125 0028 00AD 0062            BR       CKKEYS              < 1427>
2126 0010 001D 0063            BL       SPKSEED             < 1129>
     0020 00AA 0064
2127                           PAGE     26
2128 *PPPPPPPPPPPPPPPPPPPPPPPPPPPPPPPPPPPPPPPPPPPPPPPPPPPPPP
2129 *---------------------------------------------------
2130 *       GET OVERLAY SUBROUTINE
2131 *
2132 *
2133 *---------------------------------------------------
2134 0000 0040 0001  GETOL     TCY      YOLMSD
2135 0001 002C 0002            LDX      1
2136 0003 003F 0003            CLA
2137 0007 0020 0004            TAMIY                 CLEAR OL IN PLACE REG.
2138 000F 0020 0005            TAMIY
2139 *                         ALL CLEAR R LINES 0-8
2140 001F 0044 0006            TCY      2
2141 003F 0023 0007            TYA      A = 2
2142 003E 000A 0008            TDO                   SET 04
2143 003D 0048 0009            TCY      YOLLSD
2144 003B 0048 0010            TCY      YOLLSD      DUMMY
2145 0037 0008 0011            TKA
2146 002F 007E 0012            ALEC     7
2147 001E 00B9 0013            BR       CKOL2                < 214
2148 003C 0030 0014            SBIT     0
2149 0039 0046 0015  CKOL2     TCY      6
2150 0033 0023 0016            TYA      A = 6
2151 0027 000A 0017            TDO                   SETS 05
2152 000E 0048 0018            TCY      YOLLSD
2153 001D 0048 0019            TCY      YOLLSD      DUMMY
2154 003A 0008 0020            TKA
2155 0035 007E 0021            ALEC     7
2156 002B 00AC 0022            BR       CKOL4                < 21
2157 0016 0032 0023            SBIT     1
2158 002C 0041 0024  CKOL4     TCY      8
2159 0018 0023 0025            TYA      A = 8
2160 0030 000A 0026            TDO                   SETS 06
2161 0021 0048 0027            TCY      YOLLSD
2162 0002 0048 0028            TCY      YOLLSD      DUMMY
2163 0005 0008 0029            TKA
2164 000B 007E 0030            ALEC     7
2165 0017 009C 0031            BR       CKOL8                < 21
2166 002E 0031 0032            SBIT     2
2167 001C 0045 0033  CKOL8     TCY      >A
2168 0038 0023 0034            TYA      A =>A
2169 0031 000A 0035            TDO                   SETS 07
2170 0023 0048 0036            TCY      YOLLSD
2171 0006 0048 0037            TCY      YOLLSD      DUMMY DELAY
2172 000D 0008 0038            TKA
2173 001B 007E 0039            ALEC     7
2174 0036 009A 0040            BR       CKOL16               < 21
2175 002D 0033 0041            SBIT     3
2176 001A 003F 0042  CKOL16    CLA
2177 0034 000A 0043            TDO                   RESETS ALL OL 0 LINES
2178 0029 004A 0044            TCY      5
2179 0012 000D 0045            SETR
2180 0024 0008 0046            TKA                   DUMMY
2181 0008 0008 0047            TKA
2182 0011 000C 0048            RSTR
2183 0022 0040 0049            TCY      YOLMSD
2184 0004 007E 0050            ALEC     7
2185 0009 00A6 0051            BR       RETN26               < 2187>
2186 0013 0030 0052            SBIT     0
2187 0026 000B 0053  RETN26    COMCP
2188 000C 000F 0054            RETN
2189 0019 0008 0055  KEYCK''   TKA                   DUMMY
2190 0032 000C 0056            RSTR
```

```
2191 0025 0003 0057           TAM
2192 000A 000B 0058           COMCP
2193 0015 0016 0059           BL        KEYCKEND                         < 0814>
     002A 00AA 0060
2194 *PPPPPPPPPPPPPPPPPPPPPPPPPPPPPPPPPPP
2195                          PAGE    27
2196 *             RESTORE TARGET R-K VALUE
2197 0000 001B 0001  P4RETURN CALLL    CPORTN                            < 23
     0001 00CA 0002
2198 *     SETS CHAPT. 0 RTN FLAG & RESETS LRN FLAG
2199 0003 002A 0003           LDX      XKEYOLD
2200 0007 0014 0004           BL       RKSAVE                            < 16
     000F 00A5 0005
2201 *           RESTORES OLD R/K AND SPEAKS P1
2202 001F 001B 0006           CALLL    CPORTN       ALSO RESET LRN FL<  23
     003F 00CA 0007
2203 003E 0045 0008  BUMPCCTR TCY      YCORCTR
2204 003D 002F 0009           LDX      XCORCTR
2205 003B 0002 0010           IMAC
2206 0037 0003 0011           TAM
2207 *           GO SPEAK P19
2208 002F 004D 0012           TCY      YMODE2
2209 001E 002F 0013           LDX      XMODE2
2210 003C 0035 0014           RBIT     2            00 CASE
2211 0039 0037 0015           RBIT     3
2212 *           P19 RETURN SET
2213 0033 0048 0016           TCY      1
2214 0027 000B 0017  TONESPK  COMCP
2215 000E 0010 0018           CALLL    SAVECNT1                          < 08
     001D 00F2 0019
2216 003A 001E 0020           BL       GETTONE#     SAY TONE             < 19
     0035 0081 0021
2217 002B 0096 0022  P19RETN  BR       SPEAKP5                           < 22
2218 0016 000B 0023  SPEAKP5  COMCP
2219 002C 0011 0024           CALLL    GETMOD4                           < 08
     0018 00C0 0025
2220 0030 0028 0026           LDX      XDIG1
2221 0021 0047 0027           TCY      YROMTEMP
2222 0002 0003 0028           TAM
2223 0005 000B 0029           COMCP
2224 000B 0018 0030           CALLL    ROM#LOAD                          < 0
     0017 00C4 0031
2225 002E 003F 0032           CLA
2226 001C 0004 0033           A2AA
2227 0038 002D 0034           LDX      XDIG2
2228 0031 0003 0035           TAM
2229 0023 001B 0036           CALLL    CPORTN                            < 2
     0006 00D4 0037
2230 000D 000B 0038           COMCP
2231 001B 0049 0039           TCY      9
2232 0036 0012 0040           BL       LOAD&SPK                          < 0
     002D 00BB 0041
2233 *                  P5 NOW SPEAKING
2234 001A 002F 0042  AXMODAF  LDX      XMODE2
2235 0034 004D 0043           TCY      YMODE2
2236 0029 0032 0044           SBIT     1            SETS AX RETN FLAG
2237 0012 004B 0045           TCY      YMODE1
2238 0024 002D 0046           LDX      XMODE1
2239 0008 0031 0047           SBIT     2
2240 0011 0033 0048           SBIT     3            AXRETN FLAG SET
2241 0022 000B 0049  DOIT     COMCP
2242 0004 0017 0050           BL       COMPLP6                           < 1
     0009 00A5 0051
2243 0013 0079 0052  LDSPKRTN ALEC     9
2244 0026 009A 0053           BR       AXMODAF      Y = 9 RETURN CASE    < 2234>
2245 *          ALEC    10       Y = 10 CASE
2246 000C 001B 0054           CALLL    CPORTN                            < 2384>
     0019 00D4 0055
2247 0032 00A2 0056           BR       DOIT         RETURNS TO P4RETURN  < 2241>
2248 *
2249 0025 0022 0057  XPORT    TMY
2250 000A 001F 0058           LDP      15
```

```
2251 0015 000B 0059           COMCP
2252 002A 003A 0060           YNEC     5
2253 0014 00AD 0061           BR       CKKEYS                              < 1427>
2254 0028 000B 0062           COMCP
2255 0010 0019 0063           BL       XPORT                               < 2120>
     0020 00A5 0064
2256                          PAGE     28
2257 0000 004D 0001 CKLRNFLG  TCY      YMODE2
2258 0001 002F 0002           LDX      XMODE2
2259 0003 0011 0003           LDP      8
2260 0007 0038 0004           TBIT     0         IS LEARN MODE ACTIVE
2261 000F 0080 0005           BR       BUMPT2                              < 2(
2262 001F 0013 0006           BL       LRNSETUP  USED TO BE KEYSCAN< 2:
     003F 00AF 0007
2263 003E 003F 0008 CLRT2     CLA
2264 003D 0003 0009           TAM
2265 *
2266 *
2267 *     **********  GO RESET LRN ACTIVE FLAG  ************
2268 *
2269 *
2270 003B 001B 0010           CALLL    CPORTN                              < 2:
     0037 00CA 0011
2271 *                        SET UP P1 ADDRESS USING MODULO4
2272 *                        FIND THE
2273 *                        WHERE'S THE
2274 *                        DO YOU SEE THE
2275 *                        CAN YOU FIND THE
2276 *                        SELECT P1  X010-X011
2277 *                        MODIFIED BY 0,2,4,6
2278 002F 0011 0012 LRNSETUP  CALLL    CP1RTN                              < 2(
     001E 00C5 0013
2279 003C 000B 0014           COMCP
2280 0039 0011 0015           CALLL    GETMOD4   A RETURNS 0,2,4,6 < 0
     0033 00C0 0016
2281 0027 0028 0017           LDX      XDIG1
2282 000E 0043 0018           TCY      YLEARN
2283 001D 0003 0019           TAM
2284 003A 000B 0020           COMCP
2285 0035 0018 0021           CALLL    ROM#LOAD                            < 0
     002B 00C4 0022
2286 0016 0048 0023           TCY      1
2287 002C 0023 0024           TYA
2288 0018 002D 0025           LDX      XDIG2
2289 0030 0043 0026           TCY      YLEARN
2290 0021 0003 0027           TAM
2291 0002 000B 0028           COMCP
2292 0005 0018 0029           CALLL    LOADADDR                            < 0
     000B 00C0 0030
2293 0017 000B 0031           COMCP
2294 002E 0010 0032           CALLL    READ                                < 0
     001C 00C0 0033
2295 0038 0043 0034           TCY      YLEARN
2296 0031 001E 0035           BL       LRNLNK                              < 1
     0023 0085 0036
2297 0006 0003 0037 GETSPK    TAM
2298 000D 004F 0038           TCY      15
2299 001B 003F 0039           CLA
2300 0036 0003 0040           TAM      INITIAL Y VALUE
2301 002D 0022 0041 GETSPK    TMY
2302 001A 000B 0042           COMCP
2303 0034 0018 0043           CALLL    ROM#LOAD                            < (
     0029 00C4 0044
2304 0012 000B 0045           COMCP
2305 0024 0018 0046           CALLL    LOADADDR                            < 0387>
     0008 00C0 0047
2306 0011 000B 0048           COMCP
2307 0022 0010 0049           CALLL    READ      GET SPEECH ADDRESS  < 0312>
     0004 00C0 0050
2308 0009 004F 0051           TCY      15
2309 0013 002D 0052           LDX      XDIG2
2310 0026 0022 0053           TMY                GET NEXT Y VALUE
```

```
2311 000C 000B 0054              COMCP
2312 0019 001C 0055              CALLL   ADDRMOVE                        < 0547>
     0032 00C0 0056
2313 0025 002D 0057              LDX     XDIG2
2314 000A 004F 0058              TCY     15
2315 0015 0002 0059              IMAC
2316 002A 0003 0060              TAM
2317 0014 0073 0061              ALEC    12
2318 0028 00AD 0062              BR      GETSPK                          < 2301>
2319 0010 0017 0063              BL      DIAGCK                          < 2448>
     0020 0095 0064
2320                             PAGE    29
2321 *PPPPPPPPPPPPPPPPPPPPPPPPPPPPPPPPPPPPPPPPPPPPPPPP
2322 0000 002F 0001  SPKP6CK' LDX        XMODE2
2323 0001 004D 0002           TCY        YMODE2
2324 0003 0038 0003           TBIT       0         IS LEARN ACTIVE
2325 *                       BRANCHES FOR BOTH P4 & PX
2326 0007 0099 0004           BR         SPKP2                           < 2378
2327 000F 002D 0005           LDX        XMODE1
2328 001F 004B 0006           TCY        YMODE1
2329 003F 0039 0007           TBIT       2
2330 003E 00B5 0008           BR         SAYBASIC                        < 2340
2331 003D 0011 0009           CALLL      CP1RTN                          < 2032
     003B 00C5 0010
2332 0037 000B 0011           COMCP
2333 002F 0011 0012           CALLL      GETMOD4                         < 0884
     001E 00C0 0013
2334 003C 00D4 0014           CALL       CPORTN                          < 2384
2335 0039 0070 0015           ALEC       0
2336 0033 008E 0016           BR         SAYLNK2'                        < 2338
2337 0027 00B5 0017           BR         SAYBASIC                        < 2340
2338 000E 000B 0018  SAYLNK2' COMCP
2339 001D 0013 0019           BL         SAYLNK2                         < 1154
     003A 0082 0020
2340 0035 00D4 0021  SAYBASIC CALL       CPORTN    CHAP 0 RTN & RESETS L< 2384
2341 002B 0043 0022           TCY        YBASIC    OR LEARN PHRASE
2342 0016 000B 0023  P12LINK' COMCP
2343 002C 0013 0024           BL         PG12LNK                         < 1149
     0018 009D 0025
2344 *
2345 *                   GO SPEAK P4 X0018,1A,1C,1E
2346 *                       CHANGE 350 TO ADDRESS SHOWN
2347 *                   X0018     'LOOK AGAIN'        OR
2348 *                   X001A     'SND OF SILENCE'    OR
2349 *                   X001C     'LOOK AGAIN'        OR
2350 *                   X001E     'TRY AGAIN '
2351 *
2352 0030 003F 0026  SPKP4    CLA
2353 0021 002F 0027           LDX        XCORCTR
2354 0002 0045 0028           TCY        YCORCTR
2355 0005 0003 0029           TAM
2356 000B 004D 0030           TCY        YMODE2
2357 0017 0036 0031           RBIT       1         SETS P4RETURN
2358 002E 000B 0032           COMCP
2359 001C 0047 0033           TCY        YROMTEMP
2360 0038 0018 0034           CALLL      ROM#LOAD                        < 044.
     0031 00C4 0035
2361 0023 003F 0036           CLA
2362 0006 0004 0037           A2AA
2363 000D 0007 0038           DCA
2364 001B 002D 0039           LDX        XDIG2
2365 0036 0003 0040           TAM
2366 002D 000B 0041           COMCP
2367 001A 0011 0042           CALLL      GETMOD4   GO GET MOD4 TIME      < 088
     0034 00C0 0043
2368 0029 0028 0044           LDX        XDIG1
2369 0012 0047 0045           TCY        YROMTEMP
2370 0024 0003 0046           TAM
2371 0008 0006 0047           A6AA
2372 0011 0004 0048           A2AA       ADDS IN 8
2373 0022 0003 0049           TAM
2374 0004 00D4 0050           CALL       CPORTN                          < 2384>
```

```
2375 0009 0045 0051           TCY     10
2376 0013 000B 0052           COMCP
2377 0026 0012 0053           BL      LOAD&SPK    GO SPEAK P4            < 0631>
     000C 00BB 0054
2378 0019 00D4 0055   SPKP2   CALL    CPORTN      CHAP 0 RTN & RESETS< 2384>P
2379 0032 0040 0056           TCY     YTHATS
2380 0025 0096 0057           BR      P12LINK                            < 2342>
2381 000A 002F 0058   CPORTN' LDX     XMODE2
2382 0015 004D 0059           TCY     YMODE2
2383 002A 0034 0060           RBIT    0           RESETS LEARN ACTIVE MODE
2384 0014 002E 0061   CPORTN  LDX     XMODE
2385 0028 004B 0062           TCY     YMODE
2386 0010 0033 0063           SBIT    3           SETS CHAPTER 0 RETURN
2387 0020 000F 0064           RETN
2388                          PAGE    30
2389 *PPPPPPPPPPPPPPPPPPPPPPPPPPPPPPPPPPPPPPPPPPPPPPPPPPPPPPP
2390 *                                GO SPEAK P6
2391 0000 004B 0001   RETNCK  TCY     YMODE
2392 0001 002E 0002           LDX     XMODE
2393 0003 003B 0003           TBIT    3
2394 0007 009F 0004           BR      RETN30                             < 23
2395 000F 000B 0005           COMCP
2396 001F 000B 0006   RETN30  COMCP
2397 003F 0047 0007           TCY     YROMTEMP
2398 003E 000F 0008           RETN
2399 003D 002B 0009   ADDRLSD LDX     XRNEW
2400 003B 004B 0010           TCY     YRLINE
2401 0037 0021 0011           TMA
2402 002F 000B 0012           COMCP
2403 001E 0038 0013           TBIT    0
2404 003C 008F 0014           BR      ADD0S       R = XX1 CASE           < 12
2405 0039 00AE 0015           BR      ADDRK       R = XX0 CASE           < 13
2406 0033 002B 0016   ADDRMSD LDX     XRNEW
2407 0027 004B 0017           TCY     YRLINE
2408 000E 0021 0018           TMA                 GET R VALUE
2409 001D 000B 0019           COMCP
2410 003A 0078 0020           ALEC    1
2411 0035 00AE 0021           BR      ADDRK                              < 13
2412 002B 000B 0022           COMCP
2413 0016 007C 0023           ALEC    3
2414 002C 009A 0024           BR      ADD1X       R2,R3 CASE             < 24
2415 0018 007A 0025           ALEC    5
2416 0030 00B6 0026           BR      ADD2X       R5,R4 CASE             < 24
2417 0021 007E 0027           ALEC    7
2418 0002 008D 0028           BR      ADD3X       R6,R7 CASE             < 24
2419 0005 0042 0029   ADD4X   TCY     4           R8 CASE
2420 000B 0023 0030   DIGIT2  TYA
2421 0017 000B 0031           COMCP
2422 002E 002D 0032           LDX     XDIG2
2423 001C 0047 0033           TCY     YROMTEMP
2424 0038 0025 0034           AMAAC
2425 0031 00BA 0035           BR      ADDDIG3                            < 13
2426 0023 0003 0036           TAM
2427 0006 00AE 0037           BR      ADDRK                              < 13
2428 000D 004C 0038   ADD3X   TCY     3
2429 001B 008B 0039           BR      DIGIT2                             < 24
2430 0036 0044 0040   ADD2X   TCY     2
2431 002D 008B 0041           BR      DIGIT2                             < 24
2432 001A 0048 0042   ADD1X   TCY     1
2433 0034 008B 0043           BR      DIGIT2                             < 24
2434 0029 0011 0044   PXRETN  CALLL   CP1RTN                             < 20
     0012 00C5 0045
2435 0024 000B 0046           COMCP
2436 0008 001C 0047           CALLL   BUMPTIME                           < 05
     0011 00EE 0048
2437 *                 CHECK CORRECT COUNTER  C1 = 4
2438 0022 0045 0049           TCY     YCORCTR
2439 0004 002F 0050           LDX     XCORCTR
2440 0009 0021 0051           TMA
2441 0013 0019 0052           BL      CKCTR=4                            < 2
     0026 0080 0053
2442 *
```

```
2443 000C 002B 0054  GETK′    LDX      XKNEW
2444 0019 0047 0055           TCY      YKEYKX
2445 0032 0003 0056           TAM
2446 0025 0011 0057           BL       GETK′′                        < 2062>
     000A 00AA 0058
2447 *
2448 0015 001B 0059  DIAGCK   CALLL    CPORTN                        < 2384>
     002A 00D4 0060
2449 0014 0040 0061           TCY      0
2450 0028 000B 0062           COMCP
2451 0010 001F 0063           BL       DIAGCK′                       < 1437>
     0020 0039 0064
2452 *PPPPPPPPPPPPPPPPPPPPPPPPPPPPPPPPPPPPPPPPPPPPPPPPPP
2453                          PAGE     31
2454 *                VERIFY ALL RAM LOCATIONS CAN BE SET
2455 *                TO ALL ONES & ALL ZEROES
2456 0000 003F 0001  DIAGTEST CLA
2457 0001 004F 0002  RAMTEST  TCY      15
2458 0003 0007 0003  LOOP31   DCA               A = 15
2459 0007 0003 0004           TAM
2460 000F 0021 0005           TMA
2461 001F 0077 0006           ALEC     14
2462 003F 00B1 0007           BR       RAMERROR                      < 2
2463 003E 003F 0008           CLA
2464 003D 0003 0009           TAM
2465 003B 0070 0010           ALEC     0
2466 0037 009E 0011           BR       NEXTRAM                       < 2
2467 002F 00B1 0012           BR       RAMERROR                      < 2
2468 001E 003C 0013  NEXTRAM  DCY
2469 003C 005F 0014           YNEC     15
2470 0039 0083 0015           BR       LOOP31                        < 2
2471 0033 0009 0016           COMX
2472 0027 000F 0017           RETN
2473 000E 00C1 0018           CALL     RAMTEST  4 TEST               < 2
2474 001D 0028 0019           LDX      0
2475 003A 00C1 0020           CALL     RAMTEST  1 TEST               < 2
2476 0035 00C1 0021           CALL     RAMTEST  5 TEST               < 2
2477 002B 002A 0022           LDX      2
2478 0016 00C1 0023           CALL     RAMTEST  2 TEST               < 2
2479 002C 00C1 0024           CALL     RAMTEST  6 TEST               < 2
2480 0018 002E 0025           LDX      3
2481 0030 00C1 0026           CALL     RAMTEST  3 TEST               < 2
2482 0021 00C1 0027           CALL     RAMTEST  7 TEST               < 2
2483 *                INITIALIZE DIAGNOSTIC FLAGS
2484 0002 0040 0028           TCY      OLMSD
2485 0005 002C 0029           LDX      1
2486 000B 0033 0030           SBIT     3        DIAGNOSTIC MODE BIT
2487 0017 002E 0031           LDX      XMODE
2488 002E 004B 0032           TCY      YMODE
2489 001C 0030 0033           SBIT     0        BASIC ONLY MODE BIT
2490 *                GO SPEAK RAM GO KEY TEST
2491 *                FIRST FETCH ALL DIAGNOSTIC PROMPS
2492 0038 008D 0034  RAMALLGO BR       DOSPKDAT                      < 2
2493 0031 0040 0035  RAMERROR TCY      0
2494 0023 002F 0036           LDX      XOLACT
2495 0006 0032 0037           SBIT     1        RAM ERROR FLAG
2496 *                FETCH ALL SPEECH DIAG. ADDRESSES &
2497 *                STORE IN XDIG1-XDIG4 STARTING IN Y = 0
2498 *                REQUIRES P10-P13
2499 *                UPON START ALL RAM = 0
2500 000D 0011 0038  DOSPKDAT CALLL    CP1RTN                        < 2
     001B 00C5 0039
2501 0036 0028 0040           LDX      XDIG1    003A-003B ETC.
2502 002D 0041 0041           TCY      3
2503 001A 0023 0042           TYA
2504 0034 0040 0043           TCY      0
2505 0029 0004 0044  SETLSD   A2AA
2506 0012 0020 0045           TAMIY
2507 0024 005B 0046           YNEC     13
2508 0008 00A9 0047           BR       SETLSD                        < 2
2509 0011 004C 0048           TCY      3
```

TABLE VII

RB READ SEQUENCE

| STEP | COUNTER 623 CONTENTS (BINARY) | COUNTER 624 CONTENTS (HEX) | SIGNALS GENERATED |
|---|---|---|---|
| 1 | 11 | F | SAD, INC |
| 2 | 11 | E | DC, INC |
| 3 | 11 | C | DC, INC |
| 4 | 11 | 8 | DC, INC |
| 5 | 11 | 0 | DC, INC |
| 6 | 11 | 1 | DC, INC |
| 7 | 11 | 3 | SAM, DC, INC |
| 8 | 11 | 7 | PC |
| 9 | 01 | F | SAD, TF |
| 10 | 01 | E | BR, PC |
| 11 | 01 | C | BR, DC |
| 12 | 01 | 8 | BR, DC |
| 13 | 01 | 0 | BR, DC |
| 14 | 01 | 1 | DC |
| 15 | 01 | 3 | SAM, DC |
| 16 | 01 | 7 | PC |
| 17 | 00 | F | SAD, TF |
| 18 | 00 | E | BR |
| 19 | 00 | C | BR |
| 20 | 00 | 8 | BR |
| 21 | 00 | 0 | |
| 22 | 00 | 1 | |
| 23 | 00 | 3 | |
| 24 | 00 | 7 | PC |
| 25 | 10 | F | SAD, INC |
| 26 | 10 | E | DC, INC |
| 27 | 10 | C | DC, INC |
| 28 | 10 | 8 | DC, INC |
| 29 | 10 | 0 | DC, INC |
| 30 | 10 | 1 | DC, INC |
| 31 | 10 | 3 | SAM, DC, INC |
| 32 | 10 | 7 | PC, $\overline{\text{ZERO}}$ |

TABLE VIII

TB8 READ SEQUENCE

| STEP | COUNTER 623 CONTENTS (BINARY) | COUNTER 624 CONTENTS (HEX) | SIGNALS GENERATED |
|---|---|---|---|
| 1 | 10 | F | SAD, INC |
| 2 | 10 | E | DC, INC |
| 3 | 10 | C | DC, INC |
| 4 | 10 | 8 | DC, INC |
| 5 | 10 | 0 | DC, INC |
| 6 | 10 | 1 | DC, INC |
| 7 | 10 | 3 | SAM, DC, INC |
| 8 | 10 | 7 | PC, $\overline{\text{ZERO}}$ |

TABLE X

$I_0/I_1$ COMMANDS

| $I_0$ | $I_1$ | |
|---|---|---|
| 0 | 0 | No Operation |
| 0 | 1 | Load Address (LA) |
| 1 | 0 | Transfer Bit (TB) |
| 1 | 1 | Read and Branch (RB) |

TABLE XI

Counter 619/PLA 620 Timing Sequence

| STEP | COUNTER CONTENTS (HEX) | SIGNALS GENERATED |
|---|---|---|
| 1 | 0 | $\overline{\text{LA1}}$, TB8 |
| 2 | 8 | $\overline{\text{LA2}}$ |
| 3 | C | $\overline{\text{LA3}}$ |
| 4 | E | $\overline{\text{LA4}}$ |
| 5 | F | |
| 6 | 7 | |
| 7 | 3 | |
| 8 | 1 | |

What is claimed is:

1. An electronic teaching apparatus comprising:
a housing having a substantially planar surface;
a plurality of overlays adapted to be individually disposed on said substantially planar surface of said housing, each of said overlays having a plurality of pictorial representations provided thereon;
coding means associated with each of said plurality of overlays and identifying each respective overlay;
keyboard means disposed in said housing and located in registration with said substantially planar surface thereof so as to be disposed beneath an overlay when placed upon said substantially planar surface of said housing, said keyboard means being programmable in accordance with said coding means associated with the particular overlay disposed on said substantially planar surface of said housing for establishing changeable individual boundaries comprising keys respectively corresponding to each of said plurality of pictorial representations of the overlay disposed on said substantially planar surface of said housing, said keyboard means being responsive to the touching by an operator of a particular one of said plurality of pictorial representations as provided by an overlay when disposed upon said substantially planar surface of said housing for generating an input signal;
memory means having digital data stored therein including digital speech data from which synthesized speech as descriptive words in a human language may be derived corresponding to each of said plurality of pictorial representations as provided by each of said plurality of overlays;
controller means responsive to said input signal generated by said keyboard means in accordance with the touching by the operator of a particular one of said plurality of pictorial representations provided by the overlay disposed on said substantially planar surface of said housing to selectively access stored digital speech data from said memory means corresponding to the particular one of said pictorial representations touched by the operator;
speech synthesis means operably associated with said memory means for generating analog signals representative of human speech and corresponding to the particular one of said pictorial representations touched by the operator; and
audio means coupled to said speech synthesis means for converting said analog signals into audible human speech identifying the particular pictorial representation touched by the operator.

2. An electronic teaching apparatus as set forth in claim 1, wherein said programmable keyboard means has boundaries of individual keys provided thereon of varying area as determined by the particular said coding means associated with the overlay disposed on said substantially planar surface of said housing.

3. An electronic teaching apparatus as set forth in claim 2, wherein the respective boundaries of said programmable keyboard means defining individual keys are of variable area so as to correspond to the size and shape of particular pictorial representations of a specific overlay disposed on said substantially planar surface of said housing as determined by said coding means associated therewith.

4. An electronic teaching apparatus comprising:
a housing having a substantially planar surface;
a plurality of overlays adapted to be individually disposed on said substantially planar surface of said housing, each of said overlays having a plurality of pictorial representations provided thereon such that a different set of said plurality of pictorial representations is provided on each of said overlays;
coding means associated with each of said plurality of overlays and identifying each respective overlay;
memory means having digital data stored therein including digital speech data from which synthesized speech in a human language may be derived concerning a plurality of word-identification problems, the correct responses thereto, and comments reflecting upon the appropriateness of responses made by an operator as proposed answers to the respective word-identification problems;
speech synthesis means operably associated with said memory means for generating analog signals representative of human speech and corresponding to respective word-identification problems from selectively accessed digital speech data stored in said memory means;
audio means coupled to said speech synthesis means for converting said analog signals into audible human speech for audibly announcing respective word-identification problems in human speech to the operator and requesting an operator response;
said plurality of pictorial representations included on the particular overlay disposed on said substantially planar surface of said housing being visible to the operator and including a particular pictorial representation which corresponds to the word-identification problem presented to the operator for response;
operator input means responsive to the selection by the operator of a particular one of said plurality of pictorial representations as a response to the word-identification problem for generating an input signal, said operator input means comprising keyboard means disposed in said housing and located in registration with said substantially planar surface thereof so as to be disposed beneath an overlay when placed upon said substantially planar surface of said housing, said keyboard means being programmable in accordance with said coding means associated with the particular overlay disposed on said substantially planar surface of said housing for establishing changeable individual boundaries comprising keys respectively corresponding to each of said plurality of pictorial representations of the overlay disposed on said substantially planar surface of said housing, said keyboard means being responsive to the touching by an operator of a particular one of said plurality of pictorial representations as provided by an overlay when disposed upon said substantially planar surface of said housing for generating said input signal;
controller means operably associated with said memory means, said speech synthesis means and said keyboard means and being responsive to said input signal generated by said keyboard means in accordance with the selection made by the operator in touching a particular one of said plurality of pictorial representations as provided by the particular overlay disposed on said substantially planar surface of said housing to selectively access stored digital speech data from said memory means, said controller means being responsive to said coding means associated with the overlay disposed on said substantially planar surface of said housing at a given time when said controller means selectively accesses stored digital speech data from said memory means, said controller means comprising
problem posing means for randomly selecting a word-identification problem from the plurality of word-identification problems derivable as descriptive words from digital speech data stored in said memory means, and
comparator means operably associated with said problem posing means, said keyboard means and said memory means for determining the appropriateness of the input received by said keyboard means from the operator with respect to the particular word-identification problem randomly selected by said problem posing means; and
said speech synthesis means and said audio means being responsive to said comparator means of said controller means for providing audible human speech reflective of the appropriateness of the input received by said keyboard means from the operator in selecting a particular one of said plurality of pictorial representations as a proposed answer to the word-identification problem randomly selected by said problem posing means.

5. An electronic teaching apparatus as set forth in claim 4, wherein said programmable keyboard means has boundaries of individual keys provided thereon of varying area as determined by the particular said coding means associated with the overlay disposed on said substantially planar surface of said housing.

6. An electronic teaching apparatus as set forth in claim 5, wherein the respective boundaries of said programmable keyboard means defining individual keys are of variable area so as to correspond to the size and shape of particular pictorial representations of a specific overlay disposed on said substantially planar surface of said housing as determined by said coding means associated therewith.

7. An electronic teaching apparatus comprising:
a plurality of pictorial representations;
memory means having digital data stored therein including digital speech data from which synthesized speech as descriptive words in a human language may be derived corresponding to each of said plurality of pictorial representations, and concerning a plurality of word-identification problems corresponding to each of said plurality of pictoral representations, the correct solutions thereto, and comments reflecting upon the appropriateness of responses made by an operator as proposed answers to the respective word-identification problems;

said electronic teaching apparatus being operable in plural operating modes including at least first and second operating modes;

controller means for selectively accessing stored digital speech data from said memory means in an operating sequence determined by the operating mode of said electronic teaching apparatus;

operator input means responsive to the selection by an operator of a particular one of said plurality of pictorial representations for generating an input signal;

said controller means being responsive to said input signal generated by said operator input means in accordance with the selection made by the operator when said electronic teaching apparatus is in said first operating mode to selectively access stored digital speech data from said memory means corresponding to the particular one of said pictorial representations selected by the operator;

problem posing means for randomly selecting a word-identification problem corresponding to a particular one of said plurality of pictorial representations and derivable from digital speech data stored in said memory means when said electronic teaching apparatus is in said second operating mode;

speech synthesis means operably associated with said problem posing means and said memory means for generating analog signals representative of human speech and corresponding to the particular one of said pictorial representations selected by the operator when said electronic teaching apparatus is in said first operating mode, and corresponding to the randomly selected word-identification problem relating to the identification of said particular one of said plurality of pictorial representations as randomly selected by said problem posing means when said electronic teaching apparatus is in said second operating mode;

audio means coupled to said speech synthesis means for converting said analog signals into audible human speech in said first operating mode and for audibly requesting the operator to identify said particular one of said plurality of pictorial representations as an answer to the randomly selected word-identification problem in said second operating mode;

digital logic means including comparator means operably associated with said problem posing means, said operator input means and said memory means for determining the appropriateness of the input received by said operator input means from the operator with respect to said word-identification problem randomly selected by said problem posing means in said second operating mode; and said speech synthesis means and said audio means being responsive to the output from said comparator means for providing an audible comment in synthesized human speech indicative of the accuracy of the answer proposed by the operator in relation to the correct answer to the randomly selected word-identification problem in said second operating mode.

8. An electronic teaching apparatus as set forth in claim 7, further including operating mode selection means operably associated with said controller means for determining the particular operating mode of said electronic teaching apparatus.

9. An electronic teaching apparatus as set forth in claim 8, wherein said operating mode selection means includes timing means for establishing a predetermined time interval;

said electronic teaching apparatus initially being in said first operating mode and being changeable into said second operating mode upon elapsing of said predetermined time interval following initiation of said first operating mode in the absence of an input signal being generated by said operator input means.

10. An electronic teaching apparatus as set forth in claim 7, further including a housing having a substantially planar surface;

a plurality of overlays adapted to be individually disposed on said substantially planar surface of said housing, a different set of said plurality of pictorial representations being provided on each of said overlays;

coding means associated with each of said plurality of overlays and identifying each respective overlay; and said controller means being responsive to said coding means associated with the overlay disposed on said substantially planar surface of said housing at a given time when said control means selectively accesses stored digital speech data from said memory means.

11. An electronic teaching apparatus as set forth in claim 10, wherein said coding means associated with each of said plurality of overlays comprises one or more cutouts provided in said overlays and uniquely arranged with respect to each individual overlay and respectively indicative of the particular overlay, and switching means operably arranged in association with the portion of each overlay in which the uniquely arranged one or more cutouts are provided, said switching means including a plurality of switches respectively disposed in one of a closed position or an open position dependent upon registration with the overlay or a coding cutout therein.

12. An electronic teaching apparatus as set forth in claim 11, wherein said one or more cutouts provided in each of said plurality of overlays and uniquely arranged with respect thereto comprises one or more apertures through the overlay defining a distinctive pattern of holes therein.

* * * * *

UNITED STATES PATENT OFFICE
CERTIFICATE OF CORRECTION

Patent No. 4,403,965    Dated    September 13, 1983

Inventor(s)  William R. Hawkins

It is certified that error appears in the above-identified patent and that said Letters Patent are hereby corrected as shown below:

Data item [75] Inventor should show joint inventors -- William R. Hawkins, Lubbock, Texas and Barbara J. Thompson, Lubbock, Texas --.

Signed and Sealed this

Seventeenth Day of September 1985

[SEAL]

Attest:

Attesting Officer

DONALD J. QUIGG

Commissioner of Patents and Trademarks—Designate